United States Patent
Nixon et al.

(10) Patent No.: US 10,866,952 B2
(45) Date of Patent: Dec. 15, 2020

(54) SOURCE-INDEPENDENT QUERIES IN DISTRIBUTED INDUSTRIAL SYSTEM

(71) Applicant: FISHER-ROSEMOUNT SYSTEMS, INC., Round Rock, TX (US)

(72) Inventors: Mark John Nixon, Round Rock, TX (US); Alper Turhan Enver, Austin, TX (US); Noel Howard Bell, Austin, TX (US); Joshua Brian Kidd, Safety Harbor, FL (US); Paul R. Muston, Narborough (GB)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 567 days.

(21) Appl. No.: 15/274,244

(22) Filed: Sep. 23, 2016

(65) Prior Publication Data
US 2017/0103103 A1 Apr. 13, 2017

Related U.S. Application Data

(60) Provisional application No. 62/239,620, filed on Oct. 9, 2015.

(51) Int. Cl.
*G06F 17/00* (2019.01)
*G06F 7/00* (2006.01)
(Continued)

(52) U.S. Cl.
CPC ...... *G06F 16/2452* (2019.01); *G06F 16/2471* (2019.01); *G06F 16/252* (2019.01); *G06F 16/256* (2019.01); *Y02P 90/86* (2015.11)

(58) Field of Classification Search
CPC ............. G06F 16/2452; G06F 16/2471; G06F 16/256; G06F 16/252; Y02P 90/86
(Continued)

(56) References Cited

U.S. PATENT DOCUMENTS

| | | |
|---|---|---|
| 4,451,047 A | 5/1984 | Herd et al. |
| 4,593,367 A | 6/1986 | Slack et al. |

(Continued)

FOREIGN PATENT DOCUMENTS

| | | |
|---|---|---|
| AU | 2010257310 A1 | 7/2012 |
| CN | 1170464 A | 1/1998 |

(Continued)

OTHER PUBLICATIONS

Decision of Refusal for Japanese Application No. 2014-048410, dated May 29, 2018.
(Continued)

*Primary Examiner* — Pavan Mamillapalli
(74) *Attorney, Agent, or Firm* — Marshall, Gerstein & Borun LLP

(57) ABSTRACT

Techniques for requesting and providing process plant data using a source-independent standardized query are provided. A requesting device generates a standardized query to obtain data from one or more data sources, such as relational or non-relational databases. The query utilizes a standardized format that does not depend upon the data source, which query may be generated as a JSON file. The standardized query may not be directly usable for any data sources. Instead, a data device generates one or more source-specific queries upon receipt of the standardized query. The source-specific queries utilize syntax native to each data source to obtain data. In some instances, the received data must be further processed to adjust for different sample times or sampling rates, such as by interpolation. The resulting data from all data sources may be aggregated into a data frame prior to being returned to the requesting device.

35 Claims, 35 Drawing Sheets

(51) Int. Cl.
  *G06F 16/2452* (2019.01)
  *G06F 16/25* (2019.01)
  *G06F 16/2458* (2019.01)

(58) Field of Classification Search
  USPC ........................................................ 707/760
  See application file for complete search history.

(56) References Cited

U.S. PATENT DOCUMENTS

| | | | |
|---|---|---|---|
| 4,901,221 A | 2/1990 | Kodosky et al. | |
| 4,914,568 A | 4/1990 | Kodosky et al. | |
| 5,111,531 A | 5/1992 | Grayson et al. | |
| 5,164,897 A | 11/1992 | Clark et al. | |
| 5,291,587 A | 3/1994 | Kodosky et al. | |
| 5,301,301 A | 4/1994 | Kodosky et al. | |
| 5,301,336 A | 4/1994 | Kodosky et al. | |
| 5,305,426 A | 4/1994 | Ushioda et al. | |
| 5,475,851 A | 12/1995 | Kodosky et al. | |
| 5,481,740 A | 1/1996 | Kodosky | |
| 5,481,741 A | 1/1996 | McKaskle et al. | |
| 5,497,500 A | 3/1996 | Rogers et al. | |
| 5,544,320 A | 8/1996 | Konrad | |
| 5,568,491 A | 10/1996 | Beal et al. | |
| 5,598,572 A | 1/1997 | Tanikoshi et al. | |
| 5,610,828 A | 3/1997 | Kodosky et al. | |
| 5,652,909 A | 7/1997 | Kodosky | |
| D384,050 S | 9/1997 | Kodosky | |
| D384,051 S | 9/1997 | Kodosky | |
| D384,052 S | 9/1997 | Kodosky | |
| D387,750 S | 12/1997 | Kodosky | |
| 5,710,723 A | 1/1998 | Hoth et al. | |
| 5,732,277 A | 3/1998 | Kodosky et al. | |
| 5,734,863 A | 3/1998 | Kodosky et al. | |
| 5,737,622 A | 4/1998 | Rogers et al. | |
| 5,801,942 A | 9/1998 | Nixon et al. | |
| 5,801,946 A | 9/1998 | Nissen et al. | |
| 5,821,934 A | 10/1998 | Kodosky et al. | |
| 5,828,851 A | 10/1998 | Nixon et al. | |
| 5,838,563 A | 11/1998 | Dove et al. | |
| 5,856,931 A | 1/1999 | McCasland | |
| 5,862,052 A | 1/1999 | Nixon et al. | |
| 5,862,054 A | 1/1999 | Li | |
| 5,909,368 A | 6/1999 | Nixon et al. | |
| 5,917,489 A | 6/1999 | Thurlow et al. | |
| 5,940,294 A | 8/1999 | Dove | |
| 5,971,747 A | 10/1999 | Lemelson et al. | |
| 5,980,078 A | 11/1999 | Krivoshein et al. | |
| 5,987,246 A | 11/1999 | Thomsen et al. | |
| 5,988,847 A | 11/1999 | McLaughlin et al. | |
| 5,990,906 A | 11/1999 | Hudson et al. | |
| 5,995,916 A | 11/1999 | Nixon et al. | |
| 6,009,422 A | 12/1999 | Ciccarelli | |
| 6,032,208 A | 2/2000 | Nixon et al. | |
| 6,064,409 A | 5/2000 | Thomsen et al. | |
| 6,078,320 A | 6/2000 | Dove et al. | |
| 6,098,116 A | 8/2000 | Nixon et al. | |
| 6,167,464 A | 12/2000 | Kretschmann | |
| 6,173,438 B1 | 1/2001 | Kodosky et al. | |
| 6,178,504 B1 | 1/2001 | Fieres et al. | |
| 6,195,591 B1 | 2/2001 | Nixon et al. | |
| 6,219,628 B1 | 4/2001 | Kodosky et al. | |
| 6,266,726 B1 | 7/2001 | Nixon et al. | |
| 6,278,374 B1 | 8/2001 | Ganeshan | |
| 6,285,966 B1 | 9/2001 | Brown et al. | |
| 6,295,513 B1 | 9/2001 | Thackston | |
| 6,324,877 B2 | 12/2001 | Neeley | |
| 6,347,253 B1 | 2/2002 | Fujita et al. | |
| 6,421,570 B1 | 7/2002 | McLaughlin et al. | |
| 6,442,515 B1 | 8/2002 | Varma et al. | |
| 6,442,566 B1 * | 8/2002 | Atman | G06F 16/284 707/603 |
| 6,463,352 B1 | 10/2002 | Tadokoro et al. | |
| 6,529,780 B1 | 3/2003 | Soergel et al. | |
| 6,535,883 B1 | 3/2003 | Lee et al. | |
| 6,563,430 B1 | 5/2003 | Kemink et al. | |
| 6,584,601 B1 | 6/2003 | Kodosky et al. | |
| 6,608,638 B1 | 8/2003 | Kodosky et al. | |
| 6,609,036 B1 | 8/2003 | Bickford | |
| 6,658,114 B1 | 12/2003 | Farn et al. | |
| 6,701,285 B2 | 3/2004 | Salonen | |
| 6,715,078 B1 | 3/2004 | Chasko et al. | |
| 6,715,139 B1 | 3/2004 | Kodosky et al. | |
| 6,763,515 B1 | 7/2004 | Vazquez et al. | |
| 6,768,116 B1 | 7/2004 | Berman et al. | |
| 6,772,017 B1 | 8/2004 | Dove et al. | |
| 6,778,873 B1 | 8/2004 | Wang et al. | |
| 6,784,903 B2 | 8/2004 | Kodosky et al. | |
| 6,847,850 B2 | 1/2005 | Grumelart | |
| 6,868,538 B1 | 3/2005 | Nixon et al. | |
| 6,917,839 B2 | 7/2005 | Bickford | |
| 6,934,667 B2 | 8/2005 | Kodosky et al. | |
| 6,934,668 B2 | 8/2005 | Kodosky et al. | |
| 6,954,724 B2 | 10/2005 | Kodosky et al. | |
| 6,961,686 B2 | 11/2005 | Kodosky et al. | |
| 6,965,886 B2 | 11/2005 | Govrin et al. | |
| 6,970,758 B1 | 11/2005 | Shi et al. | |
| 6,971,066 B2 | 11/2005 | Schultz et al. | |
| 6,983,228 B2 | 1/2006 | Kodosky et al. | |
| 6,993,466 B2 | 1/2006 | Kodosky et al. | |
| 7,000,190 B2 | 2/2006 | Kudukoli et al. | |
| 7,006,881 B1 | 2/2006 | Hoffberg et al. | |
| 7,010,470 B2 | 3/2006 | Kodosky et al. | |
| 7,062,718 B2 | 6/2006 | Kodosky et al. | |
| 7,072,722 B1 | 7/2006 | Colonna et al. | |
| 7,123,974 B1 | 10/2006 | Hamilton | |
| 7,134,086 B2 | 11/2006 | Kodosky | |
| 7,134,090 B2 | 11/2006 | Kodosky et al. | |
| 7,143,149 B2 | 11/2006 | Oberg et al. | |
| 7,143,289 B2 | 11/2006 | Denning et al. | |
| 7,177,786 B2 | 2/2007 | Kodosky et al. | |
| 7,185,287 B2 | 2/2007 | Ghercioiu et al. | |
| 7,200,838 B2 | 4/2007 | Kodosky et al. | |
| 7,210,117 B2 | 4/2007 | Kudukoli et al. | |
| 7,213,057 B2 | 5/2007 | Trethewey et al. | |
| 7,216,334 B2 | 5/2007 | Kodosky et al. | |
| 7,219,306 B2 | 5/2007 | Kodosky et al. | |
| 7,222,131 B1 | 5/2007 | Grewal et al. | |
| 7,283,914 B2 | 10/2007 | Poorman et al. | |
| 7,283,971 B1 | 10/2007 | Levine et al. | |
| 7,302,675 B2 | 11/2007 | Rogers et al. | |
| 7,314,169 B1 | 1/2008 | Jasper et al. | |
| 7,340,737 B2 | 3/2008 | Ghercioiu et al. | |
| 7,343,605 B2 | 3/2008 | Langkafel et al. | |
| 7,346,404 B2 | 3/2008 | Eryurek et al. | |
| 7,367,028 B2 | 4/2008 | Kodosky et al. | |
| 7,478,337 B2 | 1/2009 | Kodosky et al. | |
| 7,506,304 B2 | 3/2009 | Morrow et al. | |
| 7,530,052 B2 | 5/2009 | Morrow et al. | |
| 7,530,113 B2 | 5/2009 | Braun | |
| 7,536,548 B1 | 5/2009 | Batke et al. | |
| RE40,817 E | 6/2009 | Krivoshein et al. | |
| 7,541,920 B2 | 6/2009 | Tambascio et al. | |
| 7,548,873 B2 | 6/2009 | Veeningen et al. | |
| 7,558,711 B2 | 7/2009 | Kodosky et al. | |
| 7,565,306 B2 | 7/2009 | Apostolides | |
| 7,574,690 B2 | 8/2009 | Shah et al. | |
| 7,590,987 B2 * | 9/2009 | Behrendt | H04L 67/02 707/999.01 |
| 7,594,220 B2 | 9/2009 | Kodosky et al. | |
| 7,598,856 B1 | 10/2009 | Nick et al. | |
| 7,606,681 B2 | 10/2009 | Esmaili et al. | |
| 7,616,095 B2 | 11/2009 | Jones et al. | |
| 7,617,542 B2 | 11/2009 | Vataja | |
| 7,627,860 B2 | 12/2009 | Kodosky et al. | |
| 7,630,914 B2 | 12/2009 | Veeningen et al. | |
| 7,640,007 B2 | 12/2009 | Chen et al. | |
| 7,644,052 B1 | 1/2010 | Chang et al. | |
| 7,650,264 B2 | 1/2010 | Kodosky et al. | |
| 7,653,563 B2 | 1/2010 | Veeningen et al. | |
| 7,668,608 B2 | 2/2010 | Nixon et al. | |
| 7,676,281 B2 | 3/2010 | Hood et al. | |
| 7,680,546 B2 | 3/2010 | Gilbert et al. | |
| 7,684,877 B2 | 3/2010 | Weatherhead et al. | |
| RE41,228 E | 4/2010 | Kodosky et al. | |

(56) References Cited

U.S. PATENT DOCUMENTS

| | | |
|---|---|---|
| 7,694,273 B2 | 4/2010 | Kodosky et al. |
| 7,707,014 B2 | 4/2010 | Kodosky et al. |
| 7,715,929 B2 | 5/2010 | Skourup et al. |
| 7,716,489 B1 | 5/2010 | Brandt et al. |
| 7,720,727 B2 | 5/2010 | Keyes et al. |
| 7,818,715 B2 | 10/2010 | Kodosky et al. |
| 7,818,716 B2 | 10/2010 | Kodosky et al. |
| 7,827,122 B1 | 11/2010 | Campbell, Jr. et al. |
| 7,831,914 B2 | 11/2010 | Kodosky et al. |
| 7,844,908 B2 | 11/2010 | Kodosky et al. |
| 7,853,431 B2 | 12/2010 | Samardzija et al. |
| 7,865,349 B2 | 1/2011 | Kodosky et al. |
| 7,882,490 B2 | 2/2011 | Kodosky et al. |
| 7,882,491 B2 | 2/2011 | Kodosky et al. |
| 7,890,461 B2 | 2/2011 | Oeda et al. |
| 7,925,979 B2 | 4/2011 | Forney et al. |
| 7,930,639 B2 | 4/2011 | Baier et al. |
| 7,934,095 B2 | 4/2011 | Laberteaux et al. |
| 7,937,665 B1 | 5/2011 | Vazquez et al. |
| 7,962,440 B2 | 6/2011 | Baier et al. |
| 7,978,059 B2 | 7/2011 | Petite et al. |
| 7,979,843 B2 | 7/2011 | Kodosky et al. |
| 7,984,423 B2 | 7/2011 | Kodosky et al. |
| 7,987,448 B2 | 7/2011 | Kodosky et al. |
| 8,014,722 B2 | 9/2011 | Abel et al. |
| 8,028,241 B2 | 9/2011 | Kodosky et al. |
| 8,028,242 B2 | 9/2011 | Kodosky et al. |
| 8,055,787 B2 | 11/2011 | Victor et al. |
| 8,060,834 B2 | 11/2011 | Lucas et al. |
| 8,073,967 B2 | 12/2011 | Peterson et al. |
| 8,074,201 B2 | 12/2011 | Ghercioiu et al. |
| 8,099,712 B2 | 1/2012 | Kodosky et al. |
| 8,102,400 B1 | 1/2012 | Cook et al. |
| 8,126,964 B2 | 2/2012 | Pretlove et al. |
| 8,132,225 B2 | 3/2012 | Chand et al. |
| 8,146,053 B2 | 3/2012 | Morrow et al. |
| 8,166,296 B2 | 4/2012 | Buer et al. |
| 8,171,137 B1 | 5/2012 | Parks et al. |
| 8,185,217 B2 | 5/2012 | Thiele |
| 8,185,495 B2 | 5/2012 | Clark et al. |
| 8,185,832 B2 | 5/2012 | Kodosky et al. |
| 8,185,833 B2 | 5/2012 | Kodosky et al. |
| 8,185,871 B2 | 5/2012 | Nixon et al. |
| 8,190,888 B2 | 5/2012 | Batke et al. |
| 8,191,005 B2 | 5/2012 | Baier et al. |
| 8,214,455 B2 | 7/2012 | Baier et al. |
| 8,218,651 B1 | 7/2012 | Eshet et al. |
| 8,219,669 B2 | 7/2012 | Agrusa et al. |
| 8,224,496 B2 | 7/2012 | Musti et al. |
| 8,239,848 B2 | 8/2012 | Ghercioiu et al. |
| 8,266,066 B1 | 9/2012 | Wezter et al. |
| 8,290,762 B2 | 10/2012 | Kodosky et al. |
| 8,307,330 B2 | 11/2012 | Kumar et al. |
| 8,316,313 B2 | 11/2012 | Campney et al. |
| 8,321,663 B2 | 11/2012 | Medvinsky et al. |
| 8,327,130 B2 | 12/2012 | Wilkinson, Jr. et al. |
| 8,350,666 B2 | 1/2013 | Kore |
| 8,359,567 B2 | 1/2013 | Kornerup et al. |
| 8,397,172 B2 | 3/2013 | Kodosky et al. |
| 8,397,205 B2 | 3/2013 | Kornerup et al. |
| 8,413,118 B2 | 4/2013 | Kodosky et al. |
| 8,417,360 B2 | 4/2013 | Sustaeta et al. |
| 8,417,595 B2 | 4/2013 | Keyes et al. |
| 8,418,071 B2 | 4/2013 | Kodosky et al. |
| 8,429,627 B2 | 4/2013 | Jedlicka et al. |
| 8,448,135 B2 | 5/2013 | Kodosky |
| 8,521,332 B2 | 8/2013 | Tiemann et al. |
| 8,532,795 B2 | 9/2013 | Adavi et al. |
| 8,570,922 B2 | 10/2013 | Pratt, Jr. et al. |
| 8,612,870 B2 | 12/2013 | Kodosky et al. |
| 8,624,725 B1 | 1/2014 | MacGregor |
| 8,640,112 B2 | 1/2014 | Yi et al. |
| 8,656,351 B2 | 2/2014 | Kodosky et al. |
| 8,688,780 B2 | 4/2014 | Gordon et al. |
| 8,781,776 B2 | 7/2014 | Onda et al. |
| 8,832,236 B2 | 9/2014 | Hernandez et al. |
| 8,838,636 B2 * | 9/2014 | Kulkarni ............ G06F 16/248 707/759 |
| 8,886,598 B1 | 11/2014 | Emigh |
| 8,943,469 B2 | 1/2015 | Kumar et al. |
| 8,977,851 B2 | 3/2015 | Neitzel et al. |
| 9,002,973 B2 | 4/2015 | Panther |
| 9,021,021 B2 | 4/2015 | Backholm et al. |
| 9,024,972 B1 | 5/2015 | Bronder et al. |
| 9,038,043 B1 | 5/2015 | Fleetwood et al. |
| 9,047,007 B2 | 6/2015 | Kodosky et al. |
| 9,088,665 B2 | 7/2015 | Boyer et al. |
| 9,098,164 B2 | 8/2015 | Kodosky |
| 9,110,558 B2 | 8/2015 | Kodosky |
| 9,119,166 B1 | 8/2015 | Sheikh |
| 9,122,764 B2 | 9/2015 | Neitzel et al. |
| 9,122,786 B2 | 9/2015 | Cammert et al. |
| 9,134,895 B2 | 9/2015 | Dove et al. |
| 9,229,871 B2 | 1/2016 | Washiro |
| 9,235,395 B2 | 1/2016 | Kodosky et al. |
| 9,244,452 B2 | 1/2016 | Brandes et al. |
| 9,285,795 B2 | 3/2016 | Nixon et al. |
| 9,338,218 B1 | 5/2016 | Florissi et al. |
| 9,361,320 B1 | 6/2016 | Vijendra et al. |
| 9,397,836 B2 | 7/2016 | Nixon et al. |
| 9,424,398 B1 | 8/2016 | McLeod et al. |
| 9,430,114 B1 | 8/2016 | Dingman et al. |
| 9,459,809 B1 | 10/2016 | Chen et al. |
| 9,466,038 B2 | 10/2016 | Kezeu |
| 9,516,354 B1 | 12/2016 | Verheem et al. |
| 9,532,232 B2 | 12/2016 | Dewey et al. |
| 9,541,905 B2 | 1/2017 | Nixon et al. |
| 9,558,220 B2 | 1/2017 | Nixon et al. |
| 9,652,213 B2 | 5/2017 | MacCleery et al. |
| 9,678,484 B2 | 6/2017 | Nixon et al. |
| 9,697,170 B2 | 7/2017 | Nixon et al. |
| 9,804,588 B2 | 10/2017 | Blevins et al. |
| 9,892,353 B1 | 2/2018 | Lui et al. |
| 2002/0010694 A1 | 1/2002 | Navab et al. |
| 2002/0035495 A1 | 3/2002 | Spira et al. |
| 2002/0052715 A1 | 5/2002 | Maki |
| 2002/0054130 A1 | 5/2002 | Abbott et al. |
| 2002/0064138 A1 | 5/2002 | Saito et al. |
| 2002/0077711 A1 | 6/2002 | Nixon et al. |
| 2002/0080174 A1 | 6/2002 | Kodosky et al. |
| 2002/0087419 A1 | 7/2002 | Andersson et al. |
| 2002/0094085 A1 | 7/2002 | Roberts |
| 2002/0120475 A1 | 8/2002 | Morimoto |
| 2002/0123864 A1 | 9/2002 | Eryurek et al. |
| 2002/0128998 A1 | 9/2002 | Kil et al. |
| 2002/0130846 A1 | 9/2002 | Nixon et al. |
| 2002/0138168 A1 | 9/2002 | Salonen |
| 2002/0138320 A1 | 9/2002 | Robertson et al. |
| 2002/0149497 A1 | 10/2002 | Jaggi |
| 2002/0159441 A1 | 10/2002 | Travaly et al. |
| 2002/0169514 A1 | 11/2002 | Eryurek et al. |
| 2002/0194112 A1 | 12/2002 | dePinto et al. |
| 2002/0194209 A1 | 12/2002 | Bolosky et al. |
| 2003/0020726 A1 | 1/2003 | Charpentier |
| 2003/0023795 A1 | 1/2003 | Packwood et al. |
| 2003/0028495 A1 | 2/2003 | Pallante |
| 2003/0037119 A1 | 2/2003 | Austin |
| 2003/0061295 A1 | 3/2003 | Oberg et al. |
| 2003/0083756 A1 | 5/2003 | Hsiung et al. |
| 2003/0084053 A1 | 5/2003 | Govrin et al. |
| 2003/0093309 A1 | 5/2003 | Tanikoshi et al. |
| 2003/0139837 A1 | 7/2003 | Marr |
| 2003/0147351 A1 | 8/2003 | Greenlee |
| 2003/0154044 A1 | 8/2003 | Lundstedt et al. |
| 2003/0195934 A1 | 10/2003 | Peterson et al. |
| 2004/0005859 A1 | 1/2004 | Ghercioiu et al. |
| 2004/0012632 A1 | 1/2004 | King et al. |
| 2004/0014479 A1 | 1/2004 | Milman |
| 2004/0075689 A1 | 4/2004 | Schleiss et al. |
| 2004/0093102 A1 | 5/2004 | Liiri et al. |
| 2004/0117233 A1 | 6/2004 | Rapp |
| 2004/0133457 A1 | 7/2004 | Sadiq et al. |
| 2004/0153437 A1 | 8/2004 | Buchan |
| 2004/0153804 A1 | 8/2004 | Blevins et al. |

(56) References Cited

U.S. PATENT DOCUMENTS

| | | |
|---|---|---|
| 2004/0186927 A1 | 9/2004 | Eryurek et al. |
| 2004/0203874 A1 | 10/2004 | Brandt et al. |
| 2004/0204775 A1 | 10/2004 | Keyes et al. |
| 2004/0210330 A1 | 10/2004 | Birkle |
| 2004/0230328 A1 | 11/2004 | Armstrong et al. |
| 2004/0233930 A1 | 11/2004 | Colby |
| 2004/0259533 A1 | 12/2004 | Nixon et al. |
| 2005/0005259 A1 | 1/2005 | Avery et al. |
| 2005/0007249 A1 | 1/2005 | Eryurek et al. |
| 2005/0033481 A1 | 2/2005 | Budhraja et al. |
| 2005/0049835 A1 | 3/2005 | Mayer et al. |
| 2005/0060111 A1 | 3/2005 | Ramillon et al. |
| 2005/0062677 A1 | 3/2005 | Nixon et al. |
| 2005/0080799 A1 | 4/2005 | Harnden et al. |
| 2005/0096872 A1 | 5/2005 | Blevins et al. |
| 2005/0130634 A1 | 6/2005 | Godfrey |
| 2005/0164684 A1 | 7/2005 | Chen et al. |
| 2005/0182650 A1 | 8/2005 | Maddox et al. |
| 2005/0187649 A1 | 8/2005 | Funk et al. |
| 2005/0197806 A1 | 9/2005 | Eryurek et al. |
| 2005/0213768 A1 | 9/2005 | Durham et al. |
| 2005/0222691 A1 | 10/2005 | Glas et al. |
| 2005/0222698 A1 | 10/2005 | Eryurek et al. |
| 2005/0264527 A1 | 12/2005 | Lin |
| 2005/0289183 A1 | 12/2005 | Kaneko et al. |
| 2006/0031826 A1 | 2/2006 | Hiramatsu et al. |
| 2006/0064291 A1 | 3/2006 | Pattipatti et al. |
| 2006/0064472 A1 | 3/2006 | Mirho |
| 2006/0069717 A1 | 3/2006 | Mamou et al. |
| 2006/0087402 A1 | 4/2006 | Manning et al. |
| 2006/0161394 A1 | 7/2006 | Dulberg et al. |
| 2006/0168396 A1 | 7/2006 | LaMothe et al. |
| 2006/0200260 A1 | 9/2006 | Hoffberg et al. |
| 2006/0200771 A1 | 9/2006 | Nielsen et al. |
| 2006/0218107 A1 | 9/2006 | Young |
| 2006/0235741 A1 | 10/2006 | Deaton et al. |
| 2006/0241792 A1 | 10/2006 | Pretlove et al. |
| 2006/0288091 A1 | 12/2006 | Oh et al. |
| 2006/0288330 A1 | 12/2006 | Bahrami et al. |
| 2006/0291481 A1 | 12/2006 | Kumar |
| 2006/0294087 A1 | 12/2006 | Mordvinov |
| 2007/0005266 A1 | 1/2007 | Blevins et al. |
| 2007/0014406 A1 | 1/2007 | Scheidt et al. |
| 2007/0038889 A1 | 2/2007 | Wiggins et al. |
| 2007/0067725 A1 | 3/2007 | Cahill et al. |
| 2007/0078696 A1 | 4/2007 | Hardin |
| 2007/0085840 A1 | 4/2007 | Asaka et al. |
| 2007/0112574 A1 | 5/2007 | Greene |
| 2007/0118516 A1 | 5/2007 | Li et al. |
| 2007/0130206 A1* | 6/2007 | Zhou .................. G16H 50/50 707/999.107 |
| 2007/0130310 A1 | 6/2007 | Batke et al. |
| 2007/0130572 A1 | 6/2007 | Gilbert et al. |
| 2007/0132779 A1 | 6/2007 | Gilbert et al. |
| 2007/0139441 A1 | 6/2007 | Lucas et al. |
| 2007/0142936 A1 | 6/2007 | Denison et al. |
| 2007/0168060 A1 | 7/2007 | Nixon et al. |
| 2007/0179645 A1 | 8/2007 | Nixon et al. |
| 2007/0185754 A1 | 8/2007 | Schmidt |
| 2007/0211079 A1 | 9/2007 | Nixon et al. |
| 2007/0239292 A1 | 10/2007 | Ehrman et al. |
| 2007/0250292 A1 | 10/2007 | Alagappan et al. |
| 2007/0265801 A1 | 11/2007 | Foslien et al. |
| 2007/0265866 A1 | 11/2007 | Fehling et al. |
| 2008/0021874 A1 | 1/2008 | Dahl et al. |
| 2008/0040719 A1 | 2/2008 | Shimizu et al. |
| 2008/0046104 A1 | 2/2008 | Van Camp et al. |
| 2008/0058968 A1 | 3/2008 | Sharma et al. |
| 2008/0065243 A1 | 3/2008 | Fallman et al. |
| 2008/0065705 A1 | 3/2008 | Miller |
| 2008/0065706 A1 | 3/2008 | Miller et al. |
| 2008/0076431 A1 | 3/2008 | Fletcher et al. |
| 2008/0078189 A1 | 4/2008 | Ando |
| 2008/0079596 A1 | 4/2008 | Baier et al. |
| 2008/0082180 A1 | 4/2008 | Blevins et al. |
| 2008/0082181 A1 | 4/2008 | Miller et al. |
| 2008/0082195 A1 | 4/2008 | Samardzija |
| 2008/0085682 A1 | 4/2008 | Rao |
| 2008/0086428 A1* | 4/2008 | Wallace .................. G06Q 10/06 705/36 R |
| 2008/0097622 A1 | 4/2008 | Forney et al. |
| 2008/0103843 A1 | 5/2008 | Goeppert et al. |
| 2008/0104189 A1 | 5/2008 | Baker et al. |
| 2008/0109090 A1 | 5/2008 | Esmaili et al. |
| 2008/0114710 A1 | 5/2008 | Pucher |
| 2008/0125912 A1 | 5/2008 | Heilman et al. |
| 2008/0126352 A1 | 5/2008 | Case |
| 2008/0126408 A1 | 5/2008 | Middleton |
| 2008/0126665 A1 | 5/2008 | Burr et al. |
| 2008/0134215 A1 | 6/2008 | Thibault et al. |
| 2008/0143482 A1 | 6/2008 | Shoarinejad et al. |
| 2008/0174766 A1 | 7/2008 | Haaslahti et al. |
| 2008/0182592 A1 | 7/2008 | Cha et al. |
| 2008/0209443 A1 | 8/2008 | Suzuki |
| 2008/0249641 A1 | 10/2008 | Enver et al. |
| 2008/0274766 A1 | 11/2008 | Pratt et al. |
| 2008/0275971 A1 | 11/2008 | Pretlove et al. |
| 2008/0288321 A1 | 11/2008 | Dillon et al. |
| 2008/0297513 A1 | 12/2008 | Greenhill et al. |
| 2008/0301123 A1 | 12/2008 | Schneider et al. |
| 2009/0048853 A1 | 2/2009 | Hall |
| 2009/0049073 A1 | 2/2009 | Cho |
| 2009/0059814 A1 | 3/2009 | Nixon et al. |
| 2009/0065578 A1 | 3/2009 | Peterson et al. |
| 2009/0070337 A1 | 3/2009 | Romem et al. |
| 2009/0070589 A1 | 3/2009 | Nayak et al. |
| 2009/0089233 A1 | 4/2009 | Gach et al. |
| 2009/0089247 A1 | 4/2009 | Blevins et al. |
| 2009/0089359 A1 | 4/2009 | Siorek et al. |
| 2009/0089709 A1 | 4/2009 | Baier et al. |
| 2009/0094531 A1 | 4/2009 | Danieli et al. |
| 2009/0097502 A1 | 4/2009 | Yamamoto |
| 2009/0112335 A1 | 4/2009 | Mehta et al. |
| 2009/0112532 A1 | 4/2009 | Foslien et al. |
| 2009/0198826 A1 | 8/2009 | Ishijima |
| 2009/0210386 A1 | 8/2009 | Cahill |
| 2009/0210802 A1 | 8/2009 | Hawkins et al. |
| 2009/0210814 A1 | 8/2009 | Agrusa et al. |
| 2009/0216341 A1 | 8/2009 | Enkerud et al. |
| 2009/0249237 A1 | 10/2009 | Jundt et al. |
| 2009/0284348 A1 | 11/2009 | Pfeffer |
| 2009/0284383 A1 | 11/2009 | Wiles et al. |
| 2009/0292514 A1 | 11/2009 | McKim et al. |
| 2009/0294174 A1 | 12/2009 | Harmer et al. |
| 2009/0300535 A1 | 12/2009 | Skourup et al. |
| 2009/0319058 A1 | 12/2009 | Rovaglio et al. |
| 2009/0325603 A1 | 12/2009 | Van Os et al. |
| 2009/0327014 A1 | 12/2009 | Labedz et al. |
| 2010/0036779 A1 | 2/2010 | Sadeh-Koniecpol et al. |
| 2010/0069008 A1 | 3/2010 | Oshima et al. |
| 2010/0076642 A1 | 3/2010 | Hoffberg et al. |
| 2010/0082132 A1 | 4/2010 | Marruchella et al. |
| 2010/0082158 A1 | 4/2010 | Lakomiak et al. |
| 2010/0106282 A1 | 4/2010 | Mackelprang et al. |
| 2010/0127821 A1 | 5/2010 | Jones et al. |
| 2010/0127824 A1 | 5/2010 | Moschl et al. |
| 2010/0145476 A1 | 6/2010 | Junk et al. |
| 2010/0169785 A1 | 7/2010 | Jesudason |
| 2010/0175012 A1 | 7/2010 | Allstrom et al. |
| 2010/0185857 A1 | 7/2010 | Neitzel et al. |
| 2010/0190442 A1 | 7/2010 | Citrano, III et al. |
| 2010/0192122 A1 | 7/2010 | Esfahan et al. |
| 2010/0218010 A1 | 8/2010 | Musti et al. |
| 2010/0222899 A1 | 9/2010 | Blevins et al. |
| 2010/0234969 A1 | 9/2010 | Inoue |
| 2010/0262929 A1 | 10/2010 | Avery |
| 2010/0275135 A1 | 10/2010 | Dunton et al. |
| 2010/0286798 A1 | 11/2010 | Keyes et al. |
| 2010/0290351 A1 | 11/2010 | Toepke et al. |
| 2010/0290359 A1 | 11/2010 | Dewey et al. |
| 2010/0293019 A1 | 11/2010 | Keyes et al. |
| 2010/0293564 A1 | 11/2010 | Gould et al. |
| 2010/0299105 A1 | 11/2010 | Vass et al. |
| 2010/0305736 A1 | 12/2010 | Arduini |

(56) References Cited

U.S. PATENT DOCUMENTS

| | | |
|---|---|---|
| 2010/0318934 A1 | 12/2010 | Blevins et al. |
| 2011/0019725 A1 | 1/2011 | Keller |
| 2011/0022193 A1 | 1/2011 | Panaitescu |
| 2011/0046754 A1 | 2/2011 | Bromley et al. |
| 2011/0071869 A1 | 3/2011 | O'Brien et al. |
| 2011/0072338 A1 | 3/2011 | Caldwell |
| 2011/0098918 A1 | 4/2011 | Siliski et al. |
| 2011/0115816 A1 | 5/2011 | Brackney |
| 2011/0130848 A1 | 6/2011 | Tegnell et al. |
| 2011/0140864 A1 | 6/2011 | Bucci |
| 2011/0144777 A1 | 6/2011 | Firkins et al. |
| 2011/0185292 A1 | 7/2011 | Chawla et al. |
| 2011/0191277 A1 | 8/2011 | Agúndez Dominguez et al. |
| 2011/0238189 A1 | 9/2011 | Butera et al. |
| 2011/0258138 A1 | 10/2011 | Kulkarni et al. |
| 2011/0270855 A1 | 11/2011 | Antonysamy |
| 2011/0276896 A1 | 11/2011 | Zambetti et al. |
| 2011/0276908 A1 | 11/2011 | O'Riordan |
| 2011/0279323 A1 | 11/2011 | Hung et al. |
| 2011/0282793 A1 | 11/2011 | Mercuri et al. |
| 2011/0282836 A1 | 11/2011 | Erickson et al. |
| 2011/0295578 A1 | 12/2011 | Aldrich et al. |
| 2011/0295722 A1 | 12/2011 | Reisman |
| 2012/0004743 A1 | 1/2012 | Anne et al. |
| 2012/0005270 A1 | 1/2012 | Harding et al. |
| 2012/0010758 A1 | 1/2012 | Francino et al. |
| 2012/0011180 A1 | 1/2012 | Kavaklioglu |
| 2012/0011511 A1 | 1/2012 | Horvitz et al. |
| 2012/0016816 A1 | 1/2012 | Yanase et al. |
| 2012/0029661 A1 | 2/2012 | Jones et al. |
| 2012/0038458 A1 | 2/2012 | Toepke et al. |
| 2012/0040698 A1 | 2/2012 | Ferguson et al. |
| 2012/0078869 A1 | 3/2012 | Bellville et al. |
| 2012/0095574 A1 | 4/2012 | Greenlee |
| 2012/0147862 A1 | 6/2012 | Poojary et al. |
| 2012/0163521 A1 | 6/2012 | Kirrmann et al. |
| 2012/0176491 A1 | 7/2012 | Garin et al. |
| 2012/0197852 A1* | 8/2012 | Dutta ............... H04L 67/2804 707/692 |
| 2012/0203728 A1 | 8/2012 | Levine |
| 2012/0210083 A1 | 8/2012 | Lawrence |
| 2012/0226985 A1 | 9/2012 | Chervets et al. |
| 2012/0230309 A1 | 9/2012 | Junk |
| 2012/0239164 A1 | 9/2012 | Smith et al. |
| 2012/0240181 A1 | 9/2012 | McCorkendale et al. |
| 2012/0249588 A1 | 10/2012 | Tison et al. |
| 2012/0251996 A1 | 10/2012 | Jung et al. |
| 2012/0259436 A1 | 10/2012 | Resurreccion et al. |
| 2012/0271962 A1 | 10/2012 | Ivanov et al. |
| 2012/0290795 A1 | 11/2012 | Dowlatkhah |
| 2012/0321273 A1 | 12/2012 | Messmer |
| 2012/0324365 A1 | 12/2012 | Momchilov et al. |
| 2012/0331541 A1 | 12/2012 | Hamilton, II et al. |
| 2013/0006696 A1 | 1/2013 | Louie et al. |
| 2013/0007223 A1 | 1/2013 | Luby et al. |
| 2013/0013523 A1 | 1/2013 | Herrera Campos |
| 2013/0029686 A1 | 1/2013 | Moshfeghi |
| 2013/0041479 A1 | 2/2013 | Zhang et al. |
| 2013/0060354 A1 | 3/2013 | Choi et al. |
| 2013/0086591 A1 | 4/2013 | Haven |
| 2013/0095849 A1 | 4/2013 | Pakzad |
| 2013/0120449 A1 | 5/2013 | Ihara et al. |
| 2013/0124749 A1 | 5/2013 | Thang et al. |
| 2013/0127980 A1 | 5/2013 | Haddick et al. |
| 2013/0144404 A1 | 6/2013 | Godwin et al. |
| 2013/0144405 A1 | 6/2013 | Lo |
| 2013/0144605 A1 | 6/2013 | Brager et al. |
| 2013/0151563 A1 | 6/2013 | Addepalli et al. |
| 2013/0159200 A1 | 6/2013 | Paul et al. |
| 2013/0166542 A1* | 6/2013 | Kulkarni ............... G06F 16/248 707/722 |
| 2013/0169526 A1 | 7/2013 | Gai et al. |
| 2013/0171599 A1 | 7/2013 | Bleich et al. |
| 2013/0184847 A1 | 7/2013 | Fruh et al. |
| 2013/0197954 A1 | 8/2013 | Yankelevich et al. |
| 2013/0211555 A1 | 8/2013 | Lawson et al. |
| 2013/0212129 A1 | 8/2013 | Lawson et al. |
| 2013/0214902 A1 | 8/2013 | Pineau et al. |
| 2013/0217417 A1 | 8/2013 | Mohideen et al. |
| 2013/0231947 A1 | 9/2013 | Shusterman |
| 2013/0257627 A1 | 10/2013 | Rafael |
| 2013/0265857 A1 | 10/2013 | Foulds et al. |
| 2013/0282150 A1 | 10/2013 | Panther et al. |
| 2013/0318536 A1 | 11/2013 | Fletcher et al. |
| 2013/0321578 A1 | 12/2013 | Dini |
| 2014/0006338 A1 | 1/2014 | Watson et al. |
| 2014/0015672 A1 | 1/2014 | Ponce |
| 2014/0039648 A1 | 2/2014 | Boult et al. |
| 2014/0067800 A1 | 3/2014 | Sharma |
| 2014/0078163 A1 | 3/2014 | Cammert et al. |
| 2014/0079297 A1 | 3/2014 | Tadayon et al. |
| 2014/0089504 A1 | 3/2014 | Scholz et al. |
| 2014/0108985 A1 | 4/2014 | Scott et al. |
| 2014/0122026 A1 | 5/2014 | Aberg et al. |
| 2014/0122806 A1 | 5/2014 | Lin et al. |
| 2014/0123115 A1 | 5/2014 | Peretz |
| 2014/0123276 A1 | 5/2014 | Bush et al. |
| 2014/0129002 A1 | 5/2014 | Brandes et al. |
| 2014/0136652 A1 | 5/2014 | Narayanaswami et al. |
| 2014/0156032 A1 | 6/2014 | Jenkins et al. |
| 2014/0164603 A1 | 6/2014 | Castel et al. |
| 2014/0172961 A1 | 6/2014 | Clemmer et al. |
| 2014/0180671 A1 | 6/2014 | Osipova |
| 2014/0180970 A1 | 6/2014 | Hettenkofer et al. |
| 2014/0189520 A1 | 7/2014 | Crepps et al. |
| 2014/0201244 A1 | 7/2014 | Zhou |
| 2014/0207415 A1 | 7/2014 | Bhutani et al. |
| 2014/0229970 A1 | 8/2014 | Besehanic |
| 2014/0232843 A1 | 8/2014 | Campbell |
| 2014/0250153 A1 | 9/2014 | Nixon et al. |
| 2014/0267599 A1 | 9/2014 | Drouin et al. |
| 2014/0273847 A1 | 9/2014 | Nixon et al. |
| 2014/0274123 A1 | 9/2014 | Nixon et al. |
| 2014/0277593 A1 | 9/2014 | Nixon et al. |
| 2014/0277594 A1 | 9/2014 | Nixon et al. |
| 2014/0277595 A1 | 9/2014 | Nixon et al. |
| 2014/0277596 A1 | 9/2014 | Nixon et al. |
| 2014/0277604 A1 | 9/2014 | Nixon et al. |
| 2014/0277605 A1 | 9/2014 | Nixon et al. |
| 2014/0277607 A1 | 9/2014 | Nixon et al. |
| 2014/0277615 A1 | 9/2014 | Nixon et al. |
| 2014/0277616 A1 | 9/2014 | Nixon et al. |
| 2014/0277617 A1 | 9/2014 | Nixon et al. |
| 2014/0277618 A1 | 9/2014 | Nixon et al. |
| 2014/0277656 A1 | 9/2014 | Nixon et al. |
| 2014/0278312 A1 | 9/2014 | Nixon et al. |
| 2014/0280497 A1 | 9/2014 | Nixon et al. |
| 2014/0280678 A1 | 9/2014 | Nixon et al. |
| 2014/0282015 A1 | 9/2014 | Nixon et al. |
| 2014/0282227 A1 | 9/2014 | Nixon et al. |
| 2014/0282257 A1 | 9/2014 | Nixon et al. |
| 2014/0282722 A1 | 9/2014 | Kummer et al. |
| 2014/0297225 A1 | 10/2014 | Petroski et al. |
| 2014/0303754 A1 | 10/2014 | Nixon et al. |
| 2014/0316579 A1 | 10/2014 | Taylor et al. |
| 2014/0335480 A1 | 11/2014 | Asenjo et al. |
| 2014/0358256 A1 | 12/2014 | Billi et al. |
| 2014/0359552 A1 | 12/2014 | Misra et al. |
| 2014/0372378 A1 | 12/2014 | Long et al. |
| 2014/0372561 A1 | 12/2014 | Hisano |
| 2014/0379296 A1 | 12/2014 | Nathan et al. |
| 2015/0024710 A1 | 1/2015 | Becker et al. |
| 2015/0043626 A1 | 2/2015 | Williams et al. |
| 2015/0067163 A1 | 3/2015 | Bahnsen et al. |
| 2015/0077263 A1 | 3/2015 | Ali et al. |
| 2015/0106578 A1 | 4/2015 | Warfield et al. |
| 2015/0172872 A1 | 6/2015 | Alsehly et al. |
| 2015/0177718 A1 | 6/2015 | Vartiainen et al. |
| 2015/0185716 A1 | 7/2015 | Wichmann et al. |
| 2015/0188975 A1 | 7/2015 | Hansen et al. |
| 2015/0193418 A1 | 7/2015 | Koska et al. |
| 2015/0199494 A1 | 7/2015 | Koduri et al. |
| 2015/0212679 A1 | 7/2015 | Liu |
| 2015/0220080 A1 | 8/2015 | Nixon et al. |

(56) References Cited

U.S. PATENT DOCUMENTS

| | | |
|---|---|---|
| 2015/0220311 A1 | 8/2015 | Salter |
| 2015/0221152 A1 | 8/2015 | Andersen |
| 2015/0222731 A1 | 8/2015 | Shinohara et al. |
| 2015/0246852 A1 | 9/2015 | Chen et al. |
| 2015/0254330 A1 | 9/2015 | Chan et al. |
| 2015/0261215 A1 | 9/2015 | Blevins et al. |
| 2015/0277399 A1 | 10/2015 | Maturana et al. |
| 2015/0278397 A1 | 10/2015 | Hendrickson et al. |
| 2015/0296324 A1 | 10/2015 | Garaas et al. |
| 2015/0312721 A1 | 10/2015 | Singh et al. |
| 2015/0332188 A1 | 11/2015 | Yankelevich et al. |
| 2016/0098021 A1 | 4/2016 | Zornio et al. |
| 2016/0098037 A1 | 4/2016 | Zornio et al. |
| 2016/0098388 A1 | 4/2016 | Blevins et al. |
| 2016/0098647 A1 | 4/2016 | Nixon et al. |
| 2016/0132046 A1 | 5/2016 | Beoughter et al. |
| 2016/0261482 A1 | 9/2016 | Mixer et al. |
| 2016/0281607 A1 | 9/2016 | Asati et al. |
| 2016/0327942 A1 | 11/2016 | Nixon et al. |
| 2017/0102678 A1 | 4/2017 | Nixon et al. |
| 2017/0102693 A1 | 4/2017 | Kidd et al. |
| 2017/0102694 A1 | 4/2017 | Enver et al. |
| 2017/0102696 A1 | 4/2017 | Bell et al. |
| 2017/0102969 A1 | 4/2017 | Kochunni et al. |
| 2017/0115648 A1 | 4/2017 | Nixon et al. |
| 2017/0154073 A1* | 6/2017 | Wu .................. G06F 16/2425 |
| 2017/0154395 A1 | 6/2017 | Podgurny et al. |
| 2017/0199843 A1 | 7/2017 | Nixon et al. |
| 2017/0223075 A1 | 8/2017 | Hong et al. |
| 2017/0235298 A1 | 8/2017 | Nixon et al. |
| 2017/0236067 A1 | 8/2017 | Tjiong |
| 2017/0238055 A1 | 8/2017 | Chang et al. |
| 2017/0255826 A1 | 9/2017 | Chang et al. |
| 2017/0255827 A1 | 9/2017 | Chang et al. |
| 2017/0255828 A1 | 9/2017 | Chang et al. |
| 2017/0255829 A1 | 9/2017 | Chang et al. |
| 2018/0012510 A1 | 1/2018 | Asenjo et al. |
| 2018/0151037 A1 | 5/2018 | Morgenthau et al. |
| 2018/0343544 A1 | 11/2018 | Fan et al. |
| 2019/0032948 A1 | 1/2019 | Nayak et al. |

FOREIGN PATENT DOCUMENTS

| | | |
|---|---|---|
| CN | 1409179 A | 4/2003 |
| CN | 1409232 A | 4/2003 |
| CN | 1537258 A | 10/2004 |
| CN | 1589423 A | 3/2005 |
| CN | 1757002 A | 4/2006 |
| CN | 1804744 A | 7/2006 |
| CN | 1805040 A | 7/2006 |
| CN | 1826565 A | 8/2006 |
| CN | 1864156 A | 11/2006 |
| CN | 1980194 A | 6/2007 |
| CN | 101097136 A | 1/2008 |
| CN | 101169799 A | 4/2008 |
| CN | 101187869 A | 5/2008 |
| CN | 101221415 A | 7/2008 |
| CN | 101387882 A | 3/2009 |
| CN | 101449259 A | 6/2009 |
| CN | 201374004 Y | 12/2009 |
| CN | 101713985 A | 5/2010 |
| CN | 101788820 A | 7/2010 |
| CN | 101802736 A | 8/2010 |
| CN | 101822050 A | 9/2010 |
| CN | 101828195 A | 9/2010 |
| CN | 101867566 A | 10/2010 |
| CN | 102063097 A | 5/2011 |
| CN | 102073448 A | 5/2011 |
| CN | 102124432 A | 7/2011 |
| CN | 102169182 A | 8/2011 |
| CN | 102175174 A | 9/2011 |
| CN | 102184489 A | 9/2011 |
| CN | 102200993 A | 9/2011 |
| CN | 102213959 A | 10/2011 |
| CN | 102239452 A | 11/2011 |
| CN | 102243315 A | 11/2011 |
| CN | 102278987 A | 12/2011 |
| CN | 202101268 U | 1/2012 |
| CN | 102349031 A | 2/2012 |
| CN | 102375453 A | 3/2012 |
| CN | 102378989 A | 3/2012 |
| CN | 102402215 A | 4/2012 |
| CN | 102436205 A | 5/2012 |
| CN | 102494630 A | 6/2012 |
| CN | 102494683 A | 6/2012 |
| CN | 102637027 A | 8/2012 |
| CN | 102640156 A | 8/2012 |
| CN | 102707689 A | 10/2012 |
| CN | 102710861 A | 10/2012 |
| CN | 102780568 A | 11/2012 |
| CN | 102801779 A | 11/2012 |
| CN | 102867237 A | 1/2013 |
| CN | 103106188 A | 5/2013 |
| CN | 103403686 A | 11/2013 |
| CN | 103576638 A | 2/2014 |
| CN | 103699698 A | 4/2014 |
| CN | 104035392 A | 9/2014 |
| CN | 104049575 A | 9/2014 |
| DE | 19882113 T1 | 1/2000 |
| DE | 19882117 T1 | 1/2000 |
| EP | 0 308 390 A1 | 3/1989 |
| EP | 0 335 957 A1 | 10/1989 |
| EP | 1 344 291 A1 | 9/2003 |
| EP | 1 414 215 A2 | 4/2004 |
| EP | 1 564 647 A2 | 8/2005 |
| EP | 1 912 376 A1 | 4/2008 |
| EP | 2 003 813 A1 | 12/2008 |
| EP | 2 112 614 A1 | 10/2009 |
| EP | 2 180 441 A1 | 4/2010 |
| EP | 2 469 475 A1 | 6/2012 |
| EP | 1 344 291 B1 | 8/2012 |
| EP | 2 685 329 A1 | 1/2014 |
| EP | 2 704 401 A1 | 3/2014 |
| EP | 2 746 884 A1 | 6/2014 |
| EP | 2 801 939 A1 | 11/2014 |
| FR | 2 897 453 A1 | 8/2007 |
| FR | 2 966 625 A1 | 4/2012 |
| GB | 2 336 977 B | 11/1999 |
| GB | 2 347 234 A | 8/2000 |
| GB | 2 336 923 B | 6/2002 |
| GB | 2 403 028 A | 12/2004 |
| GB | 2 453 426 A | 4/2009 |
| GB | 2 485 092 A | 5/2012 |
| GB | 2 494 778 A | 3/2013 |
| GB | 2 512 984 A | 10/2014 |
| GB | 2 512 997 A | 10/2014 |
| GB | 2 514 644 A | 12/2014 |
| GB | 2 532 849 A | 6/2016 |
| GB | 2 534 628 A | 8/2016 |
| GB | 2 536 339 A | 9/2016 |
| GB | 2 537 457 A | 10/2016 |
| JP | 64-017105 A | 1/1989 |
| JP | 01-291303 A | 11/1989 |
| JP | 05-073131 A | 3/1993 |
| JP | 05-142033 A | 6/1993 |
| JP | 05-187973 A | 7/1993 |
| JP | 05-346807 A | 12/1993 |
| JP | 06-052145 A | 2/1994 |
| JP | 06-307897 A | 11/1994 |
| JP | 08-234951 | 9/1996 |
| JP | 9-160798 A | 6/1997 |
| JP | 9-196714 A | 7/1997 |
| JP | 09-330861 A | 12/1997 |
| JP | 10-116113 A | 5/1998 |
| JP | 10-326111 A | 12/1998 |
| JP | 11-327628 A | 11/1999 |
| JP | 2000-194414 A | 7/2000 |
| JP | 2000-214914 A | 8/2000 |
| JP | 2001-036542 A | 2/2001 |
| JP | 2001-195123 A | 7/2001 |
| JP | 2001-512593 A | 8/2001 |
| JP | 2001-265821 A | 9/2001 |
| JP | 2002-010489 A | 1/2002 |
| JP | 2002-024423 A | 1/2002 |

(56) References Cited

FOREIGN PATENT DOCUMENTS

| | | |
|---|---|---|
| JP | 2002-99325 A | 4/2002 |
| JP | 2003-029818 A | 1/2003 |
| JP | 2003-067523 A | 3/2003 |
| JP | 2003-109152 A | 4/2003 |
| JP | 2003-140741 A | 5/2003 |
| JP | 2003-167621 A | 6/2003 |
| JP | 2003-167624 A | 6/2003 |
| JP | 2003-177818 A | 6/2003 |
| JP | 2003-250232 A | 9/2003 |
| JP | 2003-295944 A | 10/2003 |
| JP | 2003-337794 A | 11/2003 |
| JP | 2004-030492 A | 1/2004 |
| JP | 2004-102765 A | 4/2004 |
| JP | 2004-171127 A | 6/2004 |
| JP | 2004-199624 A | 7/2004 |
| JP | 2004-227561 A | 8/2004 |
| JP | 2004-265302 A | 9/2004 |
| JP | 2004-348582 A | 12/2004 |
| JP | 2004-537820 A | 12/2004 |
| JP | 2005-100072 A | 4/2005 |
| JP | 2005-107758 A | 4/2005 |
| JP | 2005-216137 A | 8/2005 |
| JP | 2005-242830 A | 9/2005 |
| JP | 2005-293600 A | 10/2005 |
| JP | 2005-301546 A | 10/2005 |
| JP | 2005-332093 A | 12/2005 |
| JP | 2006-172462 A | 6/2006 |
| JP | 2006-185120 A | 7/2006 |
| JP | 2006-221376 A | 8/2006 |
| JP | 2006-221563 A | 8/2006 |
| JP | 2006-260411 A | 9/2006 |
| JP | 2006-527426 A | 11/2006 |
| JP | 2007-137563 A | 6/2007 |
| JP | 2007-148938 A | 6/2007 |
| JP | 2007-164764 A | 6/2007 |
| JP | 2007-207065 A | 8/2007 |
| JP | 2007-242000 A | 9/2007 |
| JP | 2007-286798 A | 11/2007 |
| JP | 2007-299228 A | 11/2007 |
| JP | 2007-536631 A | 12/2007 |
| JP | 2007-536648 A | 12/2007 |
| JP | 2008-009793 A | 1/2008 |
| JP | 2008-065821 A | 3/2008 |
| JP | 2008-158971 A | 7/2008 |
| JP | 2008-171152 A | 7/2008 |
| JP | 2008-177929 A | 7/2008 |
| JP | 2008-305419 A | 12/2008 |
| JP | 2009-500767 A | 1/2009 |
| JP | 2009-044288 A | 2/2009 |
| JP | 2009-53938 A | 3/2009 |
| JP | 2009-064451 A | 3/2009 |
| JP | 2009-135892 A | 6/2009 |
| JP | 2009-140380 A | 6/2009 |
| JP | 2009-211522 A | 9/2009 |
| JP | 2009-251777 A | 10/2009 |
| JP | 2009-538567 A | 11/2009 |
| JP | 2010-181949 A | 8/2010 |
| JP | 2010-527486 A | 8/2010 |
| JP | 2010-250825 A | 11/2010 |
| JP | 2011-022920 A | 2/2011 |
| JP | 2011-034564 A | 2/2011 |
| JP | 2011-180629 A | 9/2011 |
| JP | 2011-204237 A | 10/2011 |
| JP | 2011-204238 A | 10/2011 |
| JP | 2012-022558 A | 2/2012 |
| JP | 2012-048762 A | 3/2012 |
| JP | 2012-069118 A | 4/2012 |
| JP | 2012-084162 A | 4/2012 |
| JP | 4-934482 B2 | 5/2012 |
| JP | 2012-88953 A | 5/2012 |
| JP | 2012-138044 A | 7/2012 |
| JP | 2012-190477 A | 10/2012 |
| JP | 2012-215547 A | 11/2012 |
| JP | 2012-527059 A | 11/2012 |
| JP | 2012-252604 A | 12/2012 |
| JP | 2013-15899 A | 1/2013 |
| JP | 2014-116027 A | 6/2014 |
| JP | 2014-170552 A | 9/2014 |
| JP | 2014-523579 A | 9/2014 |
| TW | 201408020 A | 2/2014 |
| WO | WO-02/35302 A1 | 5/2002 |
| WO | WO-02/50971 | 6/2002 |
| WO | WO-03/073344 A2 | 9/2003 |
| WO | WO-03/073688 A1 | 9/2003 |
| WO | WO-2003/073688 A1 | 9/2003 |
| WO | WO-2005/083533 A1 | 9/2005 |
| WO | WO-2005/109123 A1 | 11/2005 |
| WO | WO-2007/052342 A1 | 5/2007 |
| WO | WO-2008/042786 A2 | 4/2008 |
| WO | WO-2009/021900 A1 | 2/2009 |
| WO | WO-2009/046095 A1 | 4/2009 |
| WO | WO-2010/041462 A1 | 4/2010 |
| WO | WO-2011/120625 A1 | 10/2011 |
| WO | WO-2012/016012 A2 | 2/2012 |
| WO | WO-2012/022358 A1 | 2/2012 |
| WO | WO-2012/022381 A1 | 2/2012 |
| WO | WO-2012/096877 A1 | 7/2012 |
| WO | WO-2012/129400 A2 | 9/2012 |
| WO | WO-2012/177812 A1 | 12/2012 |
| WO | WO-2014/005073 A1 | 1/2014 |
| WO | WO-2014/145801 A2 | 9/2014 |
| WO | WO-2015/138706 A1 | 9/2015 |
| WO | WO-2016/057365 A1 | 4/2016 |

OTHER PUBLICATIONS

Decision of Rejection for Chinese Application No. 201410097675.2, dated Jul. 2, 2018.
Examination Report for Application No. EP 14724871.0, dated Aug. 10, 2018.
First Office Action for Chinese Application No. 201510113223.3, dated Jul. 4, 2018.
First Office Action for Chinese Application No. 201580014241.4, dated Jun. 22, 2018.
Notice of Reasons for Rejection for Japanese Application No. 2014-048411, dated Jul. 31, 2018.
Notice of Reasons for Rejection for Japanese Application No. 2014-049919, dated Jul. 31, 2018.
Notice of Reasons for Rejection for Japanese Application No. 2014-049920, dated Jun. 5, 2018.
Notice of Reasons for Rejection for Japanese Application No. 2014-051595, dated May 29, 2018.
Notice of Reasons for Rejection for Japanese Application No. 2014-051596, dated May 29, 2018.
Second Office Action for Chinese Application No. 201410097623.5, dated Jun. 26, 2018.
Second Office Action for Chinese Application No. 201410097872.4 dated Jul. 12, 2018.
Second Office Action for Chinese Application No. 201410097921.4, dated Jul. 5, 2018.
Second Office Action for Chinese Application No. 201410098326.2, dated Jun. 19, 2018.
Second Office Action for Chinese Application No. 201410098982.2, dated Jun. 11, 2018.
Second Office Action for Chinese Application No. 201410099068.X, dated Jun. 14, 2018.
Second Office Action for Chinese Application No. 201410099103.8, dated Jun. 5, 2018.
Third Office Action for Chinese Application No. 201410097922.9, dated Aug. 3, 2018.
"ANSI/ISA-S5.4-1991 American National Standard Instrument Loop Diagrams" by Instrument Society of America, 1986, 22 pages.
"Control Loop Foundation—Batch and Continuous Processes", by Terrence Blevins and Mark Nixon, *International Society of Automation,* 2011, Chapter 7.
"IoT and Big Data Combine Forces," (2013). Retrieved from the Internet at: <URL:http://wiki.advantech.com/images/7/73/iot2013_whitepaper.pdf>.

(56) References Cited

OTHER PUBLICATIONS

Adrian et al., "Model Predictive Control of Integrated Unit Operations Control of a Divided Wall Column," Chemical Engineering and Processing: Process Information, 43(3):347-355 (2004).
Bassat et al., "Workflow Management Combined with Diagnostic and Repair Expert System Tools for Maintenance Operations," IEEE, pp. 367-375 (1993).
Bryner, "Smart Manufacturing: The Next Revolution," Chemical Engineering Process (2012). Retrieved from the Internet at: <URL:http://www.aiche.org/sites/default/files/cep/20121004a.pdf>.
Building Smarter Manufacturing with the Internet of Things (IoT), (2014). Retrieved from the Internet at: <URL:http://www.cisco.com/web/solutions/trends/iot/iot_in_manufacturing_january.pdf>.
Communication Relating to the Results of the Partial International Search, dated Jul. 11, 2014.
Daniel et al., "Conceptual Design of Reactive Dividing Wall Columns," Symposium Series No. 152, pp. 364-372 (2006).
Dejanovic et al., "Conceptual Design and Comparison of Four-Products Dividing Wall Columns for Separation of a Multicomponent Aromatics Mixture," Distillation Absorption, pp. 85-90 (2010).
Examination Report for Application No. EP 14724871.0, dated Aug. 17, 2016.
Examination Report for Application No. GB1017192.4, dated May 28, 2014.
Examination Report for Application No. GB1017192.4, dated Sep. 5, 2013.
First Office Action for Chinese Application No. 201010589029.X, dated Dec. 10, 2013.
Hiller et al., "Multi Objective Optimisation for an Economical Dividing Wall Column Design," Distillation Absorption, pp. 67-72 (2010).
International Search Report and Written Opinion for Application No. PCT/US2014/030627, dated Sep. 11, 2014.
International Search Report and Written Opinion for Application No. PCT/US2015,053931, dated Jan. 26, 2016.
International Search Report and Written Opinion for Application No. PCT/US2015/020148, dated Jun. 18, 2015.
Kiss et al., "A control Perspective on Process Intensification in Dividing-Wall Columns," Chemical Engineering and Processing: Process Intensification, 50:281-292 (2011).
Krumeich et al., "Big Data Analytics for Predictive Manufacturing Control—A Case Study from Process Industry," IEEE International Congress on Big Data, pp. 530-537 (2014).
Notice of Reasons for Rejection for Japanese Application No. 2010-229513, dated Jul. 29, 2014.
Pendergast et al., "Consider Dividing Wall Columns," Chemical Processing (2008). Retrieved from the Internet at: <URL:http://www.chemicalprocessing.com/articles/2008/245/?show=all>.
Sander et al., "Methyl Acetate Hydrolysis in a Reactive Divided Wall Column," Symposium Series No. 152, pp. 353-363 (2006).
Schultz et al., "Reduce Costs with Dividing-Wall Columns," Reactions and Separations, pp. 64-71 (2002).
Search Report for Application No. GB1017192.4, dated Feb. 15, 2011.
Search Report for Application No. GB1402311.3, dated Aug. 6, 2014.
Search Report for Application No. GB1403251.0, dated Aug. 8, 2014.
Search Report for Application No. GB1403407.8, dated Aug. 8, 2014.
Search Report for Application No. GB1403408.6, dated Aug. 8, 2014.
Search Report for Application No. GB1403471.4, dated Sep. 9, 2014.
Search Report for Application No. GB1403472.2, dated Aug. 22, 2014.
Search Report for Application No. GB1403474.8, dated Aug. 26, 2014.
Search Report for Application No. GB1403475.5, dated Sep. 3, 2014.
Search Report for Application No. GB1403476.3, dated Aug. 27, 2014.
Search Report for Application No. GB1403477.1, dated Aug. 28, 2014.
Search Report for Application No. GB1403478.9, dated Aug. 21, 2014.
Search Report for Application No. GB1403480.5, dated Aug. 28, 2014.
Search Report for Application No. GB1403615.6, dated Aug. 18, 2014.
Search Report for Application No. GB1403616.4, dated Sep. 1, 2014.
Search Report for Application No. GB1501042.4, dated Feb. 2, 2016.
Search Report for Application No. GB1513617.9, dated Jan. 21, 2016.
Search Report for Application No. GB1517034.3, dated May 26, 2016.
Search Report for Application No. GB1517038.4, dated Mar. 22, 2016.
Shah et al., "Multicomponent Distillation Configurations with Large Energy Savings," Distillation Absorption, pp. 61-66 (2010).
Smalley, "GE Invests in Project to Embed Predictive Analytics in Industrial Internet," (2013). Retrieved from the Internet at: <URL:http://data-informed.com/ge-invents-in-project-to-embed-predictive-analytics-in-industrial-internet/>.
Thotla et al., "Cyclohexanol Production from Cyclohexene in a Reactive Divided Wall Column: A Feasibility Study," Distillation Absorption, pp. 319-324 (2010).
Tututi-Avila et al., "Analysis of Multi-Loop Control Structures of Dividing-Wall Distillation Columns Using a Fundamental Model," Processes, 2:180-199 (2014).
U.S. Office Action for U.S. Appl. No. 13/784,041 dated Apr. 6, 2015.
U.S. Office Action for U.S. Appl. No. 13/784,041, dated Feb. 26, 2016.
U.S. Office Action for U.S. Appl. No. 13/784,041, dated Oct. 15, 2015.
U.S. Appl. No. 13/784,041, filed Mar. 4, 2013.
U.S. Appl. No. 14/028,785, filed Sep. 17, 2013.
U.S. Appl. No. 14/028,897, filed Sep. 17, 2013.
U.S. Appl. No. 14/028,913, filed Sep. 17, 2013.
U.S. Appl. No. 14/028,921, filed Sep. 17, 2013.
U.S. Appl. No. 14/028,923, filed Sep. 17, 2013.
U.S. Appl. No. 14/028,964, filed Sep. 17, 2013.
U.S. Appl. No. 14/174,413, filed Feb. 6, 2014, "Collecting and Delivering Data to a Big Data Machine in a Process Control System".
U.S. Appl. No. 14/212,411, filed Mar. 14, 2014, "Determining Associations and Alignments of Process Elements and Measurements in a Process".
U.S. Appl. No. 14/212,493, filed Mar. 14, 2014, "Distributed Big Data in a Process Control System".
U.S. Appl. No. 14/506,863, filed Oct. 6, 2014, "Streaming Data for Analytics in Process Control Systems".
U.S. Appl. No. 14/507,252, filed Oct. 6, 2014, "Automatic Signal Processing-Based Learning in a Process Plant".
U.S. Appl. No. 62/060,408, filed Oct. 6, 2014, "Data Pipeline for Process Control System Analytics".
Woo, "Intel Drops a Big Data Shocker", downloaded from the Internet at: <http://forbes.com/sites/bwoo/2013/02/27/intel-drops-a-big-data-shocker/?partner=ya>dated Feb. 27, 2013.
Decision of Refusal for Japanese Application No. 2014-049918, dated Aug. 21, 2018.
Decision of Refusal for Japanese Application No. 2014-051595, dated Sep. 11, 2018.
Decision of Refusal for Japanese Application No. 2014-051596, dated Oct. 23, 2018.
Examination Report for Application No. GB1402311.3, dated Sep. 28, 2018.
Examination Report for Application No. GB14724871.0, dated Oct. 8, 2018.

(56) References Cited

OTHER PUBLICATIONS

Final Rejection for Japanese Application No. 2014-049915, dated Nov. 6, 2018.
Notice of Reasons for Rejection for Japanese Application No. 2014-049916, dated Aug. 28, 2018.
Notice of Reasons for Rejection for Japanese Application No. 2014-049917, dated Dec. 4, 2018.
Notice of Reasons for Rejection for Japanese Application No. 2014-049920, dated Oct. 23, 2018.
Notice of Reasons for Rejection for Japanese Application No. 2014-051597, dated Jul. 31, 2018.
Third Office Action for Chinese Application No. 201410098327.7, dated Sep. 30, 2018.
Zhu et al., "Localization Optimization Algorithm of Maximum Likelihood Estimation Based on Received Signal Strength," IEEE 9th International Conference on Communication Software and Networks (ICCSN), pp. 830-834 (2017).
Hu et al., "Toward Scalable Systems for Big Data Analytics: A Technology Tutorial," IEEE, 2:652-687 (2014).
Lee et al., "Recent Advances and Trends in Predictive Manufacturing Systems in Big Data Environment," Manufacturing Letters, 1(1):38-41 (2013).
Mahdavi et al., "Development of a Simulation-Based Decision Support System for Controlling Stochastic Flexible Job Shop Manufacturing Systems," Simulation Modeling Practice and Theory, 18:768-786 (2010).
Mezmaz et al., "A Parallel Bi-Objective Hybrid Metaheuristic for Energy-Aware Scheduling for Cloud Computing Systems," Journal of Parallel and Distributed Computing, Elsevier (2011).
Notification of First Office Action for Chinese Application No. 201480014734.3, dated Apr. 19, 2017.
Razik et al., "The Remote Surveillance Device in Monitoring and Diagnosis of Induction Motor by Using a PDA," IEEE (2007).
Search Report for Application No. GB1617019.3, dated Feb. 27, 2017.
Siltanen et al., "Augmented Reality for Plant Lifecycle Management," IEEE (2007).
Xu, "From Cloud Computing to Cloud Manufacturing," Robotics and Computer-Integrated Manufacturing 28:75-86 (2012).
First Office Action for Chinese Application No. 201410080524.6, dated Sep. 13, 2017.
First Office Action for Chinese Application No. 201410088828.7, dated Aug. 1, 2017.
First Office Action for Chinese Application No. 201410097623.5, dated Sep. 26, 2017.
First Office Action for Chinese Application No. 201410097873.9, dated Aug. 9, 2017.
First Office Action for Chinese Application No. 201410097874.3, dated Aug. 18, 2017.
First Office Action for Chinese Application No. 201410097921.4, dated Oct. 10, 2017.
First Office Action for Chinese Application No. 201410097922.9, dated Aug. 18, 2017.
First Office Action for Chinese Application No. 201410097923.3, dated Aug. 28, 2017.
First Office Action for Chinese Application No. 201410098326.2, dated Jul. 27, 2017.
First Office Action for Chinese Application No. 201410098327.7, dated Jul. 26, 2017.
First Office Action for Chinese Application No. 201410098982.2, dated Aug. 9, 2017.
First Office Action for Chinese Application No. 201410099103.8, dated Aug. 9, 2017.
Notice of Reasons for Rejection for Japanese Application No. 2014-051599, dated Nov. 28, 2017.
Notification of First Office Action for Chinese Application No. 201410099068.X, dated Sep. 15, 2017.
Notice of Reasons for Rejection for Japanese Application No. 2014-041785, dated Dec. 5, 2017.
Notice of Reasons for Rejection for Japanese Application No. 2014-041785, dated Nov. 30, 2017.
Notice of Reasons for Rejection for Japanese Application No. 2014-048410, dated Dec. 29, 2017.
Notice of Reasons for Rejection for Japanese Application No. 2014-048411, dated Dec. 5, 2017.
Notice of Reasons for Rejection for Japanese Application No. 2014-048412, dated Feb. 27, 2018.
Notice of Reasons for Rejection for Japanese Application No. 2014-049917, dated Mar. 6, 2018.
Notice of Reasons for Rejection for Japanese Application No. 2014-049918, dated Dec. 12, 2017.
Notice of Reasons for Rejection for Japanese Application No. 2014-049919, dated Nov. 29, 2017.
Notice of Reasons for Rejection for Japanese Application No. 2014-049920, dated Feb. 20, 2018.
Notice of Reasons for Rejection for Japanese Application No. 2014-051114, dated Dec. 28, 2017.
Notice of Reasons for Rejection for Japanese Application No. 2014-051595, dated Jan. 16, 2018.
Notice of Reasons for Rejection for Japanese Application No. 2014-051596, dated Jan. 9, 2018.
Notice of Reasons for Rejection for Japanese Application No. 2014-051597, dated Jan. 9, 2018.
Second Office Action for Chinese Application No. 201410097922.9, dated Jan. 9, 2018.
Final Rejection for Japanese Application No. 2014-048410, dated May 29, 2018.
First Office Action for Chinese Application No. 201410097872.4, dated Aug. 23, 2017.
First Office Action for Chinese Application No. 201510049715.0, dated May 4, 2018.
Notice of Reasons for Rejection for Japanese Application No. 2014-049915, dated Mar. 13, 2018.
Notice of Reasons for Rejection for Japanese Application No. 2014-049916, dated Feb. 27, 2018.
Notice of Reasons for Rejection for Japanese Application No. 2014-049918, dated Apr. 10, 2018.
Notice of Reasons for Rejection for Japanese Application No. 2014-051596, dated Jan. 16, 2018.
Notice of Reasons for Rejection for Japanese Application No. 2014-051598, dated Mar. 13, 2018.
Notice of Reasons for Rejection for Japanese Application No. 2016-503431, dated Apr. 3, 2018.
Second Office Action for Chinese Application No. 201410088828.7, dated Apr. 27, 2018.
Second Office Action for Chinese Application No. 201410097675.2, dated Feb. 11, 2018.
Second Office Action for Chinese Application No. 201410097873.9, dated May 15, 2018.
Second Office Action for Chinese Application No. 201410097875.8, dated Jun. 6, 2018.
Second Office Action for Chinese Application No. 201410098327.7, dated Feb. 27, 2018.
Aouada et al., "Source Detection and Separation in Power Plant Process Monitoring: Application of the Bootstrap," IEEE International Conference on Acoustics Speech and Signal Processing Proceedings (2006).
Bruzzone et al., "Different Modeling and Simulation Approaches Applied to Industrial Process Plants," Proceedings of the Emerging M&S Applications in Industry & Academia/Modeling and Humanities Symposium (2013).
Extended European Search Report for Application No. 17157505.3, dated Jun. 30, 2017.
First Office Action for Chinese Application No. 201410097675.2, dated May 10, 2017.
International Preliminary Report on Patentability for Application No. PCT/US2015/053931, dated Apr. 11, 2017.
Notification of First Office Action for Chinese Application No. 201410097875.8, dated Jul. 7, 2017.
Sailer et al., "Attestation-Based Policy Enforcement for Remote Access," Proceedings of the 11th ACM Conference on Computer and Communications Security (2004).

(56) References Cited

OTHER PUBLICATIONS

Search Report for Application No. GB1617020.1, dated Apr. 13, 2017.
Search Report for Application No. GB1617021.9, dated Apr. 5, 2017.
Search Report for Application No. GB1617022.7, dated Apr. 18, 2017.
Search Report for Application No. GB1617023.5, dated Apr. 7, 2017.
Search Report for Application No. GB16702014.0, dated Aug. 3, 2017.
Sunindyo et al., "An Event-Based Empirical Process Analysis Framework," ESEM (2010).
Dongargaonkar et al., "PLC Based Ignition System," Conference Records of the 1999 IEEE Industry Application Conference, 1380-1387 (1999).
International Preliminary Report on Patentability for Application No. PCT/US2014/030627, dated Sep. 15, 2015.
International Preliminary Report on Patentability for Application No. PCT/US2015/020148, dated Sep. 14, 2016.
Decision of Refusal for Japanese Application No. 2014-041785, dated May 7, 2019.
Decision of Refusal for Japanese Application No. 2014-048411, dated Mar. 1, 2019.
Decision of Refusal for Japanese Application No. 2014-049920, dated Apr. 9, 2019.
Examination Report for Application No. GB1402311.3, dated Aug. 6, 2019.
Examination Report for Application No. GB1901546.0, dated Aug. 6, 2019.
Fourth Office Action for Chinese Application No. 201410098327.7, dated Mar. 28, 2019.
Notice of Reasons for Rejection for Japanese Application No. 2015-015738, dated Jun. 18, 2019.
Notice of Reasons for Rejection for Japanese Application No. 2015-052138, dated May 13, 2019.
Notice of Reasons for Rejection for Japanese Application No. 2016-557216, dated May 14, 2019.
Search Report for Application No. GB1503743.5, dated Apr. 25, 2019.
Decision of Refusal for Japanese Application No. 2014-048412, dated Oct. 26, 2018.
Decision of Refusal for Japanese Application No. 2014-051597, dated Nov. 13, 2018.
Decision of Rejection for Chinese Application No. 201410097873.9, dated Dec. 5, 2018.
Decision of Rejection for Chinese Application No. 201410098982.2, dated Jan. 23, 2019.
First Office Action for Chinese Application No. 201510640227.7, dated Mar. 15, 2019.
First Office Action for Chinese Application No. 201510640439.5, dated Feb. 25, 2019.
First Office Action for Chinese Application No. 201510641015.0, dated Feb. 27, 2019.
First Office Action for Chinese Application No. 201580054441.2, dated Feb. 27, 2019.
Notice of Reasons for Rejection for Japanese Application No. 2014-051114, dated Mar. 5, 2019.
Notice of Reasons for Rejection for Japanese Application No. 2014-051598, dated Nov. 13, 2018.
Notice of Reasons for Rejection for Japanese Application No. 2015-015738, dated Mar. 12, 2019.
Notice of Reasons for Rejection for Japanese Application No. 2015-159015, dated Mar. 19, 2019.
Notice of Reasons for Rejection for Japanese Application No. 2016-503431, dated Jan. 8, 2019.
Third Office Action for Chinese Application No. 201410098326.2, dated Jan. 17, 2019.
Third Office Action for Chinese Application No. 201410099068.X, dated Jan. 16, 2019.
Decision of Rejection for Chinese Application No. 201410098326.2, dated Jul. 3, 2019.
Examination Report for Application No. EP 17157505.3, dated Sep. 6, 2019.
Examination Report for Application No. GB1403251.0, dated Oct. 10, 2019.
Examination Report for Application No. GB1403406.0, dated Mar. 26, 2020.
Examination Report for Application No. GB1403407.8, dated Dec. 2, 2019.
Examination Report for Application No. GB1403407.8, dated Feb. 24, 2020.
Examination Report for Application No. GB1403408.6, dated Mar. 26, 2020.
Examination Report for Application No. GB1403471.4, dated Nov. 15, 2019.
Examination Report for Application No. GB1403472.2, dated Nov. 19, 2019.
Examination Report for Application No. GB1403474.8, dated Dec. 3, 2019.
Examination Report for Application No. GB1403475.5, dated Nov. 12, 2019.
Examination Report for Application No. GB1403476.3, dated Nov. 4, 2019.
Examination Report for Application No. GB1403477.1, dated Nov. 7, 2019.
Examination Report for Application No. GB1403478.9, dated Nov. 21, 2019.
Examination Report for Application No. GB1403480.5, dated Mar. 27, 2020.
Examination Report for Application No. GB1403480.5, dated Oct. 24, 2019.
Examination Report for Application No. GB1403615.6, dated Nov. 20, 2019.
Examination Report for Application No. GB1403616.4, dated Nov. 15, 2019.
Examination Report for Application No. GB1403617.2, dated Nov. 28, 2019.
Examination Report for Application No. GB1517038.4, dated Mar. 10, 2020.
Examination Report for Application No. GB1614666.4 dated Jan. 6, 2020.
Notice of Reasons for Refusal for Japanese Application No. 2017-518462, dated Mar. 10, 2020.
Notice of Reasons for Rejection for Japanese Application No. 2014-048410, dated Jan. 14, 2020.
Notice of Reasons for Rejection for Japanese Application No. 2014-048412, dated Nov. 26, 2019.
Notice of Reasons for Rejection for Japanese Application No. 2014-051595, dated Dec. 10, 2019.
Notice of Reasons for Rejection for Japanese Application No. 2014-051596, dated Dec. 3, 2019.
Notice of Reasons for Rejection for Japanese Application No. 2014-051598, dated Jul. 30, 2019.
Notice of Reasons for Rejection for Japanese Application No. 2015-052138, dated Nov. 5, 2019.
Notice of Reasons for Rejection for Japanese Application No. 2015-159015, dated Aug. 27, 2019.
Notice of Reasons for Rejection for Japanese Application No. 2015-198444, dated Sep. 3, 2019.
Notice of Reasons for Rejection for Japanese Application No. 2015-198445, dated Aug. 27, 2019.
Notice of Reasons for Rejection for Japanese Application No. 2015-198446, dated Dec. 17, 2019.
Notice of Reasons for Rejection for Japanese Application No. 2016-557216, dated Dec. 10, 2019.
Notice of Reasons for Rejection for Japanese Application No. 2017-518462, dated Oct. 8, 2019.
Notice of Reasons for Rejection for Japanese Application No. 2018-017060, dated Oct. 15, 2019.
Notice of Reasons for Rejection for Japanese Application No. 2018-239741, dated Jan. 28, 2020.

(56) References Cited

OTHER PUBLICATIONS

Notice of Reasons for Rejection for Japanese Application No. 2019-002497, dated Nov. 25, 2019.
Notice of Reasons for Rejection for Japanese Application No. 2019-003424, dated Feb. 3, 2020.
Notice of Reasons for Rejection for Japanese Application No. 2019-003425, dated Feb. 3, 2020.
Notice of Reasons for Rejection for Japanese Application No. 2019-045165, dated Mar. 3, 2020.
Notice of Reasons for Rejection for Japanese Application No. 2019-045165, dated Nov. 6, 2019.
Notification of Reexamination for Chinese Application No. 201410099103.8, dated Dec. 16, 2019.
Notification of Reexamination for Chinese Application No. 201410099103.8, dated Mar. 5, 2020.
Second Office Action for Chinese Application No. 201510640227.7, dated Nov. 26, 2019.
Second Office Action for Chinese Application No. 201510640439.5, dated Nov. 12, 2019.
Second Office Action for Chinese Application No. 201510641015.0, dated Nov. 8, 2019.
Second Office Action for Chinese Application No. 201580054441.2, dated Nov. 15, 2019.
Tomoyuki Tanabe, "Comparative evaluation of information dissemination methods for effective and efficient information sharing in wireless sensor networks," 2011 Research Report of the Information Processing Society of Japan [CD-ROM], Japan, Information Processing Society of Japan, Aug. 15, 2011.
Examination Report for Application No. GB1403471.4, dated Apr. 23, 2020.
Examination Report for Application No. GB1403472.2, dated May 11, 2020.
Examination Report for Application No. GB1403475.5, dated Apr. 22, 2020.
Examination Report for Application No. GB1403617.2, dated Jun. 2, 2020.
Examination Report for Application No. GB1517034.3, dated Jul. 1, 2020.
Examination Report for Application No. GB1517035.0, dated Apr. 30, 2020.
Examination Report for Application No. GB1704515.4, dated May 11, 2020.
Notice of Reasons for Refusal for Japanese Application No. 2014-049915, dated Jun. 9, 2020.
Notice of Reasons for Rejection for Japanese Application No. 2014-041785, dated Mar. 10, 2020.
Notice of Reasons for Rejection for Japanese Application No. 2019-031511, dated Apr. 22, 2020.
Notice of Reasons for Rejection for Japanese Application No. 2019-031511, dated Apr. 28, 2020.
Notice of Reasons for Rejection for Japanese Application No. 2019-058143, dated May 19, 2020.
Notification of Reexamination for Chinese Application No. 201410098982.2, dated May 20, 2020.
Third Office Action for Chinese Application No. 201510641015.0, dated May 22, 2020.
Notice of Reasons for Rejection for Japanese Application No. 2019-009298, dated Feb. 18, 2020.
Examination Report for Application No. GB1403476.3, dated Apr. 15, 2020.

* cited by examiner

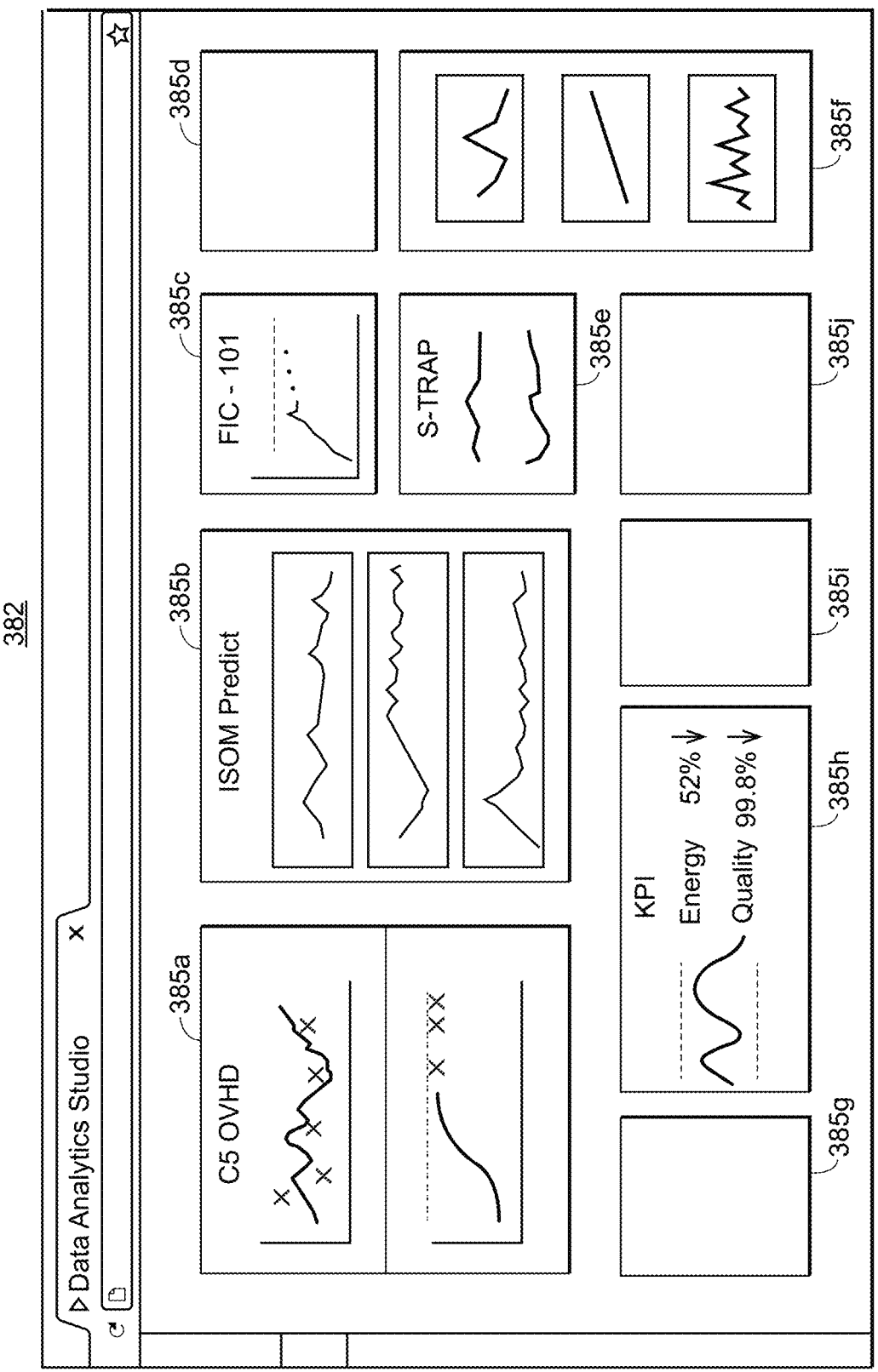

```json
{
  "query_name":"query1",
  "docType":"json",
  "version":"1.0",
  "timeSelector":[
   {
    "startTime":"2015-07-23T05:00:00.000Z",
     "endTime":"2015-07-24T15:00:00.000Z"
   },
   {
    "startTime":"2015-07-28T03:00:00.000Z",
     "endTime":"2015-07-31T12:00:00.000Z"
   },
   {
    "startTime":"2015-08-04T03:00:00.000Z",
     "endTime":"2015-08-04T16:00:00.000Z"
   }
  ],
  "sampleRateSecs":60,
  "columns":[
   {
     "tag": "FT630B/DENS.CV",
     "alias":"FT630B/DENS.CV",
     "dataType":"Float",
     "renderType":"VALUE",
     "format":"0.###"
   },
   {
     "tag": "PT615/WIRED_PSIA.CV",
     "alias":"PT615/WIRED_PSIA.CV",
     "dataType":"Float",
     "renderType":"VALUE",
     "format":"0.###"
   },
   {
     "tag": "TT6079/INPUT_1.CV",
     "alias":"TT6079/INPUT_1.CV",
     "dataType":"Float",
     "renderType":"VALUE",
     "format":"0.###"
   },
   {
     "tag": "630.molefrac.c5",
     "alias":"630.molefrac.c5",
     "dataType":"Float",
     "renderType":"VALUE",
     "format":"0.###"
   }
  ]
}
```

FIG. 6C

SOURCE-INDEPENDENT QUERIES IN DISTRIBUTED INDUSTRIAL SYSTEM

CROSS REFERENCE TO RELATED APPLICATIONS

This application claims the benefit of U.S. Provisional Application No. 32/239,620 filed on Oct. 9, 2015, and entitled DISTRIBUTED INDUSTRIAL PERFORMANCE MONITORING AND ANALYTICS, the entirety of which is hereby expressly incorporated herein by reference. The present application is related to: (i) U.S. application Ser. No. 13/784,041 filed on Mar. 4, 2013 and entitled "BIG DATA IN PROCESS CONTROL SYSTEMS," (ii) U.S. application Ser. No. 14/174,413 filed on Feb. 6, 2014 and entitled "COLLECTING AND DELIVERING DATA TO A BIG DATA MACHINE IN A PROCESS CONTROL SYSTEM," (iii) U.S. application Ser. No. 14/456,763 filed on Aug. 11, 2014 and entitled "SECURING DEVICES TO PROCESS CONTROL SYSTEMS," (iv) U.S. application Ser. No. 14/216,823 filed on Mar. 17, 2014 and entitled "DATA MODELING STUDIO," (v) U.S. application Ser. No. 14/169,965 filed on Jan. 31, 2014 and entitled "MANAGING BIG DATA IN PROCESS CONTROL SYSTEMS," (vi) U.S. application Ser. No. 14/212,411 filed on Mar. 14, 2014 and entitled "DETERMINING ASSOCIATIONS AND ALIGNMENTS OF PROCESS ELEMENTS AND MEASUREMENTS IN A PROCESS," (vii) U.S. application Ser. No. 14/212,493 filed on Mar. 14, 2014 and entitled "DISTRIBUTED BIG DATA IN A PROCESS CONTROL SYSTEM," (viii) U.S. application Ser. No. 14/506,863 filed on Oct. 6, 2014 and entitled "STREAMING DATA FOR ANALYTICS IN PROCESS CONTROL SYSTEMS," (ix) U.S. application Ser. No. 14/507,188 filed on Oct. 6, 2014 and entitled "REGIONAL BIG DATA IN PROCESS CONTROL SYSTEMS," (x) U.S. Application No. 62/060,408 filed Oct. 6, 2014 and entitled "DATA PIPELINE FOR PROCESS CONTROL SYSTEM ANALYTICS," and (xi) U.S. application Ser. No. 14/507,252 filed on Oct. 6, 2014 and entitled "AUTOMATIC SIGNAL PROCESSING-BASED LEARNING IN A PROCESS PLANT," the entire disclosures of which are hereby expressly incorporated herein by reference.

TECHNICAL FIELD

The present disclosure relates generally to process plants and to process control systems, and more particularly, to real-time performance monitoring and analytics of real-time data generated by process plants and process control systems.

BACKGROUND

Distributed process control systems, like those used in chemical, petroleum, industrial or other process plants to manufacture, refine, transform, generate, or produce physical materials or products typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process and/or environmental parameters such as temperature or pressure, etc. to control one or more processes executing within the process plant or system. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant, e.g., to control at least a portion of one or more industrial processes running or executing within the plant. For example, the controllers and the field devices control at least a portion of a process being controlled by the process control system of the process plant.

Information from the field devices and the controller is usually made available over a data highway or communication network to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

In a process plant or process control system, when evidence of an abnormal condition or fault occurs (e.g., when an alarm is generated, or when a process measurement or actuator is found to have excessive variation), an operator, instrument technician or process engineer typically uses an analytics tool in combination with his or her knowledge of the process being controlled by the system and its flow path through the system to attempt to determine upstream measurements and process variables that may have contributed to the production of the evidence of the abnormal condition or fault. For example, an operator may feed a historical log of data that has been captured over time from the output of a process control device (e.g., a field device, a controller, etc.) into the DeltaV™ batch analytics product or continuous data analytics tool to attempt to determine the contributions of various process variables and/or measurements to an abnormal or fault condition. Typically, a user decides which historical data logs and/or other time-series data to feed into the analytics tool and identifies candidate upstream factors (e.g., measurements, process variables, etc.) based on his or her knowledge of the process. Subsequently, these data analytics tools utilize principal component analysis (PCA), or other analysis techniques such as partial least squares, linear regression, and the like, to determine which of the candidate upstream factors impact downstream predicted quality parameters. Thus, the accuracy and effectiveness of the output provided by the analytics tool is based on or limited to the user's knowledge, and as such may not provide complete or correct insight into the sources of the abnormal condition or fault.

Additionally, such analytics are typically performed off-line from the process and as such, the process may change or move while the analytics are being performed. For example, a typical process plant usually performs one or two cycles of a particular analytic (e.g., a data collection and analysis cycle) per day, and only after some time after the analytics have been performed are the results analyzed and any prescriptive actions developed and implemented in the plant. Thus, not only may the accuracy of the analytics results be suspect, but the prescriptive actions developed therefrom may not be optimal or may no longer apply to the currently executing process.

Further, the architecture of currently known process control plants and process control systems is strongly influenced by limited controller and device memory, communications bandwidth and controller and device processor capability. For example, in currently known process control system architectures, the use of dynamic and static non-volatile memory in the controller is usually minimized or, at the least, managed carefully. As a result, during system configuration (e.g., a priori), a user typically must choose which data in the controller is to be archived or saved, the frequency at which it will be saved, and whether or not compression is used, and the controller is accordingly configured with this limited set of data rules. Consequently, data which could be useful in troubleshooting and process analysis is often not archived, and if it is collected, the useful information may have been lost due to data compression.

Still further, data sets of industrial or process control plants have been steadily increasing in size to the point where present data processing analytics applications are inadequate. Typically, known analytics techniques merely attempt to extract a value from data, but do not address particular sizes of data sets from which the value is to be extracted, and notably, do not operate on very large sets of data (such as all process data that is generated by a plant) in a seamless way. Further, known analytics techniques typically cannot handle streaming or streamed data.

The limitations of currently known process plant monitoring and analytics and process control systems discussed above and other limitations may undesirably manifest themselves in the operation and optimization of process plants or process control systems, for instance, during plant operations, trouble shooting, and/or predictive modeling. Generally, real-time analytics using real-time, current industrial process performance data is not possible with known monitoring and analytics tools.

SUMMARY

Techniques, systems, apparatuses, components, and methods for distributed industrial process performance monitoring and/or analytics are disclosed herein. Said techniques, systems, apparatuses, components, and methods may apply to industrial process control systems, environments, and/or plants, which are interchangeably referred to herein as "automation," "industrial control," "process control," or "process" systems, environments, and/or plants. Typically, such systems and plants provide control, in a distributed manner, of one or more processes that operate to manufacture, refine, transform, generate, or produce physical materials or products. Generally, said techniques, systems, apparatuses, components, and methods include embedding data monitoring and/or data analytics engines (also referred to interchangeably herein as a "distributed data engine," "data engine," or "DDE") in a distributed manner within devices that are operating in concert to control an industrial process. For example, a distributed data engine may be manufactured into a device that operates with other devices to control a process executing in a process plant or process control system (e.g., process control devices such as field devices, controllers, I/O cards, etc.), and/or a distributed data engine may be locally coupled with or directly coupled to such a device. Additional data engines may be embedded in or manufactured into other devices that are included in the process plant, such as in communication nodes, workstations or other operator interfaces, servers, and the like. In some configurations, data engines are connected to various communication links within the process plant or otherwise are connected to the process plant so as to have a view of or window into the real-time data transmitted during the execution or control of the process within the plant.

Data is streamed between various embedded data engines, e.g., by using one or more data communication channels and networks that typically exist outside of the traditional communication systems found in distributed control systems (DCSs), programmable logic systems (PLSs), and process control safety and health monitoring systems (SHMs). To avoid confusion with such traditionally known process control communication networks and links, the communication channels and network utilized to stream communications between data engines are interchangeably referred to herein as "data analytics communication channels," "data analytics channels," "data analytics communication networks," or "data analytics networks." The streamed data may include real-time data that is viewed or observed by the data engine. For example, when a distributed data engine is connected to (and thus is viewing the data that is traversing over) a traditional process control system communication link, the data engine may stream a copy of data that is traversing the traditional communication link to one or more other data engines via the data analytics network. In another example, when a distributed data engine is manufactured or embedded into a process control device, the analytics data that is streamed by the data engine using the data analytics network may include copies of data that is received, generated, or otherwise processed by the device. Additionally, or alternatively, the streamed data may include data corresponding to one or more analytics that were performed locally at the device, such as analytics results, prescriptive actions, and the like. This architecture allows analytics services to be locally bound and provided close to or even at a data source while at the same time providing larger scale analytics, thereby providing timely results and optimizations while minimizing bandwidth usage and processing cycles across the system, as is explained in more detail below.

In an aspect, a distributed industrial process monitoring and analytics system includes a plurality of distributed data engines (DDEs) embedded within a process plant that is operating to control a process. Each of the DDEs is coupled to a respective one or more data sources within the process plant that are respectively generating data as a result of the process being controlled. Additionally, each of the DDEs stores the data being generated by the respective one or more data sources to which each DDE is coupled. The system also includes a data analytics network that supports the streaming of analytics data amongst the plurality of DDEs, and that supports the transmission of queries for data stored at the plurality of DDEs.

In another aspect, a method includes advertising a presence of a cluster included in a data analytics network of a process control plant that is operating to control a process. The method also includes registering a data source that responds to the advertisement and that generates continuous data resulting from control of the process by the plant. Additionally, the method includes receiving the continuous data generated by the data source, and streaming, via the data analytics network, at least some of the continuous data generated by the data source to a data consumer. One or more portions of the method may be performed by the cluster, for example.

In yet another aspect, a method includes advertising a presence of a centralized cluster included in a data analytics network of a process control plant that is operating to control a process. The method also includes registering a local cluster that responds to the advertising and that is configured to store streamed, continuous data that is generated as a result of controlling the process. The local cluster is embedded in the process plant and is communicatively coupled to one or more data sources that generate at least a portion of the continuous data while operating to control a process. Additionally, the method may include receiving at least a portion of the streamed continuous data from the local cluster, performing one or more data analytics functions on the streamed continuous data received from the local cluster, and streaming, via the data analytics network, an output of one or more data analytics functions to a data consumer. One or more portions of the method may be performed by the centralized cluster, for example.

In another aspect, the system includes a data analytics module bound to a continuous data stream. The continuous data stream has contents that are generated in real-time by a data source included in a process plant that is operating to control a process, and the contents of the continuous data stream are generated as a result of the operations to control the process. The system further includes a user interface displaying continuous output generated in real-time resulting from the data analytics module operating in real-time on the continuous data stream. The continuous output displayed on the user interface includes a continuous updating of one or more predicted values.

In still another aspect, a performance monitoring and analytics system for industrial process control includes a platform that provides a set of user controls and a canvas which enable a user to create a data diagram that is representative of a data model. The platform further enables the user to evaluate or compile the data diagram to execute on an input data set, thereby generating output data. The input data set comprises time-series data (and optionally, other data) resulting from an on-line process plant controlling a process. The term "time-series data," as used herein, generally refers to a sequence of data points, values, or sets that are generated over a time interval, typically by one or more data sources.

The data diagram comprises a set of data blocks interconnected by set of wires via which data is transferred in between data blocks. Each data block of the set of data blocks corresponds to a respective data operation, includes zero, one, or more input connectors, and includes zero, one or more output connectors. Respective input data is received at each data block via the input connector(s), and the respective data block provides respective output data resulting from each data block performing its respective data operation on the respective input data via the output connector(s). Further, the input connector is included in a first data block of a set of data blocks, the respective data operation of at least one data block included in the set of data blocks includes a data analytics function, and different portions of the data diagram are asynchronously and separately compilable and executable. In some embodiments, e.g., when no input connectors and no output connectors are configured, input and output data may be handled internally by a data block.

In an aspect, a method for performing real-time analytics in a process control environment includes creating a first diagram on a graphical user interface. The first diagram may represent first programming instructions that are operable to cause a processor to manipulate data generated and stored previously by the process control environment. The method also includes compiling the first programming instructions represented by the first diagram, executing the compiled first programming instructions to create a resultant first output, and evaluating the resultant first output to determine a predictive value of a model used to create a resultant first output. Additionally, the method includes automatically generating a second diagram from the first diagram. The second diagram may represent second programming instructions that are operable to cause a processor to bind to a live data source and to evaluate data received from the live data source using at least the model used to create the resultant first output. Further, the method includes compiling the second programming instructions represented by the second diagram and executing the compiled second programming instructions to predict an aspect of the operation of the process control environment.

In another aspect, a system for performing real-time analytics in a process control environment includes a plurality of process control devices operating in a process plant and a controller that is communicatively coupled to the plurality of process devices via a control network. The system also includes a big data storage node that comprises a tangible, non-transitory storage medium storing data of the operation of the process control environment, a processor that is communicatively coupled to the big data storage node, and a program memory that is communicatively coupled to the processor. The program memory may comprise a tangible, non-transitory storage medium storing instructions that, when executed by the processor, cause the processor to display a graphical user interface comprising an editing canvas and receive a selection of a plurality of graphical programming elements for placement onto the editing canvas to create a first diagram. The first diagram may represent first programming instructions operable to cause the processor to manipulate data stored on the big data storage node. Additionally, when the instructions are executed by the processor, the processor may be caused to execute the compiled first programming instructions to create a resultant first output and create a predictive model based on the resultant first output. When the instructions are executed by the processor, the processor may be further caused to automatically generate a second diagram from the first diagram. The second diagram may represent second programming instructions that are operable to cause the processor to bind to a live data source and evaluate data received from the live data source using at least the model used to create a resultant first output. When the instructions are executed by the processor, the processor may be still further caused to compile the second programming instructions represented by the second diagram and execute the compiled second programming instructions to predict an aspect of the operation of the process control environment.

In another aspect, an analytics service for performing data analytics in a process control environment includes a library of block definitions. The library may be stored on a tangible, non-transitory medium, and each block definition stored in the library may comprise (i) a target algorithm for performing an action with respect to data in the process control environment, and (ii) one or more block properties. The analytics service further includes a set of machine-readable instructions that are stored on the tangible, non-transitory medium and that are operable, when executed by processor, to (1) present a canvas to a user via a display; (2) present the library of block definitions to the user; (3) receive one or more selections of one or more corresponding block definitions; (4) place one or more blocks corresponding to the one or more block definitions on the canvas to create a module comprising the one or more blocks; (5) facilitate configuration of one or more properties for either (i) the one or more blocks or (ii) the module or (iii) the one or more blocks and the module; and (6) cause the evaluation of (i) one or more of the blocks or (ii) the module.

Additionally, the analytics service includes an execution service operating on a processor, where the execution service is configured to (1) receive a request to evaluate the one or more blocks or the module; (2) compile instructions corresponding to the one or more blocks or the module; (3) create one or more job processes to execute the compiled instructions and cause the one or more job processes to execute the compiled instructions; and (4) receive results of the one or more job processes. The analytics service also includes a communication network that couples one or more processors executing the one or more job processes to one or more distributed data engines. Each distributed data engine may comprise a tangible, non-transitory storage medium storing data generated in the process control environment.

Indeed, data generated by or concerning the operation of the process plant may be stored in a plurality of data stores, such as relational or non-relational databases. These data stores may utilize various data structures and query mechanisms, such that different query syntax is needed to access the data in different data stores. A standardized query is described herein to facilitate data access to data stores using various formats. The standardized query utilizing a standardized data query format contains information needed to access data in a data store, but the standardized query may not be directly executable to obtain such data. Instead, data source-specific queries are generated based upon the standardized query. This may include extracting query parameters from the standardized query and generating one or more data source-specific queries utilizing data source-specific query formats associated with particular data sources. The data source-specific queries may be executed to access and select data from their respective data sources, which may then be formatted to generate data frames presenting the data indicated in the standardized query in any desired format. This may include aligning sampling rates, data properties, or other data characteristics for the data obtained by the data source-specific queries. In some embodiments, data from multiple data sources utilizing different data source-specific query formats may be combined into an aggregated data frame for further use in process control or analysis.

In another aspect, a method, system, and computer-readable medium storing instructions for obtaining time-series data from an electronic data source are described, comprising receiving an indication of the electronic data source from which the data is to be obtained, receiving an indication of a time range for which the data is to be obtained, receiving an indication of a characteristic of the data to be obtained, determining a data source-specific query format associated with the electronic data source, generating a data source-specific query complying with the data source-specific format based upon the indications of the time range and the characteristic of the data to be obtained, causing the data source-specific query to be executed to select the data from the electronic data source, and/or receiving the data from the electronic data source. The indications of the time range and the characteristics of the data may be expressed in a standardized query format that is independent of the electronic data source, and the electronic data source may be a relational database or non-relational database.

The method may include a standardized query utilizing the standardized query format. The indication of the time range and the indication of the characteristics may be received in the standardized query. The indication of the electronic data source may also be received in the standardized query. The standardized query may further indicate a format for the data or a file to return the data, such as JavaScript Object Notation (JSON). The standardized query may also be a JSON-formatted file. The standardized query format may utilize a syntax that is distinct from a native syntax utilized by the electronic data source. Such syntax utilized by the standardized query format may not be directly executable to obtain the data from the electronic data source.

The indication of the time range may include at least one start time and at least one end time. The indication of the time range may similarly include a sample rate for the data to be obtained. The indication of the characteristic of the data to be obtained may include an indication of one or more types of measurements regarding operation of a process plant. The one or more types of measurements may include measurements from one or more field devices disposed within the process plant. The indication of the one or more types of measurements may include one or more tags, aliases, and data types associated the data.

The method may further comprise receiving an indication of a format in which the data is to be received from the electronic data source, and the data may be received from the electronic data source in the indicated format. In some embodiments, an indication of a format in which the data is to be obtained may be received, and the data received from the electronic data source may be converted into the indicated format.

The data source-specific query format may be determined based upon a type of the electronic data source. Generating the data source-specific query may include mapping the indicated time range and the indicated characteristics of the data to be obtained to the determined data source-specific query format. Causing the data source-specific query to be executed may include sending the data source-specific query to an interface of the electronic data source, such that the interface queries the electronic data source using the data source-specific query.

A data frame may be generated that includes the data received from the electronic data source. The data frame may include a plurality of data points. Each data point may be associated with a time within the time range. Each data point may further be associated with a time within the time range that aligns with an integer multiple of a sample period following a start time or is the start time.

In another aspect, a method, system, and computer-readable medium storing instructions for providing data from an electronic data source are described, comprising receiving from a data requesting entity a standardized query that uses a standardized query format, extracting query parameters from the standardized query, generating a data source-specific query in the data source-specific query format based upon the extracted query parameters, executing the data source-specific query to obtain the data form the electronic data source, and/or providing the obtained data to a data receiving entity. The standardized query format may be different from a data source-specific query format utilized by the electronic data source. The electronic data source may be a relational database or a non-relational database. The data requesting entity may be a query block within an analytics program, such as the Data Analytics Studio discussed herein. The data receiving entity may be the same entity as the data requesting entity. The standardized query may utilize a syntax that is not directly executable to obtain the data from the electronic data source.

Extracting the query parameters from the standardized query may include determining a time period and a data parameter of the data. The time period may have a start time and an end time, and the data parameter may indicate a type or characteristic of data to be obtained from the electronic data source. Extracting the query parameters from the standardized query may further include determining a sampling rate.

Providing the obtained data to the requesting entity may include returning a set of data points associated with the time period. Each data point may include a timestamp indicating a time for the value or values associated with the data point. Such timestamps may be limited to times that are the start time or an integer multiple of the period of the sampling rate following the start time. To achieve a complete time series, one or more data points may be added to the data set with timestamps indicating integer multiples of the period of the sampling rate after the start time. The added data points may use values of data entries in the electronic data source associated with times most closely prior to each timestamp of the one or more added data points. The set of data points may be formatted based upon a format specified in the standardized query.

The type or characteristic of the data indicated by the data parameter may be a type of measurement or a measurement from a type of measurement device. The type or characteristic of the data may further indicate a specific measurement device, which may be a field device disposed within a process plant. The data parameter may further indicate a tag of the data to be obtained, an alias for the data to be provided to the data requesting entity, and/or a data format type for the data to be provided to the data requesting entity.

Providing the data to the data requesting entity may include sending a data frame containing the obtained data to the data requesting entity. The standardized query may include an indication of a format for the data frame. The data frame may be formatted according to the indication of the format for the data frame. The standardized query may indicate the data frame is to be provided to the data receiving entity as a JSON file.

In another aspect, a method, system, and computer-readable medium storing instructions for accessing process plant data from a plurality of electronic data sources are described, comprising receiving a standardized query that utilizes a standardized query format, generating a first data source-specific query based upon the standardized query, generating a second data source-specific query based upon the standardized query, causing the first data source-specific query to be executed to obtain a first set of data from the first electronic data source, causing the second data source-specific query to be executed to obtain a second set of data from the second electronic data source, and/or generating an aggregated data frame including the first and second sets of data. The first and second sets of data may each include a plurality of data points containing information measured by one or more field devices within a process plant.

The first data source-specific query may utilize a first query format associated with a first electronic data source, and the second data source-specific query may utilize a second query format associated with a second electronic data source. The standardized query may include a first indication of the first electronic data source and a second indication of the second electronic data source. In some embodiments, the first electronic data source may be a relational database, and the second electronic data source may be a non-relational database. The first indication may identify the first query format, and the second indication may identify the second query format. In some embodiments, the first and second indications may be prepended to indications of data columns.

The standardized query format may utilize a query syntax that is distinct from both a query syntax of the first query format and a query syntax of the second query format. The query syntax of the standardized query format may not be directly executable to obtain either of the first set of data from the first electronic data source or the second set of data from the second electronic data source. For example, the standardized query may be included in one or more objects or arrays of a JSON file.

The standardized query may include an indication of a time range identifying a period of time corresponding to data entries in the first data set and the second data set. The time range may include a plurality of time periods, which may be separated by excluded time periods for which data is not queried. The time range may also identify a first time period associated with the first data set and a second time period associated with the second data set. The standardized query may also include an indication of a sample rate for the aggregated data frame.

The first data set may include data having a first sample rate, and the second data set may include data having a second sample rate. In such instances, generating the aggregated data frame may include aligning the first and second sample rates. Aligning the first and second sample rates may include adding data points corresponding to unsampled times needed to achieve a desired sample rate. Such added data points may be given values of the sampled data directly preceding the added data points in time. Aligning the first and second data sample rates may similarly include removing sampled data points.

Systems for implementing such methods may further include one or more processors communicatively connected to one or more data sources and one or more program memories storing computer-readable instructions that, when executed by the one or more processors, cause the computer system to perform part or all of the system functions described above. Computer-readable media may store similar computer-readable instructions that may be executed by one or more processors of a computer system, thereby causing the computer system to perform part or all of the system functions described above. Additional or alternative aspects of the methods, systems, or computer-readable media may be implemented, as described more fully in the detailed description below.

Additionally, a novel frequency analysis analytics technique is disclosed, and may be provided by any of the systems, methods, apparatuses, and techniques described herein. The novel frequency analysis analytics technique may analyze streamed data to provide early warning fault detection in process plants or process control systems. More particularly, the frequency analysis analytics technique may create a new set of process variables corresponding to identified leading indicators of faults, abnormalities, decreases in performance, target performance levels, undesired conditions, and/or desired conditions, and may determine time-series data of the new process variables by performing a rolling FFT on streamed process data. The rolling FFT may convert the streamed process data from the time domain into the frequency domain, in which values of the new set of process variables may be determined. The determined values of the new process variables may be transformed back into the time domain for monitoring. The detection of a presence of a leading indicator within the monitored time domain data may cause an indication of a predicted fault, abnormality, decrease in performance, and/ or other undesired condition to be produced and/or presented, and may result in a change to the operations of the process plant, thereby avoiding, preventing, and/or mitigating the effect of the undesirable upsets, events, and/or conditions. Similarly, the detection of a presence of the leading indicator within the monitored time domain data may cause an indication of a predicted desired condition such as a target level of performance to be produced and/or presented, and in some cases, along with a time or time interval at which the desired condition is predicted to occur.

BRIEF DESCRIPTION OF THE DRAWINGS

FIGS. 4N-1 and 4N-2 depict example Data Analytics Dashboard user interfaces;

FIG. 6C depicts an example standardized query;

DETAILED DESCRIPTION

Figure 1:
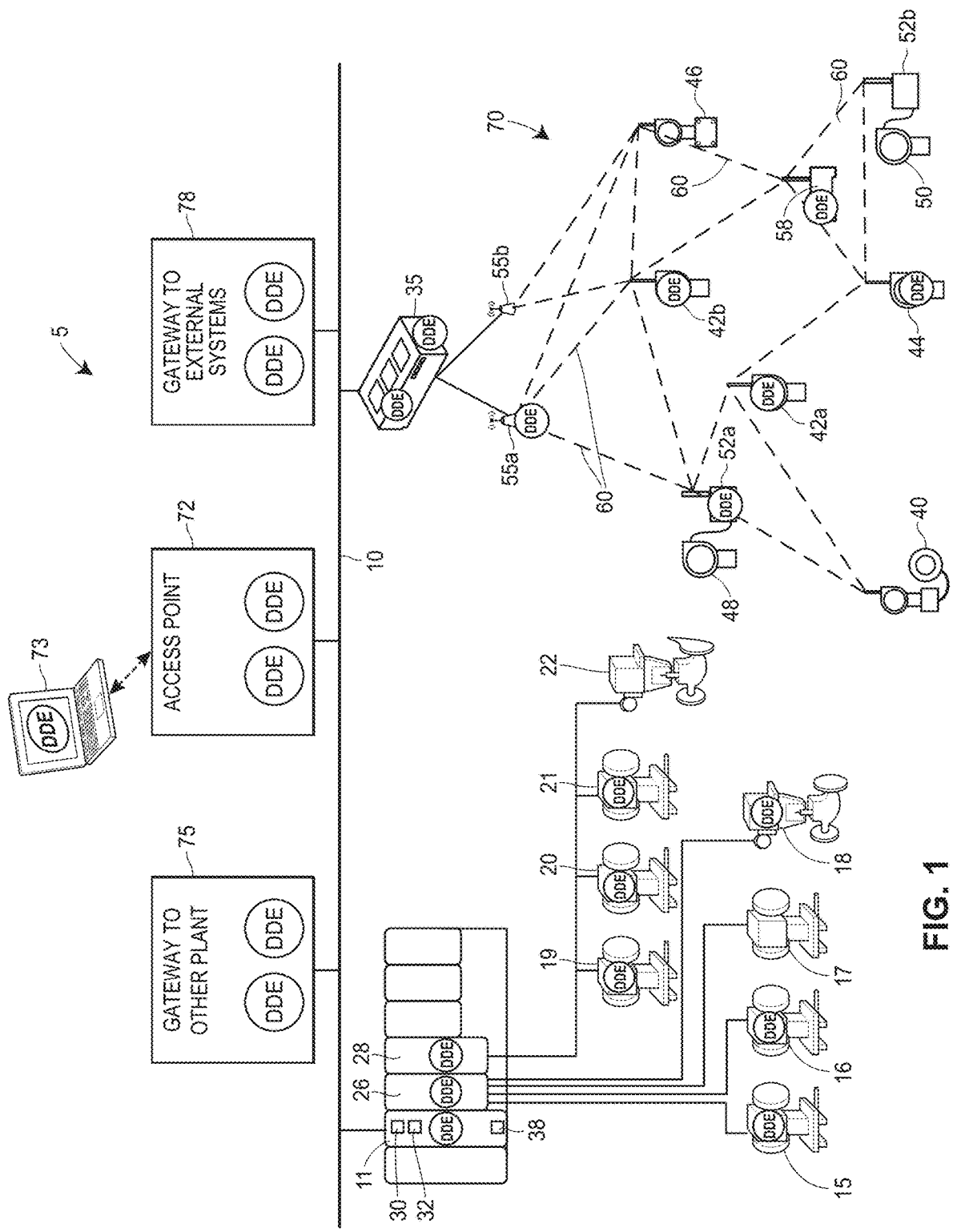
FIG. 1 depicts a block diagram illustrating an example system process plant or process control system that includes distributed, embedded industrial process performance monitoring and/or analytics engines.

Techniques, systems, apparatuses, components, and methods for distributed industrial performance monitoring and analytics are disclosed herein. Generally, said novel performance monitoring and analytics techniques provide knowledge discovery and actionable knowledge about an industrial process plant, process control environment, and/or process control system that operates to control one or more industrial processes in real-time. Typically, an industrial process performed by such process plants or control systems is controlled therein to thereby manufacture, refine, transform, generate, or produce physical materials or products. Examples of such process plants or control systems include oil refineries, paper mills, chemical manufacturing, pharmaceutical manufacturing, food processing and distributing, and the like.

Of paramount concern in any process control system, plant, or environment is its safety, reliability, and economic efficiency. Safety of operations is particularly important for any process control system or plant, as uncontrolled processes, faults, failures, and/or preventable human error may result in explosions, fire, release of dangerous chemicals, damage to the environment, loss of equipment, and/or loss of human life. Reliability of equipment and of process operations is important to maintain and/or improve the economic efficiency and profitability of the plant. Further, the economic efficiency and profitability of a plant may be improved by tuning the plant's operations to improve performance.

Faults that occur in a process control system may affect its safety, reliability, and/or economic efficiency. Faults generally occur in a process control system when events combine to create situations that the process control system is not designed to handle, such as unknown changes in feedstock composition, equipment degradation, equipment failure, and abnormal (or erroneous) user operating actions. Other examples of faults include unplanned equipment shutdowns, release of chemicals into the atmosphere, lifting of pressure relief valves, temperature excursions in equipment, and performance degradation. Of course, faults are not limited to systemic or large-scale events; a fault may be any abnormal event or combination of events that has or may lead to economic, safety, and/or environmental impact.

Typically, when a fault is detected (e.g., automatically by the process control system), an alarm is generated at an operator interface. The operator may then attempt to diagnose the root cause of the fault and take corrective action. Accordingly, some of the key factors in managing faults include early fault detection and false alarm reduction, which may include, for example, timely and reliable detection of faults, diagnosis of a fault's root cause, and carrying out corrective actions that bring the instrument, controller, process, and/or equipment that is a source of the fault back to normal operations.

Known data monitoring and analytics tools attempt to keep process plants within normal operating regions and provide a first line of defense against the occurrence of faults. Such tools, though, are typically focused on a single loop or on a severely limited scope within a process plant. They are not able to address the entirety (or even a large portion) of a typical modern process control plant in which hundreds and thousands of process variables are observed at a very fast rate. Furthermore, known data monitoring and analytics tools are not able to address unusual events like degrading equipment performance, removed field equipment, or large changes in operating conditions caused by situations outside of each tool's immediate, limited scope.

On the other hand, the novel distributed industrial process performance monitoring and analytics techniques, systems, apparatuses, components, and methods disclosed herein are able to address (e.g., monitor and/or analyze) any sized-scope of industrial process monitoring and analysis, from the entire process plant down to a single loop or even a single device. Indeed, in some configurations, the novel techniques disclosed herein are able to simultaneously address multiple process plants (e.g. multiple oil refineries owned and operated by a single company or even different companies, provided the data is available). Generally, the novel performance monitoring and analytics techniques disclosed herein discover and provide knowledge indicative of early detection and/or prior warning of possible faults that may occur in process plants and control systems, thus allowing enough time to take prescriptive or corrective action to prevent the fault from occurring. In some situations, the novel techniques disclosed herein also discover and provide prescriptive actionable knowledge to prevent possible faults from occurring and/or to limit the impact of their occurrence. Further, the novel techniques disclosed herein may discover or provide knowledge indicative of possible improvements to plant efficiency, as well as discover or provide actionable knowledge to realize the efficiency improvements.

Example Process Control System Having Distributed Industrial Process Monitoring and Analytics As discussed above, a process plant, process control system, or process control environment that includes or supports at least some of the novel distributed industrial process monitoring and analytics techniques described herein operates to control one or more industrial processes in real-time. As such, the process plant or control system may include therein one or more wired or wireless process control devices, components, or elements that perform physical functions (such as opening or closing valves, measuring temperature, pressure, and/or other process and/or environmental parameters, and the like) to control a process executing within the process plant or system. The process plant or process control system may include, for example, one or more wired communication networks and/one or more wireless communication networks. The process plant or control system may include centralized databases, such as continuous, batch and other types of historian databases.

To illustrate, FIG. 1 is a detailed block diagram of an example process plant or process control environment 5 that includes or supports any or all of the distributed industrial process monitoring and analytics techniques described herein. The process control system 5 includes multiple distributed data engines of a distributed industrial process monitoring and analytics system that is included in, integrated with, or supported by the process control plant or environment 5. (A more complete description of a distributed industrial process monitoring and analytics system is provided in later sections.) Each of the distributed data engines of the industrial process monitoring and analytics system is directly or indirectly connected (e.g., physically connected or wirelessly connected) to some component or part of the process plant 5. For example, a distributed data engine may be embedded in or manufactured into a particular device or node of the process plant 5 so as to form a unitary entity, a data engine may be attached or coupled to a particular device or node of the plant 5, or a data engine may be attached or coupled to a traditional communication link of the plant 5. In FIG. 1, an encircled "DDE" denotes a respective example distributed data engine.

As previously discussed, distributed data engines may be embedded in process control devices whose main function is to automatically generate and/or receive process control data to perform functions to control a process in real-time in the process plant environment 5. For instance, respective data engines may be embedded in or manufactured into process controllers, field devices, and I/O devices. In the process plant environment 5, process controllers receive signals indicative of process measurements made by field devices, process this information to implement a control routine, and generate control signals that are sent over traditional wired or wireless process control communication links or networks to other field devices to control the operation of a process in the plant 5. Typically, at least one field device performs a physical function (e.g., opening or closing a valve, increasing or decreasing a temperature, etc.) to control the operation of a process, and some types of field devices communicate with controllers by using I/O devices. Process controllers, field devices, and I/O devices may be wired or wireless, and any number and combination of wired and wireless process controllers, field devices and I/O devices may be included in the process plant environment or system 5, and may each include a respective distributed data engine.

For example, FIG. 1 illustrates a process controller 11 that is communicatively connected to wired field devices 15-22 via input/output (I/O) cards 26 and 28, and that is communicatively connected to wireless field devices 40-46 via a wireless gateway 35 and a process control data highway or backbone 10 (which may include one or more wired and/or wireless communication links, and may be implemented using any desired or suitable or communication protocol such as, for example, an Ethernet protocol). In an embodiment, the controller 11 is communicatively connected to the wireless gateway 35 using one or more communications networks other than the backbone 10, such as by using any number of other wired or wireless communication links that support one or more communication protocols, e.g., Wi-Fi or other IEEE 802.11 compliant wireless local area network protocol, mobile communication protocol (e.g., WiMAX, LTE, or other ITU-R compatible protocol), Bluetooth®, HART®, WirelessHART®, Profibus, FOUNDATION® Fieldbus, etc. The backbone 10 and these other communication networks are examples of "traditional" process control communication networks, as referred to herein.

The controller 11, which may be, by way of example, the DeltaV™ controller sold by Emerson Process Management, may operate to implement a batch process or a continuous process using at least some of the field devices 15-22 and 40-46. In an embodiment, in addition to being communicatively connected to the process control data highway 10, the controller 11 is also communicatively connected to at least some of the field devices 15-22 and 40-46 using any desired hardware and software associated with, for example, standard 4-20 mA devices, I/O cards 26, 28, and/or any smart communication protocol such as the FOUNDATION® Fieldbus protocol, the HART® protocol, the WirelessHART® protocol, etc. In FIG. 1, the controller 11, the field devices 15-22 and the I/O cards 26, 28 are wired devices, and the field devices 40-46 are wireless field devices. Of course, the wired field devices 15-22 and wireless field devices 40-46 could conform to any other desired standard(s) or protocols, such as any wired or wireless protocols, including any standards or protocols developed in the future.

The process controller 11 of FIG. 1 includes a processor 30 that implements or oversees one or more process control routines 38 (e.g., that are stored in a memory 32). The processor 30 is configured to communicate with the field devices 15-22 and 40-46 and with other nodes communicatively connected to the controller 11. It should be noted that any control routines or modules (including quality prediction and fault detection modules or function blocks) described herein may have parts thereof implemented or executed by different controllers or other devices if so desired. Likewise, the control routines or modules 38 described herein which are to be implemented within the process control system 5 may take any form, including software, firmware, hardware, etc. Control routines may be implemented in any desired software format, such as using object oriented programming, ladder logic, sequential function charts, function block diagrams, or using any other software programming language or design paradigm. The control routines 38 may be stored in any desired type of memory 32, such as random access memory (RAM), or read only memory (ROM). Likewise, the control routines 38 may be hard-coded into, for example, one or more EPROMs, EEPROMs, application specific integrated circuits (ASICs), or any other hardware or firmware elements. Thus, the controller 11 may be configured to implement a control strategy or control routine in any desired manner.

In some embodiments, the controller 11 implements a control strategy using what are commonly referred to as function blocks, wherein each function block is an object or other part (e.g., a subroutine) of an overall control routine and operates in conjunction with other function blocks (via communications called links) to implement process control loops within the process control system 5. Control based function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 5. Of course, hybrid and other types of function blocks exist. Function blocks may be stored in and executed by the controller 11, which is typically the case when these function blocks are used for, or are associated with standard 4-20 mA devices and some types of smart field devices such as HART® devices, or may be stored in and implemented by the field devices themselves, which can be the case with FOUNDATION® Fieldbus devices. The controller 11 may include one or more control routines 38 that may implement one or more control loops, and may be performed by executing one or more of the function blocks.

The wired field devices 15-22 may be any types of devices, such as sensors, valves, transmitters, positioners, etc., while the I/O cards 26 and 28 may be any types of I/O devices conforming to any desired communication or controller protocol. In FIG. 1, the field devices 15-18 are standard 4-20 mA devices or HART® devices that communicate over analog lines or combined analog and digital lines to the I/O card 26, while the field devices 19-22 are smart devices, such as FOUNDATION® Fieldbus field devices, that communicate over a digital bus to the I/O card 28 using a FOUNDATION® Fieldbus communications protocol. In some embodiments, though, at least some of the wired field devices 15, 16 and 18-21 and/or at least some of the big data I/O cards 26, 28 additionally or alternatively communicate with the controller 11 (and/or other big data nodes) using the process control data highway 10 and/or by using other suitable control system protocols (e.g., Profibus, DeviceNet, Foundation Fieldbus, ControlNet, Modbus, HART, etc.).

As shown in FIG. 1, each of the controller 11, the I/O cards 26 and 28, and the wired field devices 15-16, 18-21 includes a respective, embedded distributed data engine as indicated by the encircled "DDE," which communicates with other distributed data engines via one or more data analytics communications channels and/or networks (not shown in FIG. 1).

In FIG. 1, the wireless field devices 40-46 communicate via a traditional, wireless process control communication network 70 using a wireless protocol, such as the WirelessHART® protocol. Such wireless field devices 40-46 may directly communicate with one or more other devices or nodes of the process control data analytics communications network 112 that are also configured to communicate wirelessly (using the wireless protocol or another wireless protocol, for example). To communicate with one or more other nodes that are not configured to communicate wirelessly, the wireless field devices 40-46 may utilize a wireless gateway 35 connected to the process control data highway 10 or to another traditional process control communications network.

The wireless gateway 35 may provide access to various wireless devices 40-58 of the wireless communications network 70. In particular, the wireless gateway 35 provides communicative coupling between the wireless devices 40-58, the wired devices 11-28, and/or other nodes or devices of the process control plant 5. For example, the wireless gateway 35 may provide communicative coupling by using the process control data highway 10 and/or by using one or more other traditional communications networks of the process control plant 5.

Similar to the wired field devices 15-22, the wireless field devices 40-46 of the wireless network 70 may perform physical control functions within the process plant 5, e.g., opening or closing valves or taking measurements of process parameters. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some scenarios, the wireless network 70 may include non-wireless devices. For example, a field device 48 of FIG. 1 may be a legacy 4-20 mA device and a field device 50 may be a traditional wired HART® device. To communicate within the network 70, the field devices 48 and 50 may be connected to the wireless communications network 70 via a wireless adaptor or historize at this or 52b. The wireless adaptors 52a, 52b may support other communication protocols such as Foundation® Fieldbus, PROFIBUS, DeviceNet, etc. Furthermore, the wireless network 70 may include one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communications network 70. The wireless devices 40-46 and 52-58 may communicate with each other and with the wireless gateway 35 over wireless links 60 of the wireless communications network 70, and/or via the process control data highway 10.

As shown in FIG. 1, each of the adaptor 52a, access point 55a, and router 58 includes a respective, embedded distributed data engine as indicated by the encircled "DDE," which communicates with other distributed data engines via one or more data analytics communications channels and/or networks (not shown in FIG. 1).

In some embodiments, the process control system 5 includes one or more other wireless access points 72 that communicate using other wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radio communication Sector) compatible protocols, short-wavelength radio communications such as near field communications (NFC) and Bluetooth, or other wireless communication protocols. Typically, such wireless access points 72 allow handheld or other portable computing devices (e.g., user interface devices 73) to communicate over a respective traditional, wireless process control communication network that is different from the wireless network 70 and that supports a different wireless protocol than the wireless network 70. For example, a wireless or portable user interface device 73 may be a mobile workstation or diagnostic test equipment that is utilized by an operator within the process plant 5. In some scenarios, in addition to portable computing devices, one or more process control devices (e.g., controller 11, field devices 15-22, or wireless devices 35, 40-58) also communicate using the wireless protocol supported by the access points 72.

In some embodiments, the process control system 5 includes one or more gateways 75, 78 to systems that are external to the immediate process control system 5. Typically, such systems are customers or suppliers of information generated or operated on by the process control system 5. For example, the process control plant 5 may include a gateway node 75 to communicatively connect the immediate process plant 5 with another process plant. Additionally or alternatively, the process control plant 5 may include a gateway node 78 to communicatively connect the immediate process plant 5 with an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems.

As shown in FIG. 1, the access point 72, the user interface device 73, and the gateway 75 each includes a respective, embedded distributed data engine as indicated by the encircled "DDE," which communicates with other distributed data engines via one or more data analytics communications channels and/or networks (not shown in FIG. 1).

It is noted that although FIG. 1 only illustrates a single controller 11 with a finite number of field devices 15-22 and 40-46, wireless gateways 35, wireless adaptors 52, access points 55, routers 58, and wireless process control communications networks 70 included in a process plant 5, this is only an illustrative and non-limiting embodiment. Any number of controllers 11 may be included in the process control plant or system 5, and any of the controllers 11 may communicate with any number of wired or wireless devices and networks 15-22, 40-46, 35, 52, 55, 58 and 70 to control a process in the plant 5.

Figure 2A:
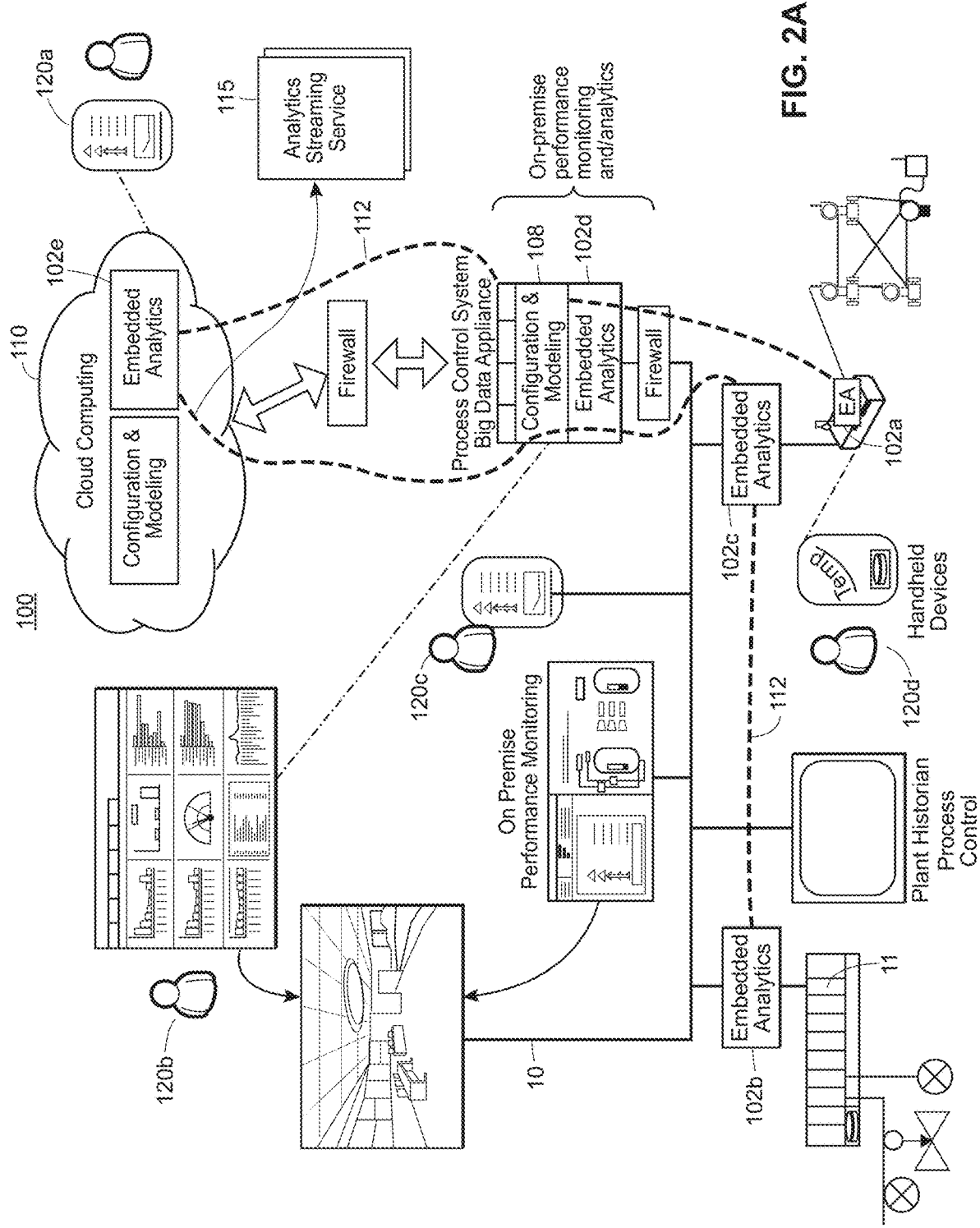
FIG. 2A depicts a block diagram of an example system for distributed industrial process performance monitoring/analytics.

Example Distributed Industrial Process Performance Monitoring/Analytics System Architecture FIG. 2A includes a block diagram of an example system 100 for distributed industrial process performance monitoring/analytics, which is also referred to interchangeably herein as a Data Analytics System (DAS). The DAS 100 may operate in conjunction with, for example, the process plant 5 of FIG. 1, and is so discussed herein for ease of illustration. However, it is understood that at least a portion of the DAS 100 may operate in conjunction with other process plants and/or process control systems other than the process plant 5.

Generally, the DAS 100 supports localized performance monitoring and/or analytics while simultaneously supporting large-scale (e.g., system-wide and/or across multiple devices or nodes of the process plant 5) performance monitoring, data mining, and data analytics for process plant environments. To this end, the system 100 includes a plurality of distributed data engines (DDEs), examples of which are indicated in FIG. 2A by the reference numbers 102a-102e and in FIG. 2B by the reference numbers 102f-102h. As used herein, the reference number "102x" refers to any one or more of the DDEs 102a-102h. At least some of the distributed data engines illustrated in FIG. 2A correspond to distributed data engines illustrated in FIG. 1. For example, the data engine 102a of FIG. 2A is the data engine included in the wireless gateway 35 of FIG. 1, and the data engine 102b of FIG. 2A is the data engine embedded in the controller 11 of FIG. 1. Additionally, the system 100 includes other distributed data engines 102 that are not shown in FIG. 1. For example, a distributed data engine 102c is connected to the data highway 10, a distributed data engine 102d is embedded in a centralized big data appliance 108 of the process plant 5, and distributed data engine 102e is embedded in a big data cloud node 110, where the big data cloud node 110 may service the data analytics needs of the process control plant 5 (and in some configurations, may also service other process control plants). Of course, the system 100 is not only limited to five data engines 102a-102e or eight data engines 102a-102h, but may include any number of distributed data engines, at least some of which are embedded in or manufactured into their respective data sources (e.g., into respective process control devices of the process plant 5) and/or at least some of which are otherwise connected to some other data source (e.g., component, portion, etc.) of the process plant 5.

As mentioned above, typically distributed data engines do not communicate with other distributed data engines by using any of the traditional process control plant communication networks (e.g., the backbone 10, the wireless network 70, the wired connection between I/O card 28 and devices 19-22, etc. of FIG. 1), although in some configurations, some distributed data engines 102x may communicate at least some information to other data engines by using a traditional process control communication network. Generally, though, the data engines 102x communicate with other data engines 102x by using one or more data analytics communication networks 112 that are separate and distinct from traditional process control networks. Analytics data is streamed between distributed data engines or nodes of the network 112, e.g., by using an analytic streaming service, a streaming and/or queuing protocol, and/or by using a messaging broker or system 115 that supports streaming, such as a custom streaming source, Flume, HDFS, ZeroMQ, Kafka, Microsoft Message Bus, MQTT, AMQP, RabbitMQ, etc., a custom specialized history object communications protocol such as described in the aforementioned U.S. application Ser. No. 14/506,863 entitled "STREAMING DATA FOR ANALYTICS IN PROCESS CONTROL SYSTEMS," or another suitable communications protocol. Several branches of the data analytics communication network 112 are represented in FIG. 2A by the dashed lines, although in FIG. 2A the network 112 is not fully depicted for clarity's sake. Thus, in an embodiment, at least a portion of the data analytics communication network 112 may be, in a sense, an overlay network on top of the traditional process control communication networks within the plant 5. For example, at least some of the physical equipment that comprise the DDEs 102x and the data analytics network 112 may be located on the premises of the process plant 5, and in some cases, may be located amongst the equipment of the process plant 5.

Figure 2B:
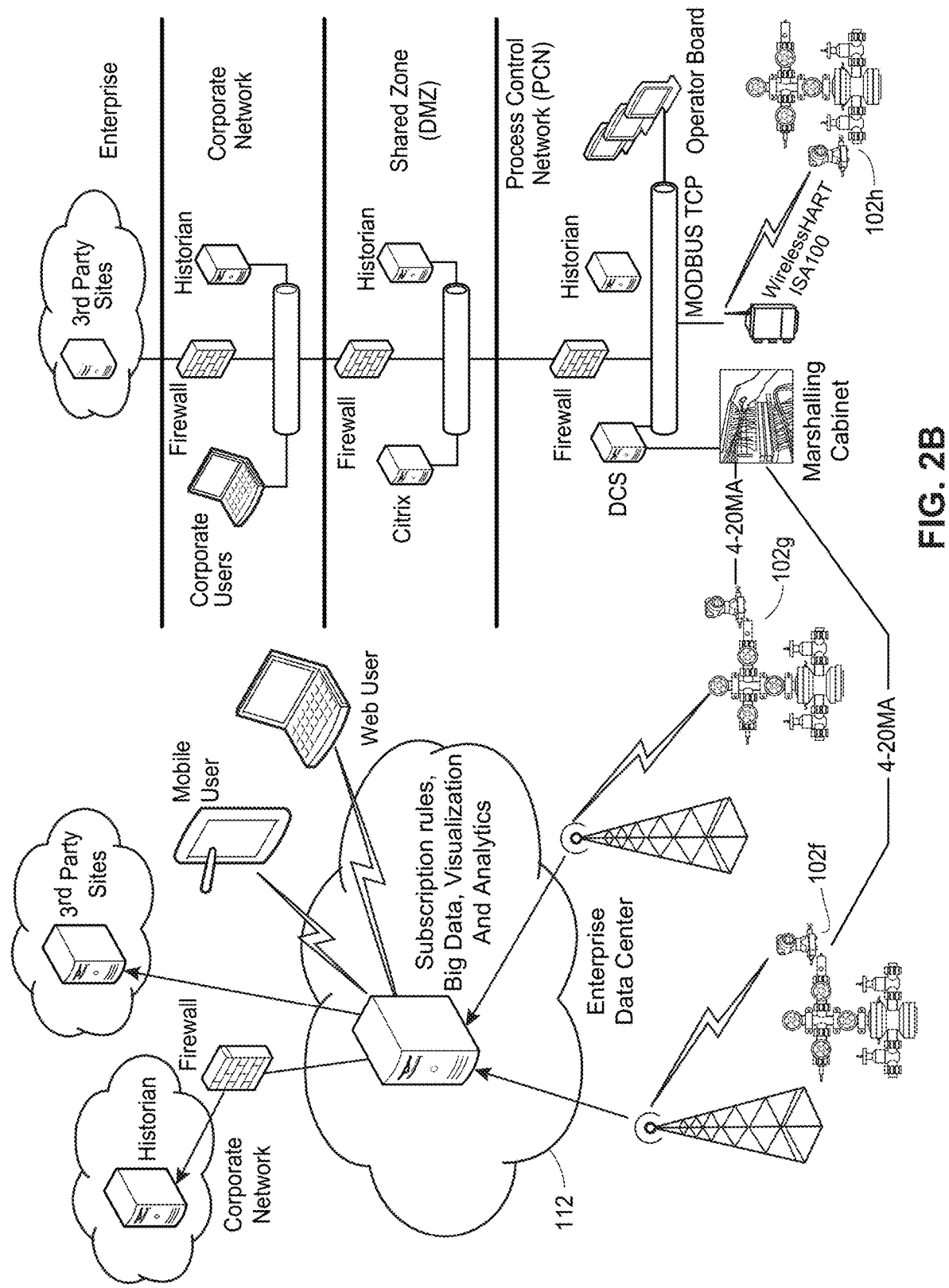
FIG. 2B depicts an embodiment of an arrangement of an example distributed industrial process performance monitoring analytics system in relation to an example process control system.

In another embodiment, at least a portion of the data analytics communication network 112 may be implemented alongside of or mostly parallel to traditional process control communication networks, as shown in FIG. 2B. In FIG. 2B, the process plant 5 includes various process control devices or components that are communicatively connected to a traditional process control communication network, e.g., to assist in controlling one or more processes within the plant 5. Three of such process control devices/components each have a respective DDE 102f, 102g, and 102h embedded therein are associated therewith, and each of the DDEs 102f-102h is communicatively connected to the data analytics network 112. However, the majority of the equipment supporting and/or comprising the data analytics network 112 is not located amongst the equipment of the process plant 5, but instead may be remotely located at an enterprise data center.

In another embodiment, at least a portion of the data analytics communication network 112 may be implemented as a logical network within the process plant 5. In this embodiment, for example, both process control data and analytics data may be transported over a same physical communications link that logically has the appearance of independent links, e.g., one traditional process communication link and one data analytics communication link.

Irrespective of the implementation of the data analytics network 112, though, the data analytics network 112 intersects with traditional process control communication networks at devices or nodes within the process control system 5 that communicate information to other devices or nodes within the process control system 5 via traditional process control communication networks and in which distributed data engines are embedded (e.g., data engines 102a, 102b, 102f, 102g, 102h), and/or by virtue of distributed data engines that are connected to traditional process control communications networks for the purposes of having a window to the data being transmitted thereon (e.g., data engine 102c).

The data analytics network 112 may utilize any desired communication technology and/or communication protocols. At least some portion of the data analytics network 112 may utilize wired technology, and at least some portion of the data analytics network 112 may utilize wireless technology. Generally, though, the data analytics network 112 may support data packet transport protocols and/or technology, such as IP or other asynchronous data packet protocols over Ethernet.

At a higher level or layer, the data analytics network 112 may utilize a streaming-capable protocol, message broker that handles real-time data feeds, and/or messaging system that handles real-time data feeds 115, such as Apache Kafka. As shown in FIG. 2A, the streaming ability 115 provided by the data analytics network 112 allows the distributed performance monitoring/analytics system or DAS 100 to locally bind and provide various analytics services close to data sources (e.g., close to or at devices or nodes of the process plant 5 in which distributed data engines 102x are embedded, such as the nodes 11, 18, 26, 28, 72, 35, 52a, 55a, 72 in FIG. 1). At the same time, the streaming ability 115 of the system 100 also allows the system 100 to provide larger scale predictions and optimizations, as only particular source-generated data that is necessary to support a broader or higher-level of data analytics need to be communicated to recipient data engines. For example, if the data engine 102d is performing a particular data analytic only on data that is generated by each of the controllers of the process plant 5 and captured within an hour after a particular configuration change is instantiated at each controller, the data engine 102b embedded at the controller 11 streams only the required data to the engine 102d (e.g., streams only the output data generated by the controller 11 to the data engine 102d during the hour after the particular configuration change is instantiated, but does not stream other output data generated by the controller 11).

As shown in FIG. 2A, portions of the distributed performance monitoring/analytics system or DAS 100 are locally disposed within the process control environment or plant 5. For example, distributed data engines 102a, 102b, 102c, and 102d are located on the premises of the process plant 5. Also as shown in FIG. 2A, other portions of the system 100 are remotely disposed. For example, data engine 102e is located in the cloud 110. Other data engines 102x may be disposed at one or more remote locations (not shown), such as at a server bank that services multiple process plants or process control systems. Of course, in some configurations, the system 100 may omit locally disposed data engines, or may omit remotely disposed data engines. That is, the system 100 may provide performance monitoring and analytics (e.g., via one or more distributed data engines) entirely on the premises of the subject process control environment 5 (e.g., locally), entirely off the premises of the subject process control environment 5 (e.g., remotely), or by using a combination of both on- and off-premise distributed data engines (e.g., both locally and remotely).

Example Types of Performance Monitoring and Analytics for Industrial Control Systems Generally, performance monitoring and analytics of industrial control systems includes gathering data generated by the subject control system (e.g., in real-time while the system is operating control one or processes), and performing one or more analytical functions or operations on at least some of the gathered data to determine knowledge about how well the control system is performing, and in some cases to determine actions that may be taken to improve the system's performance. Data analytics for industrial process control systems may be thought of in three general categories: descriptive analytics, predictive analytics, and prescriptive analytics. A general discussion of these categories of analytics follows.

Descriptive analytics allow a user to discover what happened within a process control system or plant, when it happened, how often it happened, and what problem(s) resulted from what happened. Typically, descriptive analytics are performed on data gleaned from monitoring the process system or plant (e.g., a posteriori), and may utilize techniques such as basic calculations, scaling, and standard statistics.

Prescriptive analytics allow a user to optimize the operations within a process control system or plant. For example, prescriptive analytics allow a user to answer questions such as: What is the best answer? What is the best outcome given uncertainty? What are significantly different and better choices? Predictive analytics may identify, monitor, and control key quality variables or key indicators of process operations in industrial process control plants and systems. Additionally, predictive analytics may identify what will happen to key quality variables or key indicators of process operations given a set of future inputs or causal conditions. The predicted values may then be utilized by prescriptive analytics to generate a prescriptive action. Typically, prescriptive analytics utilize techniques such as constraint-based optimization and multi-objective optimization, however, known data monitoring and analytics tools are rudimentary and severely limited in their scope.

For example, with known data monitoring and analytics tools, users or operators may optimize the performance of a single piece of equipment or unit of the plant by using constraint-based optimization tools that operate on data gleaned from monitoring that single piece of equipment or unit (e.g., a posteriori). However, as a process control system or plant includes numerous pieces of equipment and process units, the overall process may still be far from optimum due to process interactions between multiple units. Multi-objective optimization techniques for interacting units or a coordinated optimization across a portion of the process control system are available in known data monitoring and analytics tools (e.g., first-principle-based modeling), but due to the increasing complexity of processes, such coordinated optimization techniques are difficult and often take too long to execute (if they are even possible to execute) to be useful. For example, known multi-objective optimization tools operate on data gleaned from monitoring multiple pieces of equipment or units (e.g., a posteriori) to identify optimal operating points and to determine trajectories to maneuver the current operating point to the optimal one. However, each cycle of data collection and calculations thereon may take so long that by the time prescriptive actions are identified, the process has moved so far in its operation that the identified prescriptive actions are no longer optimum, or may even be invalid, counterproductive, and/or dangerous. Further, when a user attempts to scale down or narrow the size and scope of (and therefore the time needed for) the calculations by limiting the amount of variables that are input into the multi-objective optimization tool, the user makes a human judgment as to which variables are selected as inputs, which not only limits the scope, but also may be incorrect and therefore may produce a misleading or incorrect result.

Further, known data monitoring and analytics tools often are not able to provide the identity and values of key quality variables on demand (e.g., due to limitations of available measurement techniques) and cannot provide timely, pertinent results. For example, currently used techniques for predictive analytics of process control systems include either off-line techniques (e.g., in a laboratory) or on-line techniques (e.g., by an analyzer), both of which have their respective drawbacks. Off-line determination of key quality variables is undesirable, as the significant delay incurred in laboratory testing renders any output as sub-optimal or even invalid for current process conditions (e.g., measured signals cannot be used as feedback signals). The use of on-line analyzers to determine key quality variables is also less than desirable, as known on-line analyzers are problematic, expensive, and require frequent and high cost maintenance. Such limitations may have a severe influence on the quality of products, production of waste, and safety of operations.

Further, for large-scale monitoring situations, a traditional, centralized performance monitoring scheme has severe limitations. A suitable performance monitoring system should have fault tolerance ability, operational reliability, and economic efficiency, all of which are compromised when a centralized performance monitoring scheme is applied to large-scale monitoring situations. Specifically, a centralized monitor looks after faults of all units of the process simultaneously. Once a fault in a unit is found, the centralized monitor becomes limited in its ability to detect further faults from other units that occur in the same time period, as a centralized monitor uses all measured variables in its computation, and when one variable is unavailable or one communication channel is blocked, the entire monitoring system may stop functioning. Additionally, the real-time capability of a centralized monitor is limited by the lowest sampling rate of the variables, which reduces the efficiency of the monitoring system. Further, different variables in a plant can have very different scale of dynamics (even within the same unit), and a single monitoring scheme usually does not apply to all variables of an entire process or unit, and in particular, is sub-optimal for situations when the variables affect one another, e.g., across interacting process units. Still further, when there are geographical distributions in process control systems (for example, long distances between various process units, such as in an oil pipeline), typically each unit is equipped by a separate performance monitor, thereby providing local (but not overall) performance monitoring, as well as transmission delay, data loss, and battery limitation problem.

Unlike the rudimentary, univariate, and/or centralized predictive monitoring and analytic techniques that are currently in use, and unlike the a posteriori nature of descriptive and prescriptive analytics, the novel distributive performance monitoring and analytics systems, methods, apparatuses, components, and techniques for industrial control systems and plants described herein allow a user to monitor what is currently happening in the process control system or plant at any point in time, and to predict in real-time what is likely to happen next or later based on the present data. The novel techniques disclosed herein allow user to answer questions such as: "What is happening now?" "What will happen next?" "What if these trends continue?" with little or no user or human bias as to the characteristics of the process data.

The novel techniques for distributed performance monitoring and analytics for industrial control systems described herein generally include a platform (e.g., the system architecture 100 shown in FIG. 2A) and applications that operate on top of or in conjunction with the platform. The platform utilizes data-driven methods augmented with equipment and process knowledge to support, for example, estimation, monitoring, and data mining of a process control system or plant (e.g., the process control system 5) before, during, and after the process control system or plant is operating to control one or more processes. In some implementations, the platform may support multiple process control systems or plants.

The performance monitoring/analytics applications operating on or in conjunction with the platform may include, e.g., inferred measurements, equipment monitoring, fault detection, process predictions, causality, other monitoring applications, and/or other analytics applications. Techniques that may be utilized by the applications include data mining, optimization, predictive modeling, machine learning, simulation, distributed state estimation, and the like. As such, performance monitoring/analytics applications may be used to monitor, predict, and diagnose performance degradation and faults of any number of any portions of the process control system 5, including in areas such as instrumentation, equipment, control, user interactions, and process.

Accordingly, the distributed industrial performance monitoring and analytics techniques described herein may include inferential mechanisms that provide continuous on-line estimations of critical process variables from readily available process measurements. To sustain data models over an extended period of time, the system further may support the ability to monitor, tune and enhance the data models. Methods which may be used include, in the simplest case, detuning the models (e.g., increasing the normal operating region to the prediction +/−3 s). More complex examples include model switching and model adaptation.

In fact, as part of a research and prototype testing program, the inventors established a prototype industrial process performance data monitoring and data analytics framework using the techniques described herein to address soft sensor development problems in the presence of nonlinearity, non-Gaussian distribution, irregularity of data samples, process constraints, and/or other factors. In these prototypes and research, monitoring and analysis of data generated by a number of soft sensors for specialty chemical, batch, and hydrocarbon processes were performed, and resulting knowledge was utilized to improve the processes obtained. Significant economic and environmental benefits have been reported by our industrial partners. Examples of our research and prototypes are described in a later section.

Returning now to FIG. 2A, the distributed industrial performance monitoring and analytics system or DAS 100 provides the tools, configuration, and interfaces required to support localized performance monitoring while at the same time supporting large-scale data mining and data analytics for process plant environments, e.g., the process plant 5 of FIG. 1. For example, the system 100 may include a user interface application (e.g., the Data Analytics Studio) for configuring and developing data analytic models, a run-time engine for executing models (which may operate, in whole or in part, on real-time data generated by the process control system), and the same or another user interface application (e.g., a Run-time Dashboard) for displaying analytics results. The system 100 may operate on or support multiple types of data sources, including real-time values as previously mentioned (e.g., real-time continuous values), event collection, batch data collection, operator rounds data, LIMS data, external data such as supply chain data and/or weather data, and any other type of data associated with the process control system, including both structured and unstructured data. The system 100 may provide a set of standard analytics "out-of-the-box," such as descriptive statistics, histogram plots, correlation plots, etc. Additionally, the system 100 may provide a structured environment for users to create desired analytics and to view both source data and n-order data generated by applying multiple different data analytics to identify implicit relationships within various data sets of the process control system, and/or to predict product capabilities, quality, and other characteristics. Generally, the system 100 may provide knowledge discovery about the process control system as well as actionable knowledge (e.g., to improve or optimize performance of the process control system, to correct and/or predict faults, to increase reliability, to improve safety, to increase economic efficiency, etc.), which may be represented as data models.

As shown in FIG. 2A, the system 100 may be highly distributed, e.g., may include numerous distributed data engines 102x. The network 112 of embedded data engines 102x may interconnect numerous (e.g., hundreds, thousands, or even millions) of sensors and sources of process control system information. As previously mentioned, the data engines 102x are clustered near, at, or within the devices and nodes of the process control system (e.g., manufacturing equipment, process control devices, communication nodes, material handling systems, lab systems, users of the plant, and even the process itself). As such, the embedded nature of the distributed industrial performance and analytics system 100 is tightly coupled to the physical process control plant. However, the embedding and integration of the data engines 102x into the fabric of the manufacturing of process control system devices and nodes may render the data engines 102x as nearly invisible to end-users. Typically, a data engine 102x is small, wirelessly connected into the network 112, bandwidth limited, and operates under physical constraints such as limited energy and the need for adequate heat dissipation, as it may be embedded into a process control device such as a temperature or other type of sensor.

As previously mentioned, distributed data engines 102x interconnect with other data engines 102x over the network 112 by using streaming protocols and/or queuing protocols. Each distributed data engine 102x may support one or more data monitoring and/or data analytics applications. The sheer number of connected clusters of applications necessitates the use of statistically correct (instead of deterministic) algorithms for resource accounting, fault detection and correction, system management, etc., and each cluster may host functionality that is of interest to localized needs.

As such, the distributed industrial performance monitoring and analytics system 100 may increase the safety, efficiency, and productivity of process control plants. For example, the system 100 may precisely control process parameters, thus reducing the total cost of process manufacture. Additionally, the integration of the system 100 into the process control environment 5 may result in better product quality and less waste through close process control and real-time quality assurance; more flexible, quickly configured production lines as a result of programmable sub-systems; system health monitoring, which leads to more-effective, preventive and lower-cost maintenance; safer working environments due to better monitoring and control; and better component assembly techniques, such as through the use of smart RFID tags, to name just a few of innumerable benefits.

Moreover, the distributed industrial performance monitoring and analytics system 100 may improve human-machine interactions between users and the process control system 5 to the point of generating a real-time, human-plus-machine control loop within the process plant 5. For example, an improved human-machine interaction may improve quality and productivity by ensuring that there are no operator/maintenance/reliability errors, as well as by reducing accidents. Further, the availability, reliability, and continuous quality of service of the process control plant 5 may be achieved through advanced control, redundancy, intelligent alarming, self-diagnosis, and repair afforded by the system 100.

Example Industrial Performance Data Monitoring/Data Analytics Engine

Turning now to the distributed, industrial performance distributed data monitoring and/or analytics engines 102x, generally, a distributed data engine 102x may be a node of the data analytics communications network 112 that collects, observes, retrieves, receives, processes, stores, caches, and/or analyzes all or most process control related data (e.g., big data) that is generated by or otherwise observed by one or more data source or sources, e.g., by the device or component into which the data engine 102x is embedded or by the component(s) to which the data engine 102x is coupled or attached. In some situations, a distributed data engine 102x may generate additional data (e.g., results of analytics that it performs), and/or may send or forward selected data to other nodes of the data analytics network 112. The terms "process control big data," "process big data," and "big data," as used interchangeably herein, generally refer to all (or almost all) data that is generated, received, and/or observed by devices and/or components (e.g., both process control devices/components and analytics devices/components) included in and associated with a process control system or plant (e.g. the process control system or plant 5), and in particular, all (or almost all) data is that is generated, received, and/or while the process control system or plant is executing in real-time to control one or more processes. In an embodiment, all data (including all process data and all analytics data) that is generated by, created by, received at, or otherwise observed by all devices included in and associated with the process plant 5 is collected and stored as big data within the data analytics communications network 112. In process plants and process control environments, this collection and analysis of big data is key to improving safety, reliability, and economic efficiency, as the dimension of time and the presence or omission of particular data points may be critical. For example, if a particular data value is not delivered to a recipient component of the process plant within a certain time interval, a process may become uncontrolled, which may result in a fire, explosion, loss of equipment, and/or loss of human life. Furthermore, multiple and/or complex time-based relationships between different components, entities, and/or processes operating within the process plant and/or external to the process plant may affect operating efficiency, product quality, and/or plant safety.

The process control big data that is generated, collected, observed, retrieved, received, stored, cached, processed, analyzed, and/or forwarded by the distributed data engines 102x may include data that has been directly utilized in or generated from controlling a process within the plant 5, e.g., first-order real-time and configuration data that is generated or used by process control devices such as controllers, input/output (I/O) devices, and field devices. Additionally or alternatively, the data engines 102x may generate, collect, observe, process, analyze, store, receive, retrieve, cache, and/or forward data related to delivering and routing such first-order process control data and other data within the process plant 5, e.g., data related to network control of the data analytics communications network 112 and/or of other communication networks in the plant 5, data indicative of bandwidth, network access attempts, diagnostic data, etc. Further, some data engines 102x may generate, collect, observe, store, cache, retrieve, receive, and/or forward data indicative of results, learning, and/or information that has been learned within the process control data analytics communications network 112 by processing and/or analyzing process control big data that it has collected. Typically, such analytics results, learning, and/or learned information are generated from analytics that are performed by one or more data engines 102x.

As such, a distributed data engine (e.g. DDE 102x) is interchangeably referred to herein as a "big data appliance," "big data appliance node," or "appliance node." In most cases, a distributed data engine of big data appliance node 102x includes multi-core hardware (e.g., multi-core processors) for transmitting and receiving big data in real-time (e.g., via streaming) and, in some embodiments, for caching and/or storing the real-time big data for later streaming or other delivery over the process control data analytics communications network 112. Accordingly, a distributed data engine 102x also includes memory (e.g., high-density memory) for the caching and/or storing of the big data. Examples of real-time data that may be transmitted, received, streamed, cached, collected, stored, received, retrieve, cached, and/or otherwise observed by the data engines 102x may include process control data such as measurement data, configuration data, batch data, event data, and/or continuous data. For instance, real-time data corresponding to configurations, batch recipes, setpoints, outputs, rates, control actions, diagnostics, alarms, events and/or changes thereto may be collected. Other examples of real-time data may include process models, statistics, status data, network and plant management data, and analytics results. Descriptions of various types of example big data appliances and their components which may be utilized with any or all of the techniques described herein may be found in aforementioned U.S. patent application Ser. Nos. 13/784, 041, 14/174,413, and 14/212,493, although it is understood that any or all of the techniques described herein may be utilized with other suitable big data appliances.

Typically, the distributed data engine 102x generally operates on big data that has been generated or provided by one or more data sources within the process control plant or system 5 and/or otherwise associated with the real-time operations of the process control plant or system 5. For example, a DDE 102x may collect and time-stamp data that is received at and/or generated by the device in which it is embedded, or that is received at and/or generated by its corresponding data source or sources. The collected data may be stored (at least temporarily) in the local memory of the data engine 102x. In some situations, at least some of the data may be transferred or streamed to one or more other data engines 102x using a specialized history object communications protocol, such as described in the aforementioned U.S. application Ser. No. 14/506,863 entitled "STREAMING DATA FOR ANALYTICS IN PROCESS CONTROL SYSTEMS," or another suitable communications protocol or messaging system such as Kafka.

In some embodiments, one or more data engines 102x support large scale data mining and data analytics on multi-dimensional data including real-time continuous values, event collection, batch data collection, operator rounds data, and/or other data. A distributed data engine 102x may be configured to perform one or more data analytics on its locally collected data, and/or on data collected by other DDEs 102x. For example, a DDE 102x may include various tools that operate on structured data (e.g., time series and tabular data stored in memory, relational, and/or non-relational databases, or that is streamed) as well as unstructured data (e.g., pdfs). Additionally, a DDE 102x may support any one or more desired target environments and execute respective target code therein (e.g., Java, C #, R scripts, Python scripts, Matlab® scripts, Statgraphics, etc.). The DDE 102x may perform learning algorithms (e.g., partial least square regression, principle component analysis, etc.), classification techniques (e.g., random forest, pattern recognition, etc.), and/or other data analytics in order to generate results and/or useful information such as predicting product capabilities, qualities, and/or other desired characteristics. The results of the local analytics may be stored at the local memory of the data engine 102x, and itself may be treated as additional big data. Further, some data engines 102x may include interfaces for configuration and developing models, run-time engines for executing models, and dashboards for displaying results at a user interface. For example, a distributed data engine 102x may be configured with analytics for run-time in a manner such as discussed in aforementioned U.S. Application No. 62/060,408, entitled "DATA PIPELINE FOR PROCESS CONTROL SYSTEM ANALYTICS," and/or as discussed in a later section of the present disclosure. Displayed results may include standard descriptive statistics, histograms, correlation plots, and/or other data representations that can identify implicit relationships within the various data sets.

In some cases, a distributed data engine 102x is embedded in, manufactured into, directly coupled to, or otherwise co-resident with a host data source (e.g., the data engines 102a, 102b, and 102c shown in FIG. 2A). In some cases, a distributed data engine 102x may be a stand-alone big data node of the process control data analytics communications network 112 (e.g., the data engines 102d and 102e shown in FIG. 2A). That is, in these cases, the data engine 102x is not embedded in or co-resident with a data source of the process control system or plant 5, but may otherwise observe data that has been generated by one or more data sources (for example, when a distributed data engine is coupled to a traditional process control communication link, such as the data engine 102c). Whether embedded or stand-alone, the data engine 102x analyzes big data that has been locally generated and/or provided by one or more data sources to discover or learn knowledge. This learned knowledge may be stored at the data engine 102x, operated on locally by the data engine 102x, and/or provided or transmitted as big data to other data engines 102x, e.g., recipient big data nodes. Additionally, the distributed data engine 102x may provide a portion of its known or stored big data to other data engines 102x and/or other nodes of the analytics network 112 (e.g. a local or remote user interface node).

Figure 3:
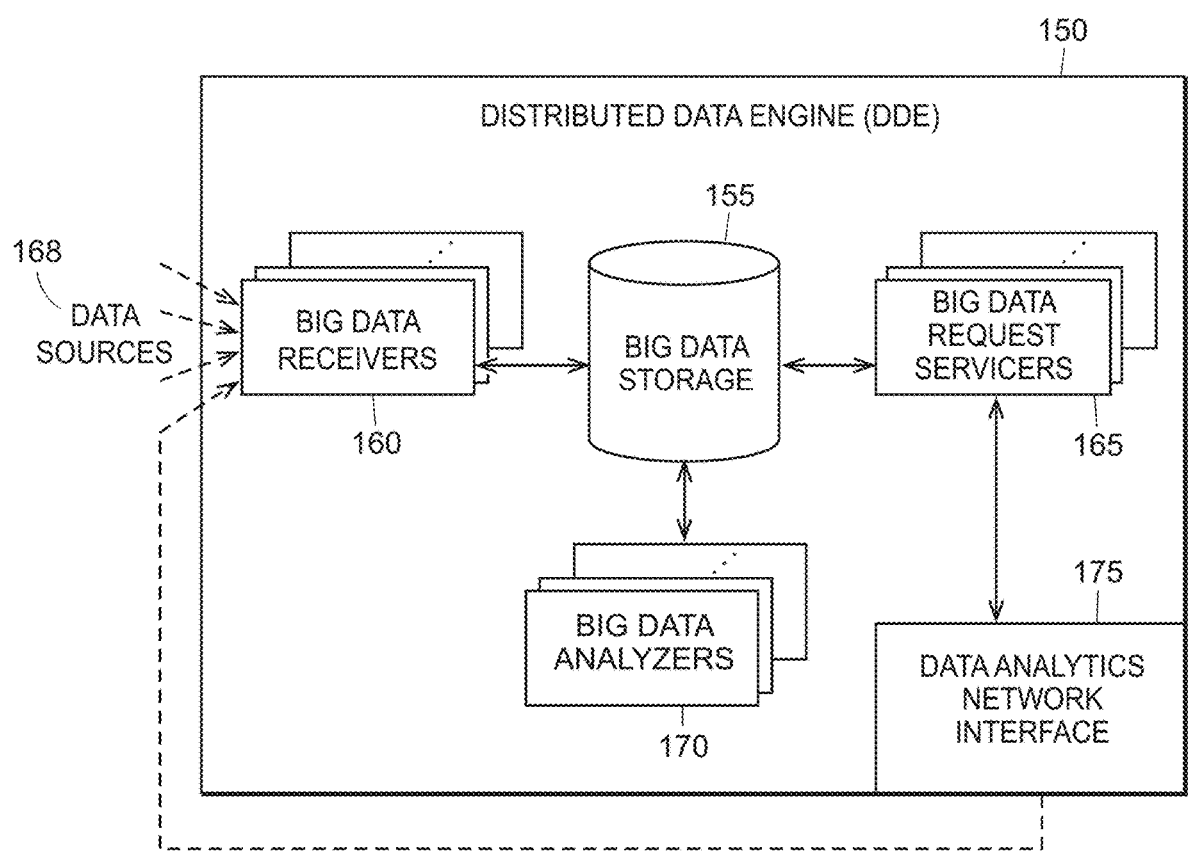
FIG. 3 depicts a block diagram of an example industrial process performance monitoring and/or analytics engine.

FIG. 3 includes a simplified block diagram of an example distributed industrial process performance data monitoring and/or data analytics engine 150, instances of which may be included in the process control data analytics communications network 112 of FIG. 2A (e.g., the distributed data engines 102x). Referring to FIG. 3, the example distributed data engine 150 includes a big data storage area 155 for caching, storing, and/or historizing big data, one or more big data appliance receivers 160, and one or more big data appliance request servicers 165. Each of the big data appliance receivers 160 is configured to receive and/or observe data from one or more data sources 168. In an example, a big data appliance receiver 160 receives and/or observes, via a network interface to a traditional, process control communications network such as the data highway 10, a Fieldbus network, a WirelessHART network, etc., data that is traveling over the traditional, process control communications network. Additionally or alternatively, the big data appliance receiver 160 may receive data, via a local interface, from its corresponding data source(s)) 168, such as from a process control or other type of device into which the DDE 150 is embedded or manufactured, or to which the DDE 150 is locally, directly, and/or otherwise tightly coupled. Still additionally or alternatively, the big data appliance receiver 160 may receive big data packets, e.g., via a data analytics network interface 175. The received big data packets may have been streamed from another DDE 150 and/or may have been generated by a big data source with which the data engine 150 resides). Irrespective of the source(s) 168 of the received/observed data, the big data appliance receiver 160 processes the received/observed data packets and/or messages to retrieve the substantive data and timestamp carried therein, and stores the substantive data and timestamp in the big data storage area 155 of the data engine 150, e.g., as time-series data and optionally also as metadata. The term "metadata," as used herein, generally refers to data about data, such as statistical information about data, categorical information about data, summary information, descriptive information, definitions, etc. The big data storage area 155 may comprise multiple local and/or remote physical data drives or storage entities, such as RAID (Redundant Array of Independent Disks) storage, solid-state storage, cloud storage, high-density data storage, and/or any other suitable data storage technology that is suitable for data bank or data center storage, and that has the appearance of a single or unitary logical data storage area or entity to other nodes, and that may be configured to locally store and/or historize big data.

Each of the big data appliance request servicers 165 is configured to access time-series data and/or metadata that is stored in the big data appliance storage area 155, e.g., per the request of a requesting entity or application such as a local or remote data analytics application, a user interface application, or another application. For example, a big data appliance request servicer 165 may publish selected data stored in the big data appliance storage area 155 at a given time interval to subscribers to the selected data. In another example, a big data appliance request servicer 165 may retrieve data stored within the local big data appliance storage area 155 per the request of a remotely executing data analytics application. Additional examples of accessing data stored at a DDE 150 will be discussed in later sections. Such data may be stored in a variety of data formats, including relational or non-relational databases or other data structures. In some embodiments, a standardized query format may be used to access data in any of the these data sources.

In some embodiments, a distributed data engine 150 includes one or more big data analyzers 170 to perform respective data analytics and/or learning on at least parts of the big data stored in the memory 155. The execution of the local analytics and/or learning may be performed in response to a command or instruction generated by a user or by another node. Additionally or alternatively, the execution of the local analytics and/or learning may be performed in an automatic and/or autonomous manner without using any input from users or other nodes to initiate and/or perform the learning analysis. For example, the data analytics and/or learning may be performed in a manner such as previously discussed, in a manner such as discussed in aforementioned U.S. Application No. 62/060,408, entitled "DATA PIPELINE FOR PROCESS CONTROL SYSTEM ANALYTICS," or in some other suitable manner. In an embodiment, the big data analyzers 170 individually or collectively perform large scale data analysis on the stored data (e.g., data mining, data discovery, etc.) to discover, detect, or learn new information or knowledge. Data mining generally involves the process of examining large quantities of data to extract new or previously unknown interesting data or patterns such as unusual records or multiple groups of data records. The big data analyzers 170 may also perform large scale data analysis on the stored data (e.g., machine learning analysis, data modeling, pattern recognition, predictive analysis, correlation analysis, etc.) to predict, calculate, or identify implicit relationships or inferences within the stored data.

In an embodiment, multiple big data analyzers 170 (and/or multiple instances of at least one big data analyzer 170) may operate in parallel and/or cooperatively to analyze the data stored in the big data storage area 155 of the distributed data engine 150 and/or to analyze data stored in one or more other big data storage areas of other distributed data engines 102x. Further, the multiple big data analyzers 170 may share, exchange, or transfer computed parameters and model information between one another as a type of cooperative data analytics and learning. The multiple big data analyzers 170 may be co-resident on a same big data node, or may be resident on different big data nodes. An example of cooperative data analytics which may be utilized with any or all of the techniques described herein is found in aforementioned U.S. Application No. 62/060,408, entitled "DATA PIPELINE FOR PROCESS CONTROL SYSTEM ANALYTICS," although any suitable cooperative data analytics technique or techniques may be utilized with any or all aspects of the present disclosure. Results of the analyses performed by the big data analyzers 170 may be stored in the big data appliance storage area 155, and/or may be returned to a requesting entity or application.

In an embodiment, at least a portion of the big data receivers 160, the big data appliance request servicers 165, and/or the big data analyzers 170 is included or implemented on one or more integrated circuits, semiconductors, chips, or other suitable hardware. For example, a big data analyzer 170 that performs spectral analysis may be implemented by an integrated circuit chip included in a big data node, such as described in aforementioned U.S. application Ser. No. 14/507,252 entitled AUTOMATIC SIGNAL PROCESSING-BASED LEARNING IN A PROCESS PLANT." In an embodiment, at least a portion of the big data receivers 160, the big data appliance request servicers 165, and/or the big data analyzers 170 comprises computer-executable instructions stored on a memory and executable by a process running on the distributed data engine 150. For example, at least some portions of the big data appliance receivers 160, the big data appliance request servicers 165, and/or the big data appliance analyzers 170 comprise respective computer-executable instructions stored on one or more non-transitory, tangible memories or data storage devices, and are executable by one or more processors to perform one or more of the respective big data functions.

In some embodiments, at least some big data analyzers 170 are not included in a distributed data engine 150, but instead are co-resident with the distributed data engine 150 on a same host data source device or component and in communicative connection with the data engine 150. For example, the data engine 150, including the storage area 155, receivers 160 and servicers 165 may be implemented by a first set of computer-executable instructions, and the big data analyzers 170 may be implemented by a semiconductor chip or by a second set of computer-executable instructions, which may or may not be stored on the same non-transitory, tangible memories or data storage devices as the first set of computer-executable instructions. In some embodiments, the big data analyzers 170 are not included in a data engine 150 and are not co-resident with the data engine 150 on a same host data source device or component, but nonetheless are in communicative connection with the data engine 150. For example, the big data analyzers 170 may be located on another node of the data analytics network 112 which is not a DDE 150, e.g., a user interface node or an analytics server.

The distributed data engine 150 shown in FIG. 3 further includes one or more network interfaces 175 that are configured to allow the data engine 150 to transmit and receive payload big data over the data analytics network 112, as well as to communicate with other data engines and nodes of the data analytics network 112 (e.g., signaling and other types of communications). For example, the data engine 150 may subscribe to one type of data that is published by another node by using the network interface 175, and the type of data that is generated by the publishing node and to which the data engine 150 is subscribed may be received via the network interface 175.

As previously discussed, various types of real-time data, such as process-related data, plant-related data, and other types of data, may be generated, collected, observed, retrieved, received, stored, cached, processed, analyzed, and/or streamed by the distributed data engines 102*x*. Examples of process-related data include continuous, batch, measurement, and event data that are generated while a process is being controlled in the process plant 5 (and, in some cases, are indicative of an effect of a real-time execution of the process). Further, process-related data may include process definitions, arrangement or set-up data such as configuration data and/or batch recipe data, data corresponding to the configuration, execution and results of process diagnostics, etc.

Plant-related data, such as data related to the process plant 5 but that may not be generated by applications that directly configure, control, or diagnose a process in the process plant 5, may be generated, collected, observed, retrieved, received, stored, cached, processed, analyzed, and/or streamed by the distributed data engines 102*x* as big data. Examples of plant-related data include vibration data, steam trap data, data indicative of a value of a parameter corresponding to plant safety (e.g., corrosion data, gas detection data, etc.), data indicative of an event corresponding to plant safety, data corresponding to the health of machines, data corresponding to assets in the plant such as plant equipment and/or devices, data corresponding to the configuration, execution and results of equipment, machine, and/or device diagnostics, and data that is useful for diagnostics and prognostics.

Further, other types of data including data highway traffic and network management data related to the process control big data network backbone and of various communications networks of the process plant 5, user-related data such as data related to user traffic, login attempts, queries and instructions, text data (e.g., logs, operating procedures, manuals, etc.), spatial data (e.g., location-based data), and multi-media data (e.g., closed circuit TV, video clips, etc.) may be generated, collected, observed, retrieved, received, stored, cached, processed, analyzed, and/or streamed by the data engines 102*x* as big data.

In some embodiments, dynamic measurement and control data may be automatically generated, collected, observed, retrieved, received, stored, cached, processed, analyzed, and/or streamed by the distributed data engines 102*x* as big data. Examples of dynamic measurement and control data include data specifying changes in a process operation, data specifying changes in operating parameters such as setpoints, records of process and hardware alarms and events such as downloads or communication failures, etc. In addition, static data such as controller configurations, batch recipes, alarms and events may be automatically collected by default when a change is detected or when a controller or other entity is initially added to the data analytics communications network 112.

Moreover, in some scenarios, at least some static metadata that describes or identifies dynamic control and measurement data is captured in the distributed data engines 102*x* when a change in the metadata is detected. For example, if a change is made in the controller configuration that impacts the measurement and control data in modules or units that must be sent by the controller, then an update of the associated metadata is automatically captured by the data engines 102*x*. Additionally or alternatively, parameters associated with the special modules used for buffering data from external systems or sources (e.g., weather forecasts, public events, company decisions, etc.), surveillance data, and/or other types of monitoring data may be automatically captured by the data engines 102*x*.

In some situations, added parameters created by end users are automatically captured in the distributed data engines 102*x*. For example, an end user may create a special calculation in a module or may add a parameter to a unit that needs to be collected, or the end user may want to collect a standard controller diagnostic parameter that is not communicated by default. Parameters that the end user optionally configures may be communicated in the same manner as the default parameters.

User Interface Application for Industrial Performance Monitoring/Analytics

As previously mentioned, the data analytics system or DAS 100 may include one or more user interface applications via which data-related human-machine interactions are conducted. The presence of example instances of these user applications is depicted in FIG. 2A by references 120*a*-120*d*. The present section of this disclosure and FIGS. 4A-4Q describe in more detail the user interface application for industrial performance monitoring/analytics, which may be provided by or operate in conjunction with the process plant or system 5 of FIG. 1, the industrial performance monitoring/analytics system 100 of FIG. 2A, and/or the monitoring and analytics engine 150 of FIG. 3, for example. However, the user interface application for industrial performance monitoring/analytics described herein may be provided by or operate in conjunction with other industrial performance monitoring and analytics systems for process control systems. For ease of discussion, though, the industrial performance monitoring/analytics user interface application is discussed below with simultaneous reference to FIGS. 1, 2, and 3. Additionally, for ease of reading, the Industrial Performance Monitoring/Analytics User Interface Application is referred to herein using capitalization to distinguish from general-purpose and/or other user interface applications, and is also interchangeably referred to herein as the "Data Analytics User Application," the "Data Analytics User Interface Application," the "Data Analytics Application," the "DDE User Interface Application," or the "User Interface Application."

The DDE User Interface Application provides an interface for a user to interact with the distributed industrial process performance monitoring/analytics system or DAS 100 to define structure, query data, build, and evaluate draft data models. When the draft data models are finalized, the DDE User Interface Application allows the data models to be downloaded into a runtime engine and deployed to operate in conjunction with an on-line process control system. A deployed data model (also referred to as an executing or on-line data module) may be accessed and monitored via a runtime dashboard of the DDE User Interface Application. The DDE User Interface Application is also able to generate alarms and notifications that correspond to executing data models.

Specifically, the DDE User Interface Application enables a user to create, view, and modify data models, each of which defines one or more data analytics (e.g., descriptive, predictive, and/or prescriptive analytics) that are to be executed or performed on an input data set. Data models are drafted or created in an off-line mode (e.g., while the data model is disconnected from live data sources in an on-line or operating process control system), and in this mode a data model is referred to herein as an "off-line data module." Generally, an off-line data module is defined by an off-line data diagram that the user creates, via the DDE User Interface Application, by selecting a set of "blocks" or "data blocks" and interconnecting the blocks on the diagram in a desired manner with a set of "wires." Each data block includes an input via data is received into the block. Each data block also represents or defines a particular function, action, algorithm, and/or operation that are to be performed by the each data block on its input data, thereby generating output data that can be provided to other blocks via one or more outputs. Each data block is able to be separately evaluated, so that the off-line diagram representation of the block and its interconnecting wires is compiled into executable code and executed, and the results of the execution of each data block are presented on the off-line data diagram. As will be discussed in a later section, the compilation of a data block into code and its subsequent execution may be performed distributively across different target environments and locations.

Similarly, the off-line data diagram as a whole is also able to be evaluated. The evaluation of an off-line data diagram includes compiling the data blocks and wires, executing the compiled code to transfer input data and output data across the wires and perform functions, actions, algorithms, and/or operations as defined by the particular configuration of blocks and wires of the off-line data diagram. Also similar to individual data blocks, the compilation of the off-line data diagram and execution of the compiled off-line data diagram may be performed distributively across different target environments and locations.

Further, the DDE User Interface Application enables a user to transform an off-line data module into an "on-line data module," so that the on-line data module of the data model binds to or otherwise receives live (e.g., streaming) data being generated by live data sources of the on-line process control system, performs the one or more data analytics defined therein on the live data, and provides the output to a user interface, historian, or other applications. For example, the output data generated by a data model may include descriptive, predictive, and/or prescriptive information or data corresponding to the process plant and/or a process being controlled therein.

In particular, a user may transform an on-line data diagram of a particular data model into an on-line data diagram of the particular data model. Like an off-line data diagram, an on-line data diagram includes a set of data blocks interconnected by a set of wires, and as the off-line and online-line data diagrams generally correspond to the same data model, the functions, actions, algorithms, and/or operations defined by the on-line data diagram corresponds to that of the off-line data diagram. However, at least some of the blocks and interconnections differ between the off-line data diagram and the on-line data diagram, primarily (but not necessarily only) to accommodate connecting the on-line data module to the on-line process plant.

Also similar to off-line data diagrams, on-line data diagrams may be compiled as a whole into executable code corresponding to the on-line data module of the data model. The compilation of particular blocks of an on-line data diagram causes the definition of bindings of the particular blocks with respective data sources and data consumers within the on-line process plant. Deployment of an on-line data module instantiates these bindings and causes the executable to run or execute, thereby integrating the on-line data module with the on-line process plant so that the on-line data module executes in conjunction with the operations of the on-line process plant. The compilation of an on-line data diagram and the binding and execution of the resulting on-line data module may be performed distributively across different target environments and locations.

In a particular useful embodiment, the on-line data module of the data model receives and operates at least in part on continuous, real-time data that is generated by devices or components of the process plant as a result of on-going control of an on-line process executing in the plant. For example, the on-line data module operates on continuous, real-time time-series data generated by the on-line process plant and/or by a process control system included in the plant while the process plant and the process control system are operating to control the process. The data model continually operates on the continuous, real-time data stream, (e.g., by performing its one or more data analytics functions and other functions (if any) thereon as defined by the data model), and continuously generates a real-time stream of results or output data, which may be displayed at a user interface (e.g., as a rolling line graph or other depiction) and may continually reflect the current, real-time values of the output of the data model. In an example, the data output generated by the data model and displayed at the user interface includes at least one predictive value and its variation over time. Generally, though, data models are capable of operating on large quantities of data generated by a variety of data sources within the process control plant or environment 5 for the purposes of fault detection, prediction, and prescription for the process control plant or environment 5.

In an embodiment, the DDE User Interface Application is web-based and is accessed through a web browser, so that different instances of the Application can be used by various platforms (e.g., Apple Macintosh, Linux, Windows, etc.) and by various users at various computing devices, sometimes simultaneously. However, the DDE User Interface Application is not limited to a web-based implementation, and may utilize any other suitable implementation that is platform-independent and that can be extended to multiple users and/or instances simultaneously.

Further, although the DDE User Interface Application is described herein as applying to a single process control plant or environment 5 with multiple instances of the DDE User Interface Application executing simultaneously, this configuration is illustrative only and is not meant to be limiting. For example, in some configurations, a DDE User Interface Application may be applied to multiple process control plants or environments that operate independently in different locations and on different processes. For instance, a single DDE User Interface Application provided by a bank of servers or computers may be utilized by multiple oil refineries of a petroleum company so that some instances of the DDE User Interface Application execute at Refinery A and some instances execute at Refinery B.

At any rate, as previously discussed, the DDE User Interface Application abstracts the functions, actions, algorithms, and/or operations that may be performed by data blocks on respective input data as blocks or data blocks. Examples of blocks or data blocks are named by their respective function, e.g., load, clean, manipulate, analyze, visualize, etc. Each data block may load or obtain respective input data, perform its one or more respective functions, actions, algorithms, and/or operations on the obtained input data, and generate one or more respective results or respective output data. Multiple data blocks may be interconnected as desired (e.g., serially, in parallel, many-to-one, one-to-many, etc.) to form and an off-line data diagram that is representative or defines a draft data model or off-line data module, and this draft data model/off-line data module may be executed or evaluated by causing the off-line data module (or portion thereof) to be applied to or operate on a set of one or more data sets or off-line data sources. For example, during an execution or evaluation of an off-line data module, the off-line data diagram is compiled into executable code, specified data set or sets are obtained and loaded into or for the use of the off-line module, and the interconnected blocks of the compiled, off-line module each are executed to perform their respective operations on their respective inputs and provide respective results at their respective outputs, thereby resulting in one or more analytics outputs or results being generated by the overall off-line data module corresponding to the data model that is being developed or created. In an embodiment, during off-line evaluation, rather than loading data sets from a file into the draft data model, input data may be received from a streaming off-line data source such as a test tool, environment, or plant. Further, as will be explained in more detail below, an off-line data module or draft data model may be incrementally evaluated as it is being developed. In the DDE User Interface Application, the platform or infrastructure for evaluating off-line data blocks and off-line data modules is the Data Analytics Services, which is described in a later section.

After an off-line data module (or portion thereof) has been evaluated, the results of the evaluation are able to be reviewed and scrutinized by the user, and the draft model (or portion thereof) can be modified accordingly and reevaluated until a satisfactory result has been achieved. A user may finalize a draft data model/off-line data module, a transform it into an on-line data module, and execute or deploy the on-line data module to operate on real-time, on-line, or streamed, live data that is being generated due to the real-time operations of the process control environment or plant 5. For example, an executing or deployed on-line data module or data model may continuously operate on real-time data that is continuously being generated due to the on-line operations of the process plant, and the on-line data module or model may itself continuously generate real-time output data or results of its execution, which may be displayed and continuously updated on a user interface. The on-line execution or operation of the deployed, on-line data module and corresponding results may be monitored at a Dashboard of the DDE User Interface Application, which is also described in more detail in a later section.

As previously discussed, within the DDE User Interface Application, data blocks, data modules (whether on-line or off-line), and portions thereof may be visually and/or graphically represented to a user as diagrams or data diagrams on a workspace or canvas provided by the DDE User Interface Application. Generally, each data diagram includes a set of data blocks (e.g., which may be represented by two-dimensional shapes) that are interconnected by a set of wires (e.g., which may be represented by lines). The DDE User Interface Application typically includes two modes of operation (although, in some embodiments, greater or lesser numbers of modes may be included), both of which utilize data diagrams for representing data modules and the data blocks included in the data modules.

One of the modes of operation is referred to interchangeably herein as the "Data Analytics Studio," the "Data Studio," or the "Studio." Typically, the Data Studio is utilized by users to design and develop data analytics models. Additionally, the Data Studio allows a user to transform an off-line module into an on-line module, as well as deploy a finalized off-line module as a corresponding on-line data module. The Data Studio provides a work area or drawing canvas upon which a user is able to develop a data model by creating and connecting blocks into a data diagram, which is a visual, graphical representation of a data model or portions thereof. While a data model is being developed within the Data Studio, it may be referred to as a draft data model or off-line data module, and may be thought of as a draft or prototype. An off-line data module diagram may include a greater number of data blocks and/or connections than its resulting on-line data module, as some of the blocks and connections included in the off-line module may be used to analyze and view data at different portions of the module, e.g., for the purposes of analyzing and checking whether or not particular portions of the data model are evaluating as desired and/or providing sufficiently useful and/or predictive data. Generally, an off-line diagram of a data module is a representation of a workflow that (1) explores and cleans raw data sets, and (2) may be built, tuned, and evaluated for desired analytic operations such as classification, regression, clustering, dimensionality reductions, and more. Data modules that are off-line may be incrementally or continually evaluated as they are being developed. The results of the evaluation process of an off-line data module or data model are communicated to the user via the Data Studio.

In some cases, an execution or evaluation of an off-line data module may take a lengthy period of time to complete. In these situations, the status and progression of the off-line data module's evaluation process may be communicated to the user via another mode of operation of the DDE User Interface Application that is referred to interchangeably herein as the "Data Analytics Dashboard," the "Analytics Dashboard," or simply the "Dashboard." The Dashboard typically is utilized by users to view and/or manage modules that are (i) off-line data modules (e.g., draft data models) which are being evaluated, and/or (ii) on-line data modules (e.g., finalized data models that have been deployed as data modules). The Dashboard also represents draft data models under evaluation and deployed on-line data modules using respective diagrams or visual, graphical representations. A deployed data module is referred to as being "on-line," as the deployed module is executing on real-time data that is being generated due to online or runtime operations of the process control system or plant 5. Generally, an on-line diagram of a data module is a representation of a workflow that is bound to one or more data sources within the process control system or plant 5 (e.g., streaming data sources) to make real-time descriptions, predictions, and/or prescriptions, and/or to continuously tune data models during or at runtime. Data modules that are deployed or on-line may continually execute until they are explicitly terminated from the Dashboard.

A. Data Module Diagrams

An example diagram of a data module (whether off-line or on-line) generally includes multiple data blocks and wires that interconnect various blocks together to form one or more data flow pipelines. As previously mentioned, a data block generally is an abstraction of a function or operation that a user would like to be applied to a data set. For example, a particular block may load a data set from the data store or file on disk, another particular block may replace all missing values (e.g., those values which have no value measured at a time corresponding to a time at which another parameter/variable does have a measured value) in the data set, yet another particular data block may perform a random forest analysis, etc. Typically, different data blocks correspond to different functions or operations that may be performed on data sets, and as such various data blocks each may have a corresponding type or name, e.g., "Load," "Query," "Fill," "Columns," "PCA (Principal Component Analysis)," "PLS (Partial Least Squares)," "Explore," "Write," etc.

Each block may have zero or more respective properties. The set of properties of a block (which for some blocks may be a null set) respectively correspond to its block type, so that all instances of a same block type have the same set of properties. For some blocks, default values of properties may be provided by the DDE User Interface Application, and for some blocks, users may be allowed to enter and/or modify one or more of the property values. A data block definition defines the respective properties and any default property values (and for some blocks, other information as well) of a data block type. Data block definitions are stored in a data block definition library that is provided by the DDE User Interface Application. Generally, the data block definition library is available to all open instances of the DDE User Interface Application, so that multiple data analytics users or engineers may simultaneously develop and/or explore data using the resources provided by the library.

Each block has zero, one, or more input connectors that specify the data (if any) that flows into the block from one or more other blocks or data sources. Additionally, each block has zero, one, or more output connectors of that specify the data (if any) that flows out of the block (and potentially into one or more recipient blocks via their respective input connectors). The interconnections between inputs and outputs of various blocks are represented on data module diagrams by wires. Any type of data may flow or be transferred along any wire, from simple scaler values to data frames that each contain millions of values to object code.

Additionally, each block has a state. For example, when a block is first created, the block is in a "configuration" or "configuring" or "unconfigured" state. After the block has been configured, the block moves into a "configured" state. While an off-line block is being evaluated, it is in an "evaluation" state. After the off-line block has been evaluated, the block moves into either an evaluation "success" state or an evaluation "failed" state. If an on-line block is undergoing configuration or binding to data sources and/or data consumers, its state is "configuring" or "binding." After an on-line block has been deployed into the process control system and is operating on live data, its state is "deployed" or "executing." Of course, other states are also possible. Typically, each block includes a visual indicator that indicates its current state. Additionally, each data module as a whole may have an indicator that indicates its current state.

Figure 4A:
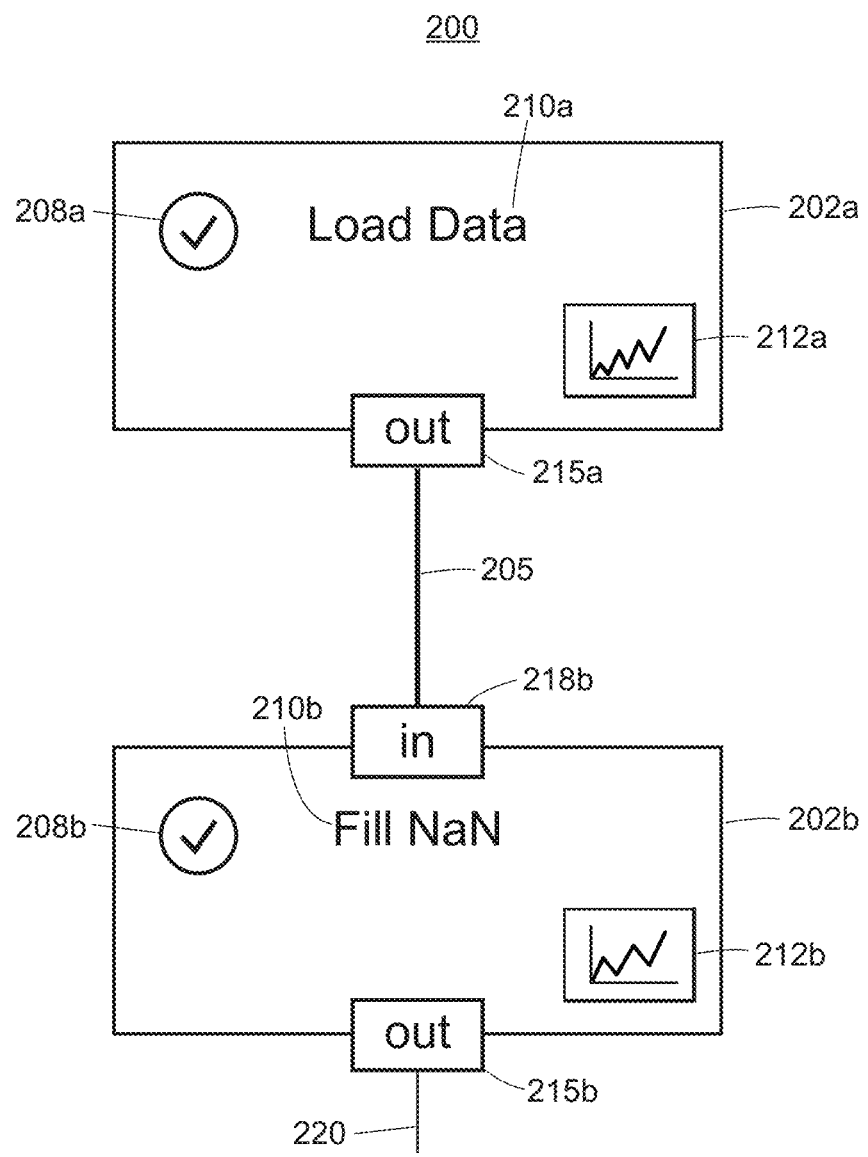
FIG. 4A depicts an example data diagram illustrating various data block features and interconnections.

An example data diagram 200 illustrating various possible data block features and interconnections is shown in FIG. 4A. This example data diagram 200 includes a LoadData block 202a connected to a FillNaN block 202b via a wire 205. The representation of the LoadData block 202a includes an indication of its current block state 208a, an indication of its block type or name 210a, an indication of the results of the block's evaluation 212a, and an output connector 215a via which at least some of the data that is generated as a result of the LoadData block's evaluation is delivered via the wire 205 to a recipient (in this scenario, to the FillNaN block 202b).

The FillNaN block 202b includes an input connector 218b which receives the data flowing over the wire 205 from the LoadData block 202a. Similar to the LoadData block 202a, the FillNaN block 202b includes an indication of its current block state 208b, an indication of its block type or name 210b, an indication of the results of its evaluation 212b, and an output connector 215b via which at least some of the data that is generated as a result of the FillNaN block's evaluation is delivered via a wire 220 to a recipient or consumer (not shown).

Note that in FIG. 4A, the LoadData block 202a does not have an input connector as the LoadData block 202a does not receive data that is output from any other data block of the data diagram 200. Instead, the LoadData block 202a may be configured to load or obtain one or more input data sets from one or more data sources. The data sources may include off-line data sources, such as a data file, a data source (e.g., a Seeq system), a relational or non-relational database, and/or the data sources may include on-line or streaming data sources, such as data streams generated by the distributed data engines 202x.

B. Data Analytics Studio

Figure 4B:
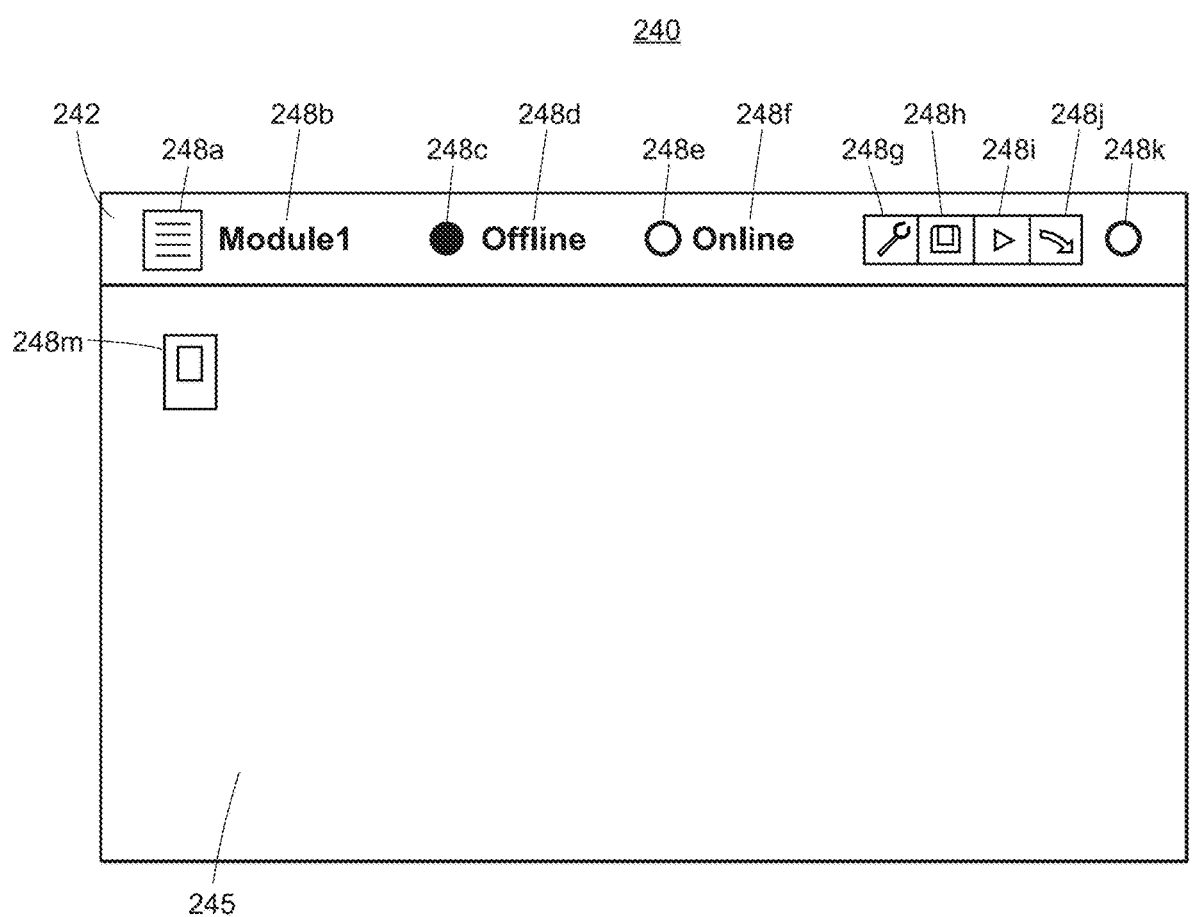
FIG. 4B depicts an example Data Analytics Studio user interface.

As previously mentioned, one of the modes of operation of the DDE User Interface Application is the Data Analytics Studio. The Data Analytics Studio may be utilized by users to design, develop, view, and explore data models. FIG. 4B depicts an example user interface presented by the Data Analytics Studio 240, which includes a navigation bar 242 and a workspace or drawing canvas 245. The navigation bar 242 provides controls and indicators via which a user is able to manage off-line and on-line data modules, e.g., by allowing a user to perform actions such as create a new off-line data module, identify an off-line or on-line data module that is currently open and shown in the canvas 245, readily view the status (e.g., off-line or on-line) of a data module that is currently open and shown in the canvas 245, save/store an off-line data module that is currently open and shown in the canvas 245, transform an off-line module into an on-line data module, toggle between viewing the off-line and the on-line data diagram of a data module, evaluate an off-line data module, deploy an on-line data module, browse to other data modules, and other such module management functions. As such, the Data Analytics Studio 240 includes numerous user controls and indicators 248a-248n thereon, such as, but not limited to:

- a module navigation control 248a to enable a user to find and browse to other data modules;
- an identifier 248b of the data module that is currently open on the canvas 245;
- one or more indicators 248c, 248d that are indicative of whether the view of the data module that is currently open on the canvas 245 is an off-line or an on-line view;
- one or more controls 248e, 248f via which a user may toggle between an on-line and an off-line view of the data module that is currently open on the canvas 245;
- a user control 248g via which a user may view and/or define properties of the data module that is currently open on the canvas 245;
- a user control 248h via which a user may save the currently open data module;
- a user control 248i via which a user may evaluate at least a portion of the currently open data module;
- a user control 248j via which a user may deploy the currently open data module;
- an indicator 248k that is indicative of an operational status of the currently open module; and/or
- one or more other user controls and/or indicators (not shown).

FIG. 4B also illustrates a user control 248m via which a user may view, select block definitions from, and/or add to a data block definition library (which is not shown in FIG. 4B). In the embodiment shown in FIG. 4B, the library user control 248m is shown as being located on the canvas 245, however, in other embodiments said control 248m may be positioned on the navigation bar 242 or at any desired location.

Indeed, the numbers, types, locations/positioning, form factors, arrangements, etc. of the user controls and indicators shown in the example Data Analytics Studio 240 are only one of many possible embodiments. More or less numbers and/or types of user controls and/or indicators may be included. Different locations/positioning of such user controls and/or indicators may be utilized, as well as different form factors, arrangements, etc. In some embodiments, the navigation bar 242 may be omitted, and another mechanism for users to access controls may be provided (e.g., pop-up window, drop down menu, etc.).

1. Data Analytics Studio—Off-Line Data Modules

In the Data Analytics Studio 240, the drawing canvas or workspace 245 is the area via which off-line data modules may be developed, defined, and evaluated. For example, on the drawing canvas or workspace 245, a user is able to access the block definition library of the DDE User Interface Application (e.g., via the user control 248m), select various data block definitions stored therein, and interconnect (e.g., wire together) the selected block definitions to form a data diagram of a data model. Additionally, on the drawing canvas workspace 245, a user is able to edit the properties of a particular data block instance; evaluate a portion of a draft data model, including viewing the progress of the evaluation as well as its results; and/or perform other actions related to an off-line data module.

As previously discussed, each data block that may be utilized in a data diagram is based on a block definition of a type of data block. That is, a particular instance of a block of a given type has a set of properties in accordance with the block definition of the given type, but the particular instance may differ from other instances of blocks of the same given type, e.g., in a manner similar to object classes and instances of object classes. Also as previously discussed, block definitions are stored in the block definition library that is accessed (e.g., toggled to be in view or hidden) via a user control 248m, which may be situated on the canvas 245.

Figure 4C:
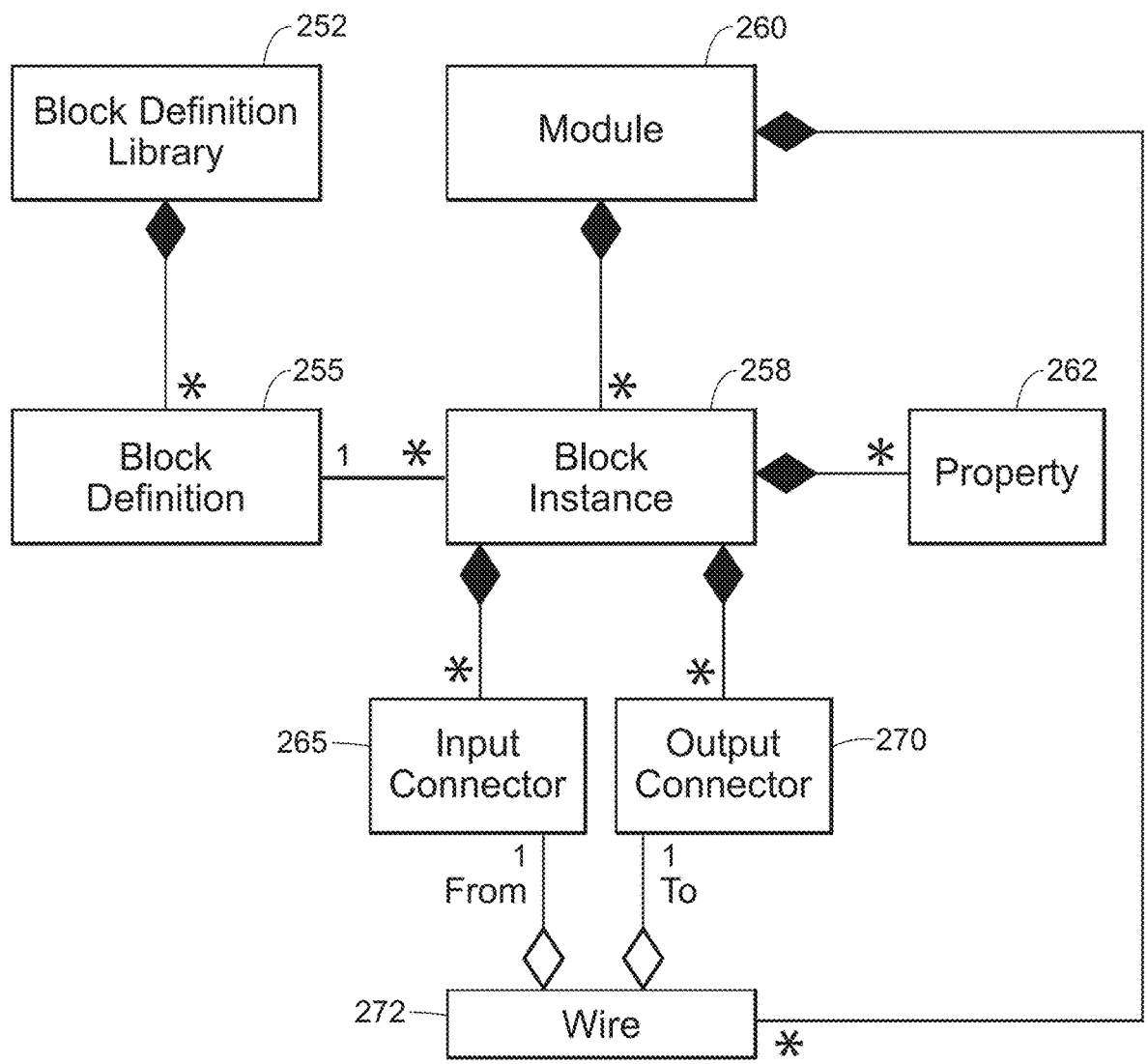
FIG. 4C depicts an example relationship between a data block definition library, data block definitions, data modules, data blocks, data block instances, and wires.

An illustration of an example relationship 250 between the data block definition library, data block definitions, data modules, data blocks, data block instances, and wires is shown in FIG. 4C. As shown in FIG. 4C, block definitions are made available through a block definition library 252 provided by the DDE User Interface Application. In some embodiments, different access permissions (e.g., read-only, read-write, etc.) to particular block definitions and/or to other data analytics library resources (and/or to portions thereof) may be granted to different users and/or groups of users.

A block definition 255 stored in the library 252 may be utilized to create an instance 258 of the block 255 that is used within a data module 260. One or more properties 262 of the block definition 255 may be particularly defined for the block instance 258. The block instance 258 may be configured or designed to include one or more input connectors 265 via which data is received into the block instance 258, and the block instance 258 may be configured or designed to include one or more output connectors 270 via which output data (e.g., data resulting from the evaluation of the block instance 258 operating on the input data received via the input connector 265) is provided, e.g., to another block instance 258, to be written or stored, to a user interface, etc. Each input connector 265 of a block instance 258 may receive data over one or more wires 272 of the data module 260, and each output connector 270 of a block instance 258 may provide data over one or more wires 272 of the data module 260. Each wire 272 of the data module 260 provides an interconnection between a particular output connector 270 of a particular block instance 258 and a particular input connector 265 of another particular block instance 258, thereby enabling data to be transferred between the two data block instances.

In an embodiment, block definitions are organized within the library 252 by categories of functions or actions. Categories may include sub-categories, sub-categories may include sub-sub-categories, and so on. In an illustrative but non-limiting example, a block definition library 252 includes at least five categories of block definitions: Data Sources, Filters, Transformers, Visualizations, and Data Consumers.

Block definitions that are included in the Data Sources category typically define various actions related to data sources that provide the input data on which a data module operates. For example, block definitions in the Data Sources category may include "CreateDataSet" to generate an input dataset, "LoadDataSet" to load or obtain an existing dataset from an off-line or on-line data source, "LoadDB" to load or obtain data from a database (such as a process control database or an analytics database), "SaveDataSet" to historize an input dataset into longer-term data storage (e.g., after its creation, such as for test input data sets), etc. Further, some of the Data Sources categories may include one or more sub-categories. For example, the CreateDataSet and LoadDataSet categories may each include respective sub-categories for particular dataset formats and or environments in which the datasets were generated, e.g., CSV (Comma Separated Values), Raspberry Pi, Seeq, etc. Generally, off-line Data Sources blocks are configured to obtain or access static data sources, such as data files, process control databases, analytics databases, etc. On the other hand, on-line Data Sources blocks are typically configured with a binding definition that relates the particular instance of the on-line Data Source block with one or more on-line data sources within the process plant. Compilation of the configured, on-line Data Source instantiates the binding so that the on-line Data Source block receives streamed data generated by the one or more on-line data sources to which it is bound.

The Data Sources category may include block definitions that relate to searching for or obtaining selected data from one or more data sources, e.g., "QueryDataSource" or "Query." Query blocks may operate on off-line data sources and/or on-line data sources. Generally, the Query block definition allows a data module to query for, obtain, or request specific types or identities of data (e.g., as indicated by columns, tags, or other suitable identifiers) and/or query for, obtain, or request data generated only during particular time intervals, which may be disjoint time intervals. Still further, the Query block is able to query for any type of data irrespective of the format and/or environment in which data is captured or stored. Additional details of the query block are provided in a later section of this application.

Block definitions that are included in the Filters category typically define various filtering techniques that can be performed on a dataset. For example, block definitions in the Filters category may include "Clip," "HighPass," "Low-Pass," "SGF" (e.g., for Savitsky-Golay filtering), "Exponential," "Averaging," "Wavelet," etc.

Block definitions that are included in the "Transformers" category of the data block definition library 252 typically define various techniques that manipulate, analyze, and/or otherwise transform the contents of a dataset or of a filtered dataset. For example, the Transformers category may include sub-category data block definitions corresponding to cleaning input datasets, e.g., "FillNaN" (e.g., to fill in entries of the dataset that are not a number)," "RmvOutlier" (e.g., to remove outlier data), "CorrectBad" (e.g., to correct bad data that is detected within the input dataset), "ExcludeBad" (e.g., to exclude bad data that is detected), etc. Additionally, the Transformers category may include sub-category data block definitions corresponding to manipulating the contents of input datasets, such as "Scale," "Shift," "Split," "Merge," "CenterNormal," "DownSample," "TimeOffset," "Columns," etc. Further, in some embodiments, the Transformers category may include sub-category block definitions corresponding to aligning data within the input datasets, e.g., "TimeDelay," "LagCorrect," etc.

The Transformers category may include sub-category data block definitions that correspond to analyzing input datasets to acquire knowledge and learning about their contents, such as "Sensitivity," "Clusters," "RandomForest," "CBP" (e.g., conditional Bayesian probability analyses), "KMeans," "FourierTransform," "FastFourierTransform," "PLS," "PCA," etc. Some sub-categories of the Transformers category may include one or more sub-sub-categories. For instance, the "PCA" sub-category of the Transformers category may include sub-sub-category data block definitions corresponding to various Principal Components Analyses techniques, such as "PCA_NIPALS" (PCA and nonlinear iterative partial least squares), "PCA_SVD" (PCA and Singular Value Decomposition), "PCA_Test," etc.

Block definitions of the Visualizations category typically define various techniques for presenting output generated by a data module. For example, the Visualizations category may include sub-categories corresponding to graphical and/or otherwise visual representations such as "LineGraph," "Chart," "BarGraph," "ScatterChart," "Histogram," "DataGrid," "DataCloud," "Animation," etc. The Visualizations category may include sub-categories corresponding to preparing output data for particular graphical representations, such as "RoundSigFig."

Block definitions of the Data Consumers category typically define actions related to various consumers or recipients of the output data generated by a data module. For example, the Data Consumers category may include the sub-category "Write," which causes the output data to be written or saved to a file, database, or other static storage area. The sub-category "Write" in turn may have respective sub-categories corresponding to the various types of locations, databases, database formats, file formats, etc. indicative of where or how the output data may be written or saved. The Data Consumers category may include a sub-category "Publish," which causes the output data to be streamed (e.g., via the analytics data network 112) or otherwise posted or delivered to a subscriber or recipient of the data (e.g., to a distributed data engine 102$x$, to an on-line data module, to an application being executed by the process control system, to a user interface, etc.). In some embodiments, to transform an off-line Publish block into its on-line version, the Publish data block is configured and bound to a live data consumer (e.g., to an on-line data module, an executing application, a process control device, element or component, etc. that has a subscription to the output of the data model). In an embodiment, the Data Consumers category may include a sub-category "Convert2Control" which causes the output data to be converted into a signal of a format that the traditional process control communication networks understand, and causes the signal to be delivered, via the traditional process control communication networks, to a process control entity, element, device, or component to effect or cause a change in the process plant 5. The sub-category "Convert2Control" may include sub-sub-categories corresponding to, for example, various traditional process protocol formats (e.g., HART, PROFIBUS, WirelessHART, etc.) and/or various targets within the process plant 5 that are potential recipients of the change signal (e.g., control loop inputs, control loop configurations, message priorities, parameter values, etc.). For example, a Convert2Control block may be configured to bind to a particular process control entity, element, device, or component within the process plant 5 that is to receive the output of the Convert2Control block and modify its operations accordingly.

The data block definition library 252 may include other data block definitions therein, each of which may or may not belong to a category. For example, the "Explore" block allows a user to explore, in an off-line mode, output data generated by or more other data blocks. For instance, an Explore data block may receive multiple different data wires at its input connectors, and may generate a visual representation that includes both sets of input data in a comparative manner, e.g., by aligning the two input datasets over time and overlaying one line graph on top of another line graph, by creating histograms with each respective dataset's information displayed next to the other dataset's information, etc. The Explore block allows a user to manipulate the visualization of its output, e.g., by increasing/decreasing the scale of an x-axis and/or a y-axis, sorting and/or filtering statistical data displayed in a chart, etc. Note that the Explore block is an example of a block that may not have an on-line counterpart, as its function is primarily to allow a user to explore and understand output data generated by a draft data model.

Figure 4D:
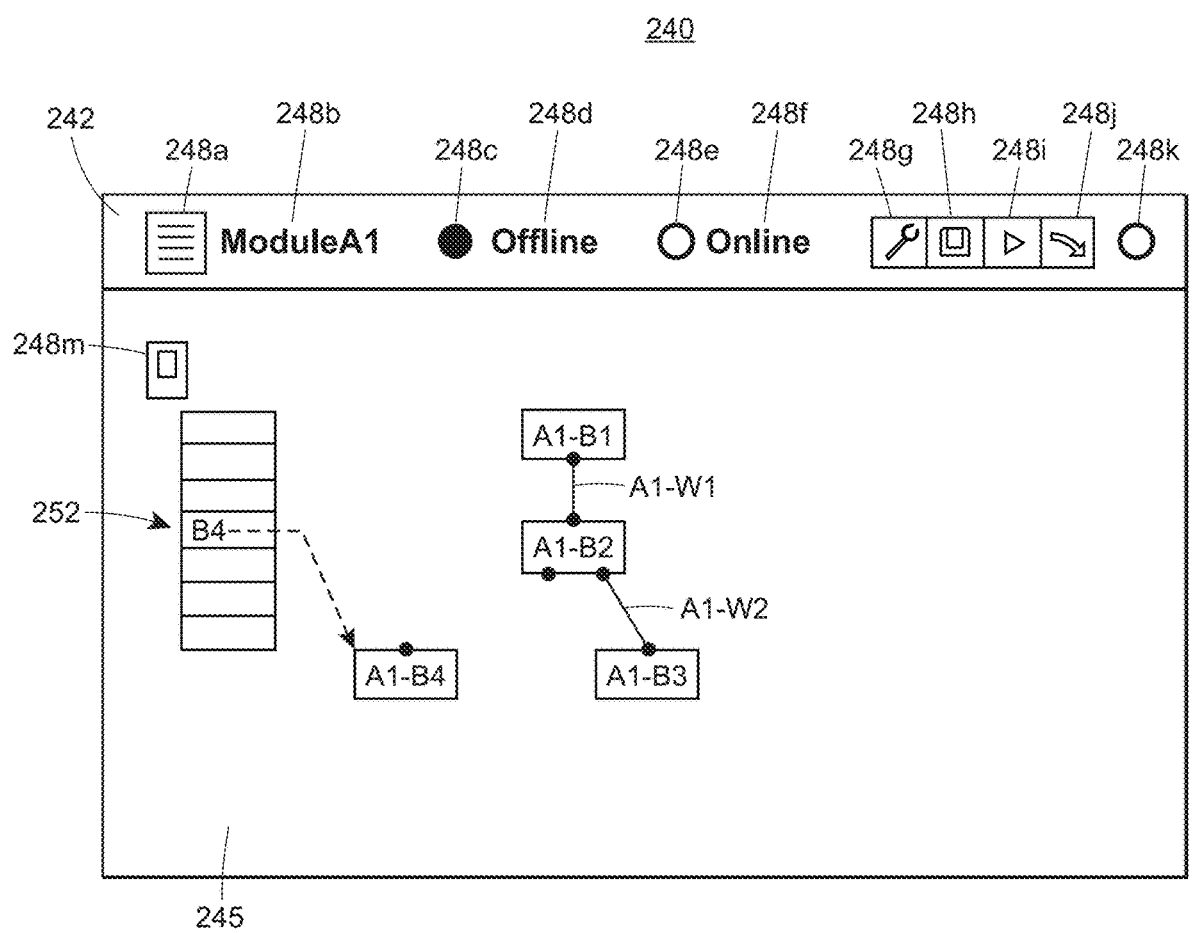
FIG. 4D depicts an example of drafting or creation of a data module.

For a user to develop a new data model, the user may invoke the data block definition library 252 (e.g., by toggling on via the user control 248$m$). The user may add a desired data block to the canvas 245 (and thereby add the data block to the data module under development that is depicted on the canvas 245) by dragging and dropping the definition of the desired data block from the library 252 onto a desired location of the canvas 245. (Of course, dragging and dropping is only one way of indicating selection, positioning, and incorporating the particular data block into the data module, and numerous other suitable ways to do so are possible.) After the drag and drop operation, the selected block definition is associated with the draft data module, and a respective instance of that data block for the draft data model is created and named. In an example scenario illustrated in FIG. 4D, draft Module A1 is in the process of being developed and its corresponding draft, off-line data diagram is shown on the Data Studio canvas 245. As shown by the indicator 248c, Module A1 has an "off-line" status. The user has already added blocks A1-B1, A1-B2, and A1-B3 to draft Module A1, and has connected them using wires A1-W1 and A1-W2. The user has invoked the library 252 via the control 248m, selected block B4 from the library, and dragged and dropped block B4 onto the canvas 245 (as indicated by the dashed line), and is in the process of naming the instance of block B4 as "A1-B4." After the instance of block B4 has been named, the user may interconnect A1-B4 to one or more other data blocks of draft Module A1 with wires. For example, the user may hover the cursor over an input connector of A1-B4 and click to create a new wire connection to the selected input connector. The user may then click on the desired output connector of another block instance on the canvas 245 to create the new wire interconnecting the selected input connector to the desired output connector, thereby interconnecting the two block instances. In another example, the user may hover the cursor over the output connector of another block instance, click to create a new wire connection to the selected output connector, and click on the desired input connector of A1-B4 to create the interconnecting wire. Of course, any suitable user control mechanism may be utilized to create wire interconnections between block instances.

Figure 4E:
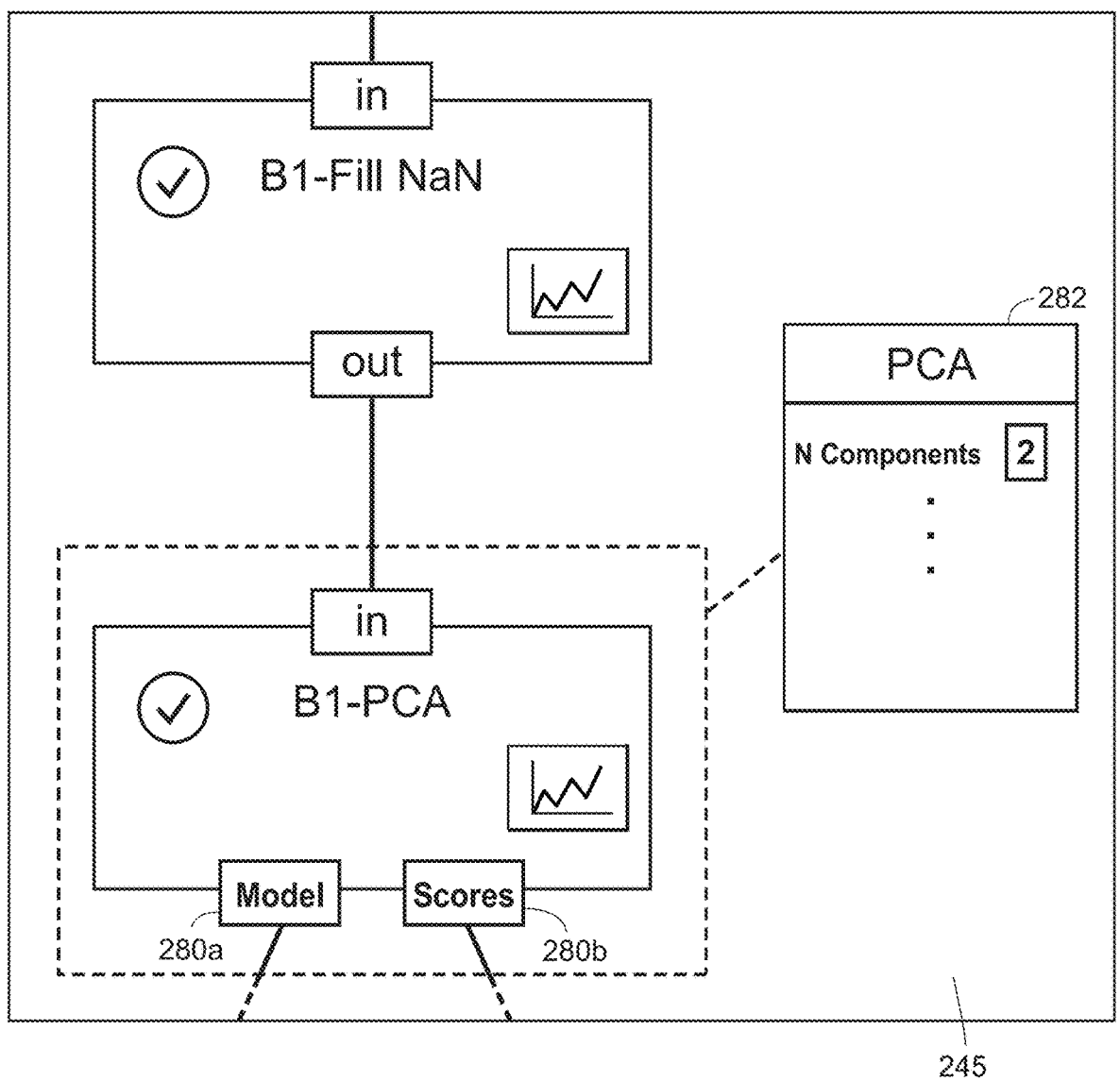
FIG. 4E depicts a zoomed-in area of a Data Studio canvas on which a data module is being created.

On the Data Studio canvas 245, a user is able to modify values of the given properties of a block for a particular block instance. To illustrate, FIG. 4E depicts a portion of the Data Studio canvas 245 on which a draft data module B1 is being developed. Two block instances included in draft Module B1 have been positioned on the canvas 245 and interconnected, i.e., B1-FillNaN and B1-PCA. B1-FillNaN receives its input data set from a data source that is not shown in FIG. 4E, and B1-PCA provides two outputs "Model" 280a and "Scores" 280b to respective consumer or recipient blocks (also not shown). The user has indicated that he or she desires to modify the values of the block definition properties corresponding to the B1-PCA block instance (e.g., by hovering over the B1-PCA block instance, by double-clicking on the B1-PCA block, or by using any other suitable user control mechanism). In response to the activated user control, a window 282 including a listing of the defined properties corresponding to the PCA block definition has appeared (e.g., as a floating dialog box, pop-up window, or some other suitable representation). A user may then modify the values of the various block properties of B1-PCA as desired via the window 282.

Figure 4F:
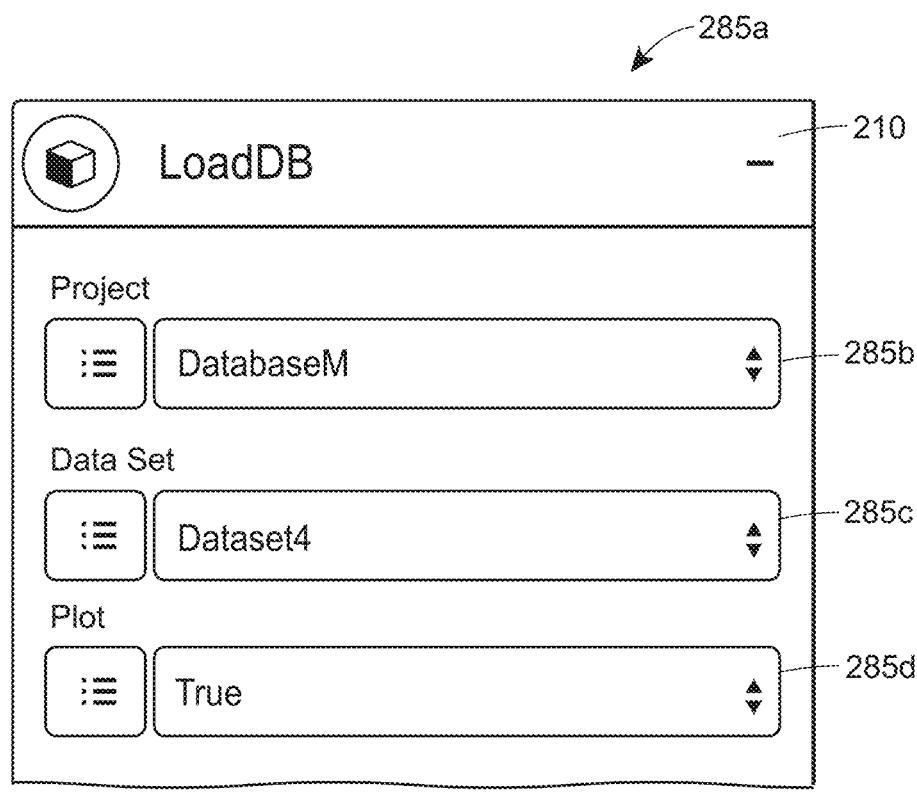
FIGS. 4F-4H depict example data block definition templates for different types of data blocks.
Figure 4G:
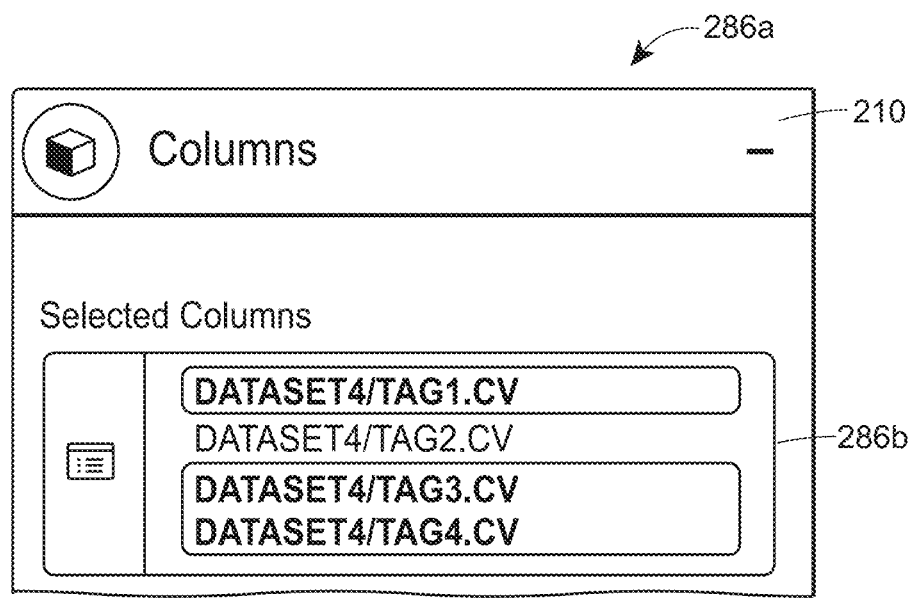
Figure 4H:
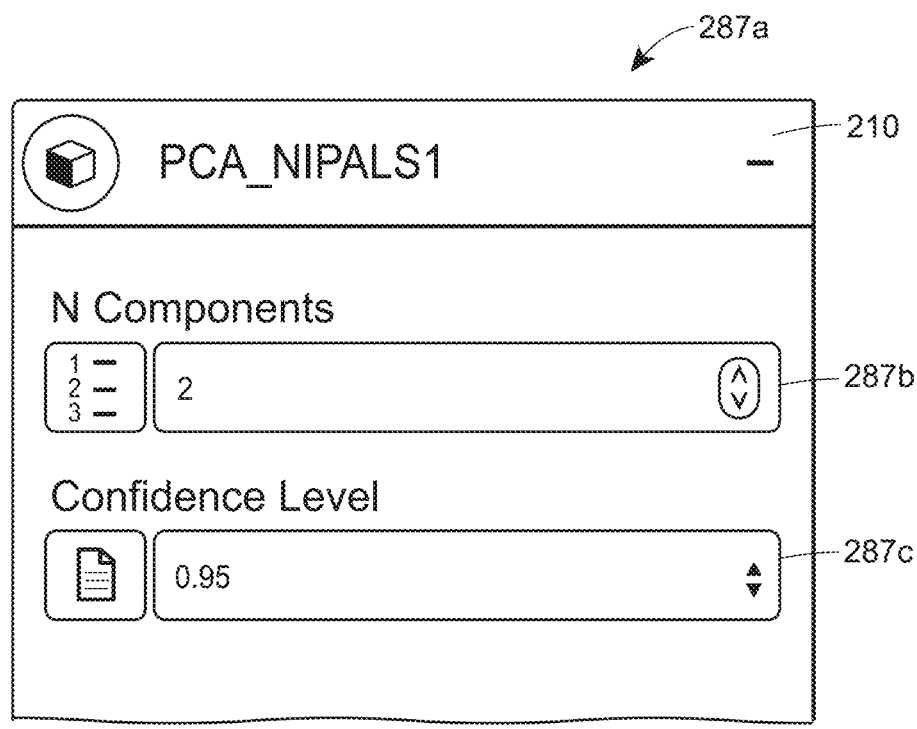

As previously discussed, the properties of each data block (if any) are defined by its respective block definition which is stored in the block definition library 252. Illustrative (but non-limiting) examples of block definitions and their respective properties are shown in FIGS. 4F-4H. It is understood that the block definition library 252 may include one or more of the example block definitions shown in FIGS. 4F-4H, none of these example block definitions, and/or other block definitions. Further, the number, types, and default values of the properties for each example block definition shown in FIGS. 4F-4H may also vary from the examples described herein.

In FIG. 4F, a data block definition template of a "LoadDB" data block 285a is presented by the DDE User Interface Application, e.g., as a result of a user dragging the LoadDB block definition from the library 252 onto the canvas 245 and subsequently indicating that he or she desires to view and/or modify the block property values of the LoadDB data block 285a to create a particular instance of the block 285a. The action or function that the LoadDB block 285a performs within an off-line diagram of a data model includes loading (or otherwise obtaining the contents of) a particular dataset on which the data model is to operate. For example, the particular input dataset may be loaded or obtained from a database or file. The user is able to indicate the particular input dataset that is to be loaded into the data model by entering the desired names, indicators, or values into the DatabaseName property field 285b and DataSet property field 285c, e.g., via drop-down menus, search and select (e.g., of a process control database or other database associated with the process control system), free-form text entry, etc. For example, a user may select a desired DatabaseName 285b from a drop-down menu, and the selection of the desired database 285b leads to providing a corresponding drop-down menu for the DataSet field 285c that includes only the datasets 285c of the selected/identified database 285b. The LoadDB block 285a also includes a Plot property field 285d, which in this implementation is a Boolean flag whose value indicates whether or not a plot of the dataset 285c from the database 285b is to be generated/presented when the LoadDB block instance is evaluated. If Plot 285d is set to "yes," then after block evaluation, a plot of the loaded dataset 285c would be displayed on the graphical representation of the LoadDB block instance shown on the canvas 245, e.g., in the View Block Results area 212 of the LoadDB block instance. For the LoadDB block 285a, the Plot property 285d is optional, and its value defaults to "no" (e.g., no plot of the loaded input data set is to be generated/presented when the block is evaluated). After the user has entered all desired values into the property fields 285b, 285c, and 285d of the LoadDB data block 285a, the user may save the modified property values, thereby configuring the LoadDB data block template 285a to create a particular instance of the LoadDB data block 285a that is to be used in the data model which the user is creating/developing. The user may name the particular instance, e.g., by entering a desired name (e.g., "LoadDB-1") into the block name field 210 of the block instance shown on the canvas 245.

FIG. 4G illustrates a data block definition template of a "Columns" data block 286a presented by the DDE User Interface Application. A particular instance of a Columns data block 286a extracts or obtains selected groups of data from a loaded/obtained dataset (referred to herein as a "column" of data, or data referenced by a "tag") as specified by its property values of the SelectedColumns property field 286b. For example, a Columns data block 286a receives a dataset (or some indication thereof, such as a pointer, indicator, or other reference to the dataset) via its input connector, e.g., from an instance of a LoadDB data block 285a. The SelectedColumns property field 286b of the Columns data block 286a allows a user to select one or more columns, tags, or other portions of the input dataset that the user desires to be operated on by other blocks of the data model. For example, as shown in FIG. 4G, the user is in the process of scrolling through a list of tags of DatasetA and highlighting desired tags. Typically (but not necessarily), the selected columns or tags are a subset of the total columns or tags included in the input dataset. A user may save the column or tag selections 286b (and other block properties, if present), thereby configuring the Columns data block 286a to create a particular instance, e.g., the particular instance that is to be used in the data model that the user is creating/developing. The user may name the particular instance of Columns 286a, e.g., by entering a desired name into its block name field 210.

FIG. 4H illustrates a data block definition template of a "PCA_NIPALS" data block 287a presented by the DDE User Interface Application. The PCA_NIPALS data block 287a performs a principal components analysis (PCA) and nonlinear iterative partial least squares operation on a set of data. For example, the PCA_NIPALS data block 287a may receive, via its input connector, the columns or tags of data (or indicators thereof or references thereto) determined by an instance of a Columns data block 286a. In another example, the PCA_NIPALS data block 287a may receive, via its input connector, an entire data set (or indicator thereof or reference thereto) that has been loaded for use by the data model by a LoadDB 285a data block. The template of the PCA_NIPALS block 287a allows a user to select the number of components 287b of the PCA and/or a confidence level 287c, if desired. Both of the property fields 287b, 287c are optional for the PCA_NIPALS block 287a, and may be set to default values (e.g., which are defined in the block definition of PCA_NIPALS) or null. In the example scenario shown in FIG. 4H, the user has indicated that the present instance of PCA_NIPALS is to be configured to generate two components 287b and at least a 95% confidence level 287c. The PCA_NIPALS data block 287a template may be configured (with or without modified property values) to create a particular instance that is to be used in the data model which the user is creating/developing, and the user may name the particular instance, e.g., by entering a desired name into its block name field 210.

Some types of data blocks are consumer or recipient data blocks that operate on output data generated by a previous block. These types of consumer data blocks may need the previous block to be evaluated in order for the consumer data blocks to be configured. For example, if an instance of a LoadDB block 485a is wired to provide data to an instance of a Columns block 486a, the evaluation of the LoadDB block instance 485a would provide the dataset from which a user may select particular columns or tags to configure the Columns block instance 486a.

Now turning to the evaluation of off-line data blocks and data modules, an off-line data module may be repeatedly evaluated as it is being developed, and need not be entirely completed to be evaluated. As such, the evaluation of an off-line data module may be performed asynchronously, so that a user is able to evaluate portions of the draft data module, modify the draft data module based on the evaluation, re-evaluate, modify again, re-evaluate again, etc. For example, a user may create an initial data block for the data module, evaluate the single data block, then connect a second data block to the first data block, evaluate only the second data block (or evaluate both the first and the second data block as a whole), add four more data blocks, evaluate only the newly added data blocks (or evaluate all six data blocks as a whole), etc. That is, when a desired number of data block instances and/or associated wires have been added to the working data diagram of an off-line or draft data module, the module (or portion thereof) represented on the canvas 245 may be evaluated, for example, by activating the evaluation user control 248i on the navigation bar 242. For example, if a user desires to evaluate the entirety of the blocks and wires presented on the canvas 245, the user may simply evaluate the user control 248i. On the other hand, if the user desires to evaluate only a subset of the blocks and wires presented on the canvas 245, the user may select the desired blocks and/or wires (e.g., by clicking, lassoing, or other suitable mechanism) and then activate the control 248i to cause the selected set of blocks and wires to be evaluated.

Figure 4I:
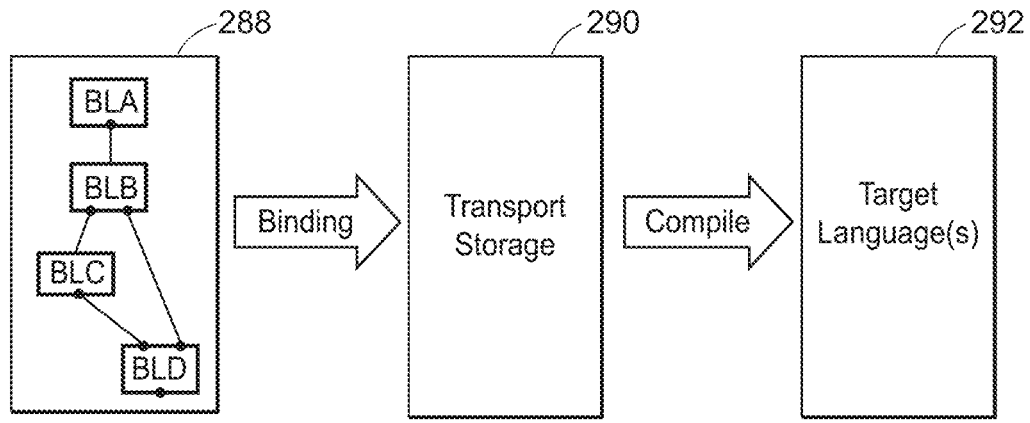
FIG. 4I depicts an example flow of evaluation, compilation, or deployment of a data diagram.

FIG. 4I illustrates an example of how an off-line data diagram 288 may be evaluated. As the off-line data diagram 288 is being created or developed, a representation of its blocks and interconnections shown on the Data Studio canvas 245 is stored into a transport file or document 290 (also referred to herein as a "configuration file"), which may of a light-weight data interchange format such as JSON (Java Script Object Notation) or any other desired format. As such, the graphical, off-line data diagram 288 is bound to the transport storage file or document 290. When the user indicates that he or she desires the off-line data diagram 288 or portion thereof to be evaluated (e.g., by activating the user control 248i), the transport file or document 290 is compiled into the language of a target execution environment, thereby generating executable code 292 for the data diagram 288. In an embodiment, the transport file or document 290 may be divided into multiple portions, each of which is compiled into a different target language that is executable in a different target environment (e.g., multiple chunks or segments of executable code 292 of different target languages may be generated from the transport storage file or document 290). After the executable code 292 of the off-line data diagram 288 has been generated, a process is created to manage and coordinate the execution of the code 292, which may or may not be across different target environments, and/or which may or may not be performed by different processors.

While various blocks of the off-line data diagram 285 are being executed or evaluated, the process may send feedback to the Data Studio. For example, based on the feedback from the process, the Data Studio updates the respective status indicators 208 of each data block of the off-line diagram 285 to indicate whether the block is compiling, is evaluating, has finished evaluation successfully, or has finished evaluation unsuccessfully (e.g., failed). Indeed, generally, throughout the compilation and execution process illustrated in FIG. 4I, feedback may be returned to the Data Studio and indicated on the user interface. For example, based on feedback from the process, the Data Studio updates the module status indicator 248k and/or the off-line status indicator 248c to indicate whether the module as a whole is undergoing compilation, undergoing evaluation, has completed evaluation successfully, or has completed evaluation unsuccessfully.

In the DDE User Interface Application, the infrastructure and actions used to evaluate off-line data blocks, diagrams, and modules is provided by the Data Analytics Services. For example, the activation of the evaluation user control 248i invokes Data Analytics Services to perform the evaluation of the off-line data block, diagram or module (or portion thereof) that is presently being developed on the canvas 245, e.g., which may utilize multiple different back-end platforms (e.g., multiple different target languages, compilers, processors, and/or target environments). Accordingly, the DDE User Interface Application shields users from having to be concerned with (or even have knowledge of) the back end platforms that are utilized to implement a data block, diagram, or module. That is, a user can utilize the Data Studio and Dashboard features (e.g., the data block definition library 252, the canvas 245, and associated user controls) to not only design or engineer data modules using data diagrams, but also evaluate, test, and deploy their designs in real-time and independently of back-end platforms, which are managed "under the covers" by the Data Analytics Services. Moreover, the DDE User Interface Application architecture advantageously allows additional back-end platforms and/or components to be added or deleted without impacting the user-facing data module design, evaluation, testing, and deployment functionalities.

A more detailed description of Data Analytics Services and its support for evaluation is provided in a later section.

Referring to FIG. 4A, as previously discussed, evaluation of a data module in the offline mode may be an iterative process. As a user adds and configures blocks for a draft data module, the user can evaluate the added blocks, and the status of each block is reflected by its respective status icon (e.g., the indicator 208 shown in FIG. 4A). In situations in which the evaluation of the block was unsuccessful or a failure, the user may obtain details about the failure (e.g., by selecting or clicking on a "failed" status indicator 208) so that the user is able to address any issues that led to the failure. In situations in which the evaluation of the block was successful, the user may view the results of the block evaluation, e.g., by selecting or clicking the block's respective view block results icon 212. In an embodiment, when a user selects "view block results" 212, a modal or visualization dialog may appear (e.g., as a pop-up window, floating dialog box, or other suitable format), and the user may view and explore various visualizations to see the data block results.

Indeed, when a data block executes or evaluates, the data block may store any type of result or results that may be useful to aid the user in determining the effect(s) of the data block operating on the data that was transferred to it (e.g., via a wire and input connector). The types of result(s) that are stored typically are specific to the block (and in some cases, to the particular instance of the block), and may be defined or determined by a block developer. These results may be shown to the user via the modal or visualization dialog window.

In addition to block- and/or block instance-specific results, the DDE User Interface Application may provide standard visualizations that may be applicable to more than one (and in some cases, a majority or even all) of the data blocks. For example, when a block is executed, a standard set of various statistics may be collected about the state of the data at the end of the block's execution, so that for each column, tag, or portion of the dataset, the mean, standard deviation and other such statistics may be computed and stored along with the resultant dataset. When the visualization dialog of a particular block instance is presented (e.g., via activation of the respective user control 212), the computed set of standard statistics for each column, tag, or portion is retrieved from the data store and presented to the user. The user may then select the columns/tags/portions of interest and request the Data Studio to generate respective charts or other visual formats that represent the statistics of said columns/tags/portions (e.g., line chart, scatter chart, histogram, data grid, data summary grid, computed statistics and histogram showing distribution of data, etc.). In an embodiment, the statistics and dataset are stored independently, as storing the statistics independently from the resultant dataset advantageously allows the DDE User Interface Application to only load the required amount of data into the browser.

Figure 4J:
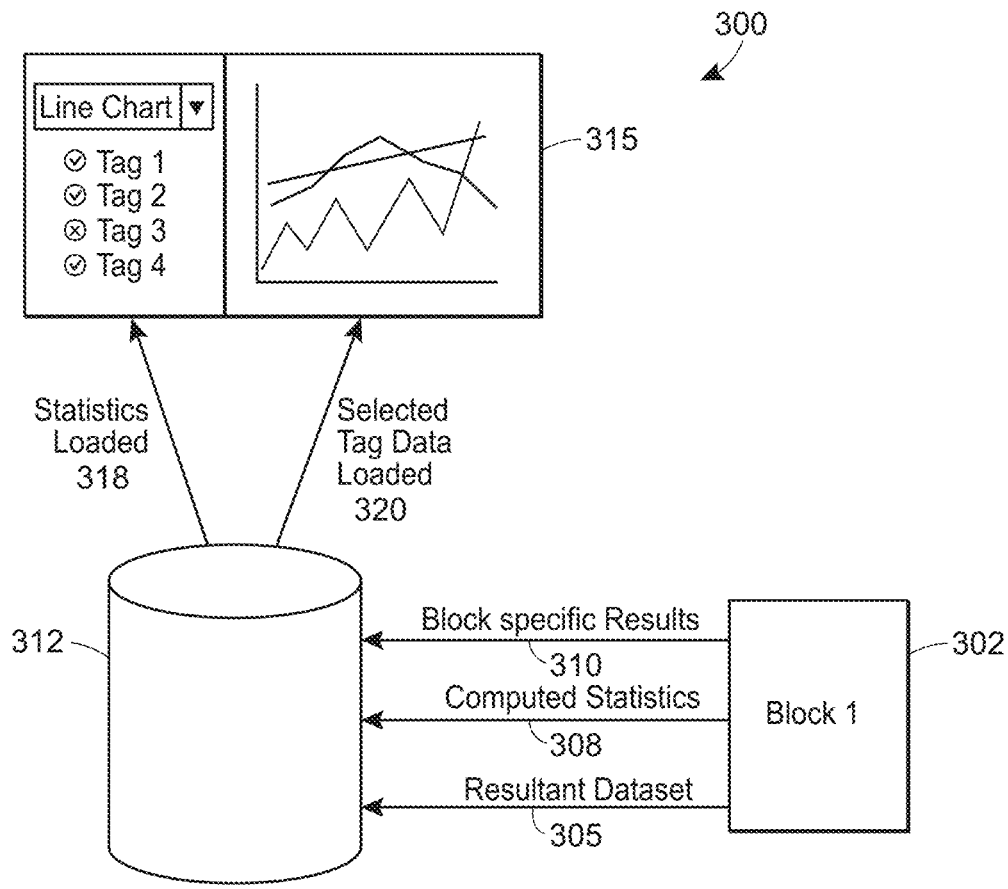
FIG. 4J depicts an example architecture that supports the presentation of standard and custom visualizations.

An example architecture 300 for presenting standard and custom visualizations is shown in FIG. 4J. In the example architecture 300, the data block code for "Block1" 302 executes, and the resulting dataset 305, computed standard statistics/other visualizations 308, and Block1-specific results 310 are generated and stored into a local or remote storage area 312 that is managed by the DDE User Application Interface. At a Data Studio instance 315 (e.g., a browser window), upon user selection of the "view block results" user control 212 displayed on the Block1 graphic, the computed statistics 308 (e.g., the standard set and/or any custom visualizations) for Block1 are loaded 318 to the Data Studio instance 315, and the user is able to select desired columns, tags, or portions of interest. Upon user selection of the desired columns/tags/portions of Block1, corresponding data is loaded 320 to the Data Studio instance 315 for the user to view and explore.

Figure 4K:
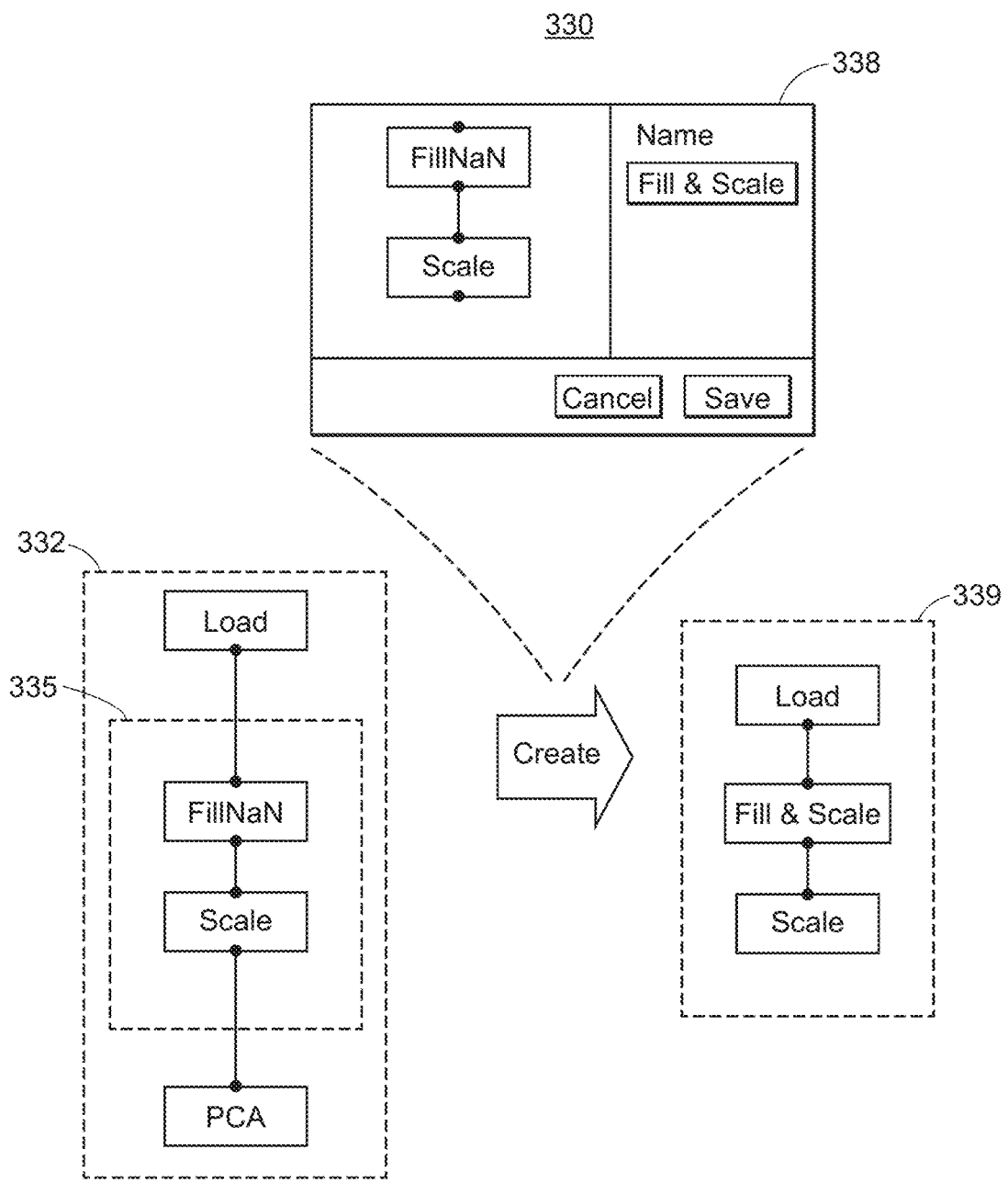
FIG. 4K depicts an example scenario in which a composite data block is created.

Over time, as multiple data modules are configured, common patterns of block configuration and usage may occur, e.g., within the same process control system 5 and/or across an enterprise that has multiple process control systems. If such commonalities are identified, it may be desirable to group a set of individual data blocks to form a new block that encapsulates their common behavior, e.g., a composite block. In some scenarios, it may be desirable to define a custom, unitary data block, e.g., when a set of particular property values is found to be repeated over time, or when a user desires to define a custom data operation or function. Custom and/or composite data blocks may be created and stored in the library 252 so that they are available for use in other data modules. An example scenario 330 illustrating the creation of a composite data block is shown in FIG. 4K. In a data diagram 332, a user selects two unitary data blocks having a particular relationship (e.g., "Fill NaN" and "Scale") 335 to form a new composite block. Using a modal dialog box, pop-up window, or other suitable interface provided by the Data Studio, the user configures or defines the new composite block with a desired name "Fill & Scale" and saves the new "Fill & Scale" composite block to the data block definition library 252 (reference 338). At some time after "Fill & Scale" has been defined and saved, it may be incorporated into another data diagram 339 in lieu of using the individual "Fill NaN" and "Scale" data blocks.

Figure 4L:
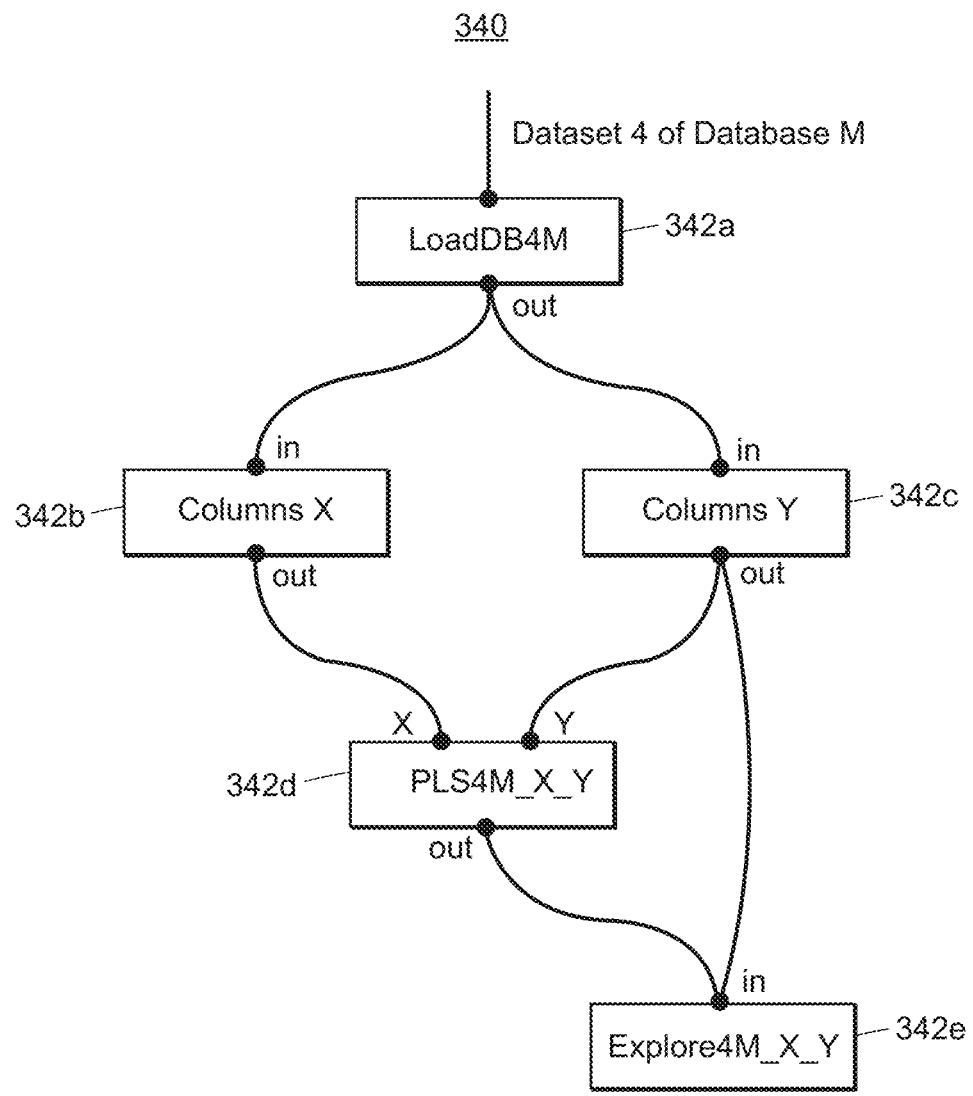
FIG. 4L depicts an example off-line data diagram.

FIG. 4L depicts an example off-line data diagram 340 that illustrates some of the features and principles described above, and that is described herein with simultaneous reference to FIGS. 4A, 4B, and 4F-4H. In FIG. 4L, the example off-line data diagram 340 has been created by a user on the user canvas 245 of the Data Studio. Specifically, the user has invoked the block definition library 252, e.g., by activating the control 248m on the canvas 245, and has dragged and dropped a LoadDB block template 285a onto the canvas 245. Further, the user has named the particular instance of the LoadDB block 285a as "LoadDB4M" (reference 342a), and has configured the LoadDB4M block instance 342a to load Dataset4 from Database M, e.g., by setting the property values in fields 285c and 285b of the LoadDB4M block 342a. Additionally, although not explicitly depicted in FIG. 4L, the user has set the Plot property value 285d of the LoadDB4M 342a to "True", so that upon evaluation of the block LoadDB4M 342a, a plot of the loaded Dataset4 is generated and presented in the View Block Results field 212a of the LoadDB4M block 342a.

After the user configured the LoadDB4M block instance 342a, the user connected two recipient Columns block instances 342b, 342c to the output of LoadDB4M block instance 342a. For example, the user dragged and dropped two different instances of the Columns data block template 286a onto the canvas 245, and respectively named the instances as "Columns X" (reference 342b) and "Columns Y" (reference 342c). Further, the user has connected each of the respective inputs of the Columns X block 342b and the Columns Y block 342c to the output of the LoadDB4M block 342a by using interconnecting wires.

The user has also configured the Columns X block 342b and the Columns Y block 342c based on the evaluation of the LoadDB4M block 342a. In particular, the user first evaluated the LoadDB4M block 342a (e.g., by selecting the image of the block 342a on the canvas 245 and activating the "evaluate" user control 248i), thereby causing the LoadDB4M block 342a to compile and execute to load or obtain Dataset4 from Database M. As the Plot property of the LoadDB4M block 342a is set to "True," this evaluation of the LoadDB4M block 342a also caused a Plot of the loaded Dataset4 to be displayed, e.g., in the View Block Results field 202a of the LoadDB4M block 342a (not shown in FIG. 4L). Using this plot, the user viewed and explored various columns, tags, or sub-groupings of data within Dataset4, and subsequently configured the Columns X block 342b to receive sub-group or column of data labeled or tagged "X" in Dataset4, and configured the Columns Y block 342c to receive the sub-group or column of data labeled or tagged "Y" in Dataset4 (e.g., by respectively selecting the appropriate sub-group, column, or tag indicator in the property field 286b of the Columns block template 286a for each of the Columns blocks 342b, 342c). As such, an evaluation of the Columns X block 342b results in only the data from Dataset4 that is characterized, labeled, or tagged as "X" to be loaded or accessed at the block 342b, and an evaluation of the Columns Y block 342c results in only the data from Dataset4 that is characterized, labeled, or tagged as "Y" to be loaded or accessed at the block 342c.

The user has also dragged, dropped, and configured a Partial Least Squares (PLS) block on the off-line data diagram 340. In particular, the user has named the PLS block instance 342d "PLS4M_X_Y," and has configured the PLS4M_X_Y block 342d to receive the output of the Columns X block 342b and the output of the Columns Y block 342c at its respective inputs. The PLS4M_X_Y block 342c operates or performs a partial least squares function, action, algorithm, or operation on the data provided by Columns X 342b and Columns Y 342c, and the result (e.g., a respective PLS model generated based on the relationship between the Columns X and Columns Y data) is provided, via the output of the PLS4M_X_Y block 342d, to an Explore4M_X_Y block 342e. Similar to the other blocks 342a-342d, the Explore4M_X_Y block 342e is an instance of a respective Explore block definition that the user has dragged and dropped onto the canvas 245, named, and configured.

In the off-line diagram 340, in addition to the 342d, the Explore4M_X_Y block 342e being configured to receive the output generated by the PLS4M_X_Y block 342d, the user has configured the Explore4M_X_Y block 342e to also receive, as an input, the direct output of the Columns Y block 342c, e.g., via wire 342f. This configuration allows the Explore4M_X_Y block 342e to enable the user to explore the relationship between the output of the PLS4M_X_Y block 342c and the output of the Columns Y block 342c, e.g., by presenting one or more visualizations and/or statistics. For example, typically, an output of the PLS4M_X_Y block 342c includes one or more predicted values. The Explore4M_X_Y block 342e allows a user to compare the one or more predicted values included in the output of the PLS4M_X_Y block 342c with the actual values of the Columns Y block 342c, e.g., to determine if the use of Columns X data 342b in the PLS4M_X_Y model 342d is sufficiently predictive of the Columns Y data 342c.

It is noted that in this off-line data diagram, neither the PLS4M_X_Y block 342d nor the Explore4M_X_Y block 342e requires its immediately preceding block(s) to be evaluated before its own configuration can be completed. That is, the configuring of each of the PLS4M_X_Y block 342d and the Explore4M_X_Y block 342e can be performed independently of other blocks' evaluations, and at any time. However, as the off-line data diagram 340 represents one or more data pipelines or data flows, typically the evaluation of each downstream data block requires its upstream data blocks(s) to be evaluated before the downstream data block can be evaluated (unless, or course, a recipient or downstream data block receives a test or dummy input data set merely for individual block evaluation purposes). In fact, in some scenarios, a user configures an entire off-line data diagram 340 as a whole, and/or can evaluate an entire off-line data diagram 340 as a whole rather than on a block-by-block or portion-by-portion basis.

2. Data Analytics Studio—on-Line Data Modules

Returning now to FIG. 4B, after an off-line data diagram of a data model has been completed and evaluated to a user's satisfaction in the Data Studio, the off-line data diagram can be translated or converted into its equivalent online form. To transform an off-line data diagram into its on-line form, a user may select or activate the online toggle or user control 248f on the navigation bar 242, thereby causing the DDE User Interface Application to transform the off-line data diagram into its on-line counterpart data diagram, and cause the on-line data diagram of the data model to be displayed on the canvas 245. Certain off-line data blocks may have an on-line counterpart definition (e.g., the off-line and on-line versions of the "Load" data block), other off-line data blocks may not require a different on-line counterpart but are nonetheless included in an on-line data module (e.g., a "FillNaN" block or "PCA_NIPALS" block), while still other off-line data blocks are omitted in the on-line data module (e.g., an "Explore" block). The infrastructure and actions performed during the transformation of an off-line diagram into its on-line counterpart is provided by the Data Analytics Services. For example, the activation of the user control 248f invokes Data Analytics Services to perform the transformation of the off-line data diagram into its corresponding on-line data diagram. A more detailed description of how the Data Analytics Services performs this transformation is provided in the description of Data Analytics Services below.

When the on-line data diagram of the data module is presented on the canvas 245 of the Data Studio, a user may configure the on-line data module. Typically, configuring an on-line data module includes indicating the live process control data relating to controlling the process that is to be obtained as input data for the on-line data module, e.g., by defining the bindings that relate the on-line data module to the corresponding data source of the input data. Additionally, configuring an on-line data module may include indicating the location(s) and/or consumers (e.g., by defining bindings) to which output data generated by the on-line data module is to be provided (e.g., one or more consumer DDEs and/or applications, data stores, files, historians, process control devices, routines, elements, components, etc.). The configuration and/or modification of data blocks, their respective properties, and interconnections of on-line data modules is performed in a manner similar to that discussed above with respect to off-line data modules, in an embodiment.

If the user identifies a problem or issue with an on-line data module or otherwise desires to modify the on-line data module, the user may flip or switch the on-line data module back into its off-line representation, e.g., by utilizing the off-line toggle or user control 248d, and the user may further modify and evaluate the off-line data diagram of the data model as described above. Subsequently, when the user flips or switches the off-line data diagram back to its on-line representation, the modified off-line data diagram transforms into a corresponding on-line data diagram of the data model.

Figure 4M:
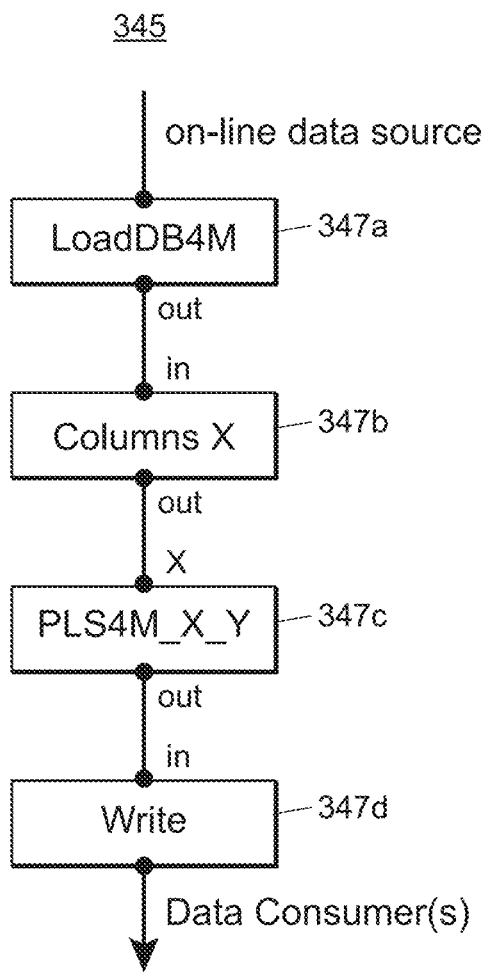
FIG. 4M depicts an on-line data diagram generated from the transformation of the example off-line data diagram of FIG. 4L.

FIG. 4M illustrates the on-line data diagram 345 corresponding to the example off-line data diagram 340 of FIG. 4L, and FIG. 4M is discussed below with simultaneous reference to FIGS. 4A, 4B, 4F-4H, and FIG. 4L. In the example scenario depicted in FIG. 4M, the user has decided that the off-line diagram 340 of FIG. 4L defines the data model as intended or desired, and that the data model is ready for deployment into the on-line process control system. As such, Studio while viewing the off-line data diagram 340 (e.g., as shown in FIG. 4L), the user has activated the on-line toggle 248f of the Data Studio, thereby transforming the off-line data diagram 340 into a corresponding on-line data diagram 345 which is presented on the canvas 245 of the Data Studio as shown in FIG. 4M. This transformation is performed by the Data Analytics Services of the DDE User Interface Application, and the particular actions, mechanisms, and architecture utilized by the Data Analytics Services to perform this and other transformations are described in more detail in a later section.

Note that although the on-line data diagram 345 and the off-line data diagram 340 represent the same data model, the set of blocks and wires of the two data diagrams 345, 340 differ. For example, the data pipeline of the off-line data diagram 340 that originates at the output of the LoadDB4M block 342a, traverses through the Columns Y block 342e, and terminates at the input of the Explore4M_X_Y block 342e is omitted from the on-line data diagram 345, as this data pipeline was utilized in the off-line data diagram 340 to test and validate the off-line PLS4M_X_Y block 342d and is not necessary in the on-line environment now that the efficacy of the PLS4M_X_Y block 342d has been demonstrated to the user's satisfaction. However, in some embodiments, a user may choose to include this validation data pipeline in the on-line data diagram 345, e.g., if the user desires to have continual testing and validation of the on-line data model in the on-line environment.

Another difference between the off-line data diagram 340 and the on-line data diagram 345 is the LoadDB4M block. In the off-line data diagram 340, the LoadDB4M block 342a is configured to load data from the off-line data source Dataset4 of Database M. On the other hand, in the on-line data diagram 345, the LoadDB4M block 347a has been transformed into a block that can connect to an on-line data source, such as an on-line streaming data source within the process plant 5. The user may configure the LoadDB4M block 347a to bind to a desired on-line data source, and the compilation of the configured LoadDB4M block 347a instantiates the binding.

In the on-line data diagram 345, the Columns X block 347b is generally similar or equivalent to its off-line form 342b. However, as previously discussed, the on-line form of the PLS4M_X_Y block 347c receives only the input that is necessary for the PLS4M_X_Y block 347c to operate in the on-line environment, i.e., the output of Columns X block 347b.

Additionally, the on-line data diagram 345 does not have a counterpart to the off-line Explore4M_X_Y block 342e, as the purpose of the Explore4M_X_Y block 342e in the off-line environment was to provide the user a view into how well the draft data diagram 340 achieved the user's goals. In the on-line data diagram 345, though, the output of the PLS4M_X_Y block 347c is provided to a "Write" data block 347d, which is a type of a Data Consumers data block. The Write data block 347d causes the real-time output of the PLS4M_X_Y block 347c in the on-line environment to be written to a file or database, as identified in the configuration of the Write block 347d. Of course, if the user so desires, the output of the PLS4M_X_Y block 347c could be additionally or alternatively provided to one or more other data consumers of the data model by interconnecting the output of the PLS4M_X_Y block 347c with the inputs of other Data Consumer blocks. For example, the PLS4M_X_Y block 347c could be connected to a Publish block so that the output of the PLS4M_X_Y block 347c is published to the data analytics network 112 and is available for use by other data analytics applications. In another example, the PLS4M_X_Y block 347c could be connected to a Convert2Control block, so that the output of the PLS4M_X_Y block 347c causes a change in the on-line process control system. For example, a Convert2Control block may be configured to convert the output of the PLS4M_X_Y block 347c into an input signal for a process control function, loop, or application within the process plant 5, and cause the input signal to be delivered to the corresponding process control industry, element, device, or component.

3. Deployment of Data Modules

Typically, on-line data modules are not evaluated asynchronously, as is possible for off-line data modules. Rather, on-line data modules are first configured (e.g., is bound to a live data source and/or one or more data consumers/recipients), and then are deployed as a whole to continuously execute and interact with the on-line process control system. A user may deploy a data module into an on-line process control system, for example, by clicking or activating the "deploy" user control 248j on the navigation bar 242, thereby notifying the Data Analytics Services to handle the deployment of the on-line data module. The infrastructure and actions used for deploying data modules are described in more detail in the description of the Data Analytics Services. Generally, though, when an on-line data module is deployed, the on-line data module follows a compilation and execution process similar to that as for an off-line data module that is being evaluated, e.g., as illustrated in FIG. 4I. However, the target environment(s) of an on-line data module may be different than the target environment(s) of its corresponding off-line data module, and on-line data modules are bound to live data sources within the process control system or plant.

In an embodiment, the DDE User Interface Application supports "one-click" deployment. That is, when an off-line data module has been configured to a user's satisfaction, the user is not required to convert the data module to its on-line representation and to configure the bindings for the data blocks of the on-line representation that are responsible for reading and writing data from live data sources. Instead, during "one-click" deployment, upon user initiation any required bindings for the subject data module are automatically determined and configured by the DDE User Interface Application. In an example scenario, a user may assign a data module to execute on a particular DCS controller, e.g., by using a dialog box or window provided by the Data Studio that retrieves information about the hierarchy of the DCS system. The user may browse the hierarchy and assign the data module accordingly. The DDE User Interface Application (e.g., the Data Studio and/or the Data Analytics Services) subsequently utilizes the assigned process control system element (in this scenario, the particular DCS controller) to automatically determine the necessary bindings. Example infrastructure and actions used to perform one-click deployment are described in more detail in the description of the Data Analytics Services.

After an on-line data analytic module has been successfully deployed, any resulting values (e.g., descriptive, predictive, and/or prescriptive) that are generated by its execution may be shown to the user, e.g., via the Data Dashboard of the DDE User Interface Application. In an embodiment, the resulting values include at least one predictive value, and the corresponding real-time, live data value(s) generated by the process control system 5 for the tag(s) or process control elements to which the predicted values apply may also be shown in conjunction with the predicted values.

C. Data Analytics Dashboard

As previously discussed, the DDE User Interface Application includes a second mode of operation, the Data Analytics Dashboard. The Dashboard is typically utilized by users to view and/or manage modules that are (i) off-line data modules (e.g., draft data models) which are being evaluated, and/or (ii) on-line data modules that have been deployed into an on-line process control system or plant. Using visual and other representations, the Dashboard provides a user a view of status and other information corresponding to evaluating off-line data models, as well as a view of deployed on-line data modules and the real-time or live information that is being generated by the on-line data modules. Generally, the Data Analytics Dashboard mode provides the user with an interface via which the user may monitor and manage on-line and off-line data modules. The user may also terminate the evaluation of any off-line data modules and the execution of any on-line data modules from the Dashboard. Generally, but not necessarily, at least some of the information displayed on the Data Analytics Dashboard is provided to the Dashboard 350 by the Data Analytics Services of the DDE User Interface Application.

Figures 1, 4N:
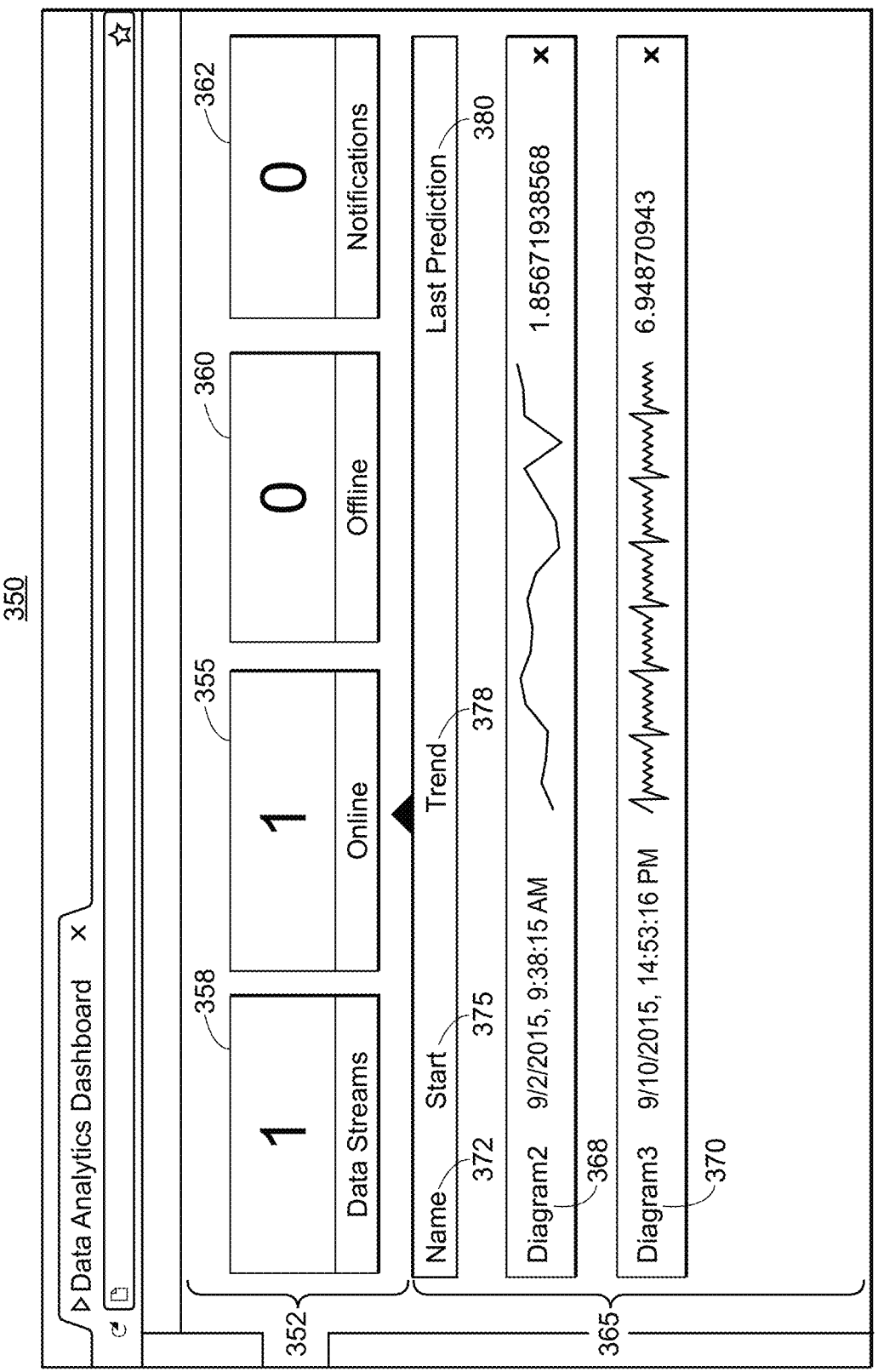

FIG. 4N-1 depicts an example user interface 350 presented by the Data Analytics Dashboard of the DDE User Interface Application. A first portion 352 of the example Dashboard user interface 350 provides current data analytics overview information, such as an indication of the number of on-line data modules 355 that are currently being monitored by the DDE User Interface Application and an indication of the number of live data streams 358 on which the on-line data modules 355 are operating. As previously discussed, the live data streams 358 are received from one or more data sources that are continuously generating real-time data resulting from the on-line process control plant or environment 5 controlling one or more industrial processes, and executing on-line data modules 355 have been configured to receive the live data streams 358. The data analytics overview information also includes an indication of the number of off-line data modules 360 whose evaluations are currently being monitored by the DDE User Interface Application. In some embodiments, the Dashboard user interface 350 includes one or more other notifications or other information 362 related to monitored data analytics modules, whether on-line or off.

When the user clicks on or otherwise activates one of the overview controls 355, 358, 360, 362, additional summary information corresponding to the selection is presented on a second portion 365 of the Dashboard 350. In FIG. 4N-1, the user has selected to view summary information for currently executing on-line data modules 355, of which there are two at the moment, i.e., Diagram2 indicated by reference 368, and Diagram3 indicated by reference 370. For each executing on-line data module 360, 370, the second portion 365 of the Dashboard 350 indicates its respective summary information, such as the name of the module 372, the start time at which the module was deployed 375, a trend indication 378 (which may be graphical, as shown in FIG. 4N-1) of the module's output over a most recent interval of time, the most current last prediction or predicted value(s) 380, and/or other information (not shown). Of particular note, on the Dashboard 350, the trend indication 378 of each on-line data module 368, 370 is continuously updated to reflect the continuously generated output of the respective data module 368, 370, thereby allowing the user to monitor on-line data module execution and its continuously generated results in real-time.

Additionally, the Data Analytics Dashboard 350 allows a user to click on any summary information associated with any data module 360, 378 to view more details, e.g., in a pop-up window, dialog box, or other suitable viewing mechanism (not shown). For example, when the user clicks on the Name of Diagram2 368, the Dashboard 250 may present the on-line data module diagram of Diagram2 368 and indications of the one or more particular data streams 358 to which Diagram2 368 is bound. When the user clicks on the Start information of Diagram2 368, an indication of the creator of Diagram2 368, the user who deployed Diagram2 368, and/or an owner of Diagram2 368 may be presented. Clicking on the Trend 378 information of Diagram2 368 allows the user to manipulate and explore the output data trend of Diagram2 368, e.g., by extending or shortening the viewed time interval, converting the trend information into another type of visualization (e.g., bar charts, pie chart, scatterplot, etc.), applying and/or obtaining statistics regarding the trend data over a given interval (e.g., average, rolling average, maximum, minimum, etc.), and the like. Similarly, clicking on the Last Prediction 380 information of Diagram2 368 allows the user to manipulate and explore the latest predicted value or values, e.g., by viewing the time of the last prediction and how often predictions are being made, comparing the last prediction with a current live data value, etc.

When the user selects the user control 360 to view currently executing off-line data modules (of which there are none in the example scenario of FIG. 4N-1), additional summary information corresponding to off-line data modules is presented in the second portion 365 of the Dashboard 350. Generally, the summary information for an off-line data module is similar to that of an on-line data module, however, instead of indicating associated live data streams, the summary information for the off-line data module may indicate the test data file(s) or data streams generated by off-line data source(s) (e.g., test tools, devices, and/or environments) on which the off-line data module is executing. Additionally, the summary information for an off-line data module may indicate the current status, state, and/or progress of its execution.

In some scenarios, a user may configure and/or deploy an off-line data module from the Dashboard (instead from the Data Studio). For example, a user may be monitoring the evaluation of an off-line data module from the Dashboard, and that off-line data module successfully completes its evaluation. The user may activate a user control of the Dashboard (not shown) via which the user may configure the data module to reference the live data source(s) and the data generated by the live data source(s) on which the on-line data module is to execute. This configuration of the on-line data module to bind to data source(s) is similar to that described above, with the exception of being initiated from the Dashboard instead of from the Data Studio. Alternatively, the user may utilize one-click deployment for the off-line data module via the Dashboard.

When the user selects the user control 358 to view information associated with on-line data streams that are currently bound to executing on-line data modules (of which there are three in the example scenario of FIG. 4N-1), additional summary information corresponding to the on-line data streams is presented in the second portion 365 of the Dashboard 350 (not shown). The summary information for each live data stream may include an identifier of the data stream, an indication of the data source from which the data stream is being received, an indication of a corresponding process control system tag or other traditional process control system identifier of the live data source, information about subscription(s) to and/or the publication of the data stream, an indication of the one or more on-line data modules that are currently executing on the live data stream, a continuously updated visualization of the live data stream (e.g., line graph, bar chart, scatterplot, etc. and/or basic statistics thereof), and/or other information.

Of particular note in the example scenario depicted in FIG. 4N-1, the data stream overview 358 indicates there are three live data streams that are presently being operated on by on-line data modules, while the on-line data module overview 355 indicates there are only two executing on-line modules. As such, one of the two executing on-line modules 368, 370 is operating on two of the live data streams. The user may discover this relationship either by navigating to view the details of each on-line data module 368, 370, which would provide an indication of the data streams to which the respective module 368, 370 is bound, or by navigating to view the details of each data stream 358, which would provide an indication of the executing on-line data modules that are operating on each data stream 358.

FIG. 4N-2 depicts an example user interface 382 that may be presented by the Data Analytics Dashboard of the DDE User Interface Application. In an embodiment, the user interface 382 is included in the second portion 365 of the user interface 350 shown in FIG. 4N-1. In an embodiment, the user interface 382 is a full-screen view.

The user interface 382 includes one or more tiles or cards 385a-385j, each of which corresponds to a respective executing on-line data module, and which may collectively referred to as a pallet or deck of cards 385x. Each of the cards 385x in the pallet may include information similar to that displayed for executing on-line data modules 360, 370 of FIG. 4N-1, e.g., the name of the module, a start time at which the module is deployed, a trend indication of the module's output over a most recent interval of time, the most current last prediction or predicted value(s), and/or other information. Also similar to the displays for the executing on-line data modules 360, 370, the trend indication of each of the cards 385x is continuously updated to reflect the continuously generated output of its respective on-line data module, thereby allowing the user to monitor its execution and continuously generated results in real-time.

Each of the cards 385x is resizable and movable, as desired by the user. In an embodiment, the size of a particular card 385x increases when the particular card is in focus. A card 385x may come into focus manually, such as when the user clicks on the particular card 385x, hovers over the particular card 385x, etc. Additionally, or alternatively, a card 385x may come into focus automatically, such as when a particular data module needs urgent attention (e.g., a predicted value crosses a threshold, the data module itself requires a user input or user intervention, a condition severity ranking amongst the cards 385x, etc.). Other automatically generated indications of needed attention may be indicated on the user interface 382, for example, by highlighting or providing some other treatment to a particular card 385x, sizing the set of cards 385x in accordance with their respective urgencies, bringing a particular card 385x to the foreground or the front of the pallet, arranging the cards 385x in order of priority of attention, etc. In an embodiment, a user may define particular treatments are to be automatically applied to the cards 385x in which particular situations.

Returning now to data block definitions 255 that are stored in the data block definition library 252 of the DDE User Interface Application (e.g., as shown in FIG. 4C), the data block definitions that are stored in the library 252 may be dynamically discovered by the DDE User Interface Application during its start-up or initialization. In an embodiment, data block definitions are defined using a light-weight data interchange format, such as JSON files or documents, or other suitable format. The definition file or document of a particular data block includes a block definition name and details the block properties and connectors that define the particular data block. In some cases, a particular block definition may provide a definition for an off-line representation and a definition for an on-line representation.

As the DDE User Interface Application may continually and dynamically discover block definitions, additional block definitions (e.g., for custom data blocks, composite data blocks, and/or other data blocks) are able to be added to the library 252 at any time while the DDE User Interface Application is executing. In an embodiment, additional block definitions are generated by a utility application which is referred to herein as a "data block definition wrapper." For example, the data block definition wrapper may be invoked when a user saves a custom or composite data block, as previously described with respect to FIG. 4K. When the block definition wrapper executes, it creates an instance of the additional block definition and causes a corresponding JSON document or similar that defines the additional block definition to be created and stored. For instance, the created instance of the additional block definition generates the JSON document and stores it in the library 252. Referring to FIG. 4K as an example scenario, when the user saves the composite block definition 338, the block definition wrapper executes to cause a JSON document or similar for the composite block definition 338 to be generated and stored.

During configuration of a data block (whether off-line or on-line), the DDE User Interface Application may need to perform some functionality (e.g., business logic) in order to achieve the configuration experience required to help the user configure and use the data block successfully. As block definitions are dynamically discovered by the DDE User Interface Application, this functionality is not embedded in the DDE User Interface Application itself. Thus, in an embodiment, any associated functionality that is specific to a particular data block may also be dynamically loaded when the DDE User Interface Application is initialized. Subsequently, a reference to the dynamically loaded functionality corresponding to the particular data block is maintained in the block definition of the particular data block, and is used by the DDE User Interface Application when an instance of the particular block's block definition is configured. Additional details regarding block definitions and associated functionality is provided in later sections of the present application.

Industrial Process Monitoring and Analytics System Integrated with Process Control System As seen in the discussion of FIGS. 1-3 and 4A-4N-2 above, the distributed industrial process performance monitoring and/or analytics system or DAS 100 provides a platform that supports data analytics configuration, data modeling, data model execution, data visualizations, and streaming services for industrial process plants. As previously discussed, although various nodes of the monitoring and analytics system 100 are embedded within a process control system or plant 5, typically the data communications network 112 of the analytics platform 100 exists outside of (and is independent of) existing DCS, PLS, health monitoring, and other systems of the process plant 5. In an example configuration, the data analytics network 112 is overlaid on top of the process plant 5, thereby separating the network 112 from most or all of the traditional process control communications networks 10, 70, etc. of the process plant 5. Traditional process control communication networks continue to transmit process control data to control, manage, and/or to administrate the control of the process and operations of the plant 5, while the data analytics network 112 transmits analytics data (which may include copies of the data transmitted over the traditional process control communication networks) for discovery of knowledge about the operations of the process plant 5, e.g., descriptive knowledge, predictive knowledge, and/or prescriptive knowledge. The architecture of the data analytics system 100 allows the data analytics system 100 to be easily added or integrated into existing, legacy process plants 5.

The knowledge about the process plant 5 that is discovered by the data analytics system 100 may be utilized to modify parameters, equipment, operations, and other portions of the process plant 5 to increase the performance of the plant 5 and decrease the occurrence of faults, failures, and other undesirable conditions. Advantageously, the data analytics system 100 discovers knowledge about the process plant 5 in real-time in correspondence with the current, on-line operations of the process plant, so that the discovered knowledge is descriptive, predictive, and/or prescriptive of the current operations of the process plant 5. As such, the data analytics system 100 and the process plant 5 form a control loop to control and optimize the performance of the process plant 5.

Figure 4O:
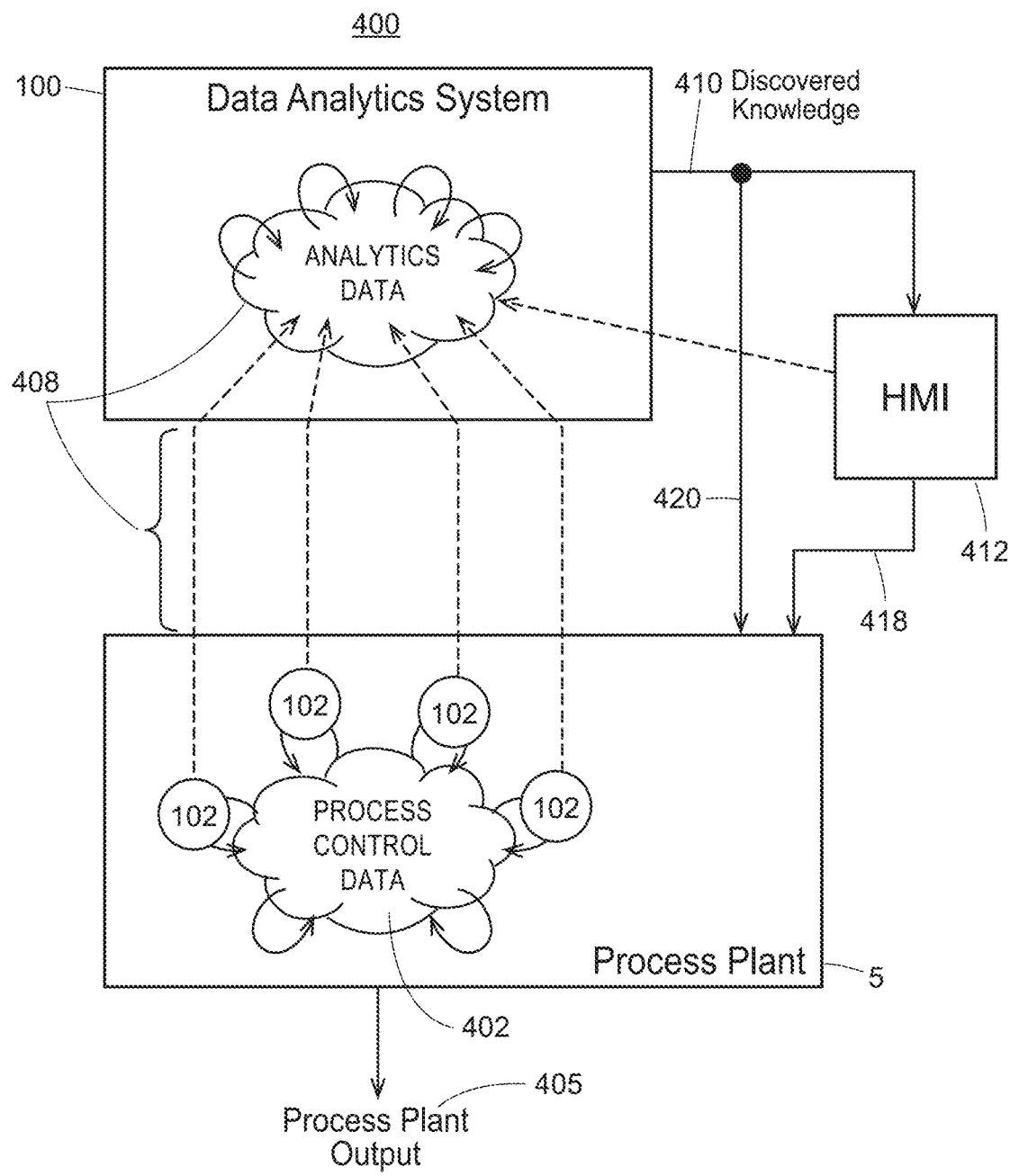
FIG. 4O depicts a high-level block diagram of a control loop that controls and optimizes process plant performance.

An example, high level block diagram 400 of the control loop that controls and optimizes the performance of the process plant 5 is illustrated in FIG. 4O. As shown in FIG. 4O, the on-line process plant 5 generates, operates on, and communicates various types of control data 402 over traditional process control communication networks (e.g., networks 10, 70, etc.) to control one or more industrial processes and generate process plant output 405. The distributed industrial process performance monitoring/analytics system 100 is connected to and integrated with the process plant 5 via embedded distributed data engines 102x that capture analytics data 408 generated as a result of the process plant 5 controlling the one or more processes to produce the output 405. As previously discussed, the captured analytics data 408 may include copies of first-order and higher-order process control data 402, as well as the results/output of analytics functions locally performed by the DDEs 102x and/or performed by off-line and on-line data analytics modules developed via the Data Studio of the data analytics system 100. In some cases, the captured analytics data 408 includes new analytics functions that are generated via the Data Studio and/or that are autonomously generated by the DDEs 102x.

The data analytics system or platform 100 receives, generates, communicates, and operates on analytics data 408 to generate analytics output 410. The analytics output 410 may include discovered knowledge about the process plant 5, such as knowledge that is descriptive of the current operations of the process plant 5, knowledge that predicts occurrences of faults, failures, time intervals, performance, events, etc. given the current operations of the process plant 5, and/or knowledge that prescribes one or more prescriptive actions that may be taken to mitigate undesirable characteristics of current plant operations and/or to mitigate the probability of the occurrence of undesirable predicted faults, failures, time intervals, performance, events, etc. given the current operations of the process plant 5. In some embodiments, the discovered knowledge 410 includes knowledge about the analytics data 408 itself. For example, the discovered analytics knowledge 410 may include an optimal off-line data set that may be utilized to evaluate different off-line data modules, a series of steps that have been repeatedly used by data engineers and that are defined as a new data analytics user procedure, a new configuration of data blocks that are defined as a new data analytic technique, etc. Indeed, during the testing of a prototype data analytics system 100 integrated into a refinery process plant, a new data analytic technique for industrial process plants was discovered by the control loop 400, and is explained in a later section below.

At least some of the discovered knowledge included in the analytics output 410 may be provided to a Human-Machine Interface (HMI) 412, such as the Data Analytics User Interface Application. Via the HMI 412, a user may explore the discovered knowledge 410 generated by the data analytics system 100 with regard to the process plant 5. In some cases, the exploration of the discovered knowledge 410 includes the user utilizing the Data Studio to create and execute additional data analytics modules to generate additional discovered knowledge 410 for additional exploration. At some point, based on the body of discovered knowledge 410, the user may make one or more changes 418 to one or more values, parameters, equipment, components, control loops, and/or other current operations of the on-line process plant 5, thereby optimizing the performance and output 405 of the process plant 5 and/or preventing or deterring the occurrence of faults, failures, and other undesirable conditions.

In some situations, at least some of discovered knowledge included in the analytics output 410 is directly provided to the process plant 5 to effect or implement one or more prescriptive changes, as represented in FIG. 4O by the arrow 420. For example, the discovered knowledge 410 may include a prescriptive action comprising a change to a set point, a change to a configuration of a controller, a change to a priority of process control message, or a change to some other value, parameter, configuration, etc. The data analytics system 100 may automatically and directly download or otherwise cause the change to be implemented in the process plant 5 without requiring any user intervention 418, thereby automatically optimizing the performance and output 405 of the process plant 5 and/or preventing or deterring the occurrence of faults, failures, and other undesirable conditions based on the discovered knowledge 410. It is noted that this leg of the control loop 400 automatically updates the on-line process plant 5 to improve its current operations in real-time, as the analytics system 100 processes current analytics data 408 and generates discovered knowledge 410 based on the current operations of the process plant 5. Thus, in contrast to existing analytics techniques that require hours or even days to calculate, determine, and implement prescriptive actions, the prescriptive actions generated by the analytics system 100 are optimized for the current operating conditions of the plant 5 and immediately applied to the process plant 5, and in some cases are applied even before any user is aware of an impending undesired or desired condition.

Of course, for optimum implementation of prescriptive actions within the process plant 5 as a whole, the control loop 400 requires both the autonomous leg 420 and the HMI control leg 418. For example, some prescriptive actions require human intervention, such as installing a replacement valve, sensor, or other component.

As previously discussed, the data analytics platform 100 enables analytics data to be streamed between a plurality of embedded distributed data engines (DDEs) 102$x$. Any type of first-order data generated by the process plant 5 as a result of controlling the process may be streamed. For example, the process control data included in signals generated by process control devices (e.g., controllers, I/O cards, field devices, etc.) that are typically transmitted via traditional process control communication networks for purposes of controlling the process may be also streamed in the data analytics network 112 for the purpose of data analytics. Thus, the content or data included in process control signals, sensor signals, etc. may be copied and/or reproduced and streamed over the data analytics network 112. Further, second-order (or higher-order) process control data that is generated and transmitted via traditional process control communication networks (e.g., data that is to be historized within process control databases or historians, process control configurations, process control user interface commands, process control network management signals, and any other signals that are traditionally sent and received via traditional process control communication networks as a result of controlling a process) may be streamed in the data analytics network 112 for the purpose of data analytics. Additionally, the data analytics network 112 may stream computed data or results of analytics functions or techniques that have been performed on the traditional process control data and/or on computed analytics data.

Consequently, the data analytics platform 100 integrates with the process plant 5 in part by locally binding to data sources of the process plant 5, and/or by providing data analytics services or functionality close to the data sources within the process plant 5, while at the same time provide larger scale predictions and optimizations. Only the data that is necessary to support outer loop predictions and optimizations need to be communicated to higher level/more capable analytics servers and cloud platforms of the analytics system 100.

As previously discussed, some of the plurality of DDEs 102$x$ of the data analytics system 100 are embedded into physical devices within the process plant 5. For example, some of the plurality of DDEs 102$x$ each is integral with a respective process control device (e.g., controller 11; I/O cards 26, 28; field devices 15-16, 18-21, 42A, 42B, 44, etc.) and/or with a respective network routing and management device (e.g., gateways 35, 75, 78; adaptors 52$a$; routers 58; access points 55$a$, 72; etc.). In an embodiment, rather than being integrated into a unitary device or component of the process plant 5, a DDE may be a stand-alone device attached to a traditional process communication link or network (e.g. network 10, 70, PLS network, safety health monitoring system, etc.) as a scope, monitor, or voyeur, and may copy/reproduce selected process control data that is being transmitted via the traditional process communication links or networks for streaming over the data analytics network 112 for data analytics purposes.

In some scenarios, more than one DDE may form a local data analytics cluster with which data sources may register and join and via which analytics data generated by registered data sources may be received into the data analytics network 112 as analytics data. In an example, a set of DDEs forms a local cluster and advertises the presence of the local cluster. The local cluster appears as a unitary node or a single DDE instance 150 of the data analytics network 112 even though the local cluster comprises multiple DDEs that are interconnected via the data analytics network 112. Upon a new data source being activated or booted up on the premises of the process plant 5, the data source scans or looks for local cluster advertisements. The data source may detect the local cluster's advertisement and register with the local cluster, thereby joining the data analytics network 112. Subsequently, registered data sources may request bandwidth from the analytics system 100 (e.g., via their local cluster), and may publish data to their local cluster, to another node of the data analytics network 112, or directly to the analytics system 100. As local clusters appear as instances of distributed data engines 150, local clusters receive locally generated analytics data (e.g., from registered sources and/or other sources) via respective big data receivers 160, and store the locally generated analytics data in respective local persistent storage 155. Additionally, local clusters may provide at least some of the stored analytics data to requesting applications (e.g., to another data analytics application, to a data module, to a user interface, to the Data Studio, to another application, etc.), e.g., via a respective big data request servicers 165. In some cases, local clusters may perform respective local data analytics functions on stored data that has been received from registered data sources and/or on other data streamed within the data analytics network 112, e.g., via respective big data request analyzers 170. The result or output of a local data analytics function may be stored locally in respective big data storage 155, and/or maybe streamed to one or more other DDEs outside the local cluster, e.g., to another local DDE or local cluster, a centralized data cluster, or to a subscribing application, e.g., via the respective one or more data analytics network interfaces 175 of the local cluster.

In some embodiments, local clusters register themselves with more centralized clusters that receive and store higher level analytics data and that perform respective, higher level data analytics functions. For example, a particular centralized cluster (e.g., a regional cluster) may receive streamed data from all local clusters within a particular area of the plant 5, and may perform data analytics thereon. In another example, a particular centralized cluster may receive streamed data from all control loops of a particular type of configuration within the plant 5, and may perform data analytics thereon. Similar to local clusters, a centralized cluster has the appearance of a single node or instance of a DDE 150 in the data analytics network 112.

Consequently, the ability of the distributed industrial process performance monitoring and analytics system 100 to provide DDEs and/or clusters of DDEs at various tiers or levels of localization allows fault detection and predictions to be executed close to the data sources of the process plant 5, thereby providing real-time fault detection and predictions corresponding to the real-time data generated by the on-line data sources. Such a multi-tiered or clustered architecture also allows for storage of analytics data throughout the system 100, and indeed, throughout the process plant 5, as the analytics system 100 includes portions embedded therein. Further, the data analytics system 100 provides the ability to access data that has been stored at any DDE, and provides a centralized system for analytics configuration, diagnostics, and monitoring for performance, faults, and failures.

In an embodiment, one or more centralized clusters provide a centralized location for a user or system administrator to establish rules for backup or historization of analytics data from the plurality of DDEs 102x. In an example, the one or more centralized clusters are located on the premises of the process plant 5 and service the process plant 5 as a whole. In another example, the one or more centralized clusters are located or hosted in the cloud and service the process plant 5 as a whole. In some configurations, the centralized cluster(s) providing backup or historization of the process plant 5 also service other process plants. Generally, as previously discussed, analytics data is persistently and stored at each DDE or cluster, e.g. in its respective big data storage area 155. In some cases, some analytics data that is received at or generated by the DDE or cluster may be cached at the DDE or cluster (e.g., based on one or more criteria such as number of subscribers, frequency of publication or transmission, etc.) for quicker access, but generally all local analytics data is moved to persistent storage 155 at the DDE or cluster. Periodically or at pre-defined times, the persistently stored analytics data at each DDE may be backed up, saved, or historized into long-term data analytics storage, e.g., at a centralized analytics data historian that is accessible via the data analytics network 112. For example, the data analytics historian may be a plant-wide data analytics historian, and/or may be hosted in the cloud. Typically, though, the data analytics historian is independent and separate from any process control data historians. Via a user interface that accesses the one or more centralized clusters, a user or system administrator may define a set of rules indicating how often each particular DDE storage area 155 is to be backed up, when the backups are to take place, where the analytics data is to be historized, etc.

In an embodiment, one or more centralized clusters provide a centralized location for a user or system administrator to establish rules for replication of analytics data amongst clusters, nodes, and/or DDEs 102x of the data analytics system 100. For example, the set of replication rules may define which particular analytics data is to be replicated amongst which particular nodes of the data analytics network 112, and how often the particular analytics data is to be updated amongst the particular nodes. For instance, the set of replication rules may define how often the results of analytics function A performed by node A is to be replicated (e.g., by streaming) at nodes B-D so that the replicated results are available for nodes B-D to utilize in performing their respective data analytics functions. Similar to the historization and backup rules, the set of replication rules may be defined by a user or system administrator via a user interface that accesses the one or more centralized clusters. For example, the system administrator may utilize the user interface to administer the set of replication rules, and the set of replication rules may be stored at the one or more centralized clusters. The one or more centralized clusters providing the administration of analytics data replication may be the same set of clusters that provide the administration of analytics data backup/historization, or may be a different set of clusters.

In an embodiment, one or more centralized clusters provide a location service, a streaming service (e.g., the streaming service 115 of FIG. 1), a data dictionary, and/or other functionality which may be utilized by local clusters, other centralized clusters, and/or individual DDEs 102x to establish analytics data exchange there between. The one or more centralized clusters providing the location service, the streaming service, the data dictionary, and/or the other functionality may be the same set of clusters that provide the administration of analytics data replication and/or the administration of analytics data backups/historization, or may be a different set of clusters. A system administrator or user may utilize a user interface to access the one or more centralized clusters to administer the services, dictionaries, and other functionality that is used to establish and provide analytics data exchange between clusters and nodes of the data analytics network 112.

Figure 4P:
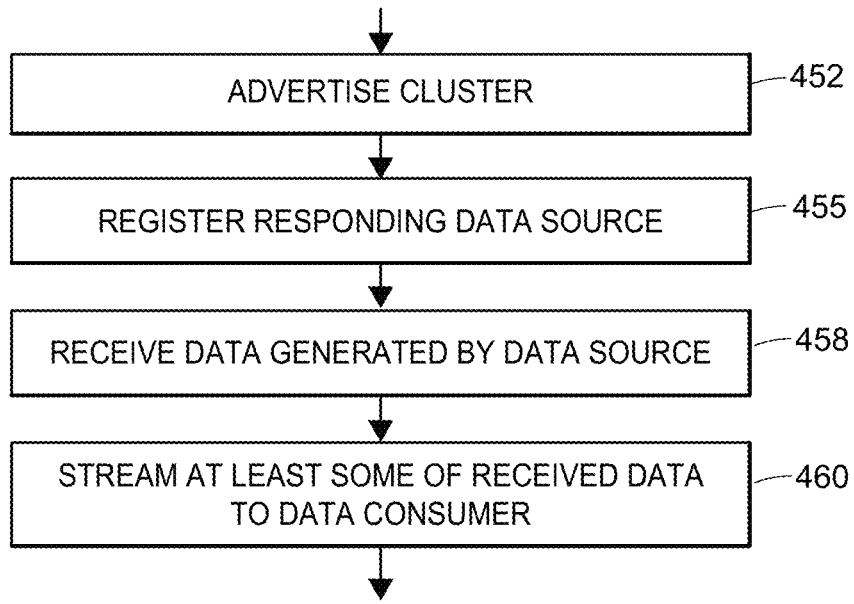
FIG. 4P depicts an example method for providing localized data analytics services.

FIG. 4P depicts an example method 450 of providing localized data analytics services. In an embodiment, a distributed data engine 102x or a cluster of DDEs performs at least a portion of the method 450. Generally, at least a portion of the method 450 may be performed by any portion of a distributed industrial performance monitoring and/or analytics system, such as the system 100. Indeed, the method 450 may be implemented using any portions of any of the systems, apparatuses, devices, and/or techniques described herein. For ease of discussion, though, the method 450 is described below with respect to a cluster of one or more DDEs 102x of the analytics system 100 that appears as a unitary DDE instance 150, although this is only one embodiment of many, and is not meant to be limiting.

The example method 450 includes advertising, by a cluster, the presence of the cluster (block 452). The cluster is included in a data analytics network 112 of a process control plant 5 that is on-line and operating to control a process, and the cluster advertisements may be transmitted over the data analytics network 112, over one or more other networks, via a short-range wireless protocol such as Bluetooth, NFC, etc., or via any other suitable advertising means.

The method 450 further includes receiving, by the cluster from a data source, a response to the cluster's advertising. For example, the response from the data source may be a request of the data source to register with the cluster, and the method 450 may include registering the data source with the cluster and/or with the data analytics network 112 (block 455), thereby joining the data source with the data analytics network 112. The data source may be a device or component that is included in the process plant 5 and that generates data as a result of the on-line process plant 5 controlling the process. In an example, the data source generates continuous, time-series data resulting from the process being controlled.

Additionally, the method 450 includes receiving, by the cluster, the data generated by the data source (block 458). For example, the data source may stream its generated data to the cluster via the data analytics network 112. Additionally or alternatively, the cluster may subscribe to particular data that is generated and published by the data source. In some embodiments, the cluster may query the data source for particular data, e.g., by using the query mechanism described in a later section of this application. When the data source is a device or component that typically communicates process control data via one or more traditional process control communication networks (e.g., networks 10, 70), the data source may continue to communicate process control data as usual over the one or more traditional process control communication networks, while also streaming a copy or reproduction of the contents of the communicated process control data to the cluster via the data analytics network 112.

Upon receiving the data generated by the data source, the cluster may cache at least some of the received data, e.g., when the received data meets one or more caching conditions. Irrespective of whether or not any of the received data is cached, though, the entirety of the received data is locally stored into the persistent storage 155 of the cluster.

The method 450 includes streaming, by the cluster via the data analytics network 112, at least some of the data generated by the data source to a data consumer (block 460). A data consumer may be another analytics node or cluster, a data analytics application, a user interface and/or user interface application, an on-line data analytics module, another application, and/or a database or data historian, for example. The data consumer may be bound to the data source and/or to the particular data stream including the at least some of the data generated by the data source. The particular data desired to be received by the data consumer typically is time-series data, and may be continuous data.

The data consumer may have queried the cluster for particular data generated by the data source, e.g., by utilizing the query mechanism described in a later section of this application, and the streaming (block 460) may be in response to the query generated by the data consumer. In an embodiment, the data consumer may subscribe to particular data that is generated by the data source and is published by the data source or by the cluster. At any rate, the cluster retrieves the desired data that has been generated by the data source from its cache or from its local persistent data storage 155, and streams the data to the data consumer via the data analytics network 112 (block 460).

In some embodiments, the method 450 includes performing, by the cluster, one or more data analytics functions or techniques at least a portion of the data generated by the data source (not shown in FIG. 4P). The one or more analytics functions or techniques may include descriptive analytics, predictive analytics, and/or prescriptive analytics. The one or more analytics functions or techniques may be performed by the cluster per the request of an on-line data analytics module, another data analytics application, or a user, for example. In another example, the one or more analytics functions or techniques may be automatically initiated and performed by the cluster. The results of the execution of the one or more analytics functions or techniques may be returned to the requesting party, and/or may be stored locally at the cluster in persistent data storage 155. In some embodiments, the one or more analytics functions or techniques are performed on data that has been generated by multiple data sources registered with the cluster, and that has been stored (and optionally cached) at the cluster.

As the cluster receives first-order data generated by data sources within the process plant 5 and is located close to these data sources within the process plant 5, the cluster is referred to herein as a "local" cluster. In some embodiments, the method 450 includes the local cluster detecting an advertisement generated by a centralized cluster, such as a regional cluster, an area cluster, a plant-wide cluster, etc. The local cluster may register itself with the centralized cluster, and may stream at least some of the local analytics data stored in its cache and/or its persistent data storage 155 to the centralized cluster. For example, the analytics data that is streamed to the centralized cluster may include data generated by the data source and/or the results of one or more analytics functions performed by the local cluster. The local cluster may stream data to the centralized cluster per a query initiated by the centralized cluster, and/or the local cluster may publish data that is subscribed to by the centralized cluster.

In some embodiments, the method 450 includes historizing or backing up the data that is stored in the cluster's local persistent storage 155 (not shown in FIG. 4P). The data backup may be initiated by the cluster, or the data backup may be initiated by a centralized analytics data historian. In an embodiment, the cluster and the centralized analytics data historian may have a publisher/subscriber relationship. The timing and/or the quantity of data to be backed up from the cluster may be defined by a system administrator of the system 100, in an embodiment. The data to be backed up may be transmitted and/or streamed from the cluster to an analytics data historian for long-term storage and backup.

Figure 4Q:
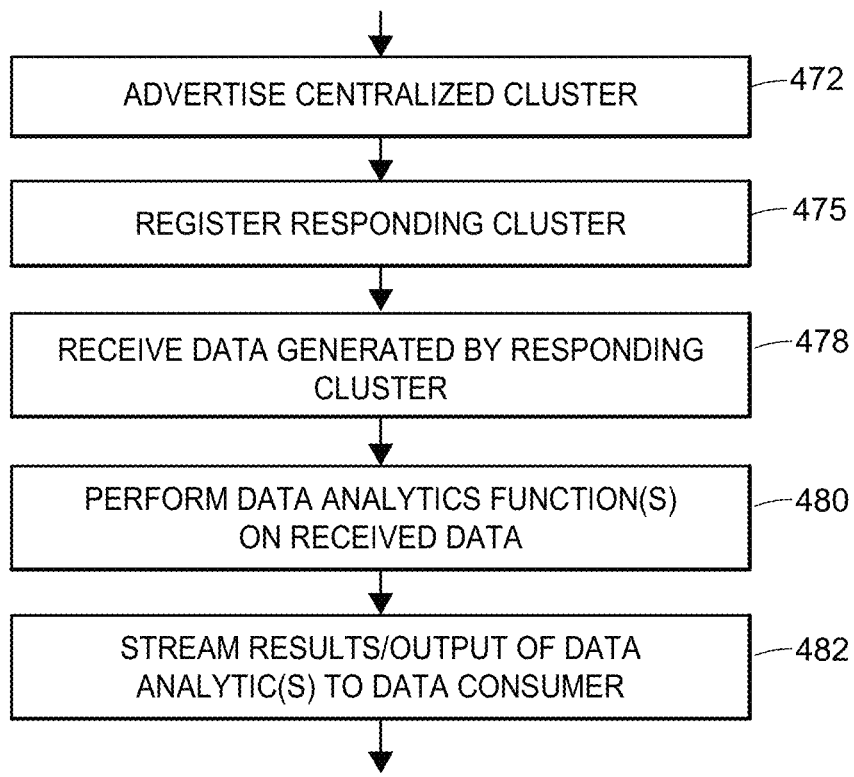
FIG. 4Q depicts an example method for providing localized data analytics services.

FIG. 4Q depicts an example method 470 of providing localized data analytics services. In an embodiment, a distributed data engine 102x or a cluster of DDEs 102x performs at least a portion of the method 470. Generally, at least a portion of the method 470 may be performed by any portion of a distributed industrial performance monitoring and/or analytics system, such as the system 100. Indeed, the method 470 may be implemented using any portions of any of the systems, apparatuses, devices, and/or techniques described herein. For ease of discussion, though, the method 470 is described below with respect to a cluster of one or more DDEs 102x of the system 100 that appears as a unitary DDE instance 150, although this is only one embodiment of many, and is not meant to be limiting.

The example method 470 includes advertising, by centralized cluster, the presence of the centralized cluster (block 472). The centralized cluster differs from the local cluster of FIG. 4P as data sources typically do not register directly with centralized clusters. Rather, in most cases, local clusters or other types of clusters register with centralized clusters, and centralized clusters perform data analytics functions on the data that is received from such other clusters. Similar to local clusters, though, centralized clusters are included in a data analytics network 112 of the process control plant 5 that is on-line in operating to control a process, and the centralized cluster advertisements may be transmitted, streamed, and/or broadcast over the data analytics network 112. A "centralized" cluster, as used herein, generally refers to a cluster to which other clusters register. A centralized cluster may service a control loop (e.g., a "control loop" cluster), an area of process plant (e.g., an "area" cluster), a region of a process plant (e.g., a "regional" cluster), the entire process plant (e.g., a "plant-wide" cluster), multiple process plants (an "enterprise" cluster), and the like. Typically, a centralized cluster comprises a plurality of DDEs interconnected via the data analytics network 112 that have an appearance as a single, unitary DDE instance 150.

The method 470 further includes receiving, by the centralized cluster from another cluster, a response to the centralized cluster advertising. For example, the response from the other cluster may be a request of the other cluster to register with the centralized cluster, and the method 470 may include registering the other cluster with the centralized cluster (block 475). The registering cluster may be a local cluster such as the local cluster of FIG. 4P, or the registering cluster may be another centralized cluster.

Additionally, the method 470 includes receiving, at the centralized cluster from a registered cluster, streamed data (block 478). For example, the registered cluster may stream a portion of its stored and/or cached data to the centralized cluster via the data analytics network 112. As such, the streamed data typically includes time-series data, which may be, for example, continuous data. Additionally or alternatively, the centralized cluster may subscribe to particular data that is published by the registered cluster. In some embodiments, the centralized cluster queries the registered cluster for particular data, e.g., by using the query mechanism described in a later section of this application. The streamed data may include data that was generated by the registered cluster, and/or may include data that was streamed to the registered cluster from data sources and/or from other clusters.

In some embodiments, the centralized cluster caches at least some of the streamed data that it receives, e.g., when the received data meets one or more caching conditions. Irrespective of whether or not any of the data received at the centralized cluster is cached, the entirety of the received data is locally stored into the persistent storage 155 of the centralized cluster.

At a block 480, the method 470 includes performing one or more data analytics functions or techniques on at least a portion of the received, streamed data (e.g., the data that is stored in its cache and/or its persistent storage area 155). The one or more analytics functions or techniques may include descriptive analytics, predictive analytics, and/or prescriptive analytics. For example, the one or more analytics functions or techniques may be performed by the centralized cluster per the request of an on-line data analytics module, another data analytics application, or a user. In another example, the one or more analytics functions or techniques may be performed by the centralized cluster automatically and/or periodically. The results or output of the execution of the one or more analytics functions or techniques may be returned to the requesting party, and/or may be stored locally in persistent data storage 155 of the centralized cluster. In some embodiments, the one or more analytics functions or techniques are performed on data that has been generated by multiple registered clusters, and that has been stored (and optionally cached) at the centralized cluster.

The method 470 includes streaming, by the centralized cluster via the data analytics network 112, at least some of the results or output of the one or more analytics functions or techniques to one or more data consumers (block 482). The one or more data consumers may include another analytics node or cluster, a data analytics application, a user interface and/or user interface application, an on-line data analytics module, another application, and/or a database or data historian, for example. The one or more data consumers may be bound to the centralized cluster, to the particular analytics result/output, and/or to a particular data stream that includes the particular analytics results/output.

The one or more data consumers may have queried the centralized cluster for the particular analytics results/output, e.g., by utilizing the query mechanism described in a later section of this application, and the streaming (block 482) may be in response to the query generated by the one or more data consumers. Additionally or alternatively, the data consumer may subscribe to the particular analytics results/output that is published by the centralized cluster. At any rate, the centralized cluster retrieves the desired data from its cache or from its local persistent data storage 155 and streams the desired data to the one or more data consumers via the data analytics network 112. In some cases, the desired analytics results/output data is streamed upon its generation by the one or more data analytics functions or techniques.

In some embodiments, the method 470 includes registering one or more additional local clusters to the centralized cluster and receiving respective analytics data from the one or more additional local clusters (not shown in FIG. 4Q). In such embodiments, performing the one or more data analytics functions or techniques (block 480) may include performing the data analytics functions or techniques on analytics data received at the centralized cluster from multiple local clusters.

In some embodiments, the method 470 includes historizing or backing up the data stored in the local persistent storage (e.g., the data stored in the big data storage area 155) of the centralized cluster (not shown in FIG. 4Q). The data backup may be initiated by the centralized cluster, or the data backup may be initiated by a centralized analytics data historian. In an example, the centralized cluster in the centralized analytics data historian may have a publisher/subscriber relationship. The timing and/or the quantity of data to be backed up from the centralized cluster may be defined by a system administrator of the system 100 at the centralized cluster or at another centralized cluster. For example, the system administrator may utilize a user interface to administer a set of rules for backup within the system 100 and/or portions thereof, and the set of rules may be stored at the centralized cluster. The data to be backed up may be transmitted and/or streamed from the centralized cluster 152 and analytics data historian for long-term storage and backup.

Additionally or alternatively, in some embodiments the method 470 includes providing a set of rules for replication of analytics data amongst clusters, nodes, and/or DDEs 102x of the data analytics system 100. For example, the set of replication rules may define which particular analytics data is to be replicated amongst which particular nodes of the data analytics network 112, and how often the particular analytics data is to be updated amongst the particular nodes. For instance, the set of replication rules may define how often the results of analytics function A performed by node A is to be replicated (e.g., by streaming) at nodes B-D so that the replicated results are available for notes B-D to utilize in performing their respective data analytics functions. Similar to the historization and backup rules, the set of replication rules may be defined by system administered of the system 100 at one or more centralized clusters. For example, the system administrator may utilize the user interface to administer the set of replication rules, and the set of replication rules may be stored at their one or more centralized clusters.

In some embodiments, the method 470 includes the centralized cluster detecting an advertisement generated by another centralized cluster. For example, the advertising cluster may be a regional cluster, an area cluster, or a plant-wide cluster located on the premises of the process plant 5. In some cases, the advertising cluster may be hosted in the cloud, and may provide analytics services for a portion of the plant 5, the entire plant 5, or multiple plants. The centralized cluster may register itself with the advertising cluster, and may stream analytics data stored in its cache and/or its persistent data storage 155 to the advertising cluster. For example, the centralized cluster may stream at least some of the results of analytics functions that the centralized cluster has performed. The centralized cluster may stream data to the advertising cluster to which the centralized is registered, and/or the centralized cluster may publish data that is subscribed to by the advertising cluster.

In some embodiments, the method 470 includes providing a location service, the streaming service (e.g., the streaming service 115 of FIG. 1), and/or a data dictionary that may be used by other local and centralized clusters as well as individual DDEs 102x to establish analytics data exchange there between (not shown in FIG. 4Q).

Services of Industrial Performance Monitoring/Analytics

The transformation of offline data diagrams into online data diagrams by the Data Studio, the execution of both offline and online blocks and modules, and the functionality of the analytics represented by the diagrams is accomplished by an Analytics Service provided by an industrial performance monitoring/analytics system, such as the data analytics system (DAS) 100. The Analytics Service is interchangeably referred to herein as the "Service," "Services," or "Analytics Services." Any or all portions of the Analytics Services described herein may operate in conjunction with any or all portions of FIGS. 1, 2, 3, and/or 4A-4Q and/or with any number of features and/or techniques described in the sections of the present disclosure respectively corresponding to FIGS. 1, 2, 3, and/or 4A-4Q.

Figure 5A:
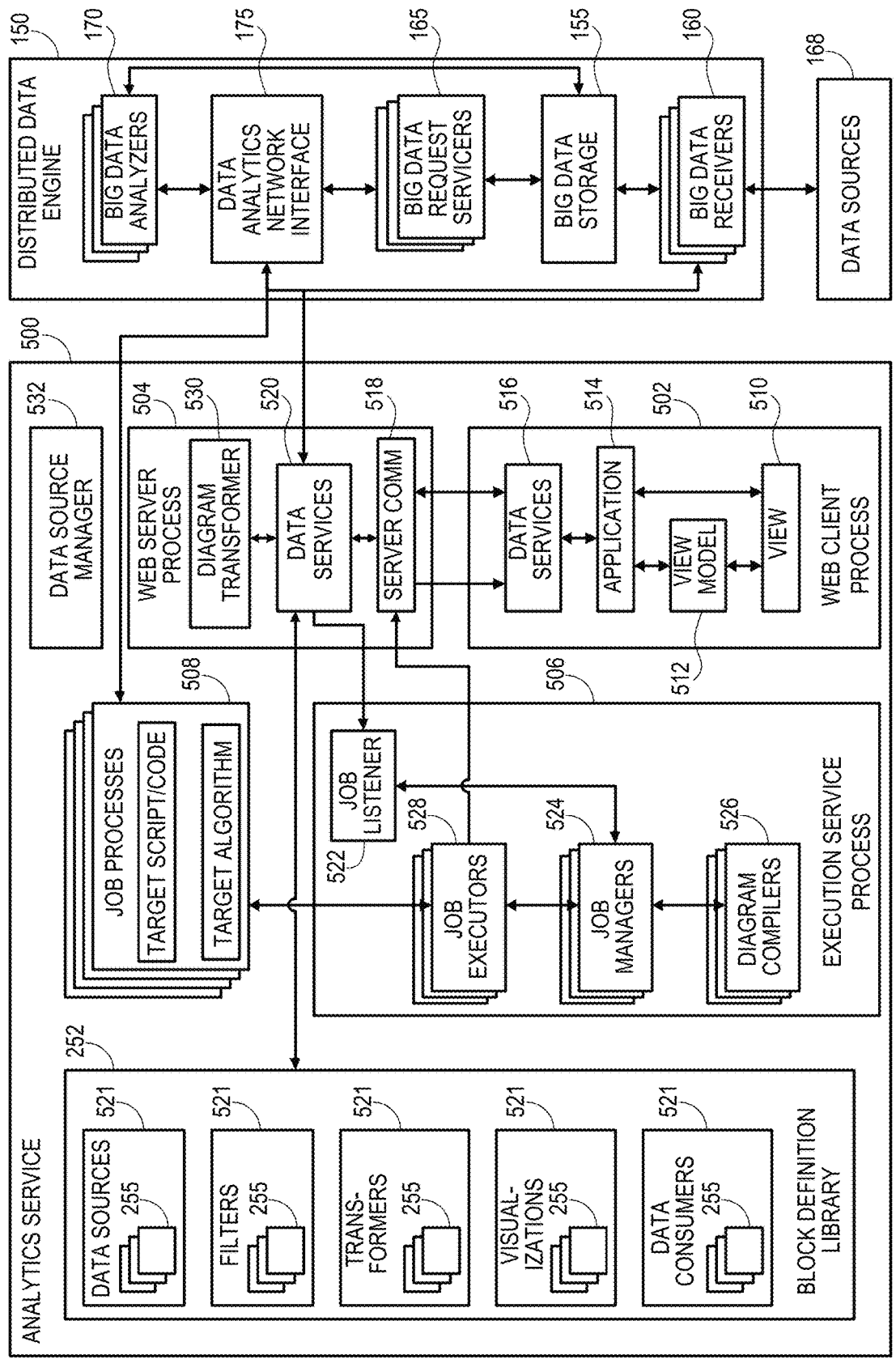
FIG. 5A depicts a block diagram for an example architecture of an Analytics Service according to the present description.

Generally, the Analytics Service is capable of compiling, executing, and/or transforming off-line diagrams (e.g., in the Data Studio and/or the Dashboard) and of compiling, executing, and creating online diagrams (e.g., in the Data Studio and/or the Dashboard). The Analytics Service facilitates the exploration of large sets data—Big Data—without requiring knowledge, necessarily, of the particular type(s) of data and without requiring the user of the Analytics Service to do the low-level programming that performs the analysis. An example block diagram architecture of an Analytics Service 500 is shown in FIG. 5A, in the context of a portion of the system 100. More specifically, the Analytics Service 500 is one of a plurality of computer-implemented processes, each of which computer-implemented processes is associated with various software entities (e.g., computer-executable instructions and data stored on one or more tangible, non-transitory computer media). As will be described in detail below, the Analytics Service 500 interacts with the broader system 100 in large part via the data produced and/or stored by the various entities in the system 100.

As described above, the DDE User Interface Application is, in embodiments, a web-based application. FIG. 5A depicts an embodiment of the Analytics Service 500 implemented in such an embodiment; that is, with a web-based DDE User Interface Application. In its broadest sense, the Analytics Service 500 implemented in this manner includes client-side, server-side, and back-end computer-implemented processes. For instance, as depicted in FIG. 5A, the Analytics Service 500 includes a web client process 502, a web server process 504, an execution service process 506, and one or more job processes 508. The various processes 502, 504, 506, 508 may execute on one or more processors, in one or more workstations or servers, in one or more physical and/or geographical locations. That is to say, while an instance of the web client process 502 may be executing on a workstation remote from a server on which the web server process 504 is executing, another instance of the web client process 502 may be executing on the same server on which the web server process 504 is executing and, in fact, may be running on the same processor. As another example, the execution service process 506 may be running on a workstation in the confines of the process control environment, while the one or more job processes 508 may be executing on one or more processors of a distributed process environment (e.g., a server farm) located remotely from the process control environment. Simply put, the Analytics Service 500 is designed to be flexible enough that there is no requirement that the various processes 502, 504, 506, 508 are or are not executed on the same processor, workstation, bank of processors, in one or more virtual machines, and/or in the same physical or geographical location. Advantageously, the architecture facilitates not only remote access to data analytics provided by the Analytics Service 500, and the ability to utilize far-flung processor and computing resources to perform analytics, but also allows the Analytics Service 500 to consume and/or analyze data across multiple process plants, however disparate their geographical locations may be.

The web client process 502 operates according to principles not so different from what is generally understood, but in accordance with the description of the DDE User Interface Application described above. For instance, the web client process 502 includes a variety of software entities including, for instance: a viewing entity 510 which presents the user with the DDE User Interface Application (e.g., the canvas 245 and user controls 248a-n of the Data Analytics Studio 240, the Data Analytics Dashboard, etc.); a view model entity 512 which manages the transfer and translation of application data such as block state to a form that a user interface can utilized, and which generates a view that provides feedback from and/or that is otherwise indicative of the operation of an on-line data module; an application entity 514, which is the software entity (i.e., web-based application) downloaded to the web client process 502 and resident on the client workstation or device that the user uses to interact with the DDE User Interface Application; and a data services entity 516 that passes data to and from the DDE User Interface Application.

The data services entity 516 receives, for example, data returned from various jobs executed in response to the user inputs and requests. As described above, and in additional detail below, the DDE User Interface Application may request various analytics be run on data from the process control environment (and in some cases, being currently generated by the process control environment), either in an exploration mode (e.g., in the Data Analysis Studio) used to discover relationships between disparate data (or data of known relationships) or in a predictive mode (e.g., in the Dashboard) used to perform real-time (or near real time), continuous analysis to predict at least one value in the process control environment. As used herein, the phrase "real time" or "real-time" means "sufficiently contemporaneous so as to remain useful for adjusting or otherwise affecting the current operation of the process plant." When one or more blocks are placed on the canvas 245, for example, and one or more of those blocks are executed, the results of that execution may be returned to the application entity 514 via the data services entity 516 (e.g. using a web socket protocol connection from the web server process 504), and displayed to the user via the viewing entity 510.

At the same time, the data services entity 516 may communicate with the web server process 504 via other protocols (e.g., HTTP) to request and receive various types of information necessary to the operation of the application entity 514. As an example, when the application entity 514 is first executing, it may request and receive, via the data services entity 516 using the HTTP protocol, the latest block definitions 255 from the block definition library 252. Alternatively, the application entity 514 may initially receive only the categories and lists of available block definitions 255 and, when selected by a user, the application entity 514 may request and receive, via the data services entity 516 using the HTTP protocol, the specific block definition 255 selected by the user.

Turning now to the web server process 504, one or more server communication entities 518 communicate with the web client process 502. As described above, the communications between the server communication entity/entities, may implement protocols such as HTTP, HTTPS, and web socket protocols, though the particular protocols described should not be considered limiting, as any other protocol suitable for the application may be implemented. In addition to communicating with the web client process 502, the server communication entity 518 may receive data from one or more processes executing instructions (e.g., data analysis, data loading, data filtering, etc.) requested according to one or more blocks (i.e., diagrammatic programming elements) placed on the canvas 245. Data may be received from the processes via, e.g., a web socket (not shown) in the server communication entity 518, and communicated to the web client process 502, also via the web socket protocol.

A data services entity 520 provides to the web client process 502 data other than the data received from processes executing the instructions associated with the various blocks. For instance, the data services entity 520 may retrieve and communicate the block definitions 255 from the block definition library 252 to the application entity 514 and/or may communicate status information about the block execution from the execution service process 506 to the application entity 514, so that the status can be displayed by the viewing entity 510.

Figure 5B:
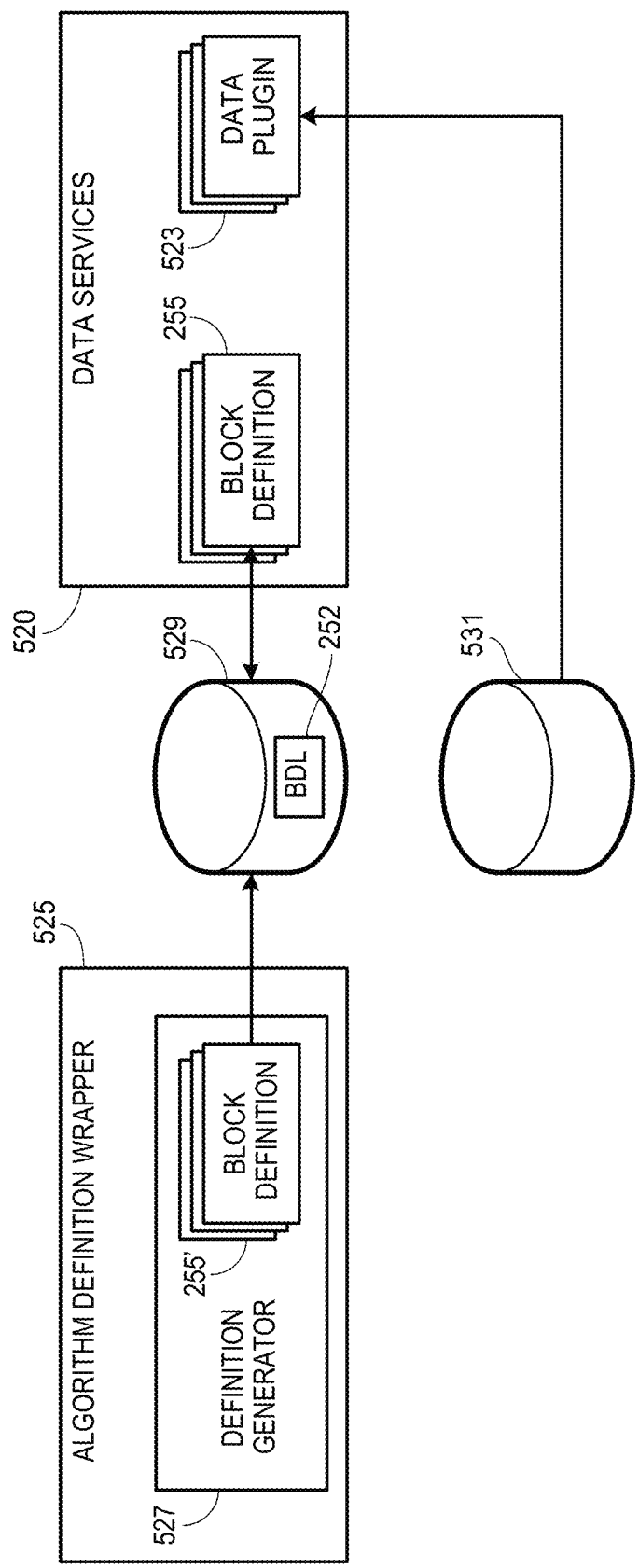
FIG. 5B depicts a block diagram illustrating in greater detail an example data services entity of the architecture depicted in FIG. 5A.

Turning to FIG. 5B, the data services entity 520 is depicted in greater detail. Specifically, the data services entity 520 includes a copy of (or pointers to) the block definitions 255 in the block definition library 252 and a set of data plugins 523. Each of the data plugins 523 is a set of computer-executable instructions that conforms to an interface that can be called from the application entity 514 to perform a specific task. Each of the plugins 523 is independent of the application entity 514 and is loaded by the application entity 514 when the application entity 514 encounters metadata specifying a plugin 523 to load. The plugins 523 may include logic specific to the application and/or operating environment in which Analytics Service 500 is operating. That is, the set of plugins 523 for a process control environment implementing the Analytics Service 500 may be different than a set of plugins for a financial service implementing the Analytics Service 500 (keeping in mind that the Analytics Service 500 facilitates the exploration of large sets data—Big Data—without requiring knowledge, necessarily, of the particular type(s) of data and without requiring the user of the Analytics Service 500 to do the low-level programming that performs the analysis) and may, in fact, be different than a set of plugins for a different process control environment implementing the Analytics Service 500.

The separation of the block definitions 255 from the application entity 514 allows the application entity 514 to use and deploy different block definitions depending on the requirements of the customer. Block definitions can be created, added, modified, and/or removed without affecting the underlying operation of the application entity 514, because the logic specific to the application and/or operating environment is not hard-coded into the application entity 514. By providing the plugins 523 and the block definitions 255 separately from the application entity 514, the application entity 514 can operate in a similar function regardless of the specific block definitions 255 and plugins 523 required for a particular application.

Referring again to FIG. 5A, as described above, the application entity 514 operates to facilitate the creation on the canvas 245 of offline diagrams, such as the offline diagram 340 of FIG. 4L. To create the offline diagram, the user selects one or more blocks to place on the canvas 245 (e.g., by dragging and dropping), and "wires" the blocks together so that data is communicated between the blocks. Each of the blocks is an instance of a template block stored as one of the block definitions 255 in the block definition library 252. When the user activates the user control 248*m*, the application entity 514 causes the viewing entity 510 to display available categories of block definitions 255 and/or available block definitions 255, from which the user may select a block to place on the canvas 245. In an embodiment, the block definition library 252 is stored in a memory device shared by one or both of the execution service process 506 or the web server process 504, and metadata of the block definition library 252 (e.g., block definition names, block definition categories, etc.) is transmitted to the application entity 514, with block definitions transmitted to the application entity 514 only when a block is selected to be placed on the canvas 245. Alternatively, the block definition library 252 is transmitted in its entirety to the application entity 514 when the application entity 514 is instantiated in the web client, and remains resident on the web client throughout the execution of the web client process 502. A master copy of the block definition library 252 may exist in a database (not shown) within the process control environment, in a cloud storage device accessible via the network, in a workstation, etc.

The block definitions 255 may be categorized according to the functionality of each block. While FIG. 5A depicts the block definitions 255 divided among each of several depicted categories 521, FIG. 5A is not intended to suggest that the block definitions 255 categorized into any particular category 521 are necessarily stored together, or are necessarily stored separately from other block definitions 255. While that may be the case in some embodiments, in other embodiments the block definitions 255 are not stored in any particular order but instead each may be tagged with metadata that may indicate the category in which the block definition belongs. The metadata for any given block definition 255 may also indicate, by way of example and not limitation, the number of inputs and outputs, the properties required for execution of the block, the UI control type for each property, when (i.e., under what circumstances) the control for each property is enabled/disabled, plugin information related to the properties, default values for the properties, etc.

Figure 5C:
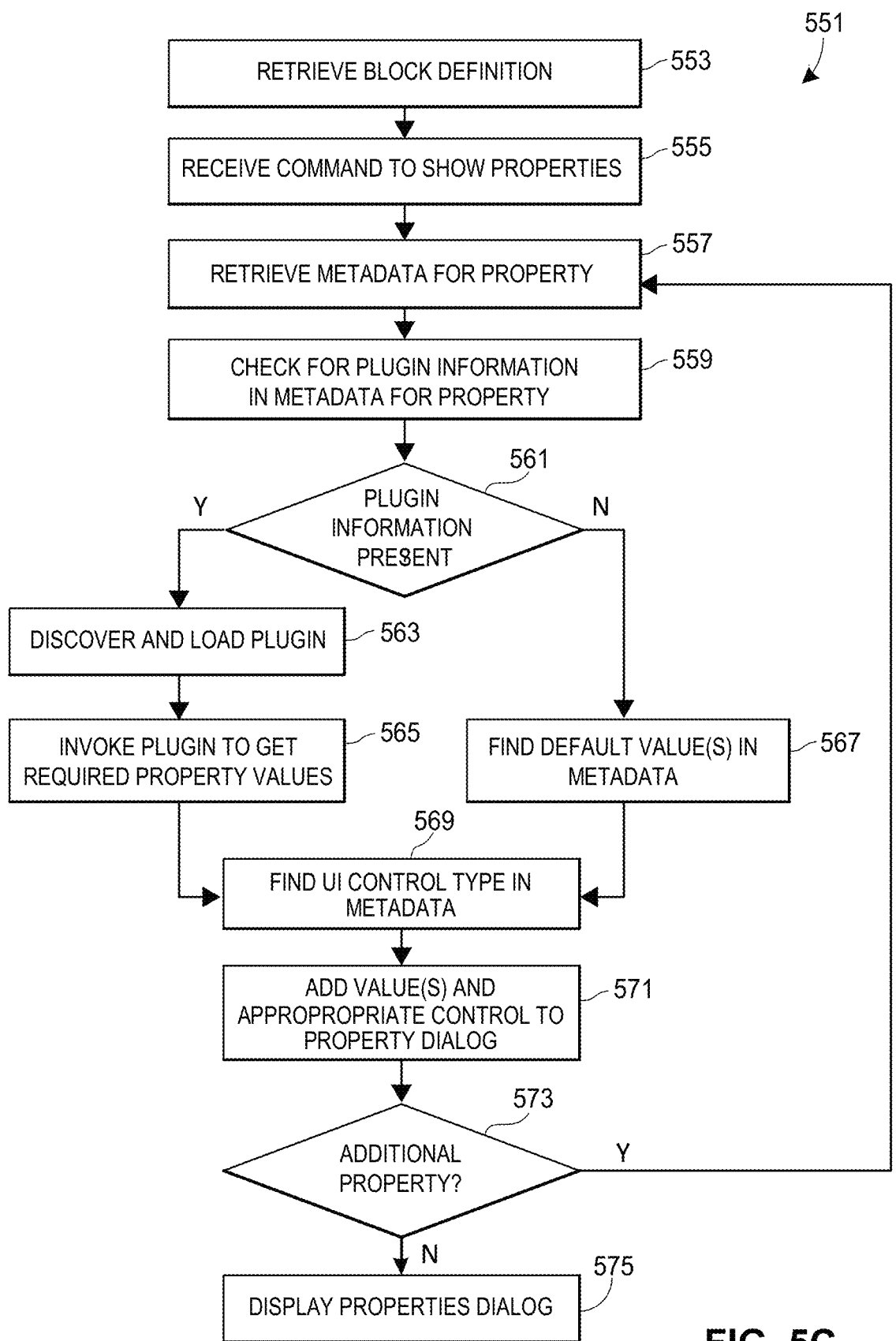
FIG. 5C depicts a flow chart illustrating a method for presenting a properties dialog for a block placed on a programming canvas according to a presently described embodiment.

In many, though not all embodiments, blocks include properties that may or must be specified before the block can be compiled and executed. Because the block definitions 255 are not built into the application entity 514, the values from which a user may select a property for a particular block cannot be predetermined and/or provided to the application entity 514 when the application entity 514 is instantiated. FIG. 5C is a flow chart depicting a method 551 for presenting a properties dialog for a block placed on the canvas 245. When the block is placed on the canvas 245, the application entity 514 retrieves the corresponding block definition 255 from the data services entity 520 or, in embodiments, from the database 529 (block 553). Thereafter, application entity 514 may receive a command to display the properties dialog for the block that was placed on the canvas 245 (block 555), for example, when the user double-clicks on the block.

When the application entity 514 receives the command to show the properties for the block (block 555), the application entity 514 parses the block definition property by property. For each property, the application entity 514 retrieves the metadata for the property (block 557), parsing the metadata for the property to look for plugin information (block 559). If, for the property, the application entity 514 finds plugin information (block 561), the application entity 514 discovers and loads the plugin specified (e.g., from the plugins 523 in the data services entity 520) (block 563). The application entity 514 invokes the plugin specified by the metadata for the property to get the required property values (block 565). If, on the other hand, the application entity 514 does not find plugin information for the property (block 561), then application entity 514 finds, in the metadata for the property, a default value or values for the property (block 567).

In any event, having invoked the plugin specified by the metadata for the property to get the property values (block 565) or found the default value or values for the property (block 567), the application entity 514 finds the UI control type (e.g., text box, drop down selection, radio button, check box, etc.) in the metadata for the property (block 569) and adds the value(s) and the control to a property dialog (block 571). If additional properties are present in the block definition (block 573), then the application entity 514 retrieves the metadata for the next property (block 557) and the method continues until there are no more additional properties (block 573). When no additional properties are found in the block definition, the application entity 514 displays the properties dialog (block 575) for the user to set the properties.

In some embodiments and/or for some block definitions 255, one or more first properties of the block may be displayed in an inactive or disabled state until one or more second properties of the block are configured. Upon configuration of the one or more second properties, the application entity 514 may re-execute one or more steps of the method 551 and/or may re-execute one or more of the plugins 523 associated with the first properties.

By way of example, suppose that a user places a "load" block on the canvas 245. The application entity 514 retrieves the block definition 255. In an embodiment, the block definition 255 for the load block provides the application entity 514 with metadata about the block and, in particular, indicates that the load block has three properties: a block name, a selected database (database name) and a selected data set (data set name) to pull from the selected database. When the property configuration dialog is triggered (e.g., by double clicking on the load block), the application entity 514 needs to determine what to display. The application entity 514 may determine that there is no plugin information in the metadata for the block name property, and instead finds a default value, for example, "load<##>." The application entity 514 may also find that the control type for the block name, indicated in the metadata for the block name property, specifies a text box. The application entity interprets the default value (e.g., "load01") and places it into the dialog as a text box.

The application entity 514, parsing the block definition, finds metadata for the database name property. Checking the metadata for the database name property, the application entity 514 finds plugin information for the property and, accordingly, discovers, loads, and invokes the specified plugin. The specified plugin, written for the particular application and/or operating environment (e.g., for a specific process control environment), is programmed to discover the list of database names (and associated locations) from which data sets may be loaded. Having received the list of database names, the application entity 514 parses the metadata for the database name property and determines that it should be displayed in a drop down selection control. The application entity 514 adds the drop down selection control to the property dialog with the list of database names returned by the plugin.

The application entity 514, parsing the block definition, finds metadata for the data set name property. The metadata for the data set name property specifies a plugin and indicates that the data set name property is a drop down selection control, but also indicates that the control must be disabled until the database name is selected by the user. Finding no further properties in the block definition for the load block, the application entity 514 displays the dialog. Once the user selects one of the database names from the database name drop down selection control, the application entity 514 knows (from the data block definition) to invoke the plugin specified in the metadata for the data set name property, passing the selected database name to the invoked plugin as an argument. The plugin returns the names of the data sets that are available in the selected database name, and populates the drop down selection control for the data set name property with the names of the available data sets, displaying the dialog again, this time with the control enabled rather than disabled. The user can then select the data set name to complete the configuration of the data block.

Of course, once a block is placed on the canvas 245, the block, after being configured to specify any required properties, may be executed (i.e., the programming instructions specified in the block definition may be executed) so that any downstream block (i.e., any block having an input to which the output of the block is "wired") will have valid input from which to produce a valid output. With reference to the off-line data diagram 340 shown in FIG. 4L, for example, the LoadDB4M block 342a must be evaluated or executed before the blocks Columns X 342b and Columns Y 342c can be configured, as the configuration of the blocks Columns X 342b and Columns Y 342c is based on user selections from the output of the LoadDB4M block 342a. On the other hand, and with additional reference to FIG. 4L, while the PLS4M_X_Y block 342d is able to be configured independently of the evaluations of blocks Columns X 342b and Columns Y 342c, the blocks Columns X 342b and Columns Y 342c must be evaluated before the PLS4M_X_Y block 342d can be evaluated based on the input data set loaded into the off-line data diagram 340.

The execution and evaluation of the blocks and/or modules is asynchronous. This allows the user to continue to modify the blocks or modules as they are being evaluated. For instance, the user may start the execution of one block, while continuing to edit and/or configure one or more other blocks. Advantageously, each block, being separately compilable and executable, can be evaluated, and the results explored, before selecting and/or configuring and/or executing a downstream block. As a result, a priori knowledge of the expected output of a particular block is not necessary, nor is it necessary even to know before seeing the results of any particular block what the next block in the data flow will be.

Any execution of an offline or online diagram involves the functionality of the execution service process 506 and job processes 508. In general, as described previously, the job processes 508 may execute on one or more processors on which the execution service process 506 and/or the web server process 506 are executing (which may or may not be the same processor(s)), on one or more processors on which the web client process 502 is executing, and/or on one or more separate processors, such as processors on a cloud computing platform and may execute on one or more virtual machines configured on one or more processors. Moreover, each job process 508 may execute in a different target environment, for example by executing each job process 508 in a dedicated virtual machine configured for the target environment. Each of the job processes 508 generally represents a portion of the code to be executed—in some instances, a particular job process 508 will execute the target script/code associated with a specific block, while in other instances, the instructions associated with a single block will be divided up into smaller scripts/code segments for execution in multiple job processes 508.

In particular, when instructions associated with a single block are divided up into small scripts/code segments for execution by different job processes, the different job processes may cooperate to accomplish some form of parallelization. As used herein, "parallel computing" is used to mean the general practice of dividing a task into smaller units and performing them in parallel; "multi-threaded processing" means the ability of a software program to run multiple threads (where resources are available); and "distributed computing" means the ability to spread processing across multiple physical or virtual machines. In principle, distributed computing can scale out without limit. In view of these concepts, it should be understood that executing instructions on a distributed platform is not the same as executing the instructions in a distributed mode; without explicit instructions supporting distributed processing, the instructions will execute locally.

The ability to parallelize a task is a property inherent in the definition of the task itself. Some tasks are easy to parallelize, because computations performed by each job process are independent of all other job processes, and the desired result set is a simple combination of the results from each job processes; we refer to these tasks "embarrassingly parallel."

Some tasks require more effort to parallelize. Specifically, such "linearly parallel" tasks are those in which computations performed by one job process are independent of computations performed by another job process, but the desired result set is a linear combination of the results from each job process. For example, a "mean computation" block may be defined by instructions that compute the mean of a set of values in a distributed database in which a single set of data is stored across multiple physical memory devices. As a more concrete example, suppose the mean computation block computes the mean temperature across a series of 300 bioreactors, each storing temperature data in a memory of an associated controller. The execution of the mean computation block can be parallelized by assigning a set of the temperature values for the 300 bioreactors to each of a plurality of job processes, and then computing the "grand" mean as the weighted mean of the means determined by each of the plurality of job processes.

Harder still to parallelize, are tasks in which the data must be organized in a meaningful way. "Data parallel" tasks are those in which computations performed by each job process are independent of all other job processes, as long as each job processes has the "correct" chuck of the data. This might include, for example, calculating an independent temperature mean for each of the same 300 bioreactors above (instead of a mean across all 300 of them), assuming that there are no cross-effects among the bioreactors. The task can be parallelized if each of the job processes has the temperature data for a single one of the bioreactors.

In order for such a task to be data parallel, however, the data must be organized in chunks that align with the task. This might be the case if each of the 300 bioreactors in the scenario above stores its temperature data in a single corresponding database or location. However, if the data for all 300 bioreactors were stored in a single database, and not organized in any way within the database, the data would require reorganization before any type of analysis could occur. The data reorganization may be handled, in the system described herein, by other blocks in the diagram constructed to perform the analysis (e.g., by data filtering block, querying blocks, etc.).

Creating and managing the job processes 508 and the parallelization and distribution of the job processes among various processors, is the responsibility of the execution service process 506. When a module or block is executed, regardless of whether the module or block is executed as part of an online diagram or an offline diagram, the configuration of the module or block is sent from the web server process 504 to the execution service process 506. In embodiments, the configuration is sent as a JSON (JavaScript Object Notation) file, however, the configuration file may utilize any data format that is suitable for language-independent, asynchronous browser/server communications. The configuration file includes native source code of the environment in which the analysis (or portion thereof) represented by the diagram 602 is to be executed, as well as values of environmental properties and variables that are required for its execution.

Because the block definitions do not require the blocks to be executed in any particular environment, the target environment being selected upon configuration of the block (or of the module that includes the block), new target environments may be added to those available in the Analytics Service, without having to rewrite the Application, the block definitions, or even stored or executing blocks and/or modules.

Similarly, new block definitions 255 may be added to the block definition library 252 at any time without affecting any of the previously built modules or changing any of the operation of the Analytics Service 500 as a whole or the application entity 514 in particular. With reference again to FIG. 5B, the creation and addition of new block definitions is accomplished, in embodiments, by an algorithm definition wrapper 525. In the algorithm definition wrapper 525, the user or developer may use a definition generator 527 to create a definition by developing an algorithm. The definition generator 527 generates definitions 255' and stores the definitions 255' in the block definition library 252, for example in a database 529. As will become clear in a later section of the description, each block definition 255 may have a corresponding data plugin 523, and the data plugins 523 may be stored in a location (e.g., a database 531) known to the Analytics Service 500. The data services entity 520 may retrieve the block definitions 255 and the data plugins 523 when the application entity 514 is initialized/instantiated and may provide them to the application entity 514.

Alternatively, rather than creating a new block definition, in some embodiments a user-defined block definition may have no associated algorithm, but instead may include a property into which the user may place the user's own code. That is, one of the block definitions 255 may allow a user to input the user's own algorithm into the block as a property.

As used herein, the terms "parameter" and "parameters" refer, respectively, to a property or properties of the block(s) and/or modules(s) that are included in the configuration file and passed as parameters to the execution service by way of the configuration file. Properties passed in the configuration file as parameters may include, by way of example, file paths, data set names, columns to be selected, confidence levels and numbers of components desired in results of PCA analyses, and any other information that is required by the compiler entities 526 to compile executable code and by the job processes 508 to execute the compiled instructions. That is, not all properties of a block or module are required for execution—some properties of a block or module, for instance, may specify or otherwise relate to how that block or module is displayed in the Data Analytics Studio, and have no effect on how the data are collected, manipulated, or processed/analyzed.

In an embodiment, the configuration file includes the definition of the block and/or module, and also any properties required for compiling and executing the block/module. In an alternate embodiment, the configuration file includes only an identification of the block and the required configuration parameters, and the block definition is retrieved from memory (e.g., from the block definition library 252). Regardless, the configuration parameters may vary according to the block definition. Some blocks may have zero configuration parameters, while others may have one, two, or many configuration parameters. Additionally, the configuration parameters may be required or optional. For example, a data load block (a block that loads a set of data) or a query block (a block that searches for specific data in a data set) may require a data path that specifies the location of the data to be loaded or queried. A column selection block, however, may have as a default selection "all columns" and thus may not require the specific, proactive configuration of a selection of a sub-set of columns.

Other parameters in the configuration file may include environmental parameters. The configuration file may include, by way of example and not limitation: an execution mode specifying, for example, whether the workflow or portion thereof is to be executed off-line or online; a target execution environment (e.g., Python, PySpark, Native Spark, etc.); whether the execution is to be local or distributed; the configuration of the distributed environment; an indication of the streaming data source to which the workflow or portion of the workflow is to be bound; an option to create a new job, or bind to and continue execution of a persistent job; an option to cache data across persistent jobs; an option to include in the execution of an online diagram a validation variable to for the purpose of evaluating the accuracy of the executing model; or other environmental variables.

The configuration of the block, module, and/or environmental parameters may occur in any of a variety of ways. As described above, for example, many parameters are passed to the configuration file according to properties set in the respective block or module. In building the diagram, it is often (though not always) necessary for a user to configure and execute a particular block before a downstream block can be configured and/or executed. This is the case where the user is using a first block to load data and a second, downstream block to select columns from the data—the load block must be configured (e.g., with a path from which to load the data, a selection of the data to load, etc.) before the load block can be executed, and must be executed before the columns available in the data are known to the second block so that a user can select the columns.

Alternatively or additionally, one or more parameters may be added to the configuration file upon request for execution of the block or module. This may be the case where a user does not specify one of the properties of the block or module, for instance. It may also be the case where one or more properties are programmed to be specified only upon a request for execution. In embodiments, for example, the Data Analytics Studio prompts a user to specify, when a block or module is selected for execution, a target environment for execution and/or a target processor or bank of processors on which to execute the block or module. Further, in some embodiments, one or more parameters in the configuration file may be passed from the Data Analytics Studio environment itself. Parameters such as preferred execution environments, limits on physical locations in which processing may/must take place (e.g., preventing or requiring cloud execution), and others may be specified in the application itself for all blocks/modules executed from within the application. These parameters may be passed to the configuration file upon a request for execution of any particular block or module.

In any event, referring still to FIG. 5A, a job listener entity 522 receives the execution request with the configuration file for the block(s) or module(s) to be executed, and creates one or more job manager entities 524, corresponding to the block(s) and/or modules(s) for which execution is requested. The job manager entities 524 receive the configuration file and, in accordance with the specified target execution environment, send the configuration file to one or more of the diagram compiler entities 526 to be compiled into instructions executable by the processor in the specified target environment. The diagram compiler entities 526 may be designed such that each of the diagram compiler entities 526 is operable to compile a configuration file into any of several specified target environments, or may be designed such that each of the diagram compiler entities 526 is operable to compile configuration files that specify just one specific target environment. In either event, the output of a job compiler entity 526 is computer-readable instructions executable by a processor in the specified target environment.

The job manager entity 524 that sent configuration file to the diagram compiler entity 526 sends the compiled output from the diagram compiler entity 526 to a job executor entity 528. The job executor entity 528 determines which resource(s) (e.g., processor resources) are available to execute the compiled output in accordance with the specified configuration parameters related to including the target environment for the job, whether the job should be distributed or not, whether the job should be local or remote, and any/or other variables including, but not limited to, the source(s) of the input data and the destination(s) for output data, and then creates a job process 508 using the identified resources. Each job process 508 executes compiled output in a particular target environment to implement a particular target algorithm (i.e., specified by the compiled instructions). In embodiments, some or all of the job processes 508 may be executed by big data analyzers 170 embedded in distributed data engines 150.

Thus, at least each of the following scenarios is possible in this flexible architecture: a single block or module executing as multiple job processes 508 in a distributed manner across multiple processors; a single block or module executing as multiple job processes 508 serially on a single processor; a single block or module executing as a single job process 508 on a single processor; multiple blocks executing as corresponding multiple job processes 508 in a distributed manner across multiple processors; etc. Moreover, while it is generally contemplated that job processes 508 corresponding to a single block or module will execute in the same target environment (e.g., Python, PySpark, etc.), there is no requirement that all processes for different blocks in a module, or different modules in a project, operate in a single target environment. In some instances, for example, a particular target environment may be better suited to accomplish the target algorithm associated with one block in a module, while other blocks in a module may be more efficiently executed in a different target environment and, so, the blocks may be configured to specify in the respective properties different target environments, with the end result being that the job processes 508 associated with the different blocks will be executed in different environments.

Further still, it is expected that in many instances the blocks associated with a particular module or project will be executed on job processes 508 that are all distributed or all local. However, it should be evident in view of the description above that efficiencies may be gained by executing one or more blocks of a module or project locally while other blocks of a module or project are executed on one or more remote processors (e.g., in a cloud computing environment). For example, consider a diagram in which a first block performs a query to retrieve specified data from a database (or other data storage) that is remotely located from the Analytics Service 500, and a second block performs an analysis on the data returned by query. It may be more efficient to create a job process 508 at a processor local to the database (e.g., in an embedded DDE at the database) to perform the query on the data local to the embedded DDE than it is to perform the query on a processor remote from the database. This may especially be the case when the database is in another geographical region, such as when a user queries data for a process control environment other than the one in which the user is currently sitting. The query results may then be analyzed according to the second block either in the same job process (and processor), in a different job process in the same processor, or in a different job process in a different processor (e.g., in a local processor).

The job executor entities 528 also keep track of the job processes 508, especially in distributed processing applications, and keep track of data dependencies. Thus, as each job process 508 completes, output data is returned to the job executor entities 528. The job executors 528 determine whether some or all of that data is passed to another job process 508 and/or passed back to the web server process 504 for display in the application entity 514 by the web client process 502. During execution of the job processes 508, the job executor entities 528 may receive status information that may be passed back to the web server process 504 for display in the application entity 514. The job processes 508 may also return predictive data to the job executor entities 528, particularly when a job process 508 is executing an online diagram (or a portion of an online diagram), which executes continuously until explicitly stopped. The predictive data may be returned to the job executor entities 528 as the predictive data is generated, and may be passed to the web server process 504 for display in the application entity 514, while keeping in mind that the predictive data may, at the same time, be written back to a location in the process control environment (e.g., a DDE storage location, a controller performing a control function, etc.) as a function of one of the blocks in the online diagram. In embodiments, status, state, and/or predictive data are passed between the job processes 508 and the job executor entities 528 by way of back channel streaming communication channels established during job creation to allow the job processes 508 to communicate with one another and/or with the job executor entities 528.

By way of the examples below, it will become apparent that, to some extent, the flow of data through the Analytics Service 500 is dependent on at least the precise blocks and/or modules configured, the properties configured for each of the blocks or modules, and whether the diagram being executed is an offline diagram or an online diagram.

Example 1—Creating an Offline Diagram

Figure 5D:
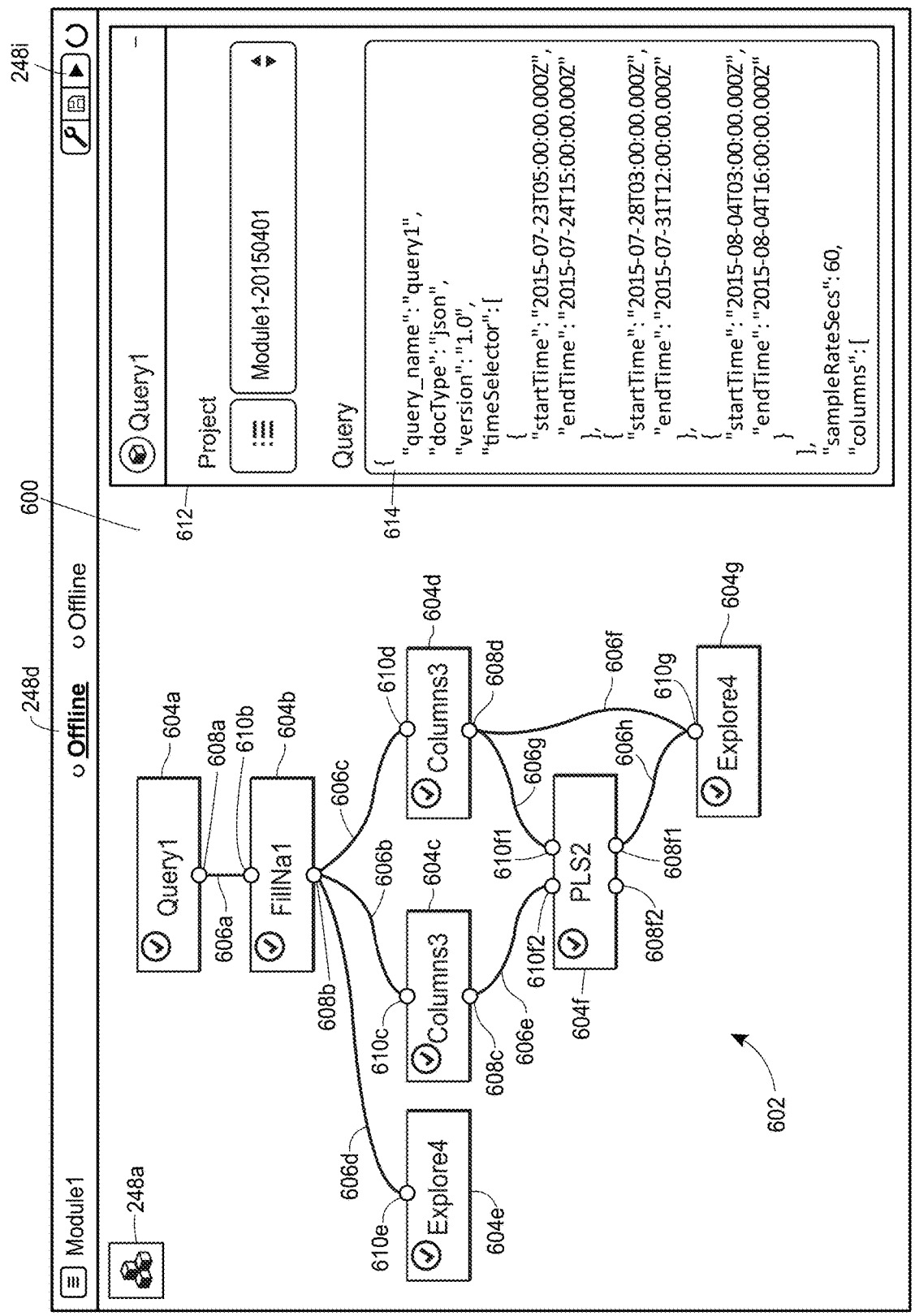
FIG. 5D depicts an example programming canvas on which an example offline diagram is configured on the programming canvas.

FIG. 5D is a diagram depicting an example canvas 600 having on it a configured offline diagram 602 that includes blocks 604a-604g and wires 606a-606h. With reference back to FIG. 5A, the canvas 600 would be displayed by the web client process 502 and, particularly, by the viewing entity 510 in cooperation with the application entity 514. The application entity 514 would receive the data (including the block definition library 252) via the data services entity 516, which would be in communication with the web server process 540 via the server communication entity 518.

Generally, there a couple of methods to construct the offline diagram 602 as pictured in FIG. 5D. First, a user could toggle the block definition toggle 248m to open the block definition library 252 (see FIG. 4D). From the block definition library 252, the user could select each of the blocks 604a-604g one at a time, and place the blocks 604a-604g onto the canvas 600. Next, the user could place the wires 606a-606h to connect the various blocks: placing the wire 606a between an output 608a of the block 604a and an input 610b of the block 604b, placing the wire 606b between an output 608b of the block 604b and an input 610c of the block 604c; placing the wire 606c between the output 608b of block 604b and an input 610d of block 604d; placing the wire 606d between the output 608b of the block 604b and an input 610e of the block 604e; placing the wire 606e between an output 608c of the block 604c and an input 610f/2 of the block 604f; placing the wire 606f between an output 608d of the block 604d and an input 610g of the block 604g; placing the wire 606g between the output 608d of the block 604d and an input 610f/1 of the block 604f; and placing the wire 606h between an output 608f/1 of the block 604f and the input 610g of the block 604g. After so placing the blocks 604a-604g and the wires 606a-606h, the offline diagram 602 would remain unconfigured.

Alternatively, the user could select and place the blocks 604a-604g one at a time, and configure the properties for each block 604a to 604g as each block is placed on the canvas 600, optionally (and in most instances) executing each of the blocks 604a-604g after the properties for the block are configured.

The user could configure each of the blocks 604a-604g one at a time (regardless of whether the blocks 604a-604g are placed and wired before configuration of the properties or are placed one at a time and the properties for each configured before the next block is placed), by clicking on the block and specifying in a block properties window 612 for the block the properties associated with the block. In the FIG. 5D, the block 604a—a query block—is selected and the block properties window 612 for the query block 604a is displayed. In the example canvas 600 depicted in FIG. 5D, the block properties window 612 for the query block 604a includes a query property input area 614, into which the user may enter a query. While the detailed description of the query language is reserved for discussion in a later section of the specification, it is sufficient for the current purpose to assume that the query entered into the query property input area 614 may specify a location of the data to be queried upon execution of the query block 604a. The block properties are stored as parameters in a configuration file associated with the block. The configuration file may be resident on the web client executing the web client process 502, or may be located on the web server executing the web server process 504.

Having configured the properties of the query block 604a, the user would typically execute the block 604a before placing the next downstream block and/or starting the configuration of the properties of the next downstream block (in this case, the block 604b). To execute the block 604a, the user would activate the evaluate user control 248i. Doing so would cause the configuration file associated with the block 604a to be transmitted to the execution server process 506 via the data services entity 520 of the web server process 504. The configuration file would be received, for example as a JSON file, by the execution server process 506 and the job listener entity 522 would create a job manager entity 524 to handle the execution request. The job manager entity 524 would engage the appropriate diagram compiler entity 526 to compile the configuration file into executable instructions (i.e., compiled query code) suitable for the target environment specified by the parameters in the configuration file. The diagram compiler entity 526 would return an output file comprising compiled code and might also return metadata indicating the target environment for which the compiled code is suited. (Alternatively, the job manager entity 524 may retain knowledge of the target environment during the compiling process.) The job manager entity 524 passes the output file to a job executor entity 528, which determines, in accordance with the parameters of the configuration file related to the target environment, whether the code should be executed locally or remotely, whether the code should be executed in a distributed system, etc., and selects and secures processor and memory resources on which to execute the instructions contained in the output file. The job executor entity 528 then creates the job process or job processes 508 to execute the output file.

When execution of the output file is complete (in the case of offline blocks or modules), or as results are available (for online modules), the results are returned to the job executor entity 528. Because, in this instance, there was no further execution pending (because the diagram is an offline diagram and the block that was just executed—the query block 604a—is the only block configured) the results are returned to the web server process 504 via the server communication entity 508, and ultimately to the application entity 514 on the web client process 502. The output data may include all of the data returned by the query, but may also include various statistical information (metadata) about the query data, such as (without limitation) mean values, standard deviations, and median values for each column of data returned by the query. The metadata and the result data are, in embodiments, stored separately from one another. This advantageously allows the user to review information about the resultant data without necessarily loading all of the resultant data, which could be time and/or resource (i.e. computer memory) intensive. The user may view the returned data and/or the metadata about the returned data by clicking the view block results control 212a (see FIG. 4A) on the block. The default view may include metadata for the results for each of the variables included in the results, and may allow the user to select one or more selected portions of the resultant data to load and, if desired, view (e.g., in graphs, charts, tables, etc.) without having to load all of the data. Additionally, the return of the results to the application entity 514 enables the configuration of the properties of the next downstream block (in this case the block 604b), to which the data and/or metadata are made available by virtue of the wire 606a.

It should be noted that execution of a block (e.g., the block 604a) may not in all instances be required to configure the next downstream block (e.g., the block 604b). Whether a block must be configured and/or executed before a downstream block can be configured and/or executed will be dependent on data dependencies as will be understood in view of the totality of the present disclosure.

It should also be noted that during execution, the job processes 508 are able to communicate with the various distributed data engines 150 to receive or access data stored in the big data storage 155. In instances in which a job process 508 is executing in an embedded big data analyzer 170, the big data analyzer 170 may be communicatively coupled—directly or via one or more big data request servicers 165—to the big data storage 155. Alternatively, in instances in which a job process 508 is executing in a processor that is not part of an embedded big data analyzer 170, the job process 508 may be communicatively coupled via a network to the DDEs and may request data via the big data request servicers 165.

Configuration of the properties of, and execution of, each of the blocks 604b-604g in the offline diagram 602 continues in the same manner, and need not be elaborated upon in great detail.

A. Using Offline Diagrams to Explore and Model

A user of the DDE User Interface Application working with an Offline diagram is generally looking to do one or both of two things: (1) explore various sets of data to seek out and discover relationships between various data sets and/or events; and (2) create models of those relationships with the goal of implementing real-time, continuous predictive capability. Accomplishing the latter generally requires some measure of time spent working on the former. That is, in many (though not all) instances, a user will explore data sets to find relationships between the data using various analysis tools (principal component analysis, Fourier analysis, regression analysis, etc.), and when a relationship is found that appears to have predictive value, the user will implement that analysis as a model and employ it in real-time, continuous analysis of the process.

In embodiments, the Analytics Service 500 may include tools that automatically conduct the analysis of data, whether real-time data or historized data or both, to discover anomalies, abnormal conditions in the process environment, relationships between data, and/or features of particular data sets. In an embodiment, the block definition library 252 includes a block 255 that looks at data and discovers and/or highlights anomalies, such as spikes or dips in the data that, in the context of the dataset being reviewed, are atypical. Such an anomaly discovery block in an offline diagram could receive as input historized data to look for features of the historized data that might be interesting to explore further using, for example, some of the techniques described above including PLS, PCA, and other types of analysis. Alternatively or additionally, an anomaly discovery block in an online diagram could receive both historized data and real-time data, and compare the historized data to the real-time data to look for anomalies in the real-time data relative to the historized data. In either case, the output of the anomaly discovery block could include one or more of the times at which the anomalous event occurred, the source or sources of the anomalous data (e.g., which measurement and/or device is associated with the anomaly), and the like.

In an embodiment, the block definition library 252 includes a block 255 that autonomously discovers relationships between various data. A relationship discovery block may select random or semi-random sets of data (aligned in time) and may run several different analyses on the sets of the data to look for relationships that may be interesting to a user, especially causal relationships or predictive relationships. Of course, truly random selection of sets of data would be unlikely to yield many useful results. However, the selection of the data sets could be governed by, for example, physical location, plant hierarchy, or other indicia that might suggest relationships between data may exist.

In some embodiments, the relationship discovery block may cooperate with the anomaly discovery block to discover relationships between data. As an example, the anomaly discovery block may output the times at which various anomalies occur in various data sets. The anomaly discovery block, in an embodiment, stores the times of anomalous events and, when events anomalous events occur in different data sets at the same time or closely spaced in time, one output of the anomaly discovery block may be a list of data sources that correspond to the data sets that experienced anomalous events in close temporal proximity to one another, and another output of the anomaly discovery block may be a list of times at which the anomalies occurred. The relationship discovery block may receive as inputs the outputs of the anomaly discovery block, and may load the relevant data sets for the relevant time periods, possibly with other data sets and/or larger time periods (e.g., extending for some greater time prior to and following the time at which the anomaly occurred), to apply various types of analysis to the data and seek causal or at least predictive relationships between the data.

Alternatively, one or more properties of a relationship discovery block may indicate a particular data set (e.g., values for a particular process variable) for which the user wishes to find relationships in the data. The relationship discovery block may autonomously seek relationships between other data—related by physical location, plant hierarchy, logical relationship, etc.—and the specified data set, performing different analyses on the data until one or more causal or predictive relationships are found that meet certain criteria (e.g., 95% predictive confidence, 0.75 correlation value, etc.).

Of course any automatic block, such as the relationship discovery block or the anomaly discovery block is contemplated as operable in an offline diagram or an online diagram.

In any event, typically, a user would create on the canvas 245 an offline diagram such as the diagram 602 on the canvas 600. The creation of the diagram would proceed generally as described above, with one or more blocks 604 being placed on the canvas 600 and the properties of each block 604 configured one block at a time, executing each block 604 before configuring the properties of the next. The user may look critically at the data at any point in the diagram by clicking on a data summary user control associated with the block 604 to see various statistics (e.g., means, medians, standard deviations, etc.) about the data in the block, or may connect to the output 608 of the block 604 (via a wire 606) a block for exploring the data (e.g., the block 604e of FIG. 5D). Assuming that the user has executed the blocks in the offline diagram up to and including the block to which the explore block is connected, the user will be able to use the explore block to view the data in various graphs, see metadata associated with the data, and the like. For example, in the offline diagram 602, the explore block 604e will allow the user to see the data after the data have been processed by the block 604b. Similarly, the explore block 604g receives the data from the PLS block 604f and from the Column block 604d. In the latter case, the explore block 604g may allow the user to visualize the output of the PLS model (which may include a predicted value of a variable) and compare the output with the actual values of that variable (from the block 604d) that were used to create the PLS model. The user may be able to determine, by looking at graphs of the data, whether the PLS model is accurately representing the process such that it has some predictive value in the process.

In embodiments, the data summary user control associated with a block 255 will be specific to the type and function of the block. A block that loads data (e.g., a query block or a load block), for example, may be programmed such that the data summary user control, when activated, causes the display of various statistical data characterizing the data loaded or returned by the query. The data might include, in embodiments, a mean, a median, a standard deviation, a maximum value, and a minimum value, for each data source included in the data. By contrast, a block that performs an analysis on data (e.g., a PLS or PCA analysis), may display different data when the data summary user control is activated. The analysis block may display one or more R-squared values, coefficients for PLS and/or PCA analysis, variance values, observation counts (e.g., how many time-series values were included for a particular data source), and customizable graphs that allow the user to select which data (i.e., from which data sources) to view. The explore block will also behave in different ways depending on the data output(s) to which its data input(s) is/are connected, in embodiments. That is, the formats and types of data displayed and/or available to be displayed in an explore block may depend on the types of blocks generating the inputs to the explore block.

With reference to FIG. 5D, the function of the offline diagram 602, which is merely one diagram configuration out of many possibilities, will now be described generically. The offline diagram 602 starts with the query block 604a, the purpose of which is to find a specific set of data and load it for analysis. The specific set of data may be, to provide just one example, historized process control data related to a particular process variable that exhibited an abnormal variation at three specific times. In general, however, the query block 604a may query any stored data, including without limitation, any data in the big data storage 155, any data stored and/or cached in one or more of the data sources 168, data stored in external data sources such as weather data sources, supply chain data sources, deliverable tracking data sources, etc. In embodiments, a database or document store (not depicted) stores documents (e.g., JSON documents) that describe online and/or offline diagrams associated with the Analytics Service, in which case the query block 604a may be configured to query that database or document store with respect to the types of calculations performed, the source or sources of the data used in the calculations, the quality of the results, etc. A query of the latter type may advantageously allow a history or knowledge base of the diagrams to be built. The query block 604a may be configured to select the values of that process variable and some number of other process variables, and may even be configured to select the sample rate and/or the values of the particular process variable and the other process variables only, for example, within a range of times corresponding to an hour before through an hour after each of the three events. That is, the query may select ranges of time that are disjoint, and find data produced during those time ranges for any number of variables, at least one of which is the one the user hopes to predict.

Once executed, the data retrieved by the query block 604a can be used by the Fill block 604b. In the example diagram 602, the Fill block 604b may fill in data for a variable corresponding to times at which the variable did not have a value, but one of the other variables did. That is, where one of the queried values is sampled at a rate more frequent than another, the Fill block 604b may insert values for the less-frequently sampled variable to match the frequency of the more-frequently sampled variable. In embodiments, the Fill block 604b may extrapolate the value of the less frequently sampled variable. For instance, if four values of the more-frequently sampled variable occur between samples of the less frequently sampled variable, the block 604b may find the difference between two consecutive values of the less-frequently sampled variable (e.g., 1.0 and 6.0), divide by four, and fill in the "missing" four values with consecutively larger or smaller values (e.g., 2.0, 3.0, 4.0, and 5.0) so that for every value of the more-frequently sampled variable, there is a corresponding value for the less-frequently sampled value. (Of course, this would not be a plausible method of filling values in a real-time analysis, as the later values would not yet be known.) In other embodiments, the Fill block 604b may simply fill in the "missing" values with the most recently sampled value for the less-frequently sampled value. In the example used above, the missing values would each be filled in with the value 1.0.

Having found the data and inserted values to create a set of data without missing values, the output of the Fill block 604b is provided to three blocks: the explore block 604e, a first column block 604c and a second column block 604d. The explore block 604e is described above. The first and second column blocks 604c and 604d operate, respectively, to pull variables (columns) out of the data. The data are stored in tables in which each column represents a variable, and the rows in each column represent values of the respective variable at different times (i.e., time series data). The first column block 604c may, for example, select all of the columns (i.e., all of the variables) that include the data for variables other than the process variable that exhibited the abnormal variation, while the second column block 604d may, for example, select the column that includes the data for the process variable that exhibited the abnormal variation.

The output of each of the column blocks 604c and 604d is sent to the PLS block 604f. The input 610/2 of the block 604f may be configured to accept the values of independent, explanatory, or input variables, in an embodiment, while the input 610/1 of the block 604f may be configured to accept the values of dependent, explained, or output variables. While a particular arrangement and/or function of the inputs to the model block (e.g., the PLS block 604f, in the offline diagram 602) is shown in the diagram 602, the arrangement and function of the inputs may be different depending on the function of the block, the types of inputs, the number of inputs, etc.

The output 608/1 of the block 604f is wired to the explore block 604g. The explore block 604f is therefore receiving the value output by the PLS block 604f and the values of the variable that exhibited the abnormal variation. The user, using the explore block 604g is able to see how the output of the block 604f compares to the dependent variable at any given time, and determine the predictive value. The output 608/2 of the block 604f, while not wired to any other block in FIG. 5D, is illustrative of a property of some of the blocks and wires. Specifically, the output 608/2 is an object output. The object output is operable to output code; in this instance, for example, the object output outputs the sensitivity model as programmed, including the model, the data, and the output. Of course, this means that a wire connected to the output 608/2 would necessarily be able to carry the model across the wire. Connecting the wire to the input of a new block could, for example, program the block with the entire diagram upstream to create a block that includes all of the functionality and data.

Thus, as should now be apparent, the user may iteratively revise the offline diagram 602 and explore the results to build a diagram that has the desired predictive value for a given variable. In so doing, the user may use different sets of data, different sub-sets of a same set of data, different modeling/analysis techniques, and the like. Put another way, the user may query or load different sets of data (e.g., replacing or modifying or adding to the block 604a in the offline diagram 602), may segment the data differently by trying to predict different variables (e.g., by changing with columns are selected in each of the blocks 604c and 604d), may try different types of analyses (PCA, PLS, etc.) and/or different properties for a particular analysis (e.g., by replacing or modifying the block 604f), etc.

In view of the example above, it will be clear that the DDE User Interface Application and attendant Analytical Services have advantageous utility in many systems in which vast amounts of data are collected. With respect to process control systems, process control environments have, relatively recently, expanded the amount of data collected and stored to include, in some instances, all data generated in the environment. Whereas past systems generated significant data, those systems used only a small portion of that data for process control, feeding it into process control algorithms and displaying some of it on operator workstations, for example; relatively little of the data was stored for later analysis and/or use. The value of a variable sampled once a second might, for example, be stored only once a minute to balance the need for post hoc analysis with the limits of storage and network capacity. Further, data that were stored were often compressed, resulting in less reliable data.

In contrast, current systems store much more of the data generated in the plant. In embodiments, such systems now store every variable value every time a sample is recorded, and may also store data never historized before, such as operator inputs, operator-to-operator messaging, video, etc. The DDE User Interface Application and the Analytic Services described herein cooperate to facilitate the exploration of all of that data in addition to other data (e.g., from other plants, weather data, etc.) and the discovery of relationships that may previously have gone unnoticed or been undiscoverable. As a result of discovering the relationships between various process values and the interactions of and between process values, plant engineers, operators, and maintenance personnel, can better design, build, operate, and maintain the process plants, which, in turn, leads to process plants that are cheaper, more efficient, easier to operate and maintain, produce better product, have fewer negative effects on the environment, and are safer for personnel and the surrounding community.

B. Creating an Online Diagram

Of course, one way that the discovered relationships may be employed toward the improved operation of the process is by using the discovered relationships to perform real-time continuous prediction. Specifically, having discovered in historical data of the process one or more relationships between process values or other data, such that one set of values can be used to predict another value or values (or the occurrence of some event(s)), the discovered relationship can be used to look at real-time data from the process to predict the same value or values (or the occurrence of the same event(s)). The DDE User Interface Application and the Analytic Services facilitate the use of the discovered relationships to perform predictive analysis, as described below.

The DDE User Interface Application includes functionality that allows it to convert an offline diagram (such as the offline diagram 602) to an online diagram (i.e., one using at least one real-time value to predict an aspect of plant operation). As described above, an online diagram differs from the offline diagrams in that it is bound to at least one real-time data source (rather than purely historized data), and provides a real-time, continuous predictive output, which can be viewed, stored, and/or used in a control algorithm to trigger alarms, alerts, and/or effect changes in the operation of the process plant.

As long as an offline diagram includes at least one model generating block, the user of the DDE User Interface Application can activate the Online toggle user control 248f, and the offline diagram will be converted to an online diagram automatically, and displayed on the canvas 245. With reference again to FIG. 5A, the conversion from offline diagram to online diagram is accomplished, in embodiments, by way of a diagram transformer entity 530 in the web server process 504.

In its simplest embodiment, the diagram transformer entity 530 locates the model generating block (e.g., the PLS block 604f in the offline diagram 602), removes any output wires (e.g., the wire 606h), adds a write block, and connects a wire between the output of the model generating block and the input of the write block. The write block generally write the values output from the model to a data storage location, a process control algorithm (e.g., executing a control algorithm in a controller or in a function block in a process control device), and/or to the Dashboard. The diagram transformer entity 530 also replaces the offline data loading block with a corresponding online data loading block that, rather than loading a batch of historized data, binds to at least one real-time data source from the process control environment.

In various other embodiments, however, the diagram transformer entity 530 is operable to do more than merely replacing two blocks in the offline diagram. In some embodiments, the diagram transformer entity 530 actively removes blocks from the offline diagram to create the online diagram. For example, if a model block requires two inputs in order to create a model (e.g., a series of X variables and a Y variable), the two inputs would be generated at different blocks. However, if the model only has one input when implementing the developed model (i.e., in the online diagram), then the block previously providing data to the other input is no longer necessary and can be removed. As another example, the diagram transformer entity 530 may remove explore blocks (e.g., the explore block 604e of FIG. 5D) when creating the online diagram.

In some embodiments, the diagram transformer 530 may reference a schema library (not shown) that provides offline and online schemas for each block type, which schemas define what inputs and outputs are associated with the online and offline version of the block, what data source(s) it accesses, and the like. In alternate embodiments, each block definition 255 in the block definition library 252 defines both the online and offline schemas for the block.

In some embodiments, the diagram transformer entity 530 can be configured to perform or not perform optional operations during the transformation of an offline diagram to an online diagram. For instance, some of the optional operations may include, without limitation, tagging the predicted value so that it can be used as an input to a process control algorithm, outputting a continuous graph of the predicted value on the Dashboard, and writing the predicted value to distributed data engine. In some cases, the at least some of the output generated by the diagram transformer entity 530 may be provided for analytics and/or control system visualizations (such as faceplates, Trendicons, etc.).

The real-time sources to which the data loading blocks (load, query, etc.) bind, the location(s) to which the output of the model block posts, and/or the virtual tags associated with the output data, are also each configurable, in embodiments, to the extent that a given embodiment implements each option. In embodiments each is configured in the environment of the application entity 514 resident in the web client process 502, for example, as a module property and/or a block property. For example, the module properties for a module may include a data posting location, and a real-time data binding location, as generally depicted in FIG. 5F. In FIG. 5F, a module properties dialog 630 is displayed for the module when a user activates a module properties control 632. The module properties dialog 630 includes a module name field 634, which allows the user to input a name for the module. The module properties dialog 630 also includes a Post field 636 that allows a user to specify where data that are output by the online diagram during execution are to be written (i.e., posted). The location to which the data is posted can be a storage location in which the data is historized, a control module in the process control environment that uses the posted values as inputs to a control algorithm to control the operation of the process plant, or both. A user control 636a may open an explorer window that allows the user to select the location to which the data will be posted, by viewing available locations in a graphical format (e.g., in a tree format, a directory structure, a list of optional locations, etc.). Similarly, a field 638 allows the user to specify a data path to bind to as a source of online data during execution of the online diagram. A user control 638a similarly opens an explorer window that allows the user to select the location from which the data will be received.

Alternatively, the offline block may include a property related to the offline version of the block and the online version of the block may include a similar property for the online version of the block. For instance, a load block may have a "source path" (e.g., \DDE_path\device_tag) property in the offline version of the block, but may have a "device tag" (e.g., \unit1\device_tag) property in the online version of the block, which allows the load block to read real-time data from the source corresponding to the data stored at the source path of the offline block. Likewise, a write block in the online diagram may have a property that specifies the location to which the output data should be written.

Figure 5E:
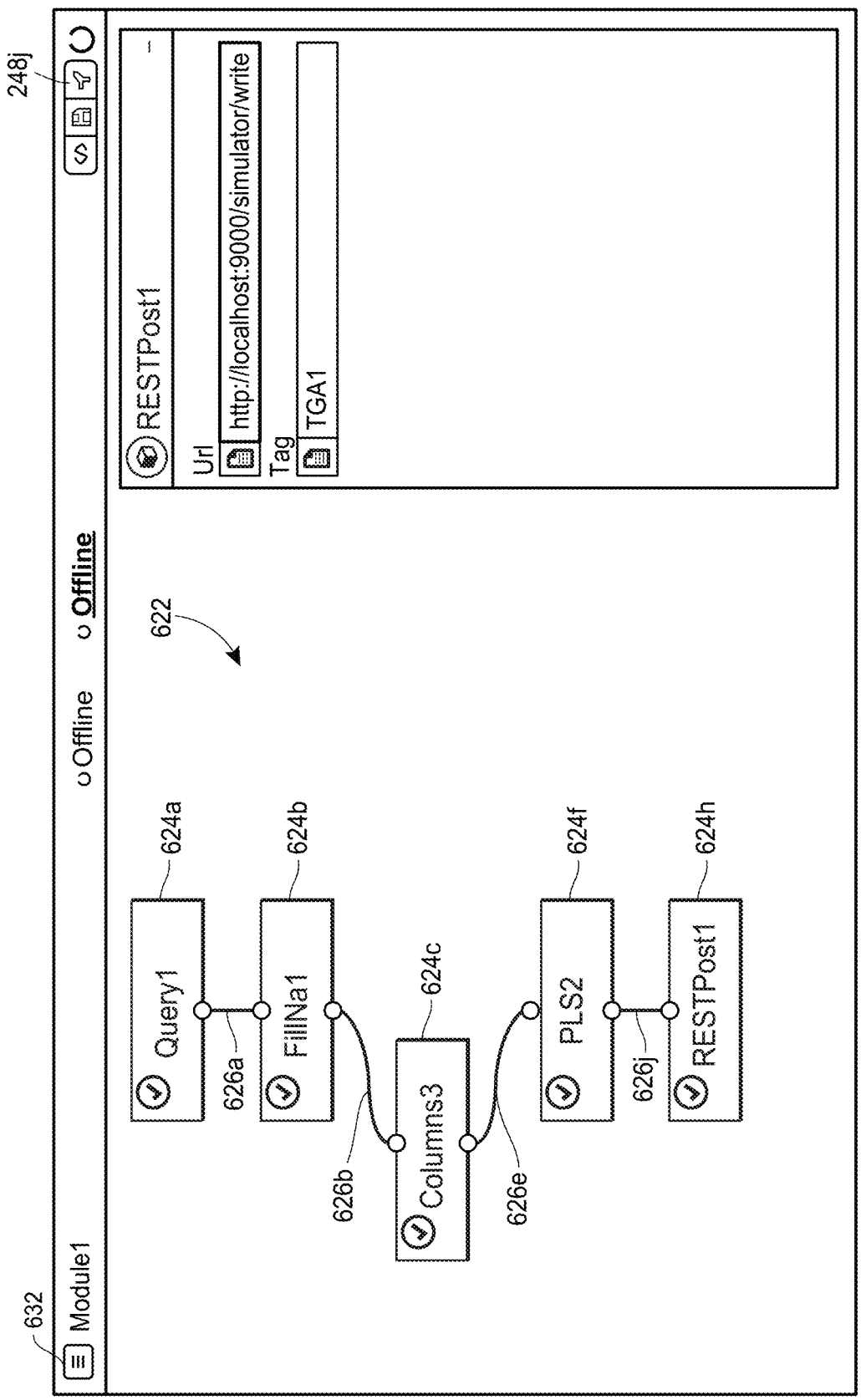
FIG. 5E depicts an example online diagram corresponding to the offline diagram of FIG. 5D.
Figure 5F:
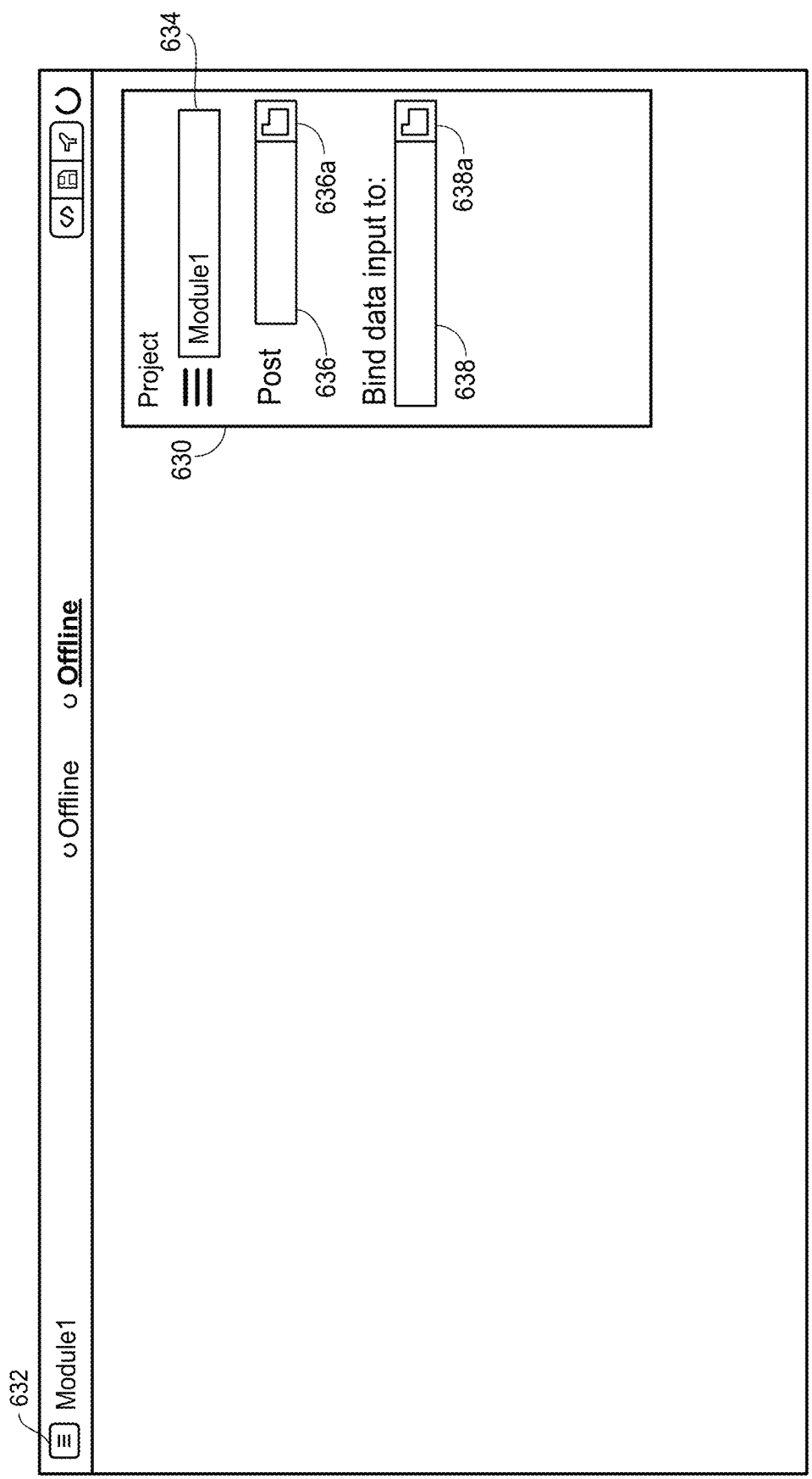
FIG. 5F depicts an example properties dialog for a module.
Figure 5G:
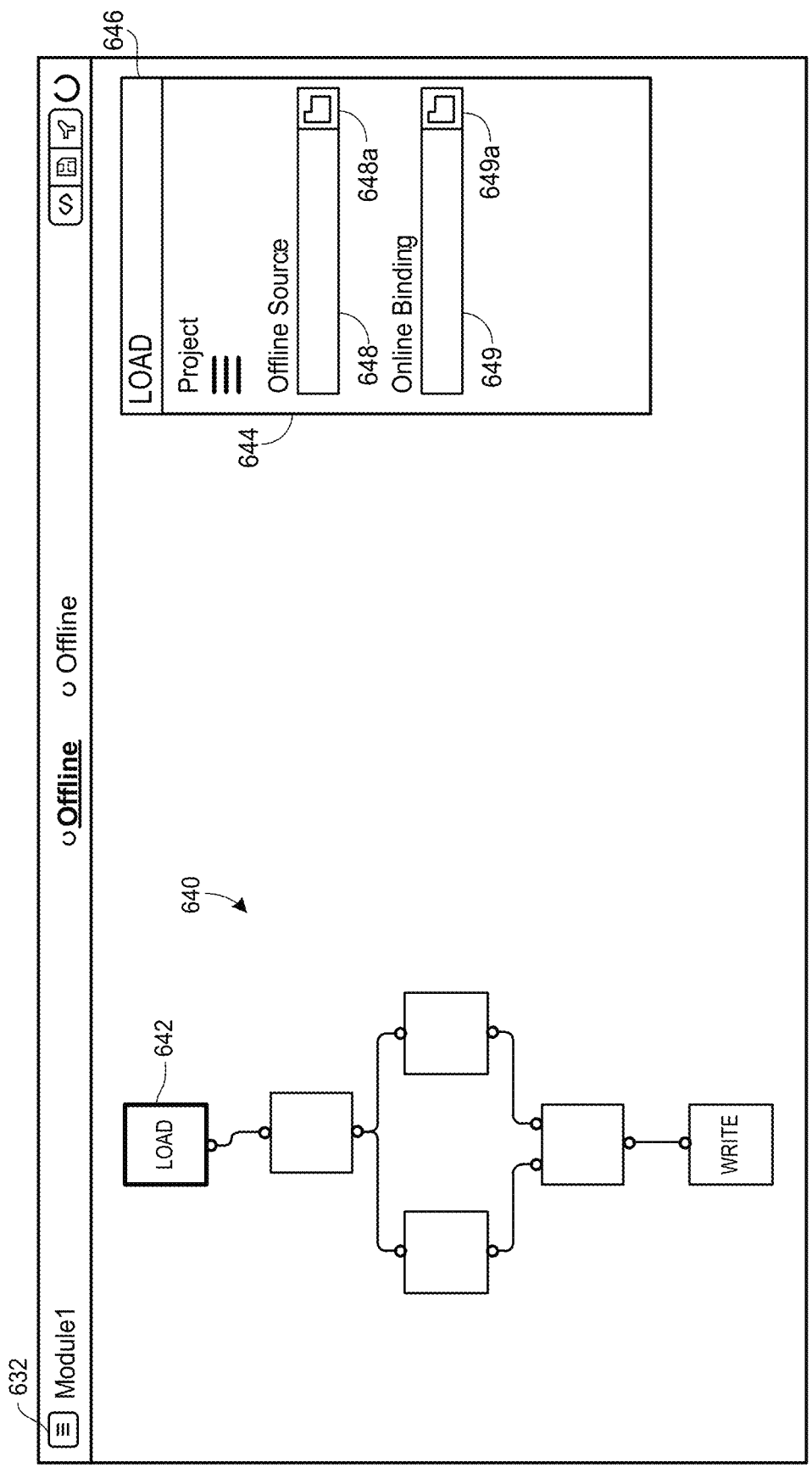
FIG. 5G depicts an example properties dialog for a block of an offline module, in which the properties relate to both offline and online operation.

As still another alternative, this time with reference to FIG. 5G, blocks in an offline diagram 640 may each have configuration for both offline and online operation. As an example, a load block 642 may be selected and may have an associated block properties dialog 644. The block properties dialog 644 includes a block name field 646, which allows the user to input a name for the block. The block properties dialog 644 also includes an offline source field 648 that allows a user to specify where data that are to be loaded in the offline diagram are found. The location in which the data to be loaded is stored can be a storage location in which the data is historized, for example. A user control 648*a* may open an explorer window that allows the user to select the location from which the data will be loaded, by viewing available locations in a graphical format (e.g., in a tree format, a directory structure, a list of optional locations, etc.). Similarly, a field 649 allows the user to specify a data path to bind to as a source of online data during execution of the online diagram. A user control 649*a* similarly opens an explorer window that allows the user to select the location from which the data will be received. Of course the controls 648, 648*a*, 649, 649*a* can be any control specified in the block definition and may invoke the execution of appropriate plugins as previously described.

In embodiments, the relationships between paths to stored, historized data from which an offline block would retrieve/query data, on the one hand, and a corresponding source of real-time data to which an online block can be bound, on the other hand, is managed by a data source manager module 532. The data source manager module 532 may be integrated as part of the web server process 502, may be included as part of the diagram transformer entity 530, or may simply be a lookup table that the diagram transformer entity 530 references when transforming an offline diagram to an online diagram. In at least some embodiments, the data source manager module 532 cooperates with the big data request servicers 165 to set up a stream of real-time data in accordance with the requirements of an online block.

FIG. 5E depicts an online diagram 622 corresponding to the offline diagram 602 of FIG. 5D. The online diagram 622 includes blocks 624*a*, 624*b*, 624*c*, 624*f*, and 624*h*, and wires 626*a*, 626*b*, 626*e*, and 626*j*. Where the blocks and/or wires correspond to those in the offline diagram 602, the letters associated with the blocks are the same.

The operation and execution of the online diagram 622 proceeds in generally the same way as that of the offline diagram 602, described above. The online diagram 622, once all of the properties are configured (and the associated parameters stored in the configuration file(s)), can be "deployed" by engaging the deploy user interface control 248*j*. Activating the control 248*j* will send the configuration file to the execution service process 506, where it will be compiled according to the parameters in the configuration file. When executed as one or more job processes 508, however, instead of downloading or querying data from the big data storage 155 via the data analytics network interface 175, the job processes 508 will receive real-time data from the big data receivers, for example, or directly through a stream that is set up by one of the big data request servicers 165. Also, rather than sending output data back to the job executors 528 to send only to the application entity 514 via the server communication entity 518 of the web server process 504 for display on the dashboard, the job processes 508 may post output data back to the big data storage 155 and/or to one or more of the data sources (e.g., controllers, other DDEs, etc.).

Query Language for Industrial Performance Monitoring/Analytics

The data sources associated with a process control system or environment on which the industrial performance monitoring/analytics system 100 operates typically provide time series data, although other types of data may be used (e.g., cross-sectional data from a plurality of batches separately executed in one or more process plants 5). Time series data may include various types of data measurements from various types of measurement devices within the process plant 5, including the field devices 15-22 and 40-46. The data sources may vary in their format over a wide range from commonly known to proprietary formats, e.g., OSISoft PI, DeltaV Historian, SEEQ, FF3, and/or manually captured formats in spreadsheets. Some data sources may include relational databases, while other data sources may include non-relational (NoSQL) databases. Still further data sources may not be databases, instead using file directories or text within a document (e.g., an XML document) to store data. In addition to differences in query syntax, the variety of data sources may require fundamentally distinct query structures because of differences in how data is stored. For example, document oriented non-relational databases such as Mongo store data based upon documents, rather than in tables accessible through SQL queries in relational databases such as MySQL. Thus, queries for data stored in different types of data sources employ distinct structures and rules, in addition to formatting and syntactic differences. Rather than using each of the various data sources' native query mechanisms to access the data stored therein, the industrial performance monitoring/analytics systems and techniques described herein (and, in particular, the DDE User Interface Application) utilizes a standardized query to interface with each of the data sources 702*a*-702*f*, as is shown in FIG. 6A.

Figure 6A:
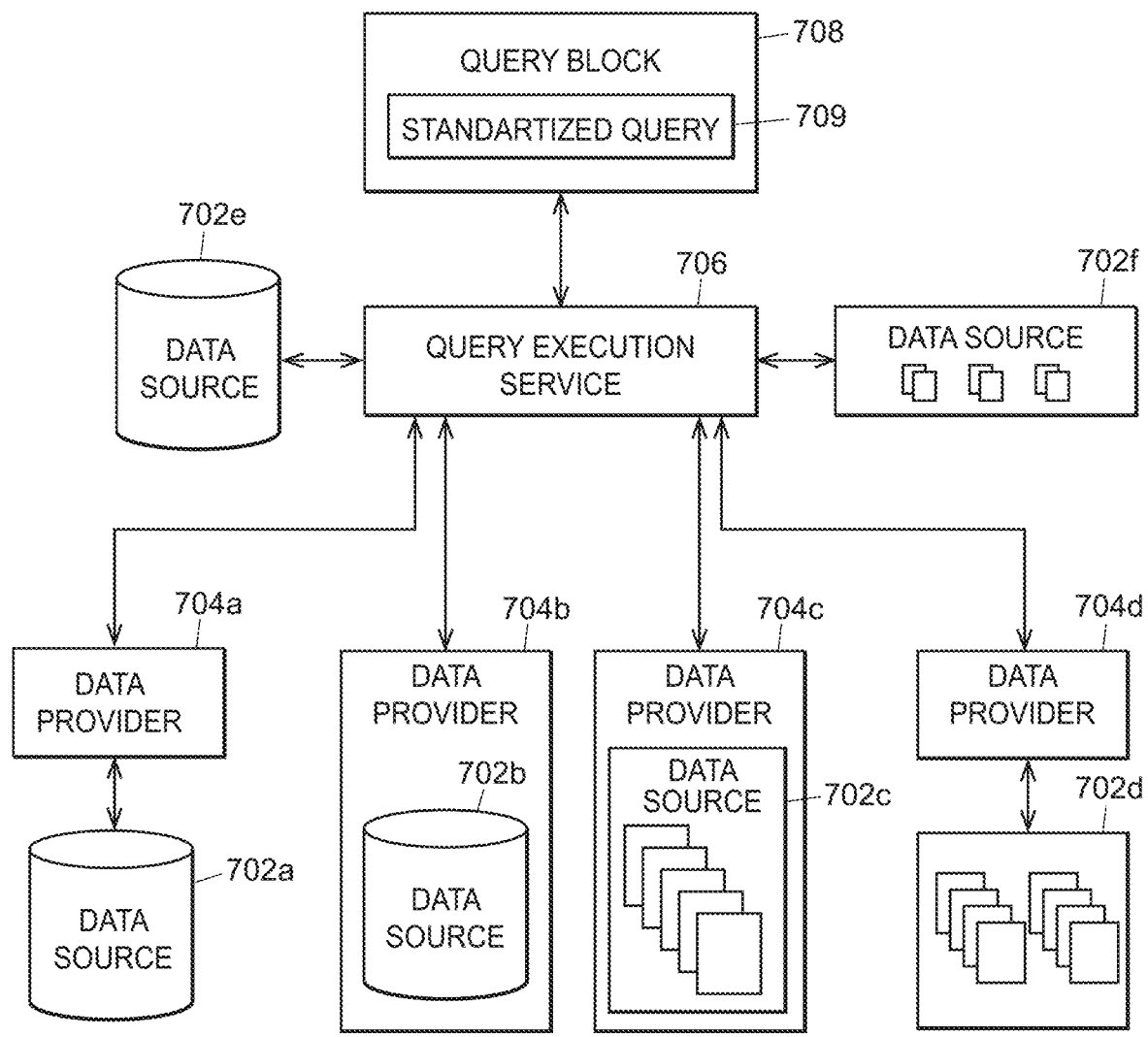
FIG. 6A depicts a block diagram of an example analytical query system.

FIG. 6A illustrates a block diagram showing various data sources 702*a*-702*f* and data providers 704*a*-704*d* communicatively connected to a query block 708 of the DDE User Interface Application via a query execution service 706. Each of the data sources 702*a*-702*f* is an electronic data source, storing data in a computer-readable format. Some data sources 702*e* and 702*f* may interface with the query execution service 706 without an intervening data provider 704, such as through an internal or network data connection. Other data sources 702*a*-702*d* interface with the query execution service 706 via one or more data source provider 704*a*-704*d*. The data providers 704*a*-704*d* may be configured to access, search, sort, read, and/or write data to or from the respective data sources 702*a*-702*d*. In some embodiments, the data providers 704*a*-704*d* may receive data source-specific queries that utilize the respective data source-specific query formats of the data sources 702*a*-702*d*. In other embodiments, the data source providers 704*a*-704*d* may be configured to receive a standardized query 709 using a customized query language from the query block 708 and convert the standardized query into a respective data source-specific query format utilizing the particular query mechanisms of the target data sources 702*a*-702*d*. The data providers 704*a*-704*d* or the data sources 702*e*-702*f* may include an execution engine (not shown) that processes and executes data source-specific queries for a specific data source 702. The execution engine may be part of the data source 702 itself, or it may be part of the data provider 704 associated with the data source 702 (e.g., the data provider 704*b* associated with data source 702*b*). Each data source 702 may be a database or document store, such as a document store including a plurality of JavaScript Object Notation (JSON) files containing data. In some embodiments, the data sources 702*a*-702*f* may even include live data sources, such as data streams generated by the field devices 15-22 and 40-46 of the process plant 5. Such live data sources may be queried by parsing data obtained and retaining or extracting only the portion of the data specifically requested.

The data sources 702*a*-702*f* may be configured to store data in any known or hereafter developed format. Data sources 702*a*, 702*b*, and 702*e* are shown as databases to represent data stored in relational databases. Examples of such relational databases include MySQL or other databases storing data in tables and utilizing SQL-formatted querying of the data. Data sources 702*c*, 702*d*, and 702*f* are shown as collections of files or data entries to represent non-relational data stores, such as NoSQL databases or non-database data sources. Examples of non-relational databases include document-oriented databases such as MongoDB or CouchDB that store data based upon documents, rather than tables. Because storing or searching extremely large data or complex data sets may be more efficient using non-relational databases, such databases are frequently used for big data analysis. Querying such non-relational databases requires different techniques and different syntax, however, as the data in such non-relational databases is not generally arranged in a tabular format (which forms the basis of SQL databases). Because SQL querying is widely used and well known, it is also frequently used for data storage and analysis. By using a standardized query format for the standardized query 709 that is converted into a data source-specific query that utilizes a data source-specific format, the invention disclosed herein allows a user to access data in SQL or NoSQL databases with the same query format. The standardized query format further allows data from multiple different types of data sources 702 to be combined into one data set having a consistent data structure and format. Thus, the query block 708 may serve as a super-connector, connecting data sources 702 having different data structures, formats, and query mechanisms using standardized queries 709.

The query block 708 may be a block implemented within the Data Analytics Studio, as discussed above, to specify data to be obtained from the data sources 702*a*-702*f*. For example, the query block 708 may be a configuration file having one or more block properties, including a property specifying the standardized query 709. The standardized query 709 may be a separate file (such as a JavaScript Object Notation file) referenced by the query block 708. The query block 708 may alternatively be any object containing or indicating the standardized query 709, such as a process or routine operating within any of the Distributed Data Engines 150. The query block 708 receives the standardized query 709 (such as by user selection or input), and the standardized query 709 utilizes a standardized query format. By utilizing a standardized query format, the data sources 702*a*-702*f* may be queried without the user, technician, or data requesting entity requiring knowledge of the particular types or structures of data in the data sources 702*a*-702*f*. The standardized query format may be either an existing query format utilized by some data sources or a different query format that is not directly utilized by any data sources. In the latter case, standardized queries utilizing the syntax of the standardized query format are not directly executable or implementable to obtain data from the data sources 702*a*-702*f*. The standardized query may specify one or more of the data sources 702*a*-702*f* (or one or more of the data providers 704*a*-704*d*) from which the data is to be obtained. Alternatively, the query block 708 may include a property specifying one or more of the data sources 702*a*-702*f*.

The query execution service 706 receives the standardized query 709 from the query block 708 and causes one or more of the data sources 702*a*-702*f* to be queried. Receiving the standardized query 709 from the query block 708 may include receiving a file containing query parameters indicating the data to be obtained from the data sources 702*a*-702*f*. Causing the data sources 702*a*-702*f* to be queried may include extracting the query parameters and generating one or more data source-specific queries based upon the query parameters. Each data source-specific query may then be executed by the execution service 706 or sent to the data sources 702*e*-702*f* or data providers 704*a*-704*d* to be executed to obtain the data indicated by the query parameters. Such query parameter may indicate specific data to be obtained from one or more data sources 702, which may be measured data (such as measurements from field devices 15-22 and 40-46), metrics calculated or otherwise derived from measured data, and/or metadata regarding the data sources 702 or the data stored therein. For example, such metadata may include indications of types, sources, or quality of data stored in a data source 702, including types of calculations performed on the data. Such metadata may be useful in developing process models or a knowledge base from the data sources 702 of the system.

The query execution service 706 may be the execution service process 506 discussed above. The query execution service 706 may include any of the components of the analytics service 500, including the data services 520, the job listener 522, the job managers 524, the job executors 528, or the data source manager 532. For example, the query block 708 may be created by the application 514 with input from a user, including the standardized query 709 stored in a JSON file. Upon receiving a user request or other triggering event, the application 514 may cause the standardized query 709 to be communicated from or through the web server process 504 to the job listener 522 of the execution service process 506 (which execution service process 506 may serve as the execution service 706). The job listener 522 may cause the standardized query 709 to be received by one or more job managers 524, which may further cause one or more job executors 528 to convert the standardized query 709 into one or more data source-specific queries associated with one or more job processes 508. The job processes 508 may then cause the one or more data sources 702 (i.e., the data sources 168 or big data storage 155) to be queried using the data source-specific queries. The data obtained by querying the one or more data sources 702 may then be received by the job processes 508, the execution service process 506, the data services 520, and/or the application 514.

In some embodiments, the query execution service 706 converts the standardized query 709 into data source-specific queries that utilize data source-specific formats native to the data sources 702*e* or 702*f*. In alternative embodiments, the query execution service 706 may determine one or more data sources 702*a*-702*f* to query and may provide the standardized query 709 to one or more data providers 704*a*-704*d* to be converted into data source-specific queries. The data providers 704 may be separate from the data sources 702 or may be combined with the data sources 702. Data providers 704*a* and 704*d* are shown as being communicatively connected to data sources 702*a* and 702*d*, respectively, but are nonetheless separate. In contrast, data providers 704*b* and 704*c* are shown as containing or being combined with the data sources 702*b* and 702*c*, respectively. For example, the data provider 704*b* may be a server (such as a data historian) or a database interface program on which the data source 720*b* is stored as a database. As another example, the data provider 704*a* may similarly be a server or database interface program that is connected to an external data source 702*a*, such as a database stored in an external memory device communicatively connected to the server. As yet another example, the data providers 704*a*-704*d* may be job processes 508 that include algorithms to convert the standardized query 709 into data source-specific queries when they receive the standardized query 709 or query parameters from the standardized query 709 from the query execution service 706.

Figure 6B:
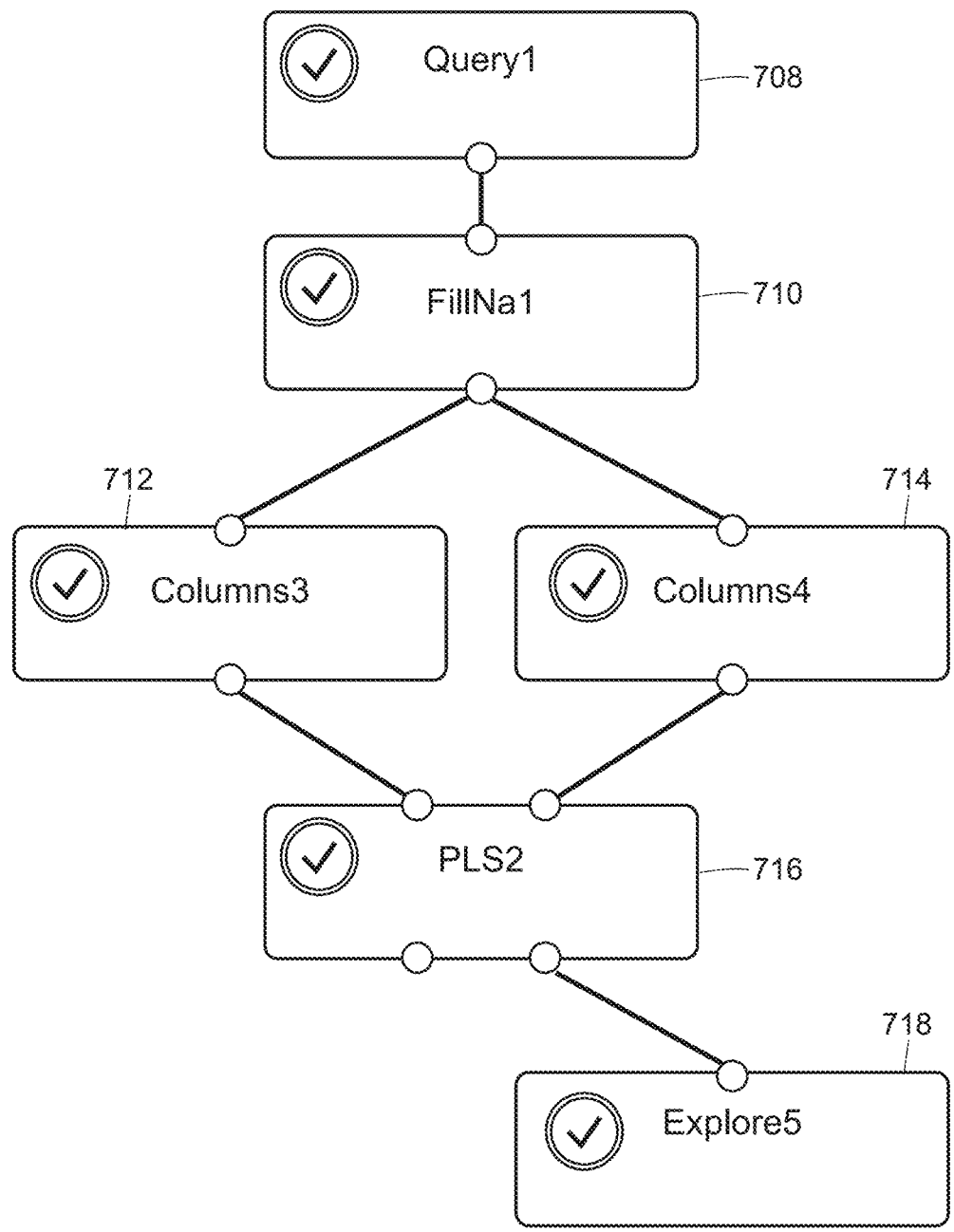
FIG. 6B depicts a block diagram of an example analysis configuration using a standardized query.

To illustrate the use of standardized queries in process control and analysis, FIG. 6B illustrates a block diagram of the query block 708 in the Data Analytics Studio. The query block 708 is associated with the standardized query 709 that obtains process data from one or more data sources 702*a*-702*f*. For example, a user may define the standardized query 709 in the standardized query format into a field of the query block 708. The standardized query 709 may be stored together with the query block 708, or it may be stored in a separate file. For example, the query block 708 may be a configuration file that includes a query property storing an identifier of a JSON-formatted file containing the standardized query 709. Upon the occurrence of an event (such as the occurrence of a time, a process control state, or a user selection), the standardized query 709 may be identified from the query block 708 and sent to the query execution service 706 to obtain the requested data from one or more of the data sources 702*a*-702*f*. The data indicated by the standardized query 709 or information related to such data (e.g., summary information, validation metadata, etc.) may be returned to the query block 708 or to another data receiving entity. Such other data receiving entity may include another block in the Data Analytics Studio, a job process 508, the query execution service 706, data services 520, the application 514, a program memory, or any other service, routine, process, or device that may further analyze, present, or store data associated with the process plant 5. As discussed above, the process data may be obtained via one or more data providers 704 in some embodiments. The obtained data may be received at the query block 708, the query execution service 706, or other data receiving entity in the desired format or may be formatted by the query block 708, the query execution service 706, or other data receiving entity. For example, the query execution service 706 may generate a data frame by causing the standardized query 709 to be converted into one or more data source-specific queries and the results of such source-specific queries to be formatted in a desired manner. Such formatted data frames may, in some embodiments, be returned to the query block 708. The data obtained from the one or more data sources 702 may include a plurality of data points retrieved by the data source-specific query, which data points may correspond to process variables, such as measurements within the process plant 5 or values derived from such measurements. Such data points may represent points in a time series, having time stamps associated with each point. Alternatively, such data points may represent cross-sectional data associated with a location, a process batch, or other identifying features. The data obtained by executing the standardized query may be referred to as a data frame to denote its variable structure, which may or may not use a tabular format.

The query block 708 may provide the data frame obtained using the standardized query to the fill block 710, which fills empty or not-a-number (NaN) entries in the data set according to rules associated with the fill block 710. This may be done in order to sanitize the data or to check for incorrect data or indications of errors in the data frame, as well as to add data points needed to reach a desired sampling rate, as described elsewhere herein. The data frame may then be used for further analysis and/or process control. As illustrated, one or more sets of data may be selected from the data frame by independent variable block 712 and dependent variable block 714. For example, the dependent variable block 712 may select one or more types of data from the data frame received from fill block 710, corresponding to data matching specified parameters or characteristics (e.g., pressure or temperature measurements) or data columns (where the data frame corresponds to a data table). The dependent variable block 714 may similarly be used to select one or more types of data from the data frame received from the fill block 710. Although two blocks 712 and 714 are shown, any number of similar blocks may be used. The analysis block 716 may then receive the data selected by the independent variable block 712 and the dependent variable block 714, as shown by the connectors between the blocks. The analysis block 716 may perform any type of analysis for which it is configured. For example, the analysis block 716 may perform partial least squares (PLS) analysis to determine the effect of the data of the independent variable block 712 on the data of the dependent variable block 714. An exploration block 718 may be connected to the analysis block 716 and the dependent variable block 714 to test the proper configuration of the query block 708 and the other blocks and connections. This exploration block 718 may generate graphical, tabular, or textual output that may be stored or viewed by the user. Although the foregoing description discusses the blocks 708-718 as taking certain actions, it will be understood that these blocks may instead cause such actions to be taken by the web server process 504, the execution service process 506, and/or the job processes 508 of the analytics service 500, as discussed elsewhere herein.

To further demonstrate the use of standardized queries 709, FIG. 6C illustrates an exemplary query utilizing an exemplary standardized query format. The exemplary query is presented as utilizing a JSON-compliant format to maximize cross-platform compatibility, but any other format may be used (e.g., an XML-based format, a CSV-based format, etc.). The exemplary query begins with a query name, followed by an indication of the format to be used to return the data frame (which is specified as JSON) and an indication of a version of the query format. The "timeSelector" array indicates a plurality of timeframes indicating ranges of time for which data is to be returned by the "startTime" and "endTime" objects. In the exemplary query, the start and end times are specified in terms of calendar data and clock time in Coordinated Universal Time, separated by the letter "T." As indicated by the exemplary query, each of the timeframes may be separated by excluded time periods for which data is not queried, which correspond to the time periods between the end time of one of the timeframes and the start time of another timeframe. Following the "timeSelector" array, the "sampleRateSecs" object specifies a sampling rate in terms of seconds, which specifies how many data points are to be obtained per unit time. The final portion of the exemplary query is a "columns" array indicating the parameters of data to be obtained from the data source 702 (i.e., the process variables to be obtained). The exemplary query specifies four types or columns of data to return. Each of the four columns is identified by a "tag" object specifying a data source and/or process variable of a data source (i.e., "FT630B/DENS.CV," "PT615/WIRED_PSIA.CV," "TT6079/INPUT_1.CV," and "630.molefrac.c5"). Each of the four columns include an "alias" object to label the returned data within the data frame, a "dataType" object to specify the data type of the data (e.g., floating point value, long integer value, text string, etc.), a "renderType" object (e.g., values, counts, etc.), and a "format" object specifying the format of the data to be returned (i.e., "0.###" indicating a format consisting of a floating point value with three digits following the decimal).

The "tag" objects associated with the columns may identify a data source 702 from which to obtain the data. Alternatively, where the exemplary query does not expressly specify the data source 702, such data source or data sources 702a-702f may be specified by other properties of the block 708. In similar queries utilizing the standardized query format, the data source or data sources 702 may be expressly indicated in the query by an object. Such indication may include a path to the source object or a value indicating the type of data source (e.g., MongoDB, CouchDB, SQL, etc.). The indication of the data source 702 may further indicate an associated data provider 704, where appropriate. Alternatively, the data source manager 532 may provide an indication of the data provider 704 or the structure or format utilized by the data source 702. In some embodiments, the indication of the source may further include a separate indication of the data source 702 for each parameter or column of data to be obtained. Thereby, queries utilizing the standardized query format may obtain data from multiple distinct data sources 702.

Figure 6D:
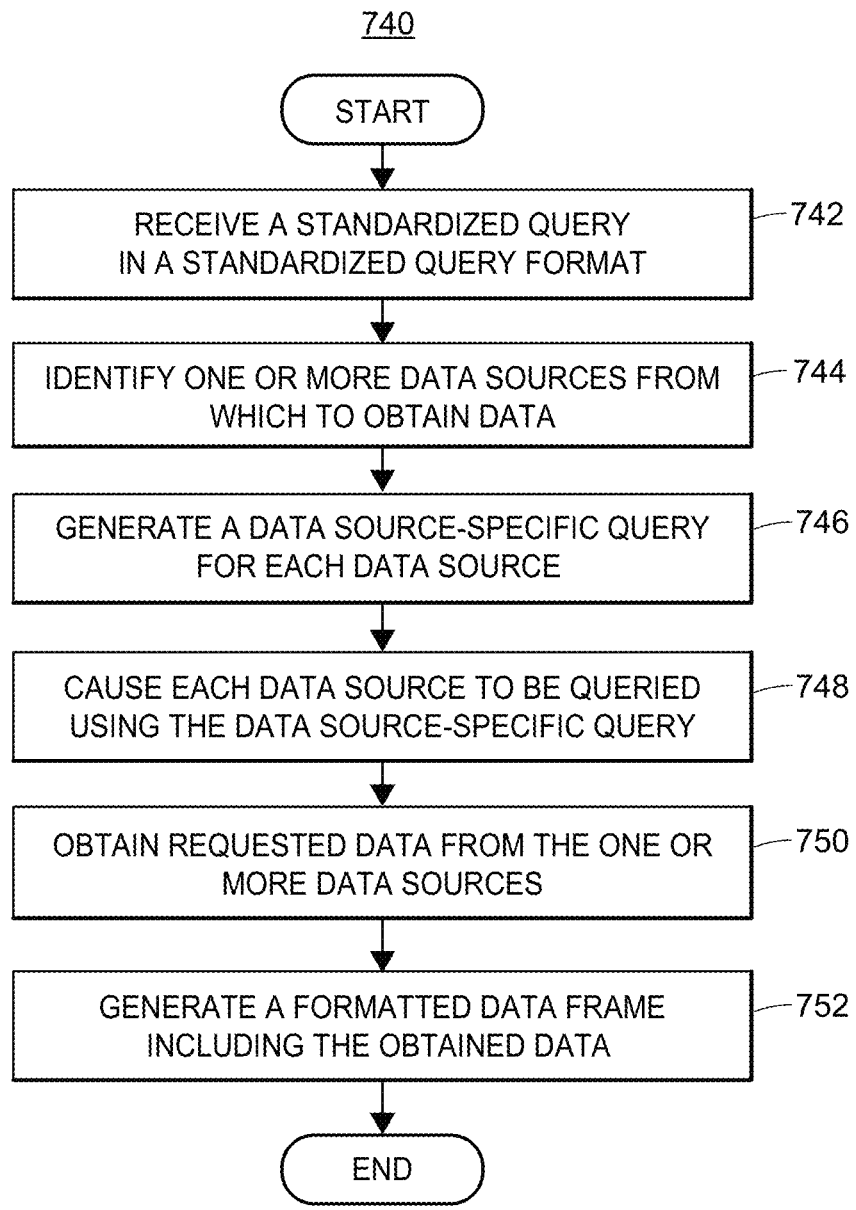
FIG. 6D depicts a flow diagram of an example standardized query method.
Figure 6E:
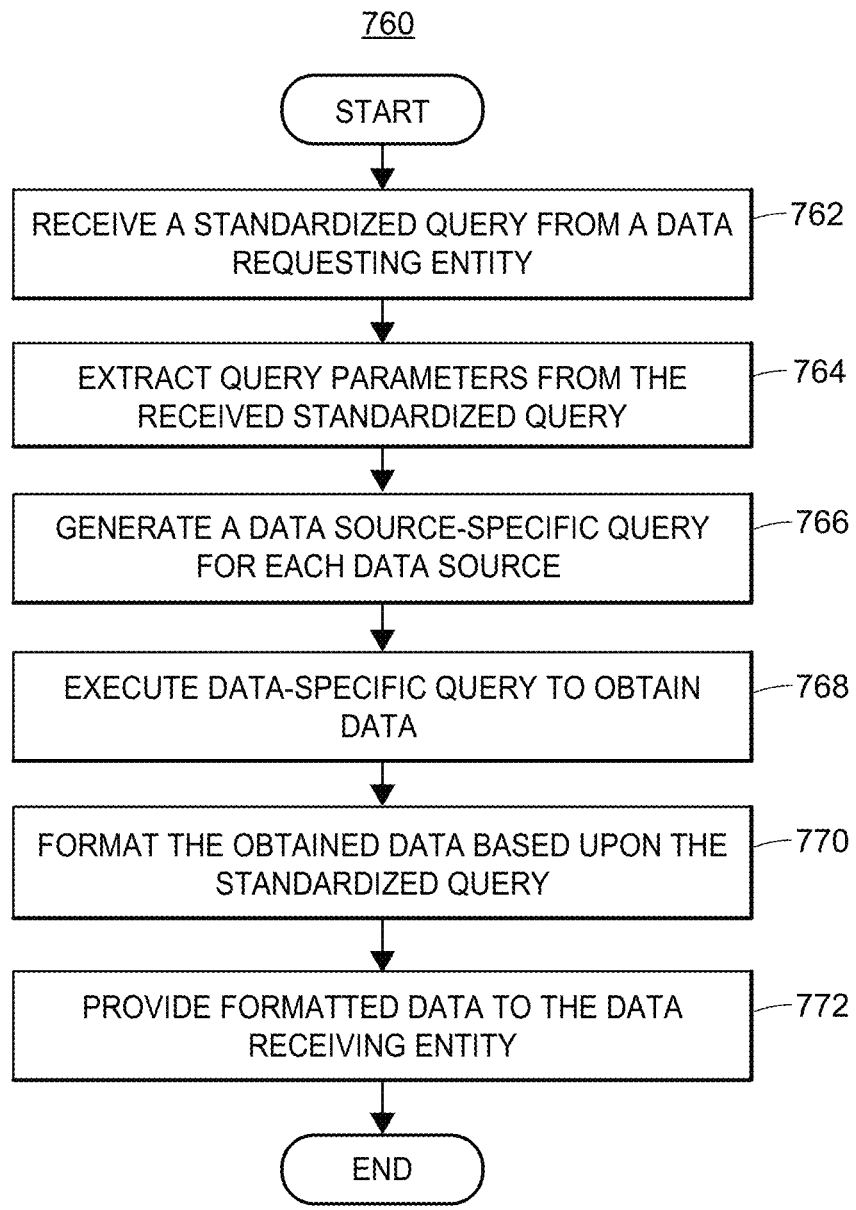
FIG. 6E depicts a flow diagram of an example standardized query method.

As noted above, standardized queries 709 are converted into data source-specific queries that may be executed for each targeted data source 702. Such conversion may be performed by the query execution service 706 or may be performed by each targeted data provider 704a-704d. FIG. 6D illustrates an exemplary query method 740 in which the query execution service 706 converts the standardized query 709 into one or more data source-specific queries, and FIG. 6E illustrates an exemplary query method 760 in which the data provider 704 converts the standardized query 709 into a source-specific query.

The method 740 may begin by receiving a standardized query utilizing a standardized query format (block 742). The standardized query may be received by the query block 708, the query execution service 706, or a data provider 704a-704d. The query may include any of the features or elements described above. The query may be received from a user via direct input or may be received from a program block or routine, which may generate and/or store standardized queries based upon user input. The standardized query may be constructed in a file or format compliant with JavaScript Object Notation (JSON), or it may be constructed using any other convenient language or syntax. The standardized query may utilize a syntax that is executable by some data sources 702a-702f to obtain data (such as SQL), or the standardized query may utilize a syntax that is not directly executable by the data sources 702a-702f to obtain data (such as the exemplary query illustrated in FIG. 6C). The standardized query may identify the data to be obtained (e.g., timeframes and parameters of the data), data sources 702 from which the data is to be obtained (e.g., data sources 702a-702f or data providers 704a-704d), and/or the format in which the data is to be provided. If the standardized query 709 is received at the query block 708, it may then be sent to the query execution service 706 upon occurrence of a triggering event, such as user selection of an option to run the query or a request for the query data by another object, routine, block, process, service, or function within the analytics service 500.

Following receipt of the standardized query 709, the query execution service 706 (or the data provider 704) may determine one or more data sources 702 from which data is to be obtained (block 744). In some embodiments, the determination may involve receiving or identifying an indication of the one or more data sources 702. The indication may be specific to each data characteristic (e.g., process variable or column) or may be general to the entire query. Such indication or indications may be included as objects or tags within the standardized query 709, or it may be indicated by an additional property of the query block 708. For example, an indication of the data source 702 for a data column or type of data may be prepended to the object or tag specifying the data column or type of data. Alternatively, the query block 708 or data provider 704 may be otherwise associated with one or more data sources 702. This association may be effected by receiving an indication of the one or more data sources 702 separately from the standardized query 709. For example, the query block 708 may be associated with one or more data sources 702 (or with one or more data providers 704) via a data source property when the query block 708 is created by receiving a selection of the data sources 702 (or data providers 704). Similarly, a data provider 704a-704d may be associated with one or more data sources 702a-702d when the data provider 704a-704d is configured, either inherently or through associations created during configuration.

Using the information regarding the one or more data sources and the standardized query 709, data source-specific queries are generated to obtain data from the one or more data sources 702 (block 746). The data source-specific queries may be generated by the query execution service 706 and sent to each data source 702a-702f to be queried (directly or via a data source provider 704a-704d) based upon the data sources identified at block 744. Alternatively, the query execution service 706 may send the standardized query 709 to be converted into a data source-specific query by each of the one or more data providers 704a-704d associated with data sources 702a-702d from which data is to be obtained based upon the data sources identified at block 744. For example, the query execution service 706 may cause one or more job processes 508 to convert the standardized query 709 as data providers 704. Regardless of whether the query execution service 706 or the data providers 704 generate the data source-specific query from the standardized query 709, the data source-specific query must utilize a data source-specific format that may be executed by a data provider 704 or a data source 702 to obtain data stored in the data source 702. The data source-specific query format may be any known or hereafter developed format or syntax for querying or otherwise accessing data stored in an electronic data source, such as SQL, MongoDB, CouchDB, etc.

Generating the data source-specific query may include identifying query parameters in the standardized query 709. The query parameters may include parameters associated with a timeframe or other characteristics of the data, such as the timeframe specified by the "timeSelector" array, the sample rate specified by the "sampleRateSecs" object, and the data parameters specified by the "columns" array (particularly the "tag" objects) in the exemplary standardized query discussed above. These query parameters may include indications of process variables associated with types or measurements, types of measurement devices, or specific measurement devices (such as the field devices 15-22 and 40-46). One or more timeframes may be specified for each data source 702 to be queried, and different data sources or data having different parameters (e.g., different columns, different process variables, etc.) within a data source may have different timeframes associated therewith. The identified query parameters may be extracted from the standardized query 709 by the query execution service 706 or the data provider 704 and converted into aspects of the data source-specific query. The generated data source-specific query thus contains query language representing the substantive parameters specified in the standardized query 709, but such substantive parameters are included in the data source-specific query in the data source-specific query format.

In embodiments in which one or more timeframes and sampling rates have been specified, the data source-specific query may be generated to provide data associated with a plurality of data points at specified times within the time period specified by each timeframe. Each data point may have a timestamp indicating a specified time associated with the data point, which is an integer multiple of the period of the sampling rate at or following the start time associated with the timeframe occurring at or before the end time associated with the timeframe. Multiple timeframes may be specified by the standardized query, as indicated in FIG. 6C. In such instances, the data source-specific query may be generated to obtain data at data points having timestamps corresponding to the sampling rate or rates within each of the multiple timeframes. In some such instances, separate data source-specific queries may be generated for some of all of the multiple timeframes. If one or more timeframes are specified without a sampling rate, the plurality of data points may be obtained with timestamps, but the timestamps may take on any value within the timeframe. Thus, the timestamps will indicate times at which each data point was measured (or at which underlying process values were measured).

The query execution service 706 or the data provider 704 may then cause the one or more data source-specific queries to be executed to query the identified data sources 702 (block 748). This may include transmitting the data source-specific query from the query execution service 706 to one or more data providers 707a-704d and/or to one or more data sources 702a-702f. Similarly, the data providers 704 may transmit the data source-specific query to the data sources to obtain the requested data in some embodiments. In further embodiments, the data source-specific query may be executed by an execution engine of the recipient data source 702. In other embodiments, the data providers 704 may execute one or more of the data source-specific queries by accessing and manipulating the data stored within the data sources 702. The data returned from the one or more data sources upon execution of the one or more data source-specific queries may then be sent to or received by a data receiving entity, which may include the data provider 704, query execution service 706, or the query block 708. Thus, the data receiving entity obtains the requested data from the one or more data sources 702 (block 750).

In embodiments in which a sampling rate is specified, obtaining the data may include ensuring the data includes data points with timestamps matching each of the sample points indicated by the timeframe and sampling rate. This may be done for each timeframe and sampling rate. As noted above, these sample points correspond to integer multiples of the period of the sampling rate at or following the start time of the timeframe and occurring at or before the end time of the timeframe. If the data points stored in the data source 702 do not include a data point for one or more of the times associated with the sample points, additional data points may be added having timestamps corresponding to the sample points. The additional data points may be assigned values associated with values of data entries within the data source 702 that are most closely prior to the timestamp in time. For example, a data source 702 may include data points for times 7:01:5500 (having value V1), 7:02:0500 (having value V2), and 7:02:5500 (having value V3), but the timeframe indicated in the standardized query may be 7:02:0000 (the start time) to 7:03:0000 (the end time), and the period of the sample rate may be 0:00:5000 (corresponding to a sampling rate of one sample every half second). In such example, the obtained data points will have timestamps of 7:02:0000, 7:02:5000, and 7:03:0000, which will have values V1, V2, and V3, respectively. Thus the most current prior value V2 (measured at 7:02:0500) is used for the data point having timestamp 7:02:5000, even though another value (V3 at time 7:02:5500) is closer in time following the timestamp. Additionally, excess data points occurring at times between the desired sample times may be removed or deleted from the obtained data. Thus each data point in the obtained data (following such adjustments or alignments) will have a timestamp that is associated with an integer multiples of the period of the sampling rate at or following the start time within each timeframe indicated by the standardized query. Other means of aligning data points within the obtained data may similarly be used.

Where multiple data sources 702 are indicated in the same standardized query, each of the data sources 702 may have data points having different timestamps, and the measurements associated with such timestamps may have occurred at different sample rates. For example, a first data source 702a and a second data source 702d may be indicated by the standardized query. The data source 702a may be a first data source storing data points having a first sample rate (e.g., one measurement every second), and the data source 702d may be a second data source storing data points having a second sample rate (e.g., four measurements every second). The obtained data may be aligned according to the parameters specified within the standardized query by adding or removing data points at times that are integer multiples of the period of the sampling rate specified by the standardized query, as discussed above.

When the data receiving entity obtains the data from the one or more data sources 702, the data receiving entity may further format the data according to formatting parameters or instructions associated with the standardized query 709 (block 752). Such formatting parameters or instructions may be included in the standardized query 709, may be associated with the standardized query format, or may be specified in a separate property of the query block 708. In some embodiments, this may include further generating a data frame from the obtained data by adjusting the format of the obtained data to match a desired format. Where a plurality of data sources 702 have been queried, generating the data frame may further comprise combining the data obtained from each of the plurality of data sources 702 to generate an aggregated data frame. For example, where a first data set is queried from a first data source 702a and a second data set is queried from a second data source 702d, an aggregated data frame combining the first and second data sets may be generated.

The method 760 may begin by receiving a standardized query 709 from a data requesting entity (block 762). A data requesting entity, such as the query block 708 or the query execution service 706, may request data from one or more data sources 702 by sending a standardized query 709 to a data provider 704. The data provider 704 may be associated with one or more data sources 702 or may be configured to obtain data from various data sources 702 via a network connection. Alternatively, the data requesting entity may receive the standardized query 709 from another data block, software routine, process, or service within the data analytics system 100. Additionally, a data receiving entity (which may likewise be the query block 708, the query execution service 706, a job process 508, data services 520, the application 514, a program memory, or any other service, routine, process, or device that may further analyze, present, or store data associated with the process plant 5) may be indicated by the standardized query 709 or otherwise. Such data receiving entity may be the same entity as the data requesting entity in some instances, or the data requesting entity may be separate from the data receiving entity. For clarity, the following discussion of the exemplary method 760 will assume the data provider 704a receives a standardized query 709 from the query execution service 706 as the data requesting entity and the data receiving entity, wherein the standardized query 709 requests data from the data source 702a. This is done to better illustrate the salient features of the method and is not intended to limit the scope of the disclosure. Those familiar with the art will understand that numerous alternative configurations may be readily created with only minor and ordinary adaptations of the method as discussed herein.

When the standardized query is received at the data provider 704a, the data provider 704a extracts query parameters from the standardized query 709 (block 764). The query parameters may include parameters associated with time (e.g., a timeframe for which data is to be obtained, a sampling rate, etc.), data types or characteristics (e.g., process variables, columns within a table, measurements, calculated values from measurements, etc.), or the data source 702a from which the data is to be obtained (e.g., an indication of the database, a path thereto, or a table therein). Extracting the query parameters may include determining one or more parameters based upon objects, arrays, or elements within the standardized query 709. In some embodiments, the data provider 704a may further extract parameters indicating how the data is to be returned to the query execution service 706 (i.e., formatting, structure, timing, or protocol to use in providing the requested data to the data requesting entity). The data provider 704a may store the extracted query parameters in a volatile or non-volatile memory for use in generating one or more data source-specific queries and/or formatting obtained data to provide to the data requesting entity.

The data provider 704a may then generate a data source-specific query based upon the extracted query parameters (block 766), which data source-specific query utilizes a data source specific query format associated with the data source 702a. For example, the data source 702a may be a non-relational database utilizing a MongoDB data structure or format, in which case the data provider 704a generates a data source-specific query utilizing the query syntax of MongoDB to obtain the data indicated by the query parameters extracted from the standardized query 709. As an alternative example, the data source 702a may be a relational database utilizing MySQL, in which case the data provider 704a generates a data source-specific query utilizing a SQL query syntax to obtain the data indicated by the query parameters extracted from the standardized query 709. To generate the data source-specific query, the data provider 704a may apply a mapping between the standardized query format and the data source-specific query format. Such mapping may include adjustments to syntax or format that convert the query parameters expressed in the standardized query 709 into substantively equivalent parameters in the data source-specific query format. In some embodiments, extracting the query parameters and generating the data source-specific query may be combined, such that the data provider 704a directly maps the query parameters indicated by the standardized query to parameters or elements of the data source-specific query. As discussed above, the data source-specific query may be generated to return data points having timestamps corresponding to integer multiples of the period of the sampling rate at or following the start time within each timeframe indicated by the standardized query 709.

Once the data source-specific query has been generated, the data provider 704a may execute the data source-specific query to obtain the requested data from the data source 702a (block 768). In some embodiments, the data provider 704a may send a request to execute the data source-specific query to the data source 702a, and the data source 702a may execute the data source-specific query and return the resulting data to the data provider 704a. Alternatively, the data provider 704a may serve as an interface or execution engine for the data source 702a, in which case the data provider 704a may execute the data source-specific query according to the rules of the data source-specific query format to access, analyze, and select data stored in the data source 702a. Regardless of whether the data source-specific query is executed by the data provider 704a or the data source 702a, the resulting data from execution of the data source-specific query is obtained by the data provider 704a.

In some embodiments, the data provider 704a may format the data obtained by execution of the query based upon the standardized query 709 (block 770). The data provider 704a may thus process the obtained data to format the obtained data to correspond to requirements for the data expressed in the standardized query 709. This may include generating a data frame from the obtained data that includes the obtained data in a format that may be readily used by the query execution service 706, including applying data format rules and data aliases to the obtained data. For example, the standardized query 709 may specify that the data is to be provided in a document using a JSON file. Similarly, the standardized query may specify that the data is to be returned to the data requesting entity in a tabular format or that the data values are to be formatted as floating point numbers with three digits following the decimal point. Although these formatting requirements may be specified in the standardized query 709, some or all of the formatting requirements may be specified by the standardized query format (or version thereof). In this manner, the standardized queries employing the standardized query format (or version thereof) will always return data in a consistent format. As discussed above, formatting the obtained data may include adjusting or aligning the times of the data points to have timestamps corresponding to integer multiples of the period of the sampling rate at or following the start time within each timeframe indicated by the standardized query 709. This may further include adding data points with appropriate timestamps or removing excess data points occurring at times between the desired sample times.

Once the obtained data has been formatted, the data provider 704a provides the formatted data to the data receiving entity (block 772). The data provider 704a may transmit a data frame in the requested format or any known format to the query execution service 706 for further analysis. In further embodiments, some or all of the formatting of the obtained data may instead be performed by the query execution service 706 after the data provider 704a sends the unformatted or partially formatted data obtained from execution of the data source-specific query to the query execution service 706. When the data has been received by the data requesting entity and formatted, the formatted data may be used in process plant control or analysis, as discussed elsewhere herein. In some embodiments, the query execution service 706 may further provide the data frame to another data receiving entity, such as the query block 708 or a job process 508.

Generally, any or all portions of the data sources 702a-f, the data source providers 704a-d, and the query block 708, as well as the query language utilized to obtain from the variably-formatted data sources 702a-f, may operate in conjunction with any or all portions of FIGS. 1, 2, 3, 4A-4Q, and/or 5A-5G, and/or with any number of features and/or techniques described in the sections of the present disclosure respectively corresponding to FIGS. 1, 2, 3, 4A-4Q, and/or 5A-5G.

Frequency Analysis Analytics Technique for Early Warning Fault Detection

A novel data analytics technique or function (e.g., that may be provided by the distributed industrial process performance monitoring/analytics system or DAS 100) is a frequency analysis analytics technique or function for early warning fault detection in process control systems or plants, such as the process plant 5. Said novel frequency analysis analytics technique or function is referred to herein as a "rolling fast Fourier transform" or "rolling FFT," and may be utilized in conjunction with any of the systems, architectures, methods, and techniques described herein. For example, a data block definition for the rolling FFT may be stored in the data block definition library 252 and made available for users to utilize in data modules that are executed off-line and/or that are executed on-line. Additionally or alternatively, one or more distributed data engines 102x may execute a rolling FFT on data obtained at the one or more DDEs 102x. A rolling FFT, though, is not limited to only be used in conjunction with the systems, architectures, methods, and techniques described herein, and may be utilized in conjunction with any system, architecture, method, and/or technique that generates time-series data. As will be shown below, the rolling FFT analytic technique or function is a combination of both descriptive and predictive analytics.

Generally, in a process control system or plant, abnormalities, faults, decreases in performance, and/or other undesired or undesirable conditions may be prevented (or their impact may be minimized) if process data that provides leading indications of future process plant behavior can be discovered, preferably in a time frame that allows for preventative or mitigating actions to take place. Such process data may include measurement data, for example, of pressures, temperatures, and flow rates of material moving through the plant, and similar information for pieces of equipment. Such process data may also include, for example, the chemical composition of process flow streams and on/off states of equipment. Generally, process data to which a rolling FFT may be applied may include any on-line and off-line time-series data that is generated as a result of controlling a process within a process plant, and that is obtained in any suitable manner, e.g., by sampling, receiving a data stream, reading from a database, data file, data source (e.g., Seeq system), or historian, querying, etc.

One technique of finding leading indicators in a process plant includes analyzing the behavior of the process data over time. The behavior may change for many reasons, but in some scenarios, the changes may be associated with process upsets that lead to abnormalities, faults, decreases in performance, and/or other conditions, and as such may be considered to be leading indicators of such conditions. The rolling FFT technique described herein converts a first set of time-series data corresponding to the leading indicators into the frequency domain and subsequently generates a second set of time-series data based on the frequency domain data, which may then be monitored and used to predict the occurrence of abnormalities, faults, decreases in performance, and/or conditions in the process plant.

Conventionally, process data from the process plant may be collected, received, or otherwise obtained to use as input into frequency analysis techniques. The data may be any data related to existing process signals found in the process plant, such as temperatures, flows, pressures, compositions, and/or other continuous signals that are generated as a result of operating the process plant to control a process. Conventionally, an FFT is performed on the obtained process data to identify amplitudes of important frequencies therein by using a fixed window (e.g., a specific number of data points), which is usually based on a power of 2 (e.g., $2^{10}$=1024). Modern computation methods allow this window of data to have a user defined length, however, the length is often limited by the amount of available computer memory. The number of samples and sampling frequency in an FFT must also meet the Nyquist criteria of having at least two samples per the fastest frequency of interest. Further, the conventional FFT should operate on several cycles of the periodic behavior of the desired data signal.

In many conventional applications of FFT applied to process data, though, it is assumed that the signal of interest does not change over time. However, the rolling FFT is not constrained by this assumption. Indeed, a "rolling" type FFT advantageously is able to capture the changes to a signal over time to identify when those changes to the signal over time occur. In particular, the rolling FFT includes performing an FFT on a window of data generated by a signal or variable of interest (such as a measurement, sensed value, or other signal generated as a result of the process plant) and recording the amplitudes (e.g., the peak amplitudes) of the frequencies for that window. The window is then moved one sample forward in time and the FFT is again performed with the results being recorded or saved. This continues until the end of the time-series data. Because an FFT is performed for every sample time in the data set (except for, in some cases, the first n−1 samples where n is the number of samples in the window), one or more new time-series data sets comprising the amplitudes (e.g., the peak amplitudes) of one or more frequencies of interest is created or generated. Each frequency of interest may correspond to a respective new process variable of the process plant that generates the respective time-series data corresponding to the amplitudes (e.g., to the peak amplitudes) of the frequency of interest. The time-series data generated by each new process variable may be stored, monitored, and/or analyzed to predict possible abnormal, fault, or other conditions in the process plant.

Thus, for a signal or variable of interest, one or more new process variables corresponding to predicting undesired process plant conditions may be created, generated, and utilized within the process plant. A signal or variable of interest may be an individual signal or measurement point, or may be a combination (e.g., a sum or other combination) of the signals or measurement values of the individual signals/points. A variable of interest may be defined by a user, or may be automatically determined by a data block, data module, and/or data analytic function.

As discussed above, the process of determining the set of new time-series data sets involves converting the signals or variables of interest from the time domain to the frequency domain, obtaining frequency domain data, and transforming the obtained frequency domain data to determine the time-series data corresponding to the new process variables. The conversion or transformation back to the time domain is significant, as this allows the new time-series data sets to be viewed along with the original process data signal and/or other time-series process data. As such, the new time-series data may be explored by using the same analytics techniques (e.g., statistical analysis, PCA, standard deviations, etc.) that are available for use on the data generated by the original signals or variables of interest and/or other process data and, in some situations, may be analyzed in conjunction with the original process data and/or other process data. For example, both the new time-series data and the original/other process data may be provided as inputs into a Transformers data block 521.

To illustrate an example of a rolling FFT analytic technique and its benefits, consider an example scenario in which a rolling FFT is applied to the problem of detecting potential flare events in a process plant, such as a refinery or chemical plant. In general, some process plants have flaring systems that collect excess vapors from individual process units and burn the collected excess vapors prior to their release to the atmosphere to remove toxic chemicals. This burning of excess vapors or gases is generally referred to as a "burn off" or a "flare event." In some scenarios, instead of being burned off, the flare gas is compressed and reused as feedstock or fuel gas, however, when the capacity of the flare gas compressor is exceeded, a flare event will occur so that the excess material is released through a flare burner. Typically, the number and/or frequency of flare events are governed by environmental and/or other types of regulations. While some planned flare events are allowed and are necessary, a process plant provider or company may be fined when unplanned flare events occur too frequently. Thus, it is desirable for a process plant provider or operator to be able to predict that an unplanned flare event will or is likely to occur based on current operating conditions, and to be able to obtain this prediction with sufficient lead time during which operators may take mitigating actions to prevent the unplanned flare event from taking place.

This is a difficult problem to solve, as modern refineries and chemical plants are complex systems with many interconnected units (e.g., tens or even hundreds of interconnected units), and each unit in itself can be considered a large process plant. Normally, these units are connected to a common flare system. Because any one of these units can be a potential source of the vapor that must be handled by the flare system, it can be difficult to monitor which unit or units are near flare conditions. Further, once a flare does occur, it is not immediately obvious which unit is responsible.

Figure 7A:
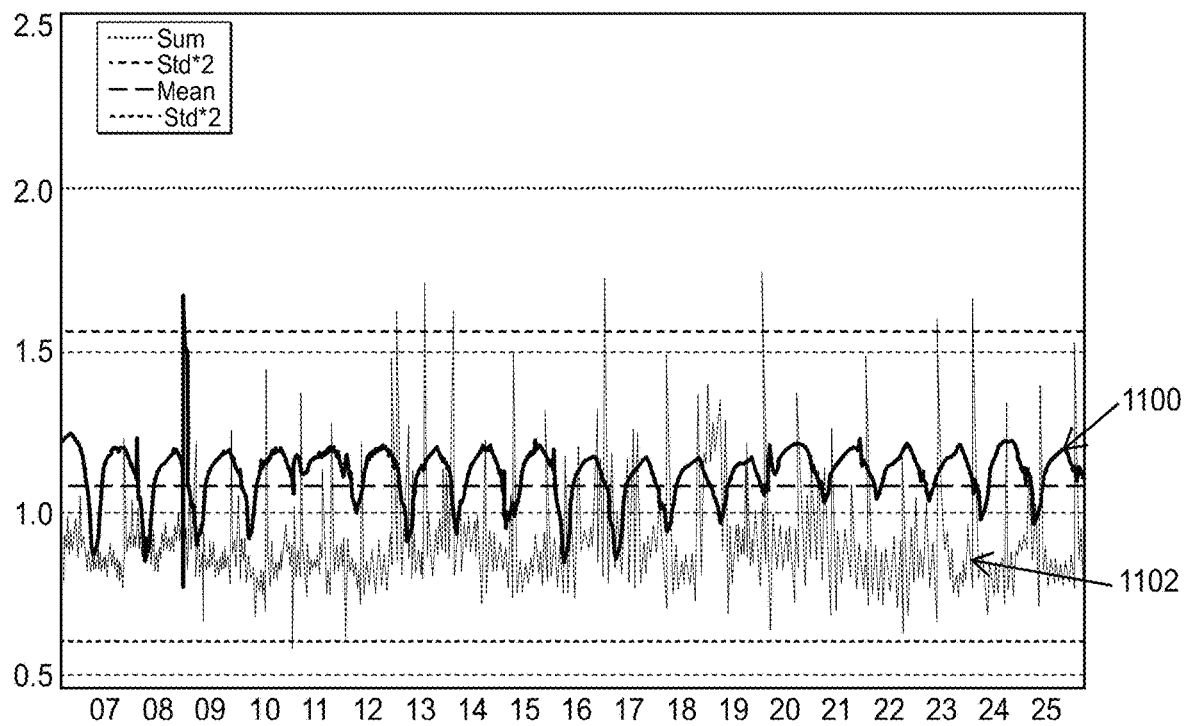
FIG. 7A depicts a graph of example process flow measurements of a flare system of a refinery during a time interval.

The rolling FFT technique described herein may be used to deal with this situation. FIG. 7A shows example process data generated by a refinery to which a rolling FFT was applied. The example process data includes a process flow measurement or signal 1100 obtained from a unit in the flare system of the refinery during a particular time interval. As can be seen, the process flow signal 1100 is periodic in nature with the period being approximately one day (e.g., as the periodicity may correspond to the daily heating and cooling cycle). Additionally, the example process data includes another signal 1102 which is indicative of the flare pressure of the flare system over the same particular time interval. The flare pressure is a measurement of the collective vapors in the flare system, and this measurement may be obtained, for example, from a sensor of a compressor or other vessel containing the excess gas and vapors. Note that in FIG. 7A, the signal data 1100 and 1102 are aligned in time and scaled so that their behavior and relationship over time is easily visualized. In an embodiment, one or more data blocks, data modules, and/or one or more DDEs 102*x* receive the signal data 1100 and 1102 and perform the time alignment of the two signals 1100 and 1102 so the signals 1100 and 1102 can be displayed in the time-aligned manner shown in FIG. 7A.

Figure 7B:
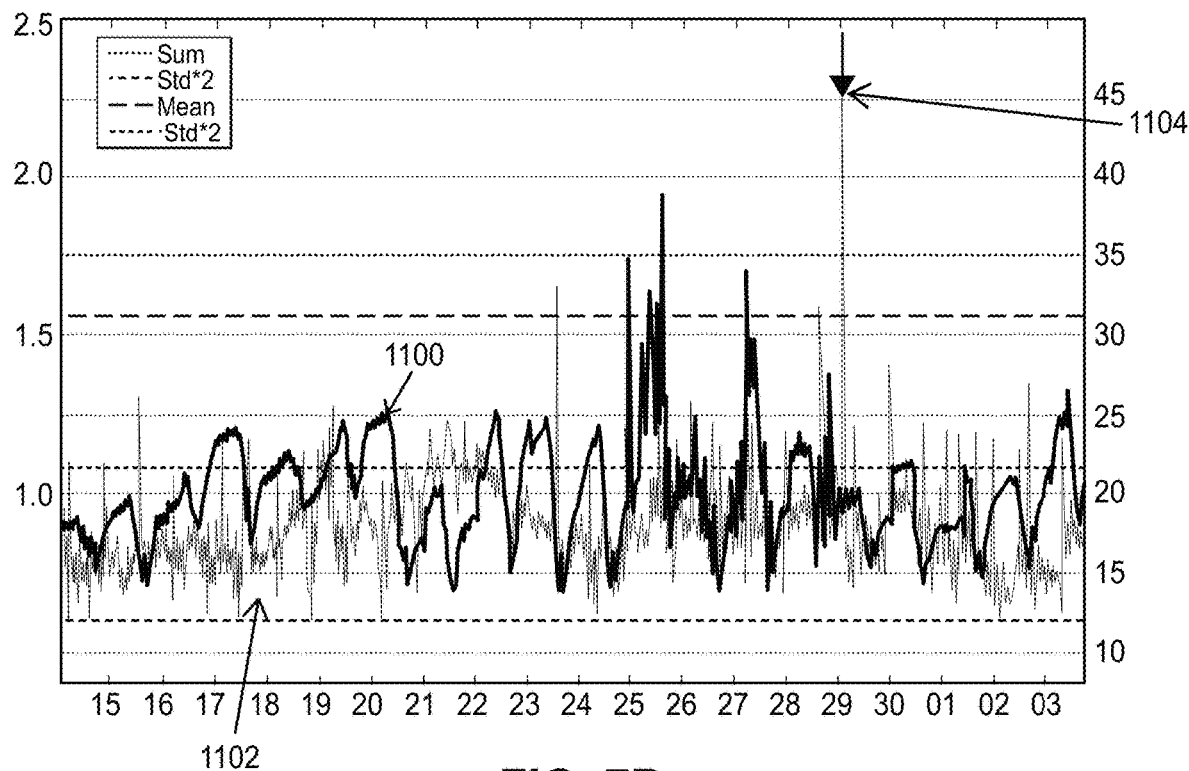
FIG. 7B depicts a graph of the example process flow measurements of FIG. 7A during another time interval.

FIG. 7B shows the same signals 1100 and 1102 for a different time interval during which a flare event 1104 in the signal 1102 has occurred (e.g., the flare pressure corresponding to signal 1102 has built up and exceeded a pressure limit, thus causing the flare event 1104). Looking at FIG. 7B, it is apparent that the behavior of the process flow signal 1100 changes prior to the flare event 1104. For example, the periodic behavior of the process flow signal 1100 changes two to three days prior to the occurrence of the flare event 1104. The identification of the change in the process flow signal 1100 as a leading indicator for the flare event 1104 may be determined, for example, by using data analysis techniques such as PCA, cross-correlation, PLS regression, etc. This change/leading indicator may be captured, identified, or defined; a new signal or process variable corresponding to the identified change/leading indicator may be generated, defined, or created; and the time-series output of the new process variable may be determined by utilizing a rolling FFT. Accordingly, by monitoring the time-series data of the new process variable as determined by the rolling FFT for the presence of a leading indicator, an impending flare may be determined, and a corresponding warning may be presented to a user (e.g., an engineer, a process operator, etc.) so that preventative and/or mitigating actions may be taken. In an embodiment, the newly defined process variable may be incorporated in the process control systems of the refinery (e.g., by assigning a tag and/or otherwise causing process control databases to recognize the new process variable), and may be monitored using traditional process control monitoring equipment and techniques. As such, status and other information corresponding to the new process control variable may be presented to the user just as any other item of process information with limits, alarms, trending charts, etc.

Figure 7C:
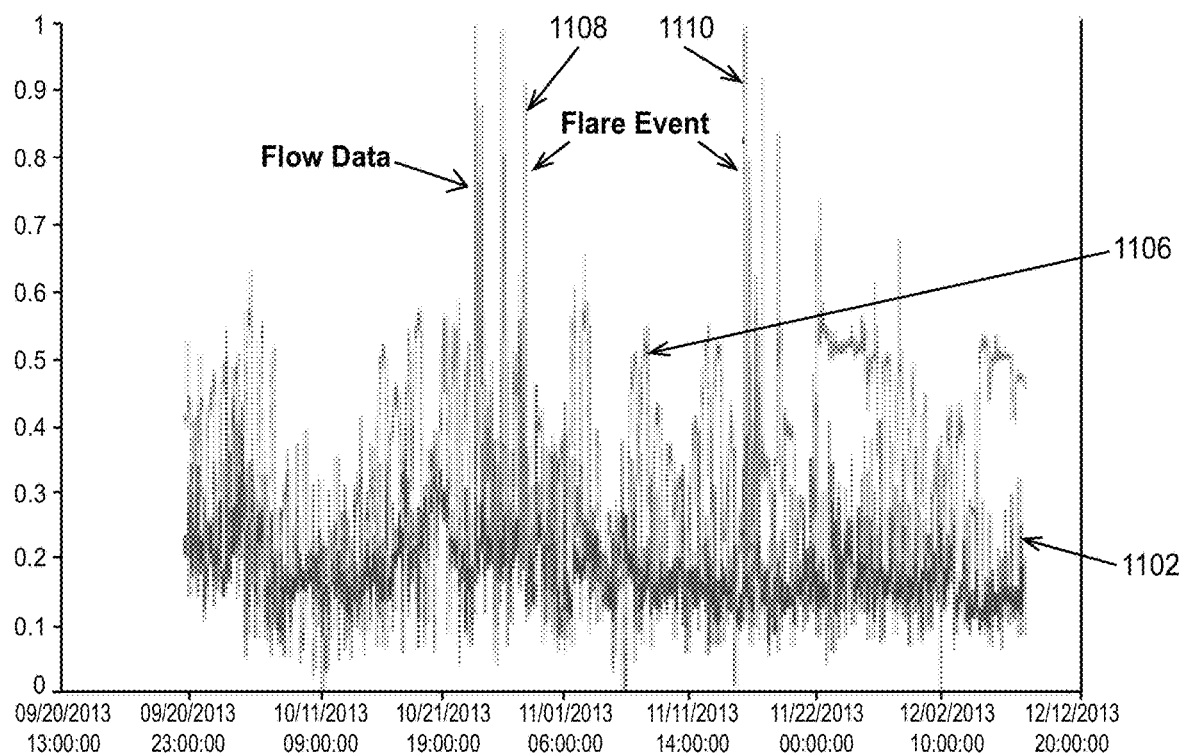
FIG. 7C depicts a graph of example process flow data of the refinery that includes flare events in the data.

In an embodiment, a process flow signal that is utilized to predict a flare event is a combination (e.g., a summation, a weighted average, or other suitable combination) of individual flows or measurements. FIG. 7C shows an embodiment in which a process signal to which the rolling FFT analysis may be applied corresponds to changes to a sum of individual process flow signals 1106. The sum signal 1106 may be created by adding up the measurements of individual flow signals, in an example. Generating the sum 1106 or other desired combination of signals reduces the number of new signals that need to be created and analyzed, which in turn can simplify the overall analysis. However, there is no restriction on using a single process signal or some combination of signals. FIG. 7C also simultaneously shows the flare pressure signal 1102 including flare events 1108 and 1110 during the displayed time interval. Note that the signals 1106 and 1102 are time-aligned, so that inter-relationships are easily visualized. A change in the behavior of the sum of process flows 1106 can be seen just prior to the flare event 1108, but for the flare event 1110, the change in the summed process flows 1106 occurs after the flare event 1110. Additional analysis of the relationship between the flow 1102 and the flow 1106 may be needed to determine whether or not (and if so, how) the behavior of the summed process flows 1106, e.g., over a larger time interval, by performing additional analytics functions, etc.

Figure 7D:
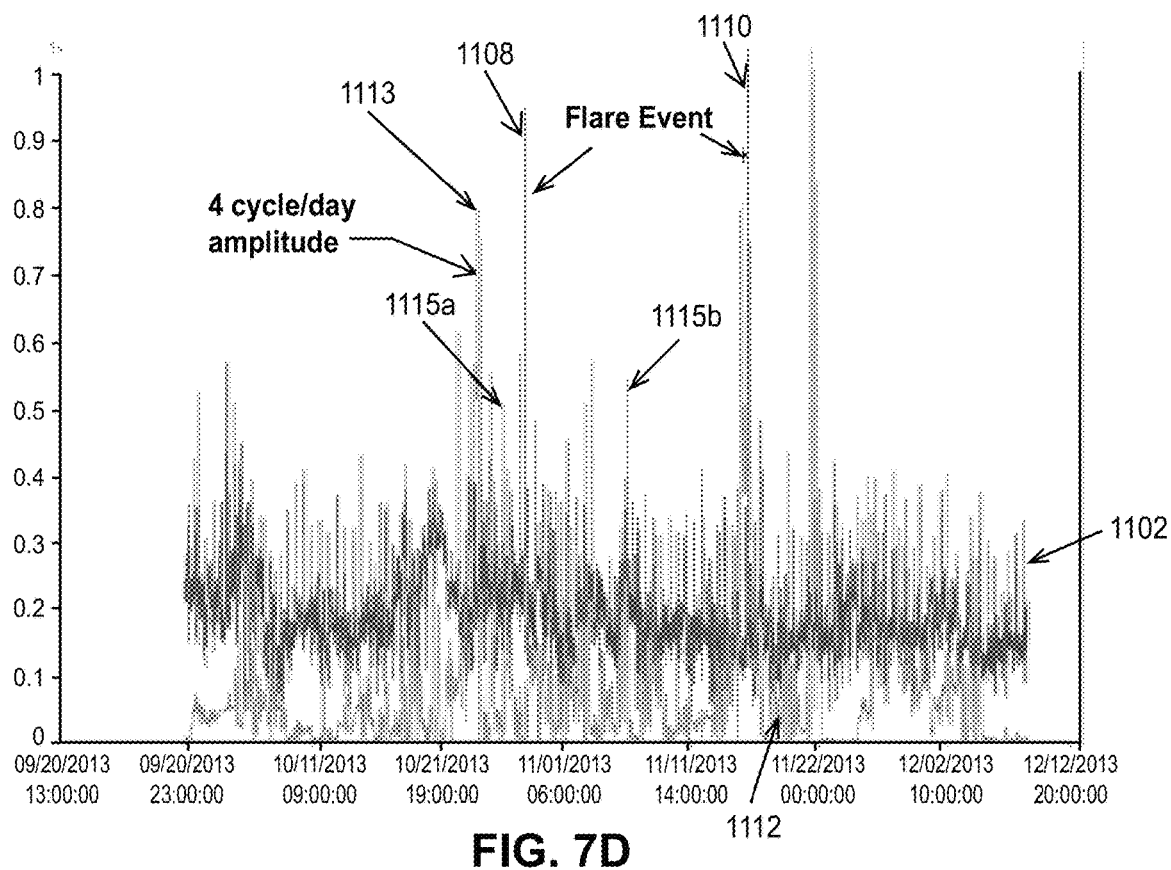
FIG. 7D depicts a graph of time-series data determined from applying a rolling FFT to the process flow data of FIG. 7C.

FIG. 7D shows the results 1112 of applying the rolling FFT technique to the signal 1106, which transformed the sum of process flow signals 1106 from the original time domain into the frequency domain, and then back to the time domain. In particular, the signal 1112 in FIG. 7D corresponds to the amplitudes (e.g., time-series data) of a particular frequency of interest (e.g., the fourth frequency corresponding to four cycles per day) of the signal 1106. The fourth frequency corresponding to four cycles per day has been defined as a new process variable whose time-series peak amplitude values have been captured from corresponding frequency domain data, and displayed in the time domain as the signal 1112 in conjunction with the flare pressure signal 1102. Note that the signals 1112 and 1102 are time-aligned, so that inter-relationships are easily visualized. As seen in FIG. 7D, the particular peak amplitude 1113 of the signal 1112 is associated with the flare event 1108. The data 1112 appears noisy, though, and contains what could be called false positives (e.g., events 1115*a*, 1115*b*). However, false positives are not overly concerning, as they may be used in an advisory capacity, and/or may represent "near" flare events that were avoided.

Figure 7E:
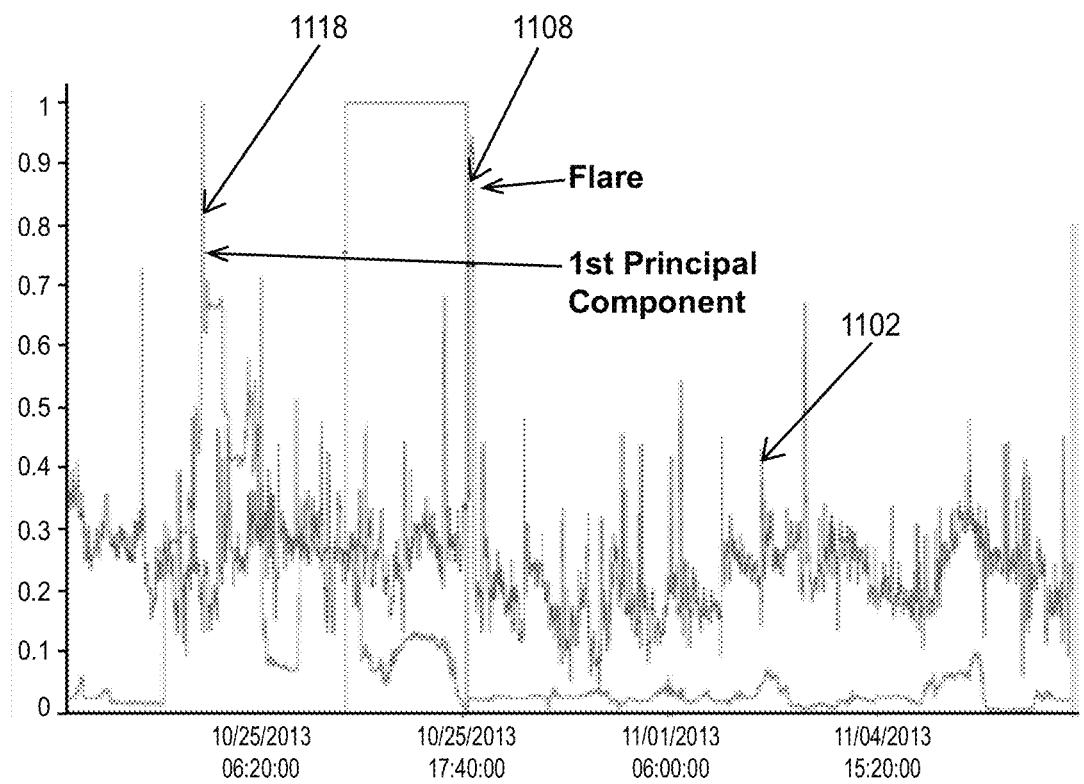
FIG. 7E depicts a graph of results of using PCA to analyze frequency domain data of FIG. 7D around a flare event.

To further process and clean the signal data 1112, additional data analysis techniques may be performed. For example, in FIG. 7E, PCA has been applied to the frequency domain data of the fourth frequency corresponding to four cycles per day to determine its first principal component, and the time-series values of the first principal component is shown as the signal 1118. In particular, FIG. 7E shows a zoomed-in view of the behavior of the first principal component 1118 during the time interval around the flare event 1108 of the flare pressure signal 1102. Note that the signals 1118 and 1102 are time-aligned, so that relationships there between are easily visualized. As can be seen in FIG. 7E, a spike in the value of the first principal component 1118 occurs well before the flare event 1108, and subsequently thereafter the value of the first principal component 1118 decreases significantly. To capture this spike, a decaying filter may be used to retain the signal 1118 for a period of time. In an embodiment, the decaying filter may be defined by a data block definition and corresponding data block property that allow instances of the decaying filter to be tuned differently for each application. For example, configurable properties of the decaying filter block may define the rate of increase and/or the rate of decay of the signal. In some embodiments, additional principal components may be determined and used to increase the sensitivity of the technique.

Figure 7F:
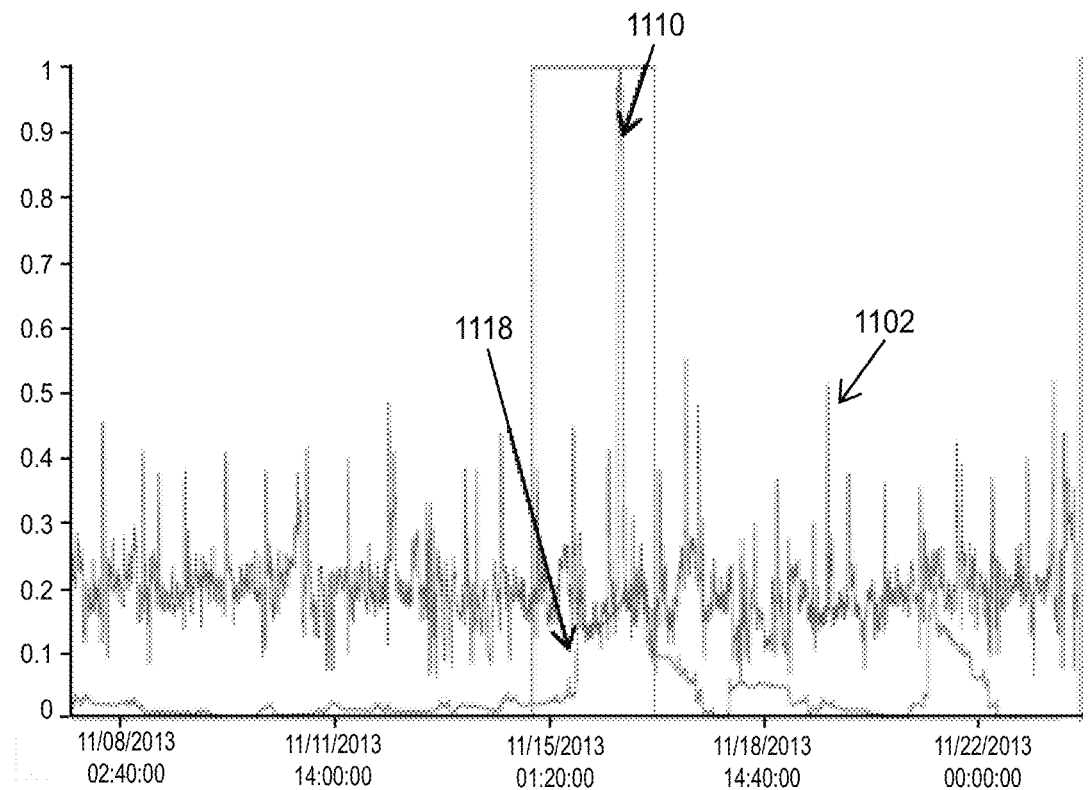
FIG. 7F depicts a graph of results of using PCA to analyze frequency domain data of FIG. 7D around another flare event.

FIG. 7F shows a zoomed-in view of another portion of FIG. 7D. Specifically, FIG. 7F shows in more detail the behavior of the first principal component 1118 during the time around the flare event 1110 of the flare pressure signal 1102. In FIG. 7F, the value of the first principal component 1118 corresponding to the flare event 1110 is smaller than for the flare event 1108, however, there is still a significant difference in values when compared to the baseline.

The technique of using the rolling FFT analytic to detect leading indicators in process control data may be used in off-line analysis and data model building efforts. However, once the new process variables (e.g., frequencies, principal components, and/or other higher-order data of interest) are identified and defined, the rolling FFT analytic may be performed on streaming real-time data from the on-line process plant. For example, the rolling FFT may be defined as a data block and stored in the block definition library 252 so that instances of the rolling FFT data block may be incorporated into on-line data modules and bound to on-line sources within the process plant. Accordingly, the live, streaming data operated on by the rolling FFT analytic may provide real-time predictions/warnings of an impending condition to a user or plant operator. In some embodiments, a user may define a combination data block to include a rolling FFT data block interconnected to other analytics function blocks (e.g., PCA, PLS, and/or other analytics function blocks). Additionally, a user may define a data block that combines (e.g., sums, calculates a weighted average, etc.) multiple process signals into a single signal to utilize as an input into a rolling FFT data block and/or into a combination block including a rolling FFT data block.

Thus, the rolling FFT data analytics technique is an example of a descriptive analytics technique that may be utilized for off-line process data and for on-line process data.

In some embodiments, the new process variables corresponding to the rolling FFT analytic technique may be incorporated into the process plant. For example, the new process variables may be defined, identified (e.g., by assigning respective process control tags), and stored in a process control database of the process plant. In an embodiment, the time-series data generated by the new process variable may serve as an input to a control function or control block that operates to control a portion of process in the process plant, or may serve as a trigger for a change in the process plant.

Further, aside from detecting potential flare events, other situations in which rolling FFTs may be applied to prevent undesired conditions or events include warning of potential pressure relief valve lifting, potential compressor surge, impending pump failure, impending valve failure, flow instabilities such as flooding in distillation columns, failures in rotating crushing mills, oil and gas well production instabilities, etc. In some scenarios, rolling FFTs may be applied to prevent undesired performance measures of one or more entities within the process plant or even of the process plant as a whole.

Figure 7G:
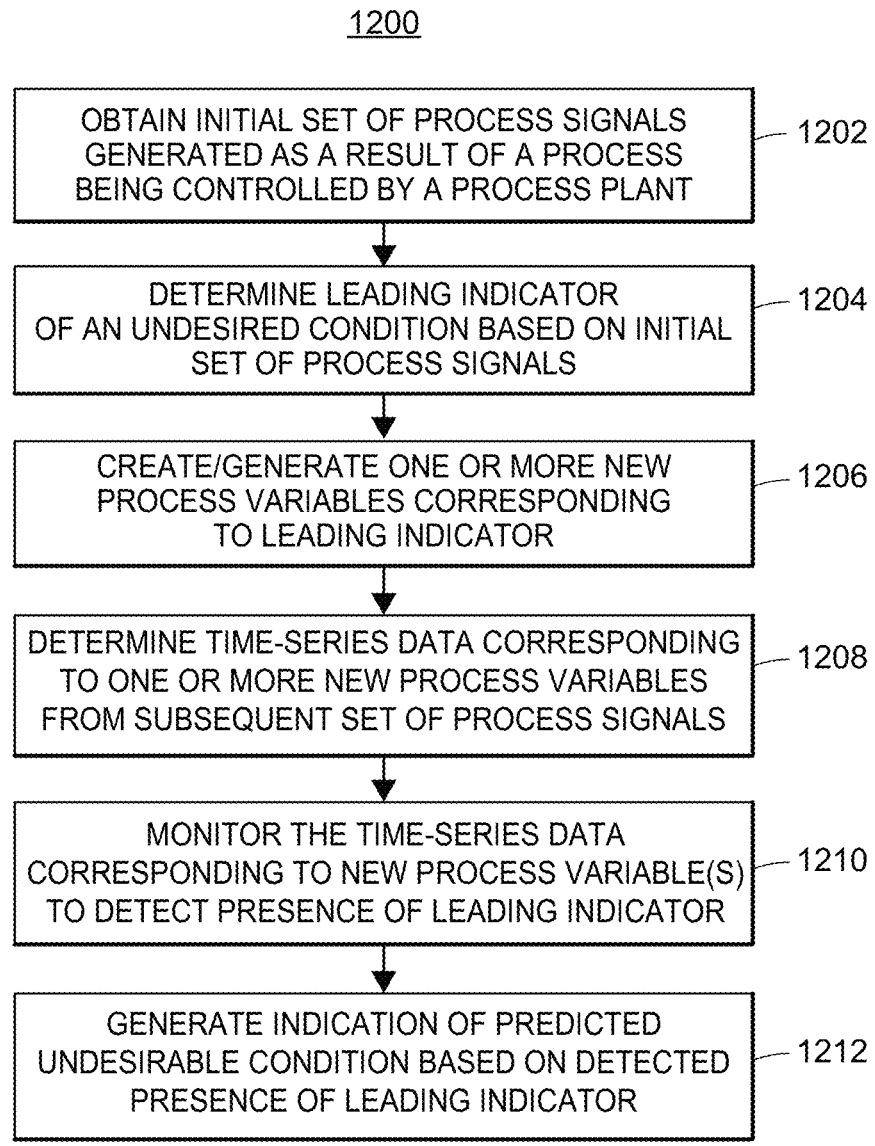
FIG. 7G depicts a flow diagram of an example method for providing early fault detection in process plants.

FIG. 7G shows a flow diagram of an example method 1200 for providing early fault detection in process plants and process control systems. One or more portions of the method 1200 may be performed by a data block in the block definition library 252, for example. One or more portions of the method 1200 may be performed by one or more portions of the industrial process performance monitoring/analytics system 100, e.g., by one or more DDEs 102*x*, by an off-line data module, by an on-line data module, etc. Of course, one or more portions of the method 1200 may be performed by systems, devices, and apparatuses other than those of the data analytics system 100 described herein. In some embodiments, the method 1200 may include more, less, or different steps other than that described herein.

At a block 1202, the method 1200 may include receiving or obtaining an initial set of process signals or data generated as a result of a process plant controlling a process. The initial set of process signals may include time domain data generated by one or more process control devices operating to control a process in the process plant, and/or may include time domain data generated by one or more other components, devices, or entities within the process plant as a result of controlling the process (e.g., first-order process data generated by various data sources within the process plant). For example, the initial set of process signals may include values of process measurements over time, such as of temperatures, flows, pressures, compositions, states, etc. In some embodiments, the obtained initial set of process signals or data may include second- or higher-order process data over time that is generated as a result of the process plant controlling the process, such as diagnostic results, a series of operator or user actions, an available bandwidth of a link or process communication network, a result of a data analytic, etc. The obtained initial set of process signals may include off-line process data and/or on-line process data, for example.

At a block 1204, the method 1200 may include determining, based on the obtained initial set of process signals, a leading indicator of an abnormality, a fault, a decrease in performance, or other undesired/undesirable condition occurring (or that has occurred) within the process plant. For example, the leading indicator may be a change in the behavior of one or more process control signals that occurs prior to the occurrence of the abnormality, fault, decrease in performance, and/or other condition, such as a spike in a peak amplitude of a particular frequency of a particular process control signal (e.g., the spike 1104 shown in FIG. 7B). In an embodiment, the leading indicator may be determined by using one or more statistical analytics techniques on one or more of the obtained initial set of process signals, such as PCA, PLS regression, clustering, cross-correlation, etc. One or more off-line and/or on-line data blocks and/or data modules of the data analytics system 100 may operate on one or more obtained process signals to determine one or more leading indicators of the abnormality, fault, decrease in performance, and/or other condition, in an embodiment.

At a block 1206, the method 1200 may include creating, defining, or generating a set of one or more new process variables corresponding to the leading indicator. In an embodiment, a new process variable corresponding to a particular change in the behavior of a particular signal may be created, defined, or generated. For example, a frequency of interest (e.g., the frequency of the signal 1106 of FIG. 7C) in which the leading indicator may occur may be identified and created/generated as a new process variable. In some embodiments, generating the set of one or more new process variables (block 1206) includes defining/identifying/generating a first new process variable corresponding to the leading indicator (e.g., the change to the signal 1106 of FIG. 7C), and subsequently performing one or more analytics techniques on the time-series data generated by the first new process variable (either alone or in combination with other time-series data generated by other process variables) to determine another new process variable associated with the leading indicator. For example, referring to FIG. 7D, a PCA was applied to the frequency domain data corresponding to the signal 1106 of FIG. 7C to determine a first principal component, and the first principal component was identified/defined as another new process variable whose values over time are represented in FIG. 7C by the signal 1112.

In some implementations of the block 1206, one or more off-line and/or on-line data blocks and/or data modules of the data analytics system 100 may operate to identify and create/define/generate the one or more new process variables corresponding to the leading indicator. The one or more new process variables may be tagged and/or stored within the process plant or process control system, in some cases.

At a block 1208, the method 1200 may include obtaining a subsequent set of process signals (e.g., in a manner similar to that of block 1202) and performing a rolling FFT thereon to determine time-series data corresponding to the one or more new process variables. The subsequent set of process signals may include off-line and/or on-line signals, for example. To perform the rolling FFT thereon, an FFT may be performed on a first window of data of the subsequent set of process signals and the values of the peak amplitudes of the frequencies therein may be saved as time-series data, an FFT may be performed on a second window of data and the values of the peak amplitudes of the frequencies therein may be saved as time-series data, and so on, thereby generating respective time-series data for one or more frequencies of interest included within the subsequent set of process signals. For example, when a particular frequency of interest of a particular process signal corresponds to a new process variable, a rolling FFT may be applied to the subsequent set of process signals to obtain the behavior of the particular frequency of interest within the subsequent set of process signals over time, e.g., to obtain time-series data comprising peak amplitude values generated by the new process variable over time. In situations in which analytics techniques were performed to identify new process variables (e.g., the new process variable corresponds to the first principal component of the frequency domain data corresponding to the signal 1106 as discussed above), the one or more analytics techniques may also be applied at the block 1208 to determine the time-series data of such new process variables. The block 1208 may be performed by one or more portions of the data analytics system 100, such as by one or more on-line and/or off-line data blocks and/or data modules, in an embodiment.

At a block 1210, the method 1200 may include monitoring the time-series data generated by the one or more new process variables (e.g., as obtained at the block 1208) for the presence of the leading indicator. For example, when the peak amplitude of a particular frequency of interest exceeds a magnitude and/or duration threshold, the presence of the leading indicator may be detected. In an embodiment, the new process variable is identified by a respective tag or other indicator and is incorporated into the process plant, and as such, the monitoring of its time-series data values (block 1215) may be performed by fault detection, alarm handling, and/or other monitoring applications of the process plant. Additionally or alternatively, the monitoring of the time-series data (block 1215) to detect the presence of the leading indicator may be performed by the data analytics system 100.

At a block 1212, the method 1200 may include generating an indication that a fault, abnormality, event, decrease in performance, undesired condition, and/or desired condition, etc. is predicted to occur based on a detected presence of the leading indicator discovered during the monitoring at the block 1210. In some cases, the block 1212 includes generating an indication of a time frame during which said condition is predicted to occur. For example, a trend chart, an alarm, an alert, and/or other visual or auditory indicator may be generated and presented by a user interface to warn a user or operator of impending abnormalities, faults, decreases in performance, and/or other conditions in the process plant based on the presence of leading indicators in obtained time-series data.

In some embodiments (not shown in FIG. 7G), the method 1200 may include causing a signal (such as a control signal or other signal indicative of a change) to be generated and provided to the on-line process plant based on the detected presence of the leading indicators. For example, the data analytics system 100 may automatically generate one or more control signals based on the detected presence of a leading indicator in the monitored data (block 1210), and may automatically provide the one or more control signals to one or more controllers to change the behavior of at least a portion of the process control plant. Other signals that may be provided to the on-line process plant to effect a change therein include, for example, a trigger or a signal indicative of a change to a parameter, a value, a configuration, and/or a state (e.g., of a piece of equipment, device, routine, or application, etc.), or to an application executing within or in conjunction with the process plant.

In some embodiments (not shown in FIG. 7G), the method 1200 may include causing one or more signals to be generated and provided to the data analytics system 100. For example, the method 1200 may include providing, to the data analytics system 100, an indication of the new process variables and their respective identifiers, an indication of determined leading indicators, the identities and sequences of various analytic techniques performed on the time-series data (and on higher order data generated therefrom, such as the output of various analytics techniques applied thereto) to determine additional new process variables, the monitored time-series data generated by the new process variables, the presence of leading indicators therein, etc. Generally, the method 1200 may include causing any data generated by execution of the method 1200 to be provided to the data analytics system 100. In an embodiment, the one or more signals provided to the data analytics system 100 may be streamed data.

Of course, the method 1200 is not limited to the blocks 1202-1212. In some embodiments, additional blocks may be performed by the method 1200, and/or some of the blocks 1202-1212 may be omitted from the method 1200. Further, embodiments of the method 1200 may operate in conjunction with any or all portions of FIGS. 1, 2, 3, 4A-4Q, 5A-5G, and 6A-6E, and/or with any number of features and/or techniques described in other sections of the present disclosure.

In view of the above, one who is familiar with the evolution of process control systems over time, e.g., from centralized process control systems in which control and other processing was performed more or less centrally, to next generation distributed control systems (DCS) in which control and other processing was distributed amongst multiple controllers throughout a plant, will recognize that the novel Distributed Analytics System (DAS) 100 and associated industrial process performance monitoring and analytics methods, devices, apparatuses, components, and techniques described herein provides a similar leap into the next generation of process control performance monitoring and analytics. For example, rather than performing targeted, narrowly-focused analytics at an operator work station of a process control system, off-line at an analytics facility, or by using rudimentary analytics tools, the distributed analytics system 100 and associated methods, devices, apparatuses, components, and techniques disclosed herein allow for comprehensive performance monitoring and real-time analytics that is distributed throughout the plant and even at corporate and/or enterprise levels in a manner similar to that of distributed control systems (see, e.g., FIG. 2B) so that real-time descriptions, predictions, and prescriptions related to current operations of the process plant are constantly available. Additionally, the modular, distributed architecture of the DAS 100 enables performance and analytics functions to be embedded as close to or as far away from data sources of the process plant and/or process control system as desired, and allows additional DDEs 102x to be added to the DAS 100 as or when desired (e.g., for more localized processing horsepower, to provide analytics at a particular region or location of the plant 5, when the plant 5 expands, etc). Further, as explained above, the DAS 100 allows for the design, definition, deployment, and monitoring of data modules to be partitioned or separated from the environments and platforms in which they are executing, thereby freeing up a data engineer or user from having to be concerned with coding and compilation of analytics and data modules/models at all. Still further, this separation allows for greater flexibility and seamless migration to different target environments.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The particular features, structures, and/or characteristics of any specific embodiment may be combined in any suitable manner and/or in any suitable combination with one and/or more other embodiments, including the use of selected features with or without corresponding use of other features. In addition, many modifications may be made to adapt a particular application, situation and/or material to the essential scope or spirit of the present invention. It is to be understood that other variations and/or modifications of the embodiments of the present invention described and/or illustrated herein are possible in light of the teachings herein and should be considered part of the spirit or scope of the present invention. Certain aspects of the invention are described herein as exemplary aspects.

What is claimed:

1. A system for accessing process plant data associated with the operation of a process plant from a plurality of electronic data sources, comprising:

a first electronic data source and a second electronic data source, each comprising a tangible, non-transitory storage medium storing the process plant data associated with the operation of the process plant;

a first data provider associated with the first electronic data source and a second data provider associated with the second electronic data source, wherein the first and second data providers are configured to: (i) receive standardized queries, (ii) convert the standardized queries into data source-specific queries for the respective first and second electronic data sources, and (iii) provide data obtained from the respective first and second electronic data sources based upon the respective data source-specific queries;

a processor, communicatively coupled to the first and second electronic data sources;

a program memory, communicatively coupled to the processor, and comprising a tangible, non-transitory storage medium storing instructions that, when executed by the processor, cause the processor to:

receive a standardized query that utilizes a standardized query format, wherein the standardized query includes an indication of a data frame format and wherein the standardized query format utilizes a query syntax that is not directly executable to obtain data from any electronic data source;

send a first message containing at least a first part of the standardized query to the first data provider to cause the first data provider to generate a first data source-specific query based upon the standardized query, wherein the first data source-specific query utilizes a first query format associated with the first electronic data source;

send a second message containing at least a second part of the standardized query to the first data provider to cause the second data provider to generate a second data source-specific query based upon the standardized query, wherein the second data source-specific query utilizes a second query format associated with the second electronic data source;

obtain, from the first data provider, a first set of data obtained from the first electronic data source bar execution of the first data source-specific query;

obtain, from the second data provider, a second set of data obtained from the second electronic data source by execution of the second data source-specific query; and generate an aggregated data frame including the first and second sets of data, wherein the aggregated data frame is formatted according to the indication of the data frame format.

2. The system of claim 1, wherein the standardized query includes a first indication of the first electronic data source and a second indication of the second electronic data source.

3. The system of claim 2, wherein the first indication identifies the first query format and the second indication identifies the second query format.

4. The system of claim 2, wherein the first and second indications are prepended to indications of data columns.

5. The system of claim 1, wherein the standardized query is contained in a JavaScript Object Notation (JSON) file.

6. The system of claim 1, wherein the standardized query includes an indication of a time range identifying a period of time corresponding to data entries in the first data set and the second data set.

7. The system of claim 6, wherein the time range includes a plurality of time periods, and wherein at least two of the plurality of time periods are separated by excluded time periods, for which data is not queried.

8. The system of claim 7, wherein the time range includes a plurality of time periods, and wherein the time range identifies a first time period associated with the first data set and a second time period associated with the second data set.

9. The system of claim 1, wherein the first electronic data source is a relational database and the second electronic data source is a non-relational database.

10. The system of claim 1, wherein the standardized query includes an indication of a sample rate for the aggregated data frame.

11. The system of claim 1, wherein:
the first data set includes data having a first sample rate,
the second data set includes data having a second sample rate, and
generating the aggregated data frame includes aligning the first and second sample rates.

12. The system of claim 11, wherein aligning the first and second sample rates includes adding data points corresponding to unsampled times needed to achieve a desired sample rate.

13. The system of claim 11, wherein the added data points are given values of the sampled data directly preceding the added data points in time.

14. The system of claim 11, wherein aligning the first and second data sample rates includes removing sampled data points.

15. The system of claim 1, wherein the first and second sets of data each include a plurality of data points containing information measured by one or more field devices within a process plant.

16. A tangible, non-transitory computer-readable medium storing instructions for obtaining time-series data associated with the operation of a process plant from an electronic data source that, when executed by a processor of a computer system, cause the computer system to implement a data provider associated with the electronic data source, wherein the data provider is configured to:

receive, from a query execution service associated with multiple electronic data sources, an indication of a time range for which the data is to be obtained, wherein the indication is expressed in a standardized query format that is independent of the electronic data source and wherein the standardized query format utilizes a query syntax that is not directly executable to obtain data from any electronic data source;

receive, from the query execution service, an indication of a characteristic of the data to be obtained, wherein the indication is expressed in the standardized query format that is independent of the electronic data source;

receive, from the query execution service, an indication of a data frame format, wherein the indication is expressed in the standardized query format that is independent of the electronic data source;

determine a data source-specific query format associated with the electronic data source;

generate a data source-specific query complying with the data source-specific format based upon the indications of the time range and the characteristic of the data to be obtained;

cause the data source-specific query to be executed to select the data from the electronic data source;

receive the data from the electronic data source;

generate a data frame including the data, wherein the data frame is formatted according to the indication of the data frame format; and send, to the query execution service, the data frame.

17. The tangible, non-transitory computer-readable medium of claim 16, wherein the indication of the time range and the indication of the characteristics are received in a standardized query utilizing the standardized query format.

18. The tangible, non-transitory computer-readable medium of claim 16, wherein the data provider is further configured to:
receive an indication of a format in which the data is to be obtained, and
convert the data received from the electronic data source into the indicated format.

19. The tangible, non-transitory computer-readable medium of claim 16, wherein the instructions that cause the processor to generate the data source-specific query cause the processor to map the indicated time range and the indicated characteristics of the data to be obtained to the determined data source-specific query format.

20. The tangible, non-transitory computer-readable medium of claim 16, wherein the instructions that cause the processor to cause the data source-specific query to be executed cause the processor to send the data source-specific query to an execution engine of the electronic data source, which execution engine queries the electronic data source using the data source-specific query.

21. The tangible, non-transitory computer-readable medium of claim 16, wherein the indication of the time range includes a plurality of start times and a plurality of end times.

22. The tangible, non-transitory computer-readable medium of claim 16, wherein the indication of the time range includes a sample rate for the data to be obtained.

23. The tangible, non-transitory computer-readable medium of claim 16, wherein the data frame includes a plurality of data points, each data point associated with a time within the time range.

24. The tangible, non-transitory computer-readable medium of claim 23, wherein each data point is associated with a time within the time range that aligns with an integer multiple of a sample period following a start time or is the start time.

25. The tangible, non-transitory computer-readable medium of claim 16, wherein the indication of the characteristic of the data to be obtained includes an indication of one or more types of measurements regarding operation of the process plant.

26. The tangible, non-transitory computer-readable medium of claim 25, wherein the indication of the one or more types of measurements includes one or more tags, aliases, and data types associated with the data.

27. The tangible, non-transitory computer-readable medium of claim 16, wherein the electronic data source is a big data storage node.

28. A method for providing data from an electronic data source, comprising:
receiving, by a data provider associated with the electronic data source from a data requesting entity, a standardized query in a standardized query format, wherein the standardized query format is different from a data source-specific query format utilized by the electronic data source, wherein the standardized query format utilizes a query syntax that is not directly executable to obtain data from any electronic data source, and further wherein the standardized query includes an indication of a data frame format;
extracting, by the data provider, query parameters from the standardized query;
generating, by the data provider, a data source-specific query in the data source-specific query format based upon the extracted query parameters;
executing, by an execution engine of the electronic data source, the data source-specific query to obtain the data form the electronic data source; and
sending, by the data provider, a data frame containing the obtained data to a data receiving entity, wherein the data frame is formatted according to the indication of the data frame format.

29. The method of claim 28, wherein the data requesting entity comprises a query block within an analytics program.

30. The method of claim 28, wherein extracting the query parameters includes determining (i) a time period and a data parameter of the data, the time period having a start time and an end time the data parameter indicating a type of data to be obtained from the electronic data source, and (ii) a sampling rate.

31. The method of claim 30, wherein providing the obtained data to the requesting entity includes returning a set of data points associated with the time period, wherein each data point includes a timestamp that is the start time or an integer multiple of the period of the sampling rate following the start time.

32. The method of claim 31, wherein one or more data points are added to the data set with timestamps indicating integer multiples of the period of the sampling rate after the start time by using values of data entries in the electronic data source associated with times most closely prior to each timestamp of the one or more added data points.

33. The method of claim 30, wherein the type indicated by the data parameter is a type of measurement or a measurement from a type of measurement device, wherein the measurement device is a field device disposed within a process plant.

34. The method of claim 30, wherein the data parameter further indicates a tag of the data to be obtained, an alias for the data to be provided to the data requesting entity, and a data format type for the data to be provided to the data requesting entity.

35. The method of claim 28, wherein the data receiving entity is the same entity as the data requesting entity.

* * * * *